(12) United States Patent
Dwivedi et al.

(10) Patent No.: US 11,726,990 B2
(45) Date of Patent: *Aug. 15, 2023

(54) EFFICIENT UPDATING OF JOURNEY INSTANCES DETECTED WITHIN UNSTRUCTURED EVENT DATA

(71) Applicant: Splunk Inc., San Francisco, CA (US)

(72) Inventors: Akash Dwivedi, San Francisco, CA (US); Himanshu Gupta, Vancouver (CA); Eric Tschetter, Redwood City, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/451,300

(22) Filed: Oct. 18, 2021

(65) Prior Publication Data

US 2022/0043807 A1     Feb. 10, 2022

Related U.S. Application Data

(63) Continuation of application No. 16/735,520, filed on Jan. 6, 2020, now Pat. No. 11,151,125.

(Continued)

(51) Int. Cl.
*G06F 16/23*     (2019.01)
*G06F 16/248*     (2019.01)
(Continued)

(52) U.S. Cl.
CPC ............ *G06F 16/2379* (2019.01); *G06F 9/54* (2013.01); *G06F 16/221* (2019.01);
(Continued)

(58) Field of Classification Search
CPC .............. G06F 16/2379; G06F 16/221; G06F 16/2477; G06F 16/258; G06F 16/248; G06F 9/54
(Continued)

(56) References Cited

U.S. PATENT DOCUMENTS 5,210,837 A     5/1993    Wiecek
5,392,735 A     2/1995    Xitco, Jr. et al.
(Continued)

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

(Continued)

*Primary Examiner* — Dung K Chau
(74) *Attorney, Agent, or Firm* — Knobbe, Martens, Olson & Bear LLP

(57) ABSTRACT

Systems and methods are disclosed for efficiently storing information identifying journey instances within unstructured event data of a data intake and processing system. Each journey instance is illustratively associated with a series of events within the unstructured event data occurring over a journey duration. Because the unstructured event data may be constantly updated, any given inspection of the event data may yield both complete and incomplete instances. Storage of instance data over time can require updating of prior incomplete journey instances with complete versions of such instance detected at a later point in time. However, a data store of the unstructured event data may be unsuited for such updating, as the store may maintain version information for deleted data to reduce possibility of data loss. To address this issue, a separate structured data store, such as a columnar time series data store, is provided to efficiently store instance information.

20 Claims, 81 Drawing Sheets

Related U.S. Application Data

(60) Provisional application No. 62/923,409, filed on Oct. 18, 2019.

(51) Int. Cl.
  *G06F 9/54* (2006.01)
  *G06F 16/2458* (2019.01)
  *G06F 16/25* (2019.01)
  *G06F 16/22* (2019.01)

(52) U.S. Cl.
  CPC ........ *G06F 16/248* (2019.01); *G06F 16/2477* (2019.01); *G06F 16/258* (2019.01)

(58) Field of Classification Search
  USPC ...................................................... 707/722
  See application file for complete search history.

(56) References Cited

U.S. PATENT DOCUMENTS

| | | |
|---|---|---|
| 5,956,695 A | 9/1999 | Carrithers et al. |
| 6,074,435 A | 6/2000 | Rojestal |
| 6,119,129 A | 9/2000 | Traversat et al. |
| 6,216,132 B1 | 4/2001 | Chandran et al. |
| 6,615,211 B2 | 9/2003 | Beygelzimer et al. |
| 7,134,087 B2 | 11/2006 | Bushold et al. |
| 7,251,584 B1 | 7/2007 | Perazolo et al. |
| 7,352,280 B1 | 4/2008 | Rockwood |
| 7,607,169 B1 | 10/2009 | Njemanze et al. |
| 7,761,407 B1 | 7/2010 | Stern |
| 7,774,359 B2 | 8/2010 | Chkodrov et al. |
| 7,822,707 B1 | 10/2010 | Yehuda et al. |
| 7,937,287 B2 | 5/2011 | Gaia et al. |
| 7,937,344 B2 | 5/2011 | Baum et al. |
| 7,949,999 B1 | 5/2011 | Willeford |
| 8,010,286 B2 | 8/2011 | Templeton et al. |
| 8,112,425 B2 | 2/2012 | Baum et al. |
| 8,121,784 B2 | 2/2012 | Templeton et al. |
| 8,447,747 B1 | 5/2013 | Yi et al. |
| 8,452,645 B2 | 5/2013 | Steinkamp et al. |
| 8,595,186 B1 | 11/2013 | Mandyam et al. |
| 8,635,425 B1 | 1/2014 | Adogla et al. |
| 8,751,529 B2 | 6/2014 | Zhang et al. |
| 8,788,525 B2 | 7/2014 | Neels et al. |
| 8,831,976 B2 | 9/2014 | Sprogoe et al. |
| 8,869,141 B2 | 10/2014 | Lauwers |
| 9,098,371 B2 | 8/2015 | Cordesses et al. |
| 9,100,424 B1 | 8/2015 | Thomas |
| 9,128,980 B2 | 9/2015 | Neels et al. |
| 9,128,995 B1 | 9/2015 | Fletcher et al. |
| 9,135,283 B2 | 9/2015 | Sivasubramanian et al. |
| 9,215,240 B2 | 12/2015 | Merza et al. |
| 9,229,702 B1 | 1/2016 | Kapulkin et al. |
| 9,268,824 B1 | 2/2016 | Federici |
| 9,286,413 B1 | 3/2016 | Coates et al. |
| 9,330,416 B1 | 5/2016 | Zaslavsky et al. |
| 9,400,644 B2 | 7/2016 | Mahajan |
| 9,471,606 B1 | 10/2016 | Pedregal et al. |
| 9,626,183 B1 | 4/2017 | Smith |
| 9,766,808 B2 | 9/2017 | Natvig |
| 9,881,066 B1 | 1/2018 | Yousaf et al. |
| 9,960,974 B2 | 5/2018 | Bai et al. |
| 9,967,351 B2 | 5/2018 | Maheshwari et al. |
| 10,127,258 B2 | 11/2018 | Lamas et al. |
| 10,140,345 B1 | 11/2018 | Hereford et al. |
| 10,142,276 B2 | 11/2018 | Rapaport et al. |
| 10,289,401 B1 | 5/2019 | Gerraty |
| 10,394,802 B1 | 8/2019 | Porath et al. |
| 10,496,632 B2 | 12/2019 | Kennedy |
| 10,678,804 B2 | 6/2020 | Beringer et al. |
| 10,719,332 B1* | 7/2020 | Dwivedi ................... G06F 8/65 |
| 10,747,750 B2 | 8/2020 | Bortnikov et al. |
| 10,754,638 B1 | 8/2020 | Dwivedi et al. |
| 10,769,163 B2 | 9/2020 | Beringer et al. |
| 10,776,377 B2 | 9/2020 | Beringer et al. |
| 10,885,049 B2 | 1/2021 | Beringer et al. |
| 10,909,128 B2 | 2/2021 | Beringer et al. |
| 10,909,182 B2 | 2/2021 | Beringer et al. |
| 10,997,192 B2 | 5/2021 | Boster et al. |
| 11,119,762 B1 | 9/2021 | Bush et al. |
| 11,144,185 B1 | 10/2021 | Dinga et al. |
| 11,151,125 B1 | 10/2021 | Dwivedi et al. |
| 11,194,564 B1 | 12/2021 | Dwivedi et al. |
| 11,256,497 B1 | 2/2022 | Dwivedi et al. |
| 11,263,229 B1 | 3/2022 | Basavaiah et al. |
| 11,269,876 B1 | 3/2022 | Basavaiah et al. |
| 11,269,908 B2 | 3/2022 | Beringer et al. |
| 11,409,756 B1 | 8/2022 | Park et al. |
| 11,550,849 B2 | 1/2023 | Beringer et al. |
| 2002/0002550 A1 | 1/2002 | Berman |
| 2002/0038230 A1 | 3/2002 | Chen |
| 2002/0038251 A1 | 3/2002 | Sheprow et al. |
| 2002/0059183 A1 | 5/2002 | Chen |
| 2002/0120511 A1 | 8/2002 | Hanes |
| 2003/0009373 A1 | 1/2003 | Ensing et al. |
| 2003/0115191 A1 | 6/2003 | Copperman et al. |
| 2003/0191870 A1 | 10/2003 | Duggan |
| 2004/0172445 A1 | 9/2004 | Singh et al. |
| 2004/0224775 A1 | 11/2004 | Wood et al. |
| 2006/0112408 A1 | 5/2006 | Crew et al. |
| 2006/0143593 A1 | 6/2006 | Caffrey et al. |
| 2006/0178954 A1 | 8/2006 | Thukral et al. |
| 2006/0195461 A1 | 8/2006 | Lo et al. |
| 2007/0013968 A1 | 1/2007 | Ebaugh et al. |
| 2007/0209074 A1 | 9/2007 | Coffman |
| 2007/0244905 A1 | 10/2007 | Ito et al. |
| 2007/0260510 A1 | 11/2007 | Chrzan et al. |
| 2009/0012862 A1 | 1/2009 | Pirillo et al. |
| 2009/0083118 A1 | 3/2009 | Kallery et al. |
| 2009/0119578 A1 | 5/2009 | Relyea et al. |
| 2009/0172035 A1* | 7/2009 | Lessing ................... G06Q 30/02 |
| 2009/0187478 A1 | 7/2009 | Shiplet |
| 2009/0235194 A1 | 9/2009 | Arndt et al. |
| 2009/0248506 A1 | 10/2009 | Goldstein et al. |
| 2009/0254572 A1* | 10/2009 | Redlich ................... G06Q 10/06 |
| 2009/0300016 A1 | 12/2009 | Kile, Jr. |
| 2009/0319941 A1 | 12/2009 | Laansoo et al. |
| 2009/0327240 A1 | 12/2009 | Meehan et al. |
| 2010/0131940 A1 | 5/2010 | Jazdzewski |
| 2010/0138431 A1 | 6/2010 | Bator et al. |
| 2010/0174662 A1 | 7/2010 | Fabella, Jr. et al. |
| 2010/0250497 A1* | 9/2010 | Redlich ................. H04L 63/105 |
| | | 707/661 |
| 2011/0029952 A1 | 2/2011 | Harrington |
| 2011/0167418 A1 | 7/2011 | Gopal |
| 2011/0199380 A1 | 8/2011 | Budiu |
| 2011/0302153 A1 | 12/2011 | Meretakis et al. |
| 2012/0005227 A1 | 1/2012 | Nagano et al. |
| 2012/0008978 A1 | 1/2012 | Iwamoto et al. |
| 2012/0084857 A1 | 4/2012 | Hubner et al. |
| 2012/0089781 A1 | 4/2012 | Ranade et al. |
| 2012/0101894 A1 | 4/2012 | Sterling et al. |
| 2012/0117116 A1 | 5/2012 | Jacobson et al. |
| 2012/0124065 A1 | 5/2012 | Butterfield et al. |
| 2012/0266156 A1 | 10/2012 | Spivak et al. |
| 2013/0031414 A1 | 1/2013 | Dhuse et al. |
| 2013/0138459 A1 | 5/2013 | Barkan et al. |
| 2013/0159036 A1 | 6/2013 | Keil et al. |
| 2013/0179443 A1 | 7/2013 | Noel |
| 2013/0185286 A1 | 7/2013 | Galitsky et al. |
| 2013/0311832 A1 | 11/2013 | Lad et al. |
| 2013/0339219 A1 | 12/2013 | Bernheimer et al. |
| 2014/0032606 A1 | 1/2014 | Chandler et al. |
| 2014/0067251 A1 | 3/2014 | Berlingerio et al. |
| 2014/0067266 A1 | 3/2014 | Berlingerio et al. |
| 2014/0208218 A1 | 7/2014 | Carasso et al. |
| 2014/0223099 A1 | 8/2014 | Kidron |
| 2014/0279753 A1 | 9/2014 | Dalessandro et al. |
| 2014/0280917 A1 | 9/2014 | Lad et al. |
| 2015/0019513 A1 | 1/2015 | Dey et al. |
| 2015/0019537 A1 | 1/2015 | Neels et al. |
| 2015/0026167 A1 | 1/2015 | Neels et al. |
| 2015/0046915 A1 | 2/2015 | Oliver et al. |
| 2015/0074644 A1 | 3/2015 | Oberheide et al. |

(56) References Cited

U.S. PATENT DOCUMENTS

| | | |
|---|---|---|
| 2015/0081701 A1 | 3/2015 | Lerios et al. |
| 2015/0100952 A1 | 4/2015 | Tornow et al. |
| 2015/0128116 A1 | 5/2015 | Chen et al. |
| 2015/0220970 A1 | 8/2015 | Greenzeiger et al. |
| 2015/0304389 A1 | 10/2015 | Chiussi et al. |
| 2015/0332290 A1 | 11/2015 | Gerber |
| 2015/0339357 A1 | 11/2015 | Carasso et al. |
| 2016/0014210 A1 | 1/2016 | Thomas |
| 2016/0063072 A1 | 3/2016 | N et al. |
| 2016/0092045 A1 | 3/2016 | Lamas et al. |
| 2016/0098384 A1 | 4/2016 | Burke et al. |
| 2016/0103908 A1 | 4/2016 | Fletcher et al. |
| 2016/0110433 A1 | 4/2016 | Sawhney et al. |
| 2016/0125185 A1 | 5/2016 | Wang et al. |
| 2016/0140243 A1 | 5/2016 | Adams et al. |
| 2016/0179863 A1 | 6/2016 | Chandran et al. |
| 2016/0188144 A1 | 6/2016 | Pistoia et al. |
| 2016/0210021 A1 | 7/2016 | Zgraggen et al. |
| 2016/0224531 A1 | 8/2016 | Robichaud et al. |
| 2016/0224532 A1 | 8/2016 | Miller et al. |
| 2016/0266882 A1 | 9/2016 | Trevathan et al. |
| 2016/0321021 A1 | 11/2016 | Derut et al. |
| 2016/0380913 A1 | 12/2016 | Morgan et al. |
| 2017/0018290 A1 | 1/2017 | Hendry et al. |
| 2017/0031565 A1 | 2/2017 | Chauhan et al. |
| 2017/0033971 A1 | 2/2017 | Radivojevic et al. |
| 2017/0039577 A1 | 2/2017 | Gauthier et al. |
| 2017/0048264 A1 | 2/2017 | Chauhan et al. |
| 2017/0060562 A1 | 3/2017 | Lopez et al. |
| 2017/0063906 A1 | 3/2017 | Muddu et al. |
| 2017/0083585 A1 | 3/2017 | Chen et al. |
| 2017/0085445 A1 | 3/2017 | Layman et al. |
| 2017/0134520 A1 | 5/2017 | Abbasi et al. |
| 2017/0139996 A1 | 5/2017 | Marquardt et al. |
| 2017/0140039 A1 | 5/2017 | Neels et al. |
| 2017/0140309 A1 | 5/2017 | Hashimoto et al. |
| 2017/0147709 A1 | 5/2017 | Ganz |
| 2017/0154087 A1 | 6/2017 | McClure et al. |
| 2017/0154088 A1 | 6/2017 | Sherman |
| 2017/0200205 A1 | 7/2017 | Liu et al. |
| 2017/0270416 A1 | 9/2017 | Sri et al. |
| 2017/0286525 A1 | 10/2017 | Li et al. |
| 2017/0289060 A1 | 10/2017 | Aftab et al. |
| 2018/0018210 A1 | 1/2018 | Dhuse et al. |
| 2018/0018436 A1 | 1/2018 | Opitz et al. |
| 2018/0039506 A1 | 2/2018 | Wagner et al. |
| 2018/0089303 A1 | 3/2018 | Miller et al. |
| 2018/0089328 A1 | 3/2018 | Bath et al. |
| 2018/0096417 A1* | 4/2018 | Cook .................. G06F 3/0482 |
| 2018/0121566 A1 | 5/2018 | Filippi et al. |
| 2018/0157713 A1 | 6/2018 | Huang et al. |
| 2018/0287925 A1 | 10/2018 | Wik et al. |
| 2018/0314853 A1 | 11/2018 | Oliner et al. |
| 2018/0359259 A1 | 12/2018 | Leon |
| 2019/0004875 A1 | 1/2019 | Ofer et al. |
| 2019/0056983 A1 | 2/2019 | Jeong et al. |
| 2019/0095478 A1 | 3/2019 | Tankersley et al. |
| 2019/0095501 A1* | 3/2019 | Beringer ............. G06F 16/2457 |
| 2019/0098106 A1 | 3/2019 | Mungel et al. |
| 2019/0113345 A1 | 4/2019 | Stewart et al. |
| 2019/0121895 A1 | 4/2019 | Liang et al. |
| 2019/0141015 A1 | 5/2019 | Nellen |
| 2019/0230015 A1 | 7/2019 | Lad et al. |
| 2019/0251579 A1 | 8/2019 | Savelli et al. |
| 2019/0278589 A1 | 9/2019 | Cook et al. |
| 2020/0026634 A1 | 1/2020 | Chen et al. |
| 2020/0110519 A1 | 4/2020 | Vangala et al. |
| 2020/0304389 A1 | 9/2020 | Bauan et al. |
| 2020/0348969 A1 | 11/2020 | Grossman et al. |
| 2020/0349482 A1 | 11/2020 | Grossman et al. |
| 2020/0402099 A1 | 12/2020 | Pittman |
| 2021/0027182 A1 | 1/2021 | Harris et al. |
| 2021/0318851 A1 | 10/2021 | Sahu et al. |
| 2022/0261397 A1 | 8/2022 | Beringer |

OTHER PUBLICATIONS

Carraso, David, "Exploring Splunk," published by CITO Research, New York, NY, Apr. 2012.

SLAML 10 Reports, Workshop On Managing Systems via Log Analysis and Machine Learning Techniques, login: Feb. 2011 Conference Reports.

Splunk Enterprise 8.0.0 Overview, available online, retrieved May 20, 2020 from docs.splunk.com.

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Cipriani, Jason; "How to Request Desktop Version of a Web Site in Chrome for Android"; CNET.com website [full url in ref.]; Apr. 18, 2012 (Year: 2012).

Doan, et al., "Information Extraction Challenges in Managing Unstructured Data," SIGMOD Record, Dec. 2008, vol. 37, No. 4, pp. 14-20 (Year: 2008).

Florence, Ryan; Welcome to Future of Web Application Delivery, Jan. 4, 2016, retrieved at medium.com.

Klimushyn, Mel; "Web Application Architecture from 10,000 Feet, Part 1-Client-Side vs. Server-Side"; atomicobject.com website [full URL in ref.]; Apr. 6, 2015 (Year: 2015).

Ma, et al., "Ordering Categorical Data to Improve Visualization," IEEE Symposium on Information Visualization, Oct. 1999, pp. 1-4.

"Modernizr Documentation"; modernizr.com website [full URL in ref.] as captured by the Wayback Machine Internet Archive (archive.org); Oct. 22, 2017 (Year: 2017).

Shiotsu, Yoshitaka; PHP vs. JavaScript,ids Dec. 22, 2016, Wayback Machine Internet Archive, retrieved from upwork.com.

Sturgeon, Philip; "Managing Stable and Unstable Branches in Git"; Phil.Tech website [full url in ref.]; Nov. 30, 2009 (Year: 2009).

Supalov, Vladislav; "How Does the Frontend Communicate with the Backend?"; vsupalov.com website (full url in ref.); Mar. 19, 2019 (Year: 2019).

Vaid, Workshop on Managing Systems via log Analysis and Machine Learning Techniques (SLAML '10), login: vol. 36, No. 1, Oct. 3, 2010, Vancouver, BC, Canada, 7 pages.

Wongsuphasawat, et al., "Exploring Flow, Factors, and Outcomes of Temporal Event Sequences with the Outlfow Visualization," IEEE Transactions on Visualization and Computer Graphics, vol. 18, No. 12, Dec. 2012, pp. 2659-2668.

Wongsuphasawat, et al., "LifeFlow: Visualizing an Overview of Event Sequences," CHI 2011—Session: Visual Analytics, Vancouver, BC, Canada, May 7-12, 2011, 11 pages.

U.S. Appl. No. 17/020,682 dated Sep. 14, 2020, in 183 pages.
U.S. Appl. No. 17/162,300, filed Jan. 29, 2021, in 266 pages.
U.S. Appl. No. 17/246,452, filed Apr. 30, 2021, in 104 pages.
U.S. Appl. No. 17/589,717, filed Jan. 31, 2022, in 222 pages.
U.S. Appl. No. 18/151,364, filed Jan. 6, 2023 in 182 pages.

* cited by examiner

| Time 535 | Host 536 | Source 537 | Source Type 538 | Event 539 |
|---|---|---|---|---|
| 10/10/2000 1:55 p.m. | www1 | access.log | access_combined | 127.0.0.1 - frank [10/Oct/2000:13:55:36 -0700] "GET /apache.gif HTTP/1.0" 200 2326 0.0947 |
| 10/10/2000 1:56 p.m. | www2 | access.log | access_combined | 127.0.0.1 - bob [10/Oct/2010:13:56:36 -0700] "GET /mickey_mouse.gif HTTP/1.0" 200 2980 0.0899 |
| 10/10/2000 1:57 p.m. | www2 | access.log | access_combined | 127.0.0.1 - carlos [10/Oct/2010:13:57:36 -0700] "GET /donald_duck.gif HTTP/1.0" 200 2900 0.0857 |
| 10/10/2000 1:58 p.m. | www2 | error.log | apache_error | [Sunday Oct 10 1:59:33 2010] [error] [client 127.10.1.1.015] File does not exist: /home/reba/public_html/images/daffy_duck.gif |

| Data Summary | | | |
|---|---|---|---|
| Hosts (5) | Sources (8) | Sourcetypes (3) | |
| filter | | | |
| Host ◇ | | Count ◇ | Last Update ◇ |
| mailsv | ⬇ | 9,829 | 4/29/14 1:32:47.000 PM |
| vendor_sales | ⬇ | 30,244 | 4/29/14 1:32:46.000 PM |
| www1 | ⬇ | 24,221 | 4/29/14 1:32:44.000 PM |
| www2 | ⬇ | 22,595 | 4/29/14 1:32:47.000 PM |
| www3 | ⬇ | 22,975 | 4/29/14 1:32:45.000 PM |

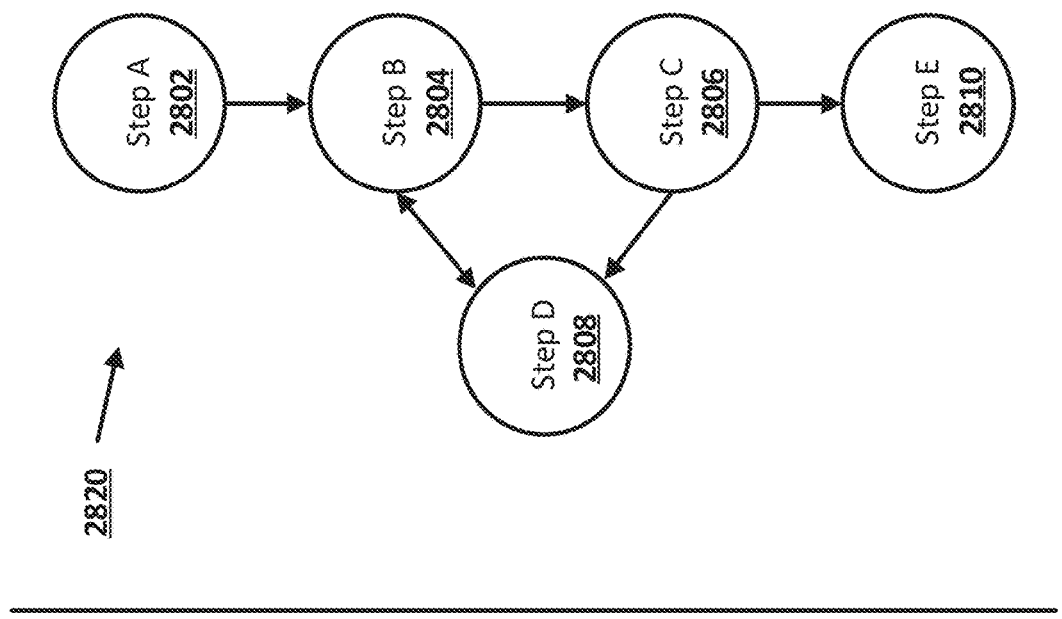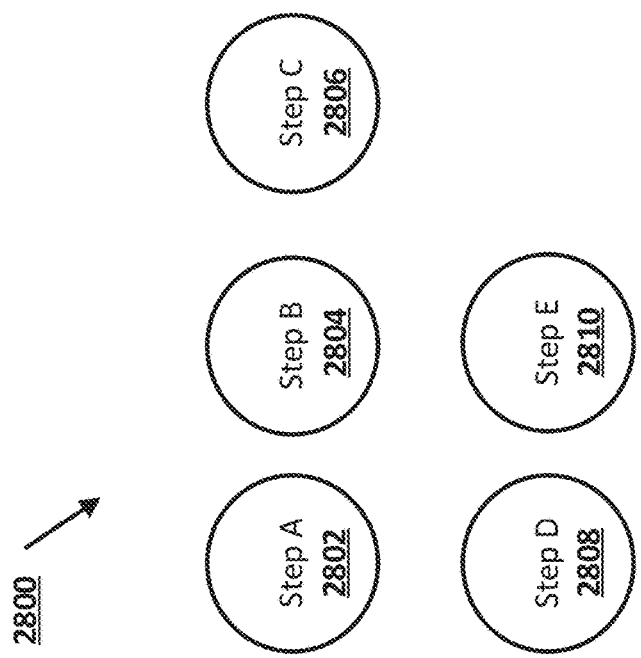
FIG. 28

Explore: Buttercup Games

Filter 3906B 3906C 3906D
3906A

Transition Filters 3912

One of...
[Select... 4104A]

[Eventually followed by... ▼ 4104B]

One of...
[Select... 4104C]

3904A 3904B 3904C
List  Flowchart  Metrics

3902 / 4202

All time ▼   Fast Mode ▼

<Prev 1 2 3 4 5 6 7 8 9 ... 10 Next>
          4206  4208  4210  4212

| PIVOT ID (JSESSIONID) | Start Time 4204 | End Time | Total Duration | Event Count | Sequence |
|---|---|---|---|---|---|
| SD4SL6FF7ADFF4963 4214A | 5/18/2017 11:59:17 PM | 5/18/2017 11:59:17 PM | 26 ms | 3 | ▭▭▭ |
| SD1SL7FF6ADFF89341 4214B | 5/18/2017 11:57:11 PM | 5/18/2017 11:57:11 PM | 4 ms | 3 | ▭▭▭ |
| SD7SL2FF9ADFF89569 4214C | 5/18/2017 11:56:46 PM | 5/18/2017 11:56:46 PM | 28 ms | 2 | ▭▭ |
| SD3SL6FF3ADFF4952 4214D | 5/18/2017 11:55:47 PM | 5/18/2017 11:55:47 PM | 0 ms | 1 | ▭ |
| SD8SL8FF6ADFF4957 4214E | 5/18/2017 11:51:52 PM | 5/18/2017 11:51:52 PM | 111 ms | 5 | ▭▭▭▭▭ |
| SD2SL10FF6ADFF4955 4214F | 5/18/2017 11:50:00 PM | 5/18/2017 11:50:00 PM | 48 ms | 4 | ▭▭▭▭ |
| SD3SL5FF2ADFF4957 4214G | 5/18/2017 11:45:16 PM | 5/18/2017 11:45:16 PM | 0 ms | 1 | ▭ |
| SD5SL2FF7ADFF4951 4214H | 5/18/2017 | 5/18/2017 | 101 ms | 4 | ▭▭▭▭ |

*FIG. 42* splunk > App: Journey Analytics ∨ Version Selector ∨         Administrator ∨ [1] Messages ∨ Settings ∨ Activity ∨ Help ∨ [Find]

5000

5002

Journey Analytics

Event Streams

Buttercup Games
- Guest 360 Experience
- Hotel Interactive Menu
- In-room Chromecast Expe...
- Order Process Flow
- SFDC Oppty Stage Funnel
- Sales Email
- TV CHANNELS

[+ Add New]

Edit: Bu  ✓ Stable   5004
         Latest
         5006

Search   Field Mapping   Sessionization (Step) (Pivot IDs (0)) (Attributes (0))    ☑ Hide default fields Preview values for JSESSIONID

| Field | Usage | | Value | Count |
|---|---|---|---|---|
| ident | none ▾ | | SD5SL5FF8ADFF4961 | 17 |
| items | none ▾ | | SD4SL6FF3ADFF4957 | 17 |
| JSESSIONID | none ▾ | | SD3SL8FF5ADFF4951 | 16 |
| method | none ▾ | | SD7SL5FF3ADFF4962 | 16 |
| msg | none ▾ | | SD9SL1FF6ADFF4955 | 16 |
| other | none ▾ | | SD8SL6FF10ADFF4961 | 15 |
| product | none ▾ | | SD0SL9FF10ADFF4962 | 15 |
| productId | none ▾ | | SD9SL2FF7ADFF4955 | 15 |
| protocol | none ▾ | | SD2SL1FF5ADFF4956 | 15 |
| q | none ▾ | | SD6SL9FF3ADFF4964 | 15 |
| | | | SD7SL5FF2ADFF4958 | 15 |
| | | | SD8SL5FF9ADFF4963 | 15 |

*Fig. 50*

EFFICIENT UPDATING OF JOURNEY INSTANCES DETECTED WITHIN UNSTRUCTURED EVENT DATA

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon Web Services (AWS), and other data systems that store passively or actively generated data, including machine-generated data ("machine data"). The machine data can include performance data, diagnostic data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it.

Although the availability of vastly greater amounts of diverse data on diverse data systems provides opportunities to derive new insights, it also gives rise to technical challenges to search and analyze the data. Tools exist that allow an analyst to search data systems separately and collect results over a network for the analyst to derive insights in a piecemeal manner. However, UI tools that allow analysts to quickly search and analyze large set of raw machine data to visually identify data subsets of interest, particularly via straightforward and easy-to-understand sets of tools and search functionality do not exist.

BRIEF DESCRIPTION OF THE DRAWINGS

The present disclosure is illustrated by way of example, and not limitation, in the figures of the accompanying drawings, in which like reference numerals indicate similar elements and in which:

FIG. 5C provides a visual representation of the manner in which a pipelined search language or query operates, in accordance with example embodiments;

FIG. 7C illustrates an example of creating and using an inverted index, in accordance with example embodiments;

FIG. 8B is an interface diagram of an example user interface for a data summary dialog that enables a user to select various data sources, in accordance with example embodiments;

FIGS. 9-15 are interface diagrams of example report generation user interfaces, in accordance with example embodiments;

FIG. 21 illustrates another example user interface for mapping a field identifier in a particular data source;

FIG. 28 illustrates a representation of steps included in a user journey;

FIGS. 39A, 39B, 40A, 40B, 41, and 42 are diagrams illustrating an example user interface displaying embodiments of journey summarizations;

FIGS. 50 and 51 depict example user interfaces of a multi-component application, in accordance with embodiments of the present disclosure;

DETAILED DESCRIPTION

Figure 1:
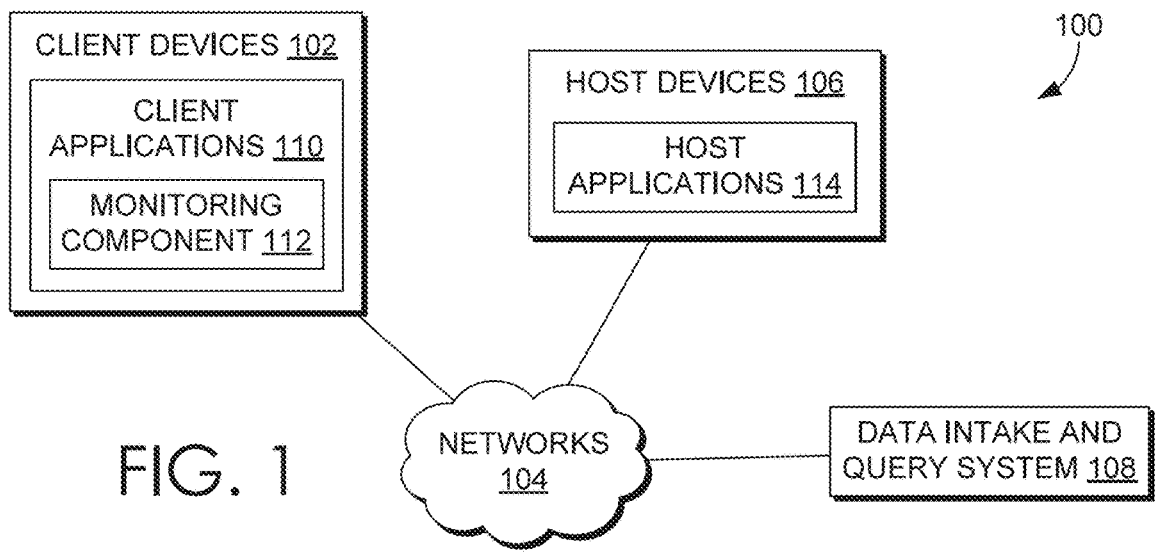
FIG. 1 is a block diagram of an example networked computer environment, in accordance with example embodiments.

Embodiments are described herein according to the following outline:
    1.0. General Overview
    2.0. Operating Environment
        2.1. Host Devices
        2.2. Client Devices
        2.3. Client Device Applications
        2.4. Data Server System
        2.5 Cloud-Based System Overview
        2.6 Searching Externally-Archived Data
            2.6.1. ERP Process Features
        2.7. Data Ingestion
            2.7.1. Input
            2.7.2. Parsing
            2.7.3. Indexing
        2.8. Query Processing
        2.9. Pipelined Search Language
        2.10. Field Extraction
        2.11. Example Search Screen
        2.12. Data Modeling
        2.13. Acceleration Techniques
            2.13.1. Aggregation Technique
            2.13.2. Keyword Index
            2.13.3. High Performance Analytics Store
                2.13.3.1 Extracting Event Data Using Posting Values
            2.13.4. Accelerating Report Generation
        2.14. Security Features
        2.15. Data Center Monitoring
        2.16. IT Service Monitoring
    3.0 User Journeys
    4.0 Journey Instances and Models
        4.1 User Interface Overview
            4.1.1 Displaying Field Identifiers
            4.1.2 Selecting Pivot Identifiers and Step Identifiers
        4.2 Pivot Identifiers
            4.2.1 Gluing Events
        4.3 Step Identifiers
        4.4 Attributes 4.5 Journey Summarization Overview
   4.6 Journey Visualizations
      4.6.1 Control Selection
      4.6.2 Journey Model Visualization
      4.6.3 Clusters of Journey Instances
      4.6.4 Filtering Journey Instances
      4.6.5 List Display of Journey Instances
   4.7 Journey Instance and Model Flows
   4.8 Additional Journey Visualizations
5.0 Hybrid Cloud/Private Data Environments
   5.1 Example Hybrid Environment
   5.2 Example User Interfaces
   5.3 Multi-Component Applications in a Hybrid Cloud/Private Environment
   5.4 Example Routines to Provide a Multi-Component Application
6.0 Efficient Alert Notifications from Journey Data
   6.1 Example User Interfaces for Requesting Alert Notification
   6.2 Example Routine for Efficient Detection of Alert States in Unstructured Data
7.0 Efficient Storage of Journey Data
8.0 Example Embodiments
9.0 Example Hardware Architecture In this description, references to "an embodiment," "one embodiment," or the like, mean that the particular feature, function, structure or characteristic being described is included in at least one embodiment of the technique introduced herein. Occurrences of such phrases in this specification do not necessarily all refer to the same embodiment. On the other hand, the embodiments referred to are also not necessarily mutually exclusive.

A data intake and query system can index and store data in data stores of indexers, and can receive search queries causing a search of the indexers to obtain search results. The data intake and query system typically has search, extraction, execution, and analytics capabilities that may be limited in scope to the data stores of the indexers ("internal data stores"). Hence, a seamless and comprehensive search and analysis that includes diverse data types from external data sources, common storage (may also be referred to as global data storage or global data stores), ingested data buffers, query acceleration data stores, etc. may be difficult. Thus, the capabilities of some data intake and query systems remain isolated from a variety of data sources that could improve search results to provide new insights. Furthermore, the processing flow of some data intake and query systems are unidirectional in that data is obtained from a data source, processed, and then communicated to a search head or client without the ability to route data to different destinations.

The disclosed embodiments overcome these drawbacks by extending the search and analytics capabilities of a data intake and query system to include diverse data types stored in diverse data systems internal to or external from the data intake and query system. As a result, an analyst can use the data intake and query system to search and analyze data from a wide variety of dataset sources, including enterprise systems and open source technologies of a big data ecosystem. The term "big data" refers to large data sets that may be analyzed computationally to reveal patterns, trends, and associations, in some cases, relating to human behavior and interactions.

In particular, introduced herein is a data intake and query system that that has the ability to execute big data analytics system seamlessly and can scale across diverse data sources to enable processing large volumes of diverse data from diverse data systems. A "data source" can include a "data system," which may refer to a system that can process and/or store data. A "data storage system" may refer to a storage system that can store data such as unstructured, semi-structured, or structured data. Accordingly, a data source can include a data system that includes a data storage system.

The system can improve search and analytics capabilities of previous systems by employing a search process master and query coordinators combined with a scalable network of distributed nodes communicatively coupled to diverse data systems. The network of distributed nodes can act as agents of the data intake and query system to collect and process data of distributed data systems, and the search process master and coordinators can provide the processed data to the search head as search results.

For example, the data intake and query system can respond to a query by executing search operations on various internal and external data sources to obtain partial search results that are harmonized and presented as search results of the query. As such, the data intake and query system can offload search and analytics operations to the distributed nodes. Hence, the system enables search and analytics capabilities that can extend beyond the data stored on indexers to include external data systems, common storage, query acceleration data stores, ingested data buffers, etc.

The system can provide big data open stack integration to act as a big data pipeline that extends the search and analytics capabilities of a system over numerous and diverse data sources. For example, the system can extend the data execution scope of the data intake and query system to include data residing in external data systems such as MySQL, PostgreSQL, and Oracle databases; NoSQL data stores like Cassandra, Mongo DB; cloud storage like Amazon S3 and Hadoop distributed file system (HDFS); common storage; ingested data buffers; etc. Thus, the system can execute search and analytics operations for all possible combinations of data types stored in various data sources.

The distributed processing of the system enables scalability to include any number of distributed data systems. As such, queries received by the data intake and query system can be propagated to the network of distributed nodes to extend the search and analytics capabilities of the data intake and query system over different data sources. In this context, the network of distributed nodes can act as an extension of the local data intake in query system's data processing pipeline to facilitate scalable analytics across the diverse data systems. Accordingly, the system can extend and transform the data intake and query system to include data resources into a data fabric platform that can leverage computing assets from anywhere and access and execute on data regardless of type or origin.

The disclosed embodiments include services such as new search capabilities, visualization tools, and other services that are seamlessly integrated into the DFS system. For example, the disclosed techniques include new search services performed on internal data stores, external data stores, or a combination of both. The search operations can provide ordered or unordered search results, or search results derived from data of diverse data systems, which can be visualized to provide new and useful insights about the data contained in a big data ecosystem.

Various other features of the DFS system introduced here will become apparent from the description that follows. First, however, it is useful to consider an example of an environment and system in which the techniques can be employed, as will now be described.

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, pre-defined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 7A).

2.0. Operating Environment

FIG. 1 is a block diagram of an example networked computer environment 100, in accordance with example embodiments. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, hyper-text markup language (HTML) documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
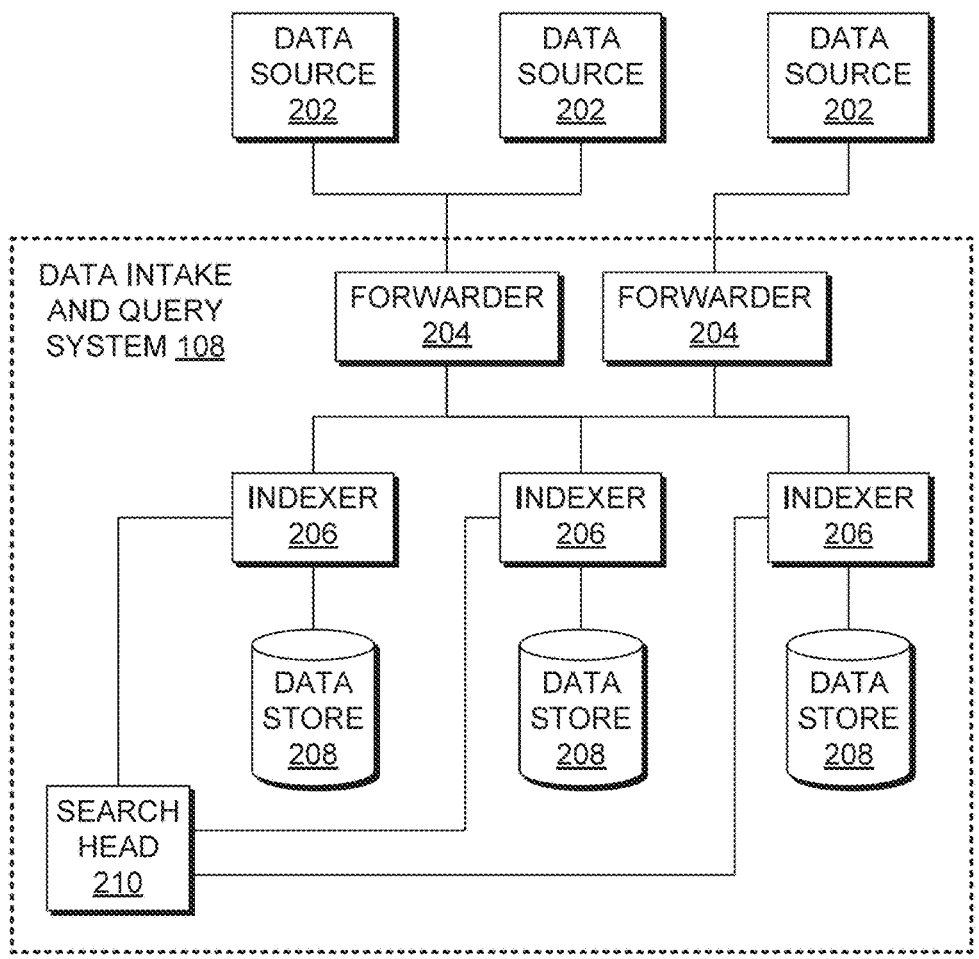
FIG. 2 is a block diagram of an example data intake and query system, in accordance with example embodiments.

FIG. 2 is a block diagram of an example data intake and query system 108, in accordance with example embodiments. System 108 includes one or more forwarders 204 that receive data from a variety of input data sources 202, and one or more indexers 206 that process and store the data in one or more data stores 208. These forwarders 204 and indexers 208 can comprise separate computer systems, or may alternatively comprise separate processes executing on one or more computer systems.

Each data source 202 broadly represents a distinct source of data that can be consumed by system 108. Examples of a data sources 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In some embodiments, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

2.5. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
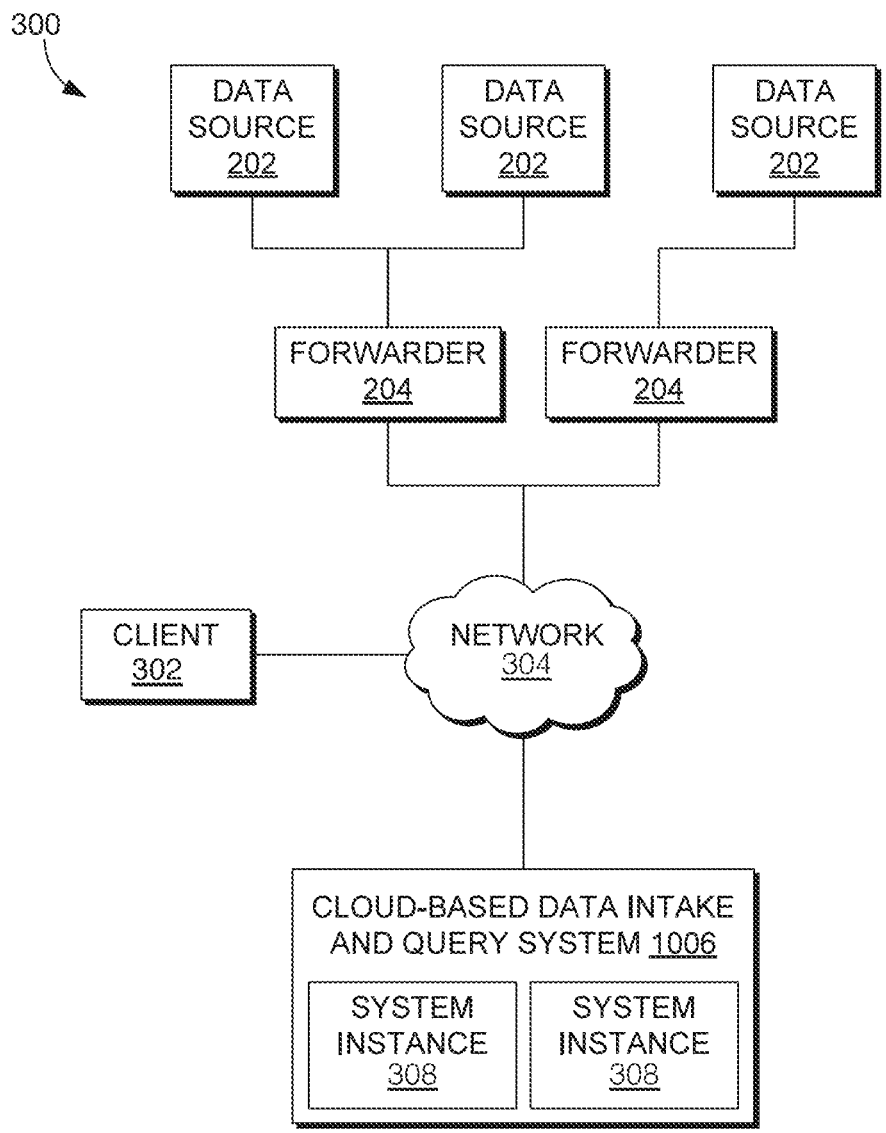
FIG. 3 is a block diagram of an example cloud-based data intake and query system, in accordance with example embodiments.

FIG. 3 illustrates a block diagram of an example cloud-based data intake and query system. Similar to the system of FIG. 2, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 38, each of the forwarders 204 may be configured to receive data from an input source and to forward the data to other components of the system 306 for further processing.

In some embodiments, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK CLOUD™, are centrally visible).

2.6. Searching Externally-Archived Data

Figure 4:
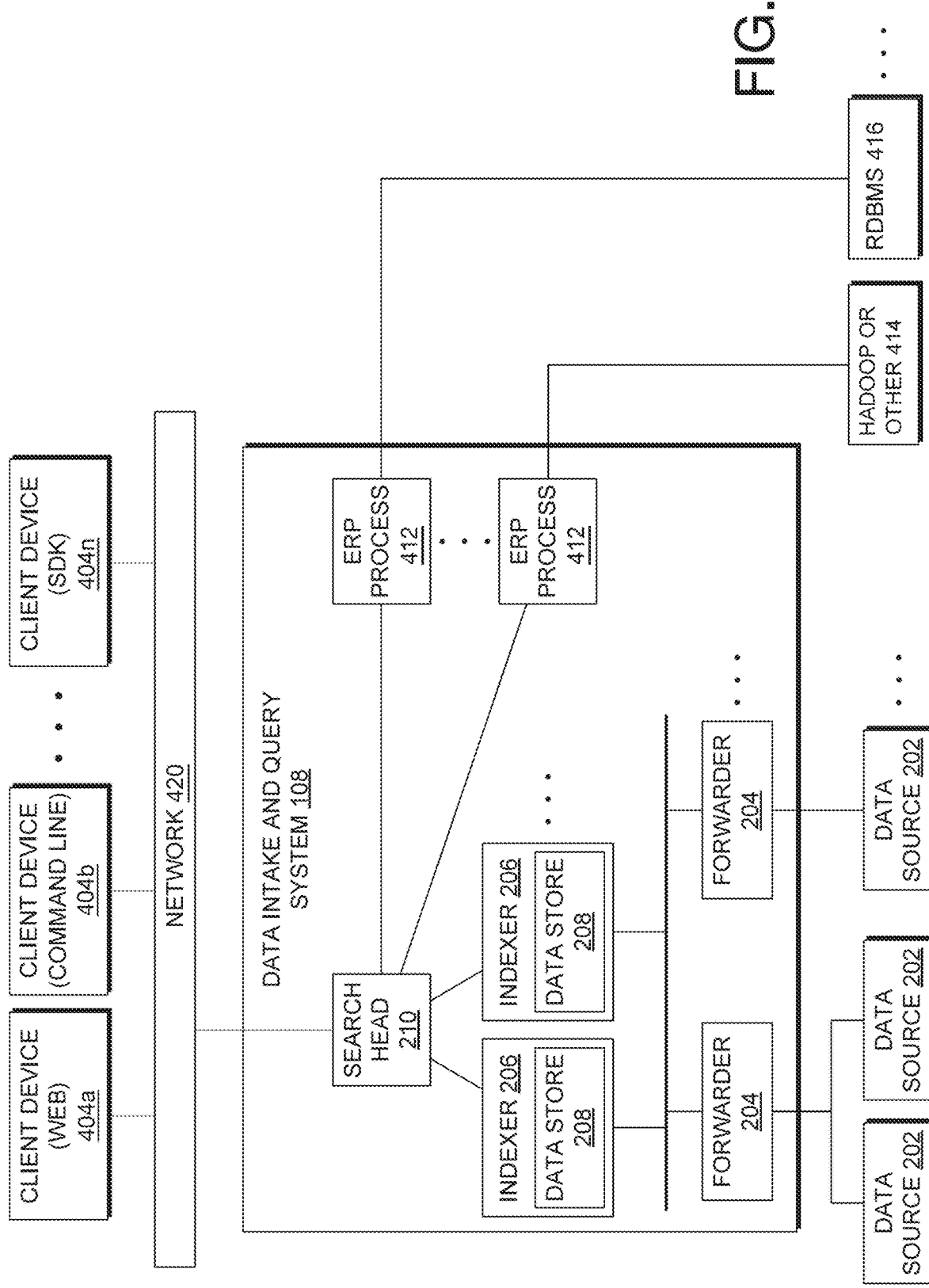
FIG. 4 is a block diagram of an example data intake and query system that performs searches across external data systems, in accordance with example embodiments.

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, Calif. Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404a, 404b, . . . , 404n may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

2.6.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which can then process the results data (e.g., break the machine data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.7. Data Ingestion

Figure 5A:
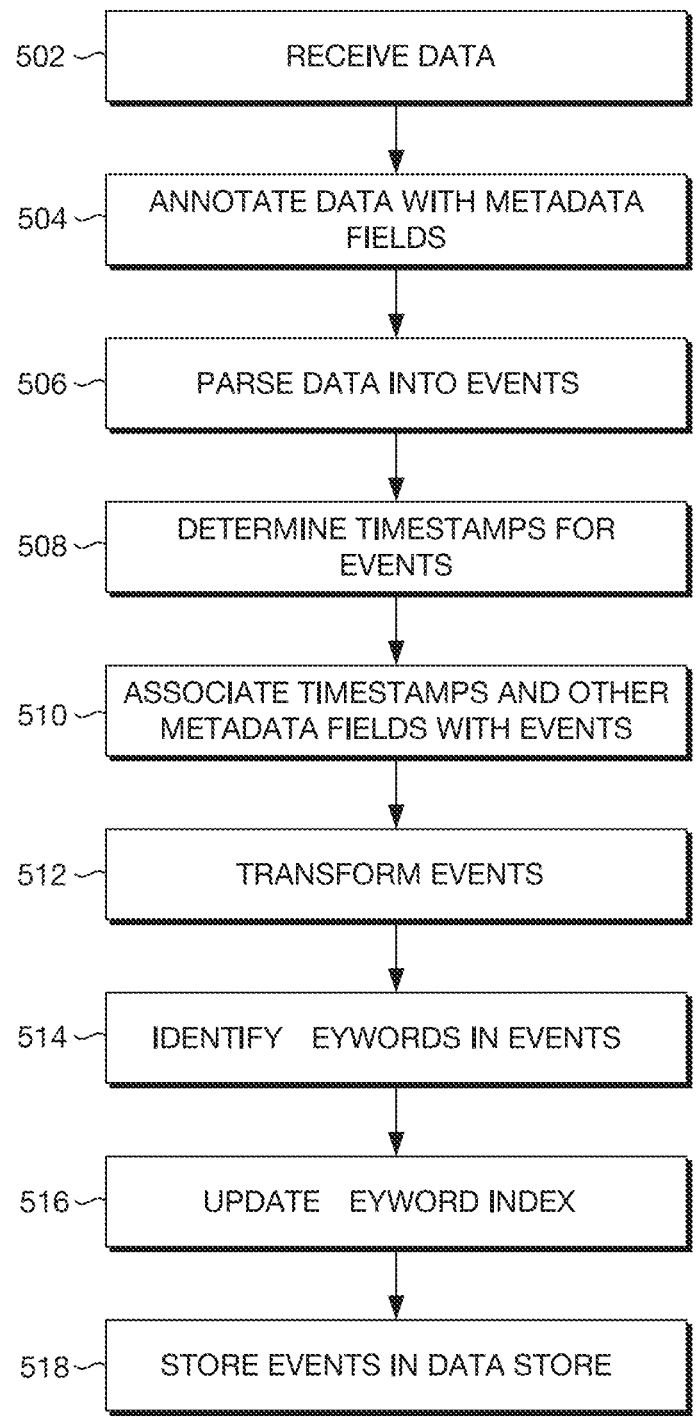
FIG. 5A is a flowchart of an example method that illustrates how indexers process, index, and store data received from forwarders, in accordance with example embodiments.

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

2.7.1. Input

At block 502, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some embodiments, a forwarder may contain the essential components needed to forward data. A forwarder can gather data from a variety of inputs and forward the data to an indexer for indexing and searching. A forwarder can also tag metadata (e.g., source, source type, host, etc.).

In some embodiments, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

2.7.2. Parsing

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 536, source 537, source type 538 and timestamps 535 can be generated for each event, and associated with a corresponding portion of machine data 539 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexer based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 536.

In the example shown in FIG. 5C, each of the events 531-534 is associated with a discrete request made from a client device. The raw machine data generated by the server and extracted from a server access log can include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds 544. As seen in FIG. 5C, all the raw machine data retrieved from the server access log is retained and stored as part of the corresponding events, 1221, 1222, and 1223 in the data store.

Event 534 is associated with an entry in a server error log, as indicated by "error.log" in the source column 537, that records errors that the server encountered when processing a client request. Similar to the events related to the server access log, all the raw machine data in the error log file pertaining to event 534 can be preserved and stored as part of the event 534.

Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

2.7.3. Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "SITE-BASED SEARCH AFFINITY", issued on 8 Sep. 2015, and in U.S. patent Ser. No. 14/266,817, entitled "MULTI-SITE CLUSTERING", issued on 1 Sep. 2015, each of which is hereby incorporated by reference in its entirety for all purposes.

Figure 5B:
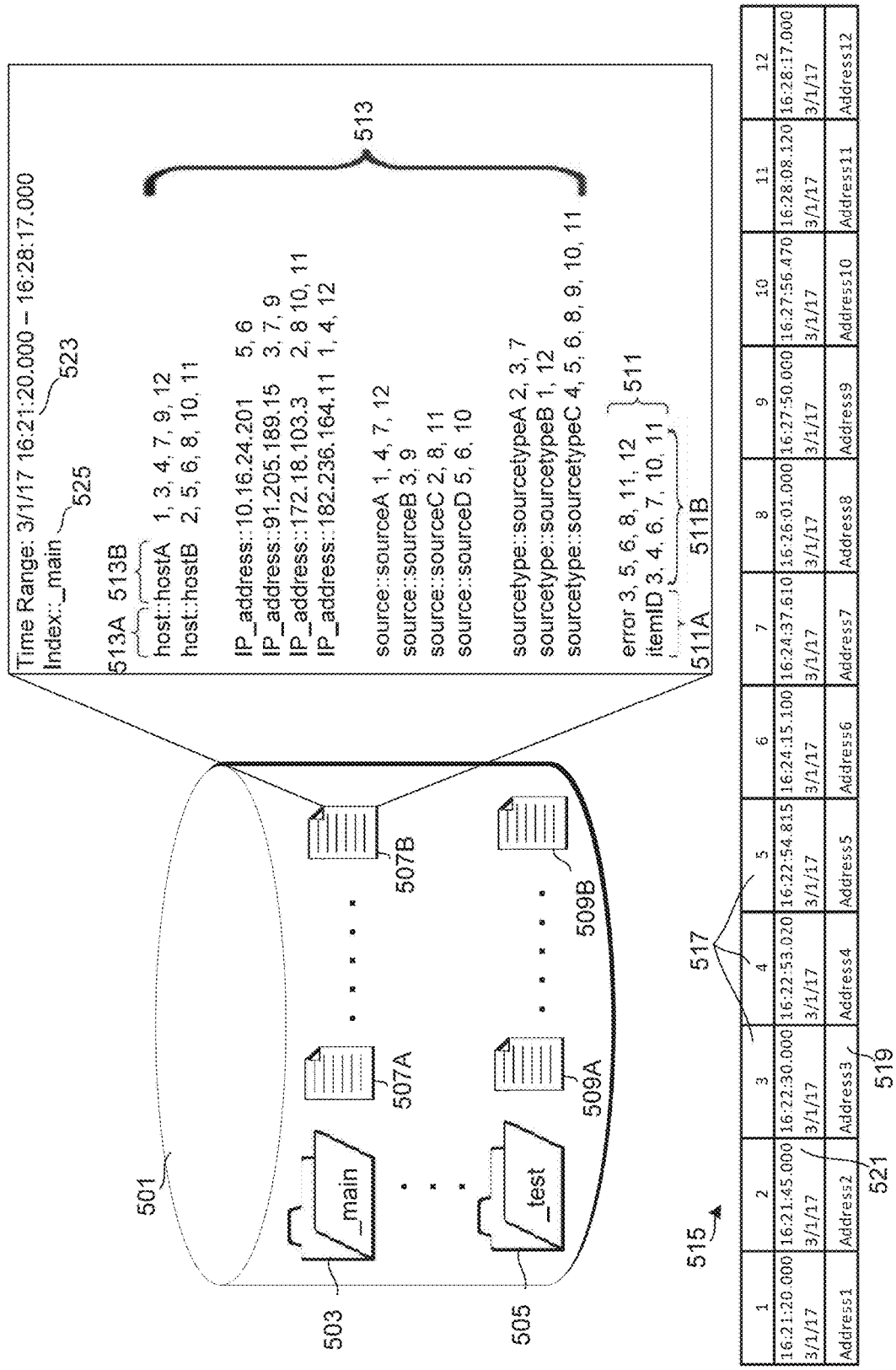
FIG. 5B is a block diagram of a data structure in which time-stamped event data can be stored in a data store, in accordance with example embodiments.

FIG. 5B is a block diagram of an example data store 501 that includes a directory for each index (or partition) that contains a portion of data managed by an indexer. FIG. 5B further illustrates details of an embodiment of an inverted index 507B and an event reference array 515 associated with inverted index 507B.

The data store 501 can correspond to a data store 208 that stores events managed by an indexer 206 or can correspond to a different data store associated with an indexer 206. In the illustrated embodiment, the data store 501 includes a _main directory 503 associated with a _main index and a _test directory 505 associated with a _test index. However, the data store 501 can include fewer or more directories. In some embodiments, multiple indexes can share a single directory or all indexes can share a common directory. Additionally, although illustrated as a single data store 501, it will be understood that the data store 501 can be implemented as multiple data stores storing different portions of the information shown in FIG. 5B. For example, a single index or partition can span multiple directories or multiple data stores, and can be indexed or searched by multiple corresponding indexers.

In the illustrated embodiment of FIG. 5B, the index-specific directories 503 and 505 include inverted indexes 507A, 507B and 509A, 509B, respectively. The inverted indexes 507A . . . 507B, and 509A . . . 509B can be keyword indexes or field-value pair indexes described herein and can include less or more information that depicted in FIG. 5B.

In some embodiments, the inverted index 507A . . . 507B, and 509A . . . 509B can correspond to a distinct time-series bucket that is managed by the indexer 206 and that contains events corresponding to the relevant index (e.g., _main index, _test index). As such, each inverted index can correspond to a particular range of time for an index. Additional files, such as high performance indexes for each time-series bucket of an index, can also be stored in the same directory as the inverted indexes 507A . . . 507B, and 509A . . . 509B. In some embodiments inverted index 507A . . . 507B, and 509A . . . 509B can correspond to multiple time-series buckets or inverted indexes 507A . . . 507B, and 509A . . . 509B can correspond to a single time-series bucket.

Each inverted index 507A . . . 507B, and 509A . . . 509B can include one or more entries, such as keyword (or token) entries or field-value pair entries. Furthermore, in certain embodiments, the inverted indexes 507A . . . 507B, and 509A . . . 509B can include additional information, such as a time range 523 associated with the inverted index or an index identifier 525 identifying the index associated with the inverted index 507A . . . 507B, and 509A . . . 509B. However, each inverted index 507A . . . 507B, and 509A . . . 509B can include less or more information than depicted.

Token entries, such as token entries 511 illustrated in inverted index 507B, can include a token 511A (e.g., "error," "itemID," etc.) and event references 511B indicative of events that include the token. For example, for the token "error," the corresponding token entry includes the token "error" and an event reference, or unique identifier, for each event stored in the corresponding time-series bucket that includes the token "error." In the illustrated embodiment of FIG. 5B, the error token entry includes the identifiers 3, 5, 6, 8, 11, and 12 corresponding to events managed by the indexer 206 and associated with the index _main 503 that are located in the time-series bucket associated with the inverted index 507B.

In some cases, some token entries can be default entries, automatically determined entries, or user specified entries. In some embodiments, the indexer 206 can identify each word or string in an event as a distinct token and generate a token entry for it. In some cases, the indexer 206 can identify the beginning and ending of tokens based on punctuation, spaces, as described in greater detail herein. In certain cases, the indexer 206 can rely on user input or a configuration file to identify tokens for token entries 511, etc. It will be understood that any combination of token entries can be included as a default, automatically determined, a or included based on user-specified criteria.

Similarly, field-value pair entries, such as field-value pair entries 513 shown in inverted index 507B, can include a field-value pair 513A and event references 513B indicative of events that include a field value that corresponds to the field-value pair. For example, for a field-value pair source-type::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 can be default entries, automatically determined entries, or user specified entries. As a non-limiting example, the field-value pair entries for the fields host, source, sourcetype can be included in the inverted indexes 507A . . . 507B, and 509A . . . 509B as a default. As such, all of the inverted indexes 507A . . . 507B, and 509A . . . 509B can include field-value pair entries for the fields host, source, sourcetype. As yet another non-limiting example, the field-value pair entries for the IP_address field can be user specified and may only appear in the inverted index 507B based on user-specified criteria. As another non-limiting example, as the indexer indexes the events, it can automatically identify field-value pairs and create field-value pair entries. For example, based on the indexers review of events, it can identify IP_address as a field in each event and add the IP_address field-value pair entries to the inverted index 507B. It will be understood that any combination of field-value pair entries can be included as a default, automatically determined, or included based on user-specified criteria.

Each unique identifier 517, or event reference, can correspond to a unique event located in the time series bucket. However, the same event reference can be located in multiple entries. For example if an event has a sourcetype splunkd, host www1 and token "warning," then the unique identifier for the event will appear in the field-value pair entries sourcetype::splunkd and host::www1, as well as the token entry "warning." With reference to the illustrated embodiment of FIG. 5B and the event that corresponds to the event reference 3, the event reference 3 is found in the field-value pair entries 513 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 can be used to locate the events in the corresponding bucket. For example, the inverted index can include, or be associated with, an event reference array 515. The event reference array 515 can include an array entry 517 for each event reference in the inverted index 507B. Each array entry 517 can include location information 519 of the event corresponding to the unique identifier (non-limiting example: seek address of the event), a timestamp 521 associated with the event, or additional information regarding the event associated with the event reference, etc.

For each token entry 511 or field-value pair entry 513, the event reference 501B or unique identifiers can be listed in chronological order or the value of the event reference can be assigned based on chronological data, such as a timestamp associated with the event referenced by the event reference. For example, the event reference 1 in the illustrated embodiment of FIG. 5B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 5B, the entries are sorted first by entry type and then alphabetically.

As a non-limiting example of how the inverted indexes 507A . . . 507B, and 509A . . . 509B can be used during a data categorization request command, the indexers can receive filter criteria indicating data that is to be categorized and categorization criteria indicating how the data is to be categorized. Example filter criteria can include, but is not limited to, indexes (or partitions), hosts, sources, sourcetypes, time ranges, field identifier, keywords, etc.

Using the filter criteria, the indexer identifies relevant inverted indexes to be searched. For example, if the filter criteria includes a set of partitions, the indexer can identify the inverted indexes stored in the directory corresponding to the particular partition as relevant inverted indexes. Other means can be used to identify inverted indexes associated with a partition of interest. For example, in some embodiments, the indexer can review an entry in the inverted indexes, such as an index-value pair entry 513 to determine if a particular inverted index is relevant. If the filter criteria does not identify any partition, then the indexer can identify all inverted indexes managed by the indexer as relevant inverted indexes.

Similarly, if the filter criteria includes a time range, the indexer can identify inverted indexes corresponding to buckets that satisfy at least a portion of the time range as relevant inverted indexes. For example, if the time range is last hour then the indexer can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria includes a partition main, then the indexer can determine that any events identified using inverted indexes within the partition main directory (or otherwise associated with the partition main) satisfy the index filter criterion.

Furthermore, based on the time range associated with each inverted index, the indexer can determine that that any events identified using a particular inverted index satisfies a time range filter criterion. For example, if a time range filter criterion is for the last hour and a particular inverted index corresponds to events within a time range of 50 minutes ago to 35 minutes ago, the indexer can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes, the indexer can identify event references (and therefore events) that satisfy the filter criteria. For example, if the token "error" is a filter criterion, the indexer can track all event references within the token entry "error." Similarly, the indexer can identify other event references located in other token entries or field-value pair entries that match the filter criteria. The system can identify event references located in all of the entries identified by the filter criteria. For example, if the filter criteria include the token "error" and field-value pair sourcetype::web_ui, the indexer can track the event references found in both the token entry "error" and the field-value pair entry sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The indexer can determine that the events associated with the identified event references satisfy the filter criteria.

In some cases, the indexer can further consult a timestamp associated with the event reference to determine whether an event satisfies the filter criteria. For example, if an inverted index corresponds to a time range that is partially outside of a time range filter criterion, then the indexer can consult a timestamp associated with the event reference to determine whether the corresponding event satisfies the time range criterion. In some embodiments, to identify events that satisfy a time range, the indexer can review an array, such as the event reference array 1614 that identifies the time associated with the events. Furthermore, as mentioned above using the known location of the directory in which the relevant inverted indexes are located (or other index identifier), the indexer can determine that any events identified using the relevant inverted indexes satisfy the index filter criterion.

In some cases, based on the filter criteria, the indexer reviews an extraction rule. In certain embodiments, if the filter criteria includes a field name that does not correspond to a field-value pair entry in an inverted index, the indexer can review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer can review an extraction rule that identifies how the sessionID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the indexer can then identify a field-value pair entry in the inverted index that includes a field value corresponding to the identity of the particular host, source, or sourcetype identified using the extraction rule.

Once the events that satisfy the filter criteria are identified, the system, such as the indexer 206 can categorize the results based on the categorization criteria. The categorization criteria can include categories for grouping the results, such as any combination of partition, source, sourcetype, or host, or other categories or fields as desired.

The indexer can use the categorization criteria to identify categorization criteria-value pairs or categorization criteria values by which to categorize or group the results. The categorization criteria-value pairs can correspond to one or more field-value pair entries stored in a relevant inverted index, one or more index-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The indexer can use the nineteen distinct field-value pair entries as categorization criteria-value pairs to group the results.

Specifically, the indexer can identify the location of the event references associated with the events that satisfy the filter criteria within the field-value pairs, and group the event references based on their location. As such, the indexer can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the indexer can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the indexer can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the indexer can generate up to thirty groups for the results that satisfy the filter criteria. Each group can be associated with a unique combination of categorization criteria-value pairs (e.g., unique combinations of partition value sourcetype value, and host value).

In addition, the indexer can count the number of events associated with each group based on the number of events that meet the unique combination of categorization criteria for a particular group (or match the categorization criteria-value pairs for the particular group). With continued reference to the example above, the indexer can count the number of events that meet the unique combination of partition, sourcetype, and host for a particular group.

Each indexer communicates the groupings to the search head. The search head can aggregate the groupings from the indexers and provide the groupings for display. In some cases, the groups are displayed based on at least one of the host, source, sourcetype, or partition associated with the groupings. In some embodiments, the search head can further display the groups based on display criteria, such as a display order or a sort order as described in greater detail above.

As a non-limiting example and with reference to FIG. 5B, consider a request received by an indexer 206 that includes the following filter criteria: keyword=error, partition=_main, time range=3/1/17 16:22.00.000-16:28.00.000, sourcetype=sourcetypeC, host=hostB, and the following categorization criteria: source.

Based on the above criteria, the indexer 206 identifies _main directory 503 and can ignore _test directory 505 and any other partition-specific directories. The indexer determines that inverted partition 507B is a relevant partition based on its location within the _main directory 503 and the time range associated with it. For sake of simplicity in this example, the indexer 206 determines that no other inverted indexes in the _main directory 503, such as inverted index 507A satisfy the time range criterion.

Having identified the relevant inverted index 507B, the indexer reviews the token entries 511 and the field-value pair entries 513 to identify event references, or events, that satisfy all of the filter criteria.

With respect to the token entries 511, the indexer can review the error token entry and identify event references 3, 5, 6, 8, 11, 12, indicating that the term "error" is found in the corresponding events. Similarly, the indexer can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer can ignore those field-value pair entries.

In addition to identifying event references found in at least one token entry or field-value pair entry (e.g., event references 3, 4, 5, 6, 8, 9, 10, 11, 12), the indexer can identify events (and corresponding event references) that satisfy the time range criterion using the event reference array 1614 (e.g., event references 2, 3, 4, 5, 6, 7, 8, 9, 10). Using the information obtained from the inverted index 507B (including the event reference array 515), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry source::sourceD (or have matching categorization criteria-value pairs) and event reference 8 is located in the field-value pair entry source::sourceC. Accordingly, the indexer can generate a sourceC group having a count of one corresponding to reference 8 and a sourceD group having a count of two corresponding to references 5 and 6. This information can be communicated to the search head. In turn the search head can aggregate the results from the various indexers and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, a request received by an indexer 206 that includes the following filter criteria: partition=_main, time range=3/1/17 3/1/17 16:21:20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

Group 1 (hostA, sourceA, sourcetypeA): 1 (event reference 7)

Group 2 (hostA, sourceA, sourcetypeB): 2 (event references 1, 12)

Group 3 (hostA, sourceA, sourcetypeC): 1 (event reference 4)

Group 4 (hostA, sourceB, sourcetypeA): 1 (event reference 3)

Group 5 (hostA, sourceB, sourcetypeC): 1 (event reference 9)

Group 6 (hostB, sourceC, sourcetypeA): 1 (event reference 2)

Group 7 (hostB, sourceC, sourcetypeC): 2 (event references 8, 11)

Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer can include the categorization criteria-value pairs for each group and the count. In some embodiments, the indexer can include more or less information. For example, the indexer can include the event references associated with each group and other identifying information, such as the indexer or inverted index used to identify the groups.

As another non-limiting examples, a request received by an indexer 206 that includes the following filter criteria: partition=_main, time range=3/1/17 3/1/17 16:21:20.000-16:28:17.000, source=sourceA, sourceD, and keyword=itemID and the following categorization criteria: host, source, sourcetype would result in the indexer identifying event references 4, 7, and 10 as satisfying the filter criteria, and generate the following groups:

Group 1 (hostA, sourceA, sourcetypeC): 1 (event reference 4)

Group 2 (hostA, sourceA, sourcetypeA): 1 (event reference 7)

Group 3 (hostB, sourceD, sourcetypeC): 1 (event references 10)

The indexer communicates the groups to the search head for aggregation with results received from other indexers. As will be understand there are myriad ways for filtering and categorizing the events and event references. For example, the indexer can review multiple inverted indexes associated with an partition or review the inverted indexes of multiple partitions, and categorize the data using any one or any combination of partition, host, source, sourcetype, or other category, as desired.

Further, if a user interacts with a particular group, the indexer can provide additional information regarding the group. For example, the indexer can perform a targeted search or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer can identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some embodiments, the indexer identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer can determine that it will analyze a sample of the events associated with the event references 4, 5, 6, 8, 10, 11. For example, the sample can include analyzing event data associated with the event references 5, 8, 10. In some embodiments, the indexer can use the event reference array 1616 to access the event data associated with the event references 5, 8, 10. Once accessed, the indexer can compile the relevant information and provide it to the search head for aggregation with results from other indexers. By identifying events and sampling event data using the inverted indexes, the indexer can reduce the amount of actual data this is analyzed and the number of events that are accessed in order to generate the summary of the group and provide a response in less time.

2.8. Query Processing

Figure 6A:
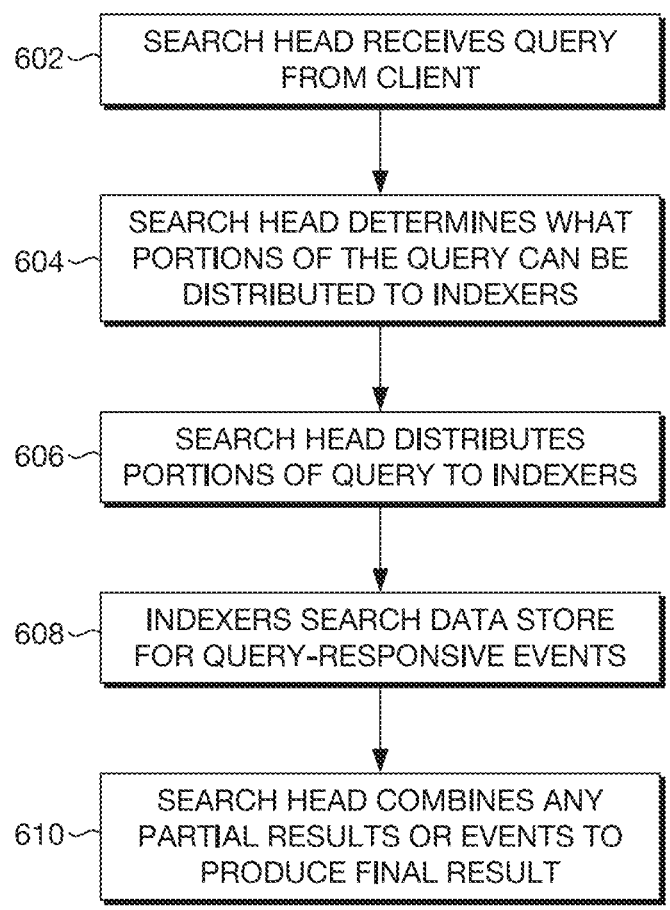
FIG. 6A is a flow diagram of an example method that illustrates how a search head and indexers perform a search query, in accordance with example embodiments.

FIG. 6A is a flow diagram of an example method that illustrates how a search head and indexers perform a search query, in accordance with example embodiments. At block 602, a search head receives a search query from a client. At block 604, the search head analyzes the search query to determine what portion(s) of the query can be delegated to indexers and what portions of the query can be executed locally by the search head. At block 606, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a cluster master, not shown in FIG. 2) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

2.9. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 6B:
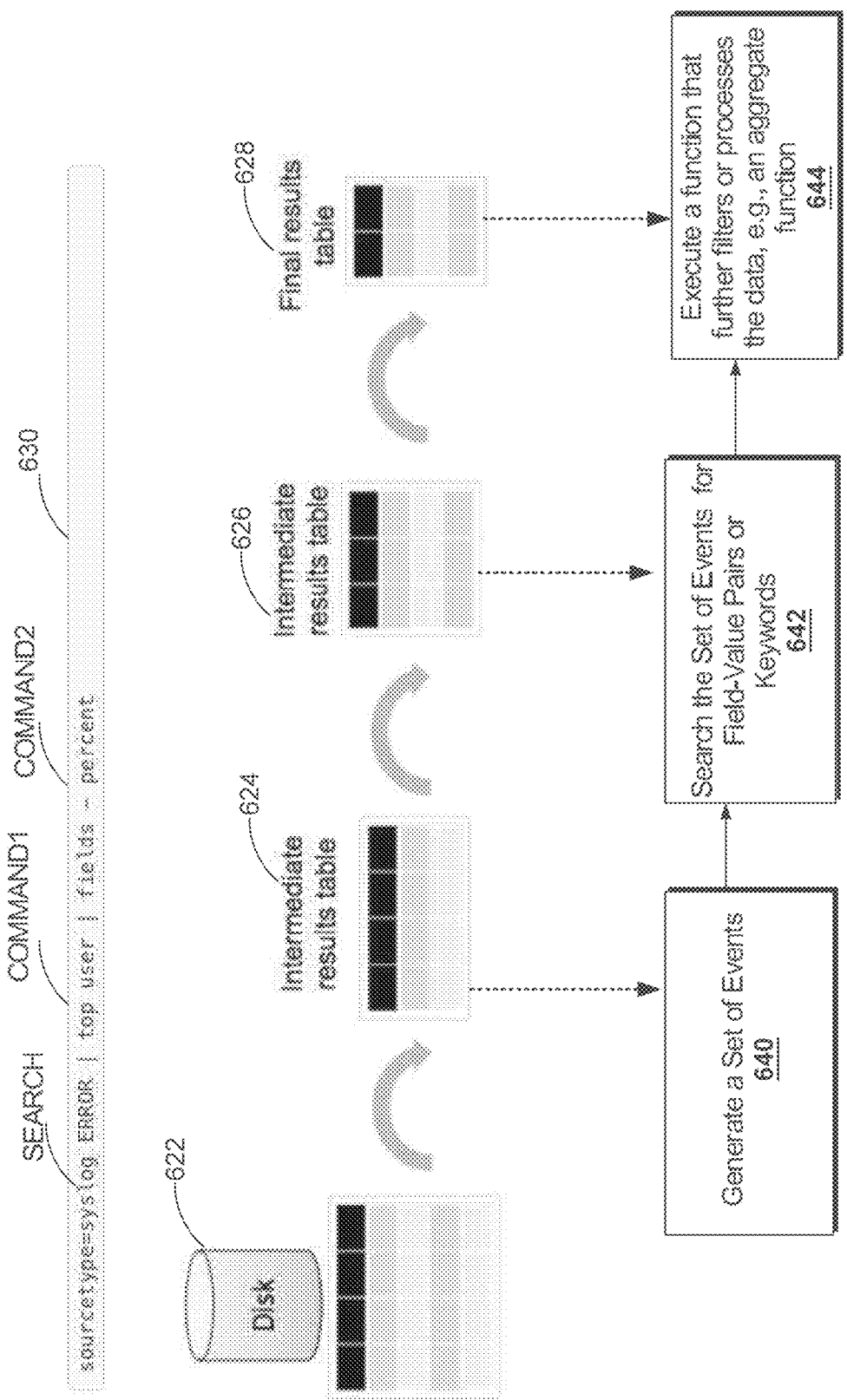
FIG. 6B provides a visual representation of an example manner in which a pipelined command language or query operates, in accordance with example embodiments.

FIG. 6B provides a visual representation of the manner in which a pipelined command language or query operates in accordance with the disclosed embodiments. The query 630 can be inputted by the user into a search. The query comprises a search, the results of which are piped to two commands (namely, command 1 and command 2) that follow the search step.

Disk 622 represents the event data in the raw record data store.

When a user query is processed, a search step will precede other queries in the pipeline in order to generate a set of events at block 640. For example, the query can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630. By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which summarizes the events into a list of the top 10 users and displays the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields—percent" part of command 630 removes the column that shows the percentage, thereby, leaving a final results table 628 without a percentage column. In different embodiments, other query languages, such as the Structured Query Language ("SQL"), can be used to create a query.

2.10. Field Extraction

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for fields in the events being searched. The search head 210 obtains extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 210 can apply the extraction rules to events that it receives from indexers 206. Indexers 206 may apply the extraction rules to events in an associated data store 208. Extraction rules can be applied to all the events in a data store or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

Figure 7A:
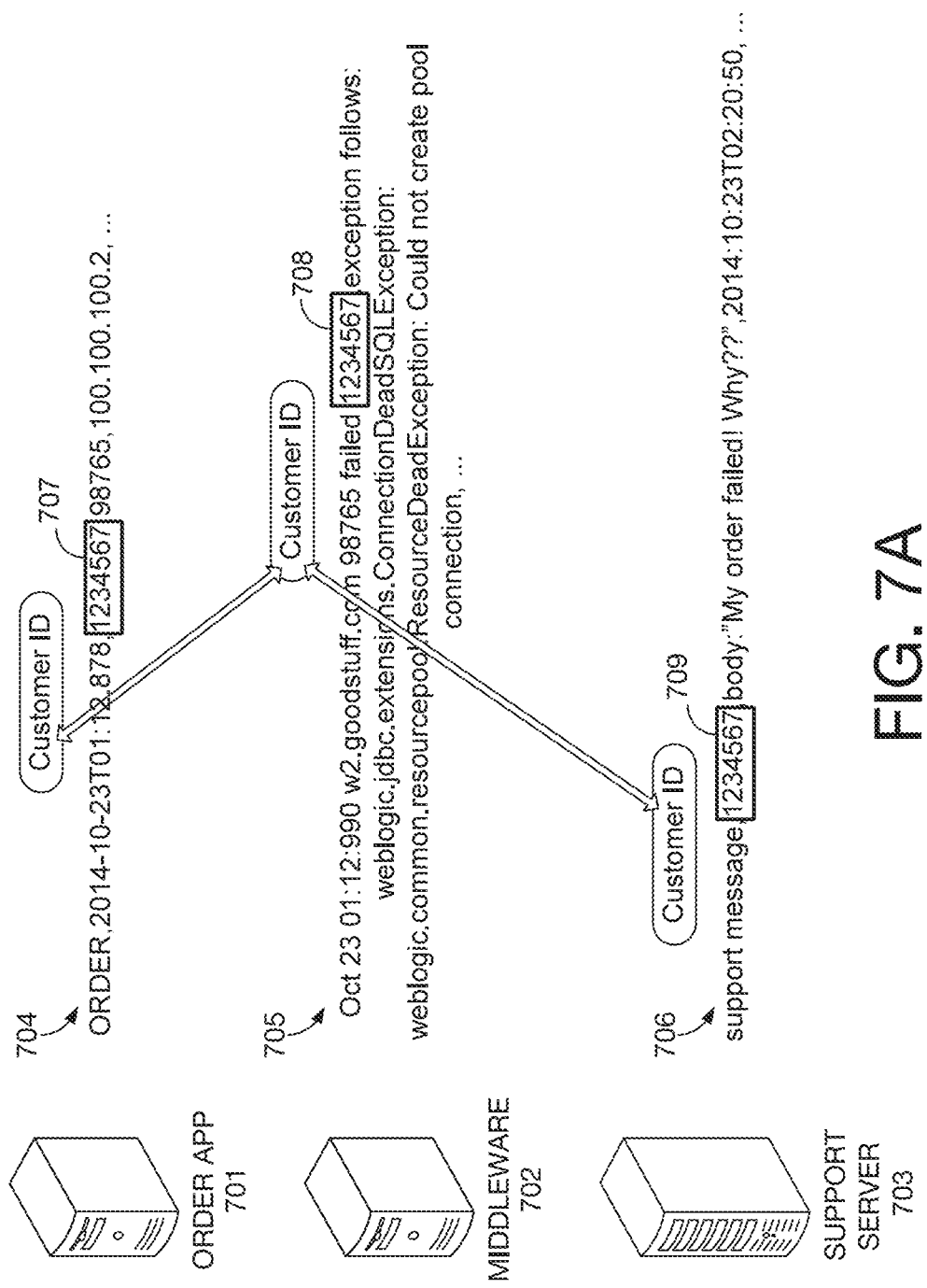
FIG. 7A is a diagram of an example scenario where a common customer identifier is found among log data received from three disparate data sources, in accordance with example embodiments.

FIG. 7A is a diagram of an example scenario where a common customer identifier is found among log data received from three disparate data sources, in accordance with example embodiments. In this example, a user submits an order for merchandise using a vendor's shopping application program 701 running on the user's system. In this example, the order was not delivered to the vendor's server due to a resource exception at the destination server that is detected by the middleware code 702. The user then sends a message to the customer support server 703 to complain about the order failing to complete. The three systems 701, 702, and 703 are disparate systems that do not have a common logging format. The order application 701 sends log data 704 to the data intake and query system in one format, the middleware code 702 sends error log data 705 in a second format, and the support server 703 sends log data 706 in a third format.

Using the log data received at one or more indexers 206 from the three systems, the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems. There is a semantic relationship between the customer ID field values generated by the three systems. The search head 210 requests events from the one or more indexers 206 to gather relevant events from the three systems. The search head 210 then applies extraction rules to the events in order to extract field values that it can correlate. The search head may apply a different extraction rule to each set of events from each system when the event format differs among systems. In this example, the user interface can display to the administrator the events corresponding to the common customer ID field values 707, 708, and 709, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

Figure 7B:
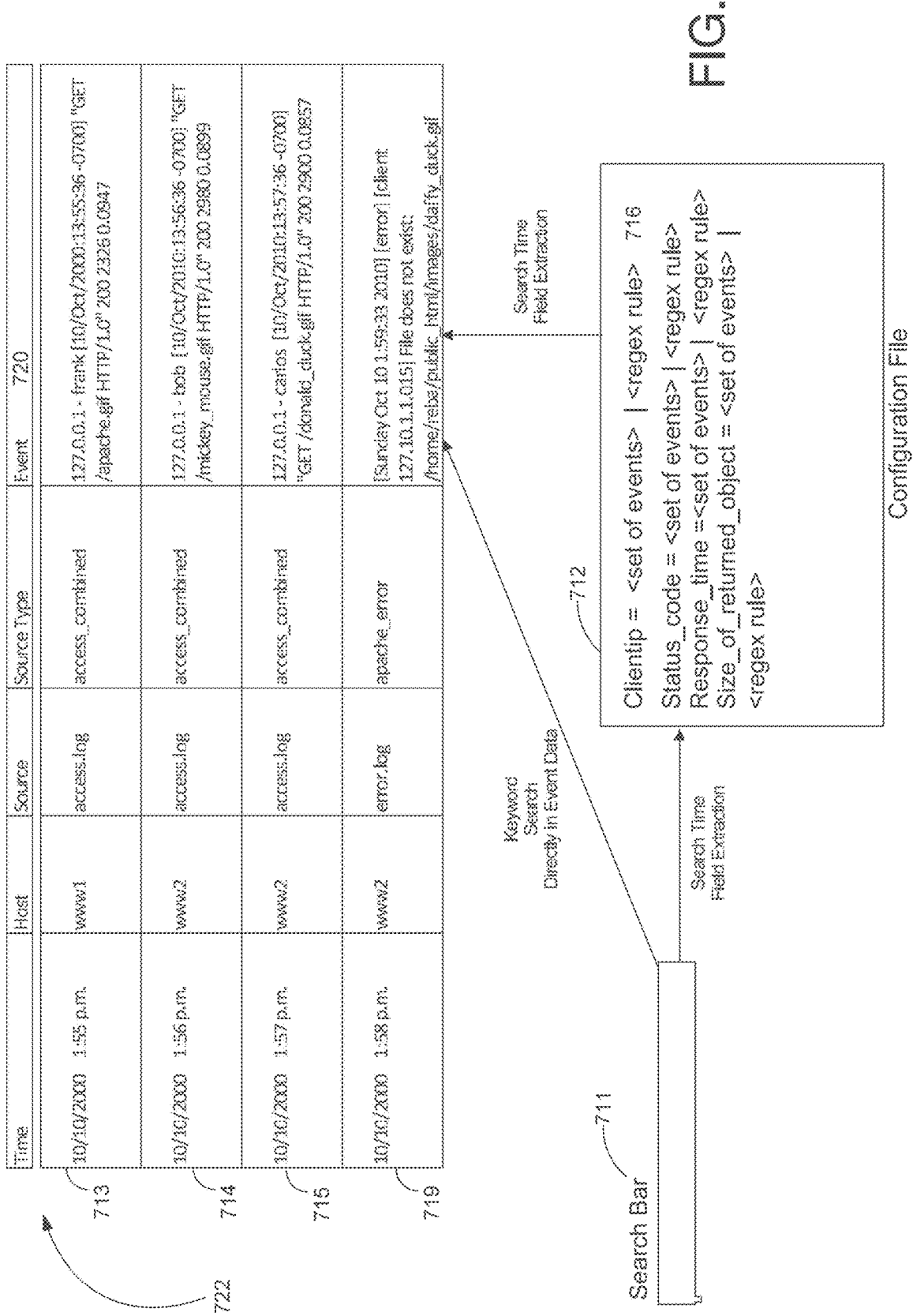
FIG. 7B illustrates an example of processing keyword searches and field searches, in accordance with disclosed embodiments.

The search system enables users to run queries against the stored data to retrieve events that meet criteria specified in a query, such as containing certain keywords or having specific values in defined fields. FIG. 7B illustrates the manner in which keyword searches and field searches are processed in accordance with disclosed embodiments.

If a user inputs a search query into search bar 1401 that includes only keywords (also known as "tokens"), e.g., the keyword "error" or "warning", the query search engine of the data intake and query system searches for those keywords directly in the event data 722 stored in the raw record data store. Note that while FIG. 7B only illustrates four events, the raw record data store (corresponding to data store 208 in FIG. 2) may contain records for millions of events.

As disclosed above, an indexer can optionally generate a keyword index to facilitate fast keyword searching for event data. The indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword. For example, if the keyword "HTTP" was indexed by the indexer at index time, and the user searches for the keyword "HTTP", events 713 to 715 will be identified based on the results returned from the keyword index. As noted above, the index contains reference pointers to the events containing the keyword, which allows for efficient retrieval of the relevant events from the raw record data store.

If a user searches for a keyword that has not been indexed by the indexer, the data intake and query system would nevertheless be able to retrieve the events by searching the event data for the keyword in the raw record data store directly as shown in FIG. 7B. For example, if a user searches for the keyword "frank", and the name "frank" has not been indexed at index time, the DATA INTAKE AND QUERY system will search the event data directly and return the first event 713. Note that whether the keyword has been indexed at index time or not, in both cases the raw data with the events 712 is accessed from the raw data record store to service the keyword search. In the case where the keyword has been indexed, the index will contain a reference pointer that will allow for a more efficient retrieval of the event data from the data store. If the keyword has not been indexed, the search engine will need to search through all the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the search engine does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "November 15 09:33:22 johnmedlock."

The data intake and query system advantageously allows for search time field extraction. In other words, fields can be extracted from the event data at search time using late-binding schema as opposed to at data ingestion time, which was a major limitation of the prior art systems.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 7B illustrates the manner in which configuration files may be used to configure custom fields at search time in accordance with the disclosed embodiments. In response to receiving a search query, the data intake and query system determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the search engine may, in one or more embodiments, need to locate configuration file 712 during the execution of the search as shown in FIG. 7B.

Configuration file 712 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system would then generate a regular expression that extracts those fields from similar events and store the regular expression as an extraction rule for the associated field in the configuration file 712.

In some embodiments, the indexers may automatically discover certain custom fields at index time and the regular expressions for those fields will be automatically generated at index time and stored as part of extraction rules in configuration file 712. For example, fields that appear in the event data as "key=value" pairs may be automatically extracted as part of an automatic field discovery process. Note that there may be several other ways of adding field definitions to configuration files in addition to the methods discussed herein.

The search head 210 can apply the extraction rules derived from configuration file 1402 to event data that it receives from indexers 206. Indexers 206 may apply the extraction rules from the configuration file to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 712 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 719 also contains "clientip" field, however, the "clientip" field is in a different format from events 713-715. To address the discrepancies in the format and content of the different types of events, the configuration file will also need to specify the set of events that an extraction rule applies to, e.g., extraction rule 716 specifies a rule for filtering by the type of event and contains a regular expression for parsing out the field value. Accordingly, each extraction rule will pertain to only a particular type of event. If a particular field, e.g., "clientip" occurs in multiple events, each of those types of events would need its own corresponding extraction rule in the configuration file 712 and each of the extraction rules would comprise a different regular expression to parse out the associated field value. The most common way to categorize events is by source type because events generated by a particular source can have the same format.

The field extraction rules stored in configuration file 712 perform search-time field extractions. For example, for a query that requests a list of events with source type "access-_combined" where the "clientip" field equals "127.0.0.1," the query search engine would first locate the configuration file 712 to retrieve extraction rule 716 that would allow it to extract values associated with the "clientip" field from the event data 720 "where the source type is "access_combined. After the "clientip" field has been extracted from all the events comprising the "clientip" field where the source type is "access_combined," the query search engine can then execute the field criteria by performing the compare operation to filter out the events where the "clientip" field equals "127.0.0.1." In the example shown in FIG. 7B, events 713-715 would be returned in response to the user query. In this manner, the search engine can service queries containing field criteria in addition to queries containing keyword criteria (as explained above).

The configuration file can be created during indexing. It may either be manually created by the user or automatically generated with certain predetermined field extraction rules. As discussed above, the events may be distributed across several indexers, wherein each indexer may be responsible for storing and searching a subset of the events contained in a corresponding data store. In a distributed indexer system, each indexer would need to maintain a local copy of the configuration file that is synchronized periodically across the various indexers.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the data intake and query system to search and correlate data across heterogeneous sources flexibly and efficiently.

Further, by providing the field definitions for the queried fields at search time, the configuration file 712 allows the record data store 712 to be field searchable. In other words, the raw record data store 712 can be searched using keywords as well as fields, wherein the fields are searchable name/value pairings that distinguish one event from another and can be defined in configuration file 1402 using extraction rules. In comparison to a search containing field names, a keyword search does not need the configuration file and can search the event data directly as shown in FIG. 7B.

It should also be noted that any events filtered out by performing a search-time field extraction using a configuration file can be further processed by directing the results of the filtering step to a processing step using a pipelined search language. Using the prior example, a user could pipeline the results of the compare step to an aggregate function by asking the query search engine to count the number of events where the "clientip" field equals "127.0.0.1."

2.11. Example Search Screen

Figure 8A:
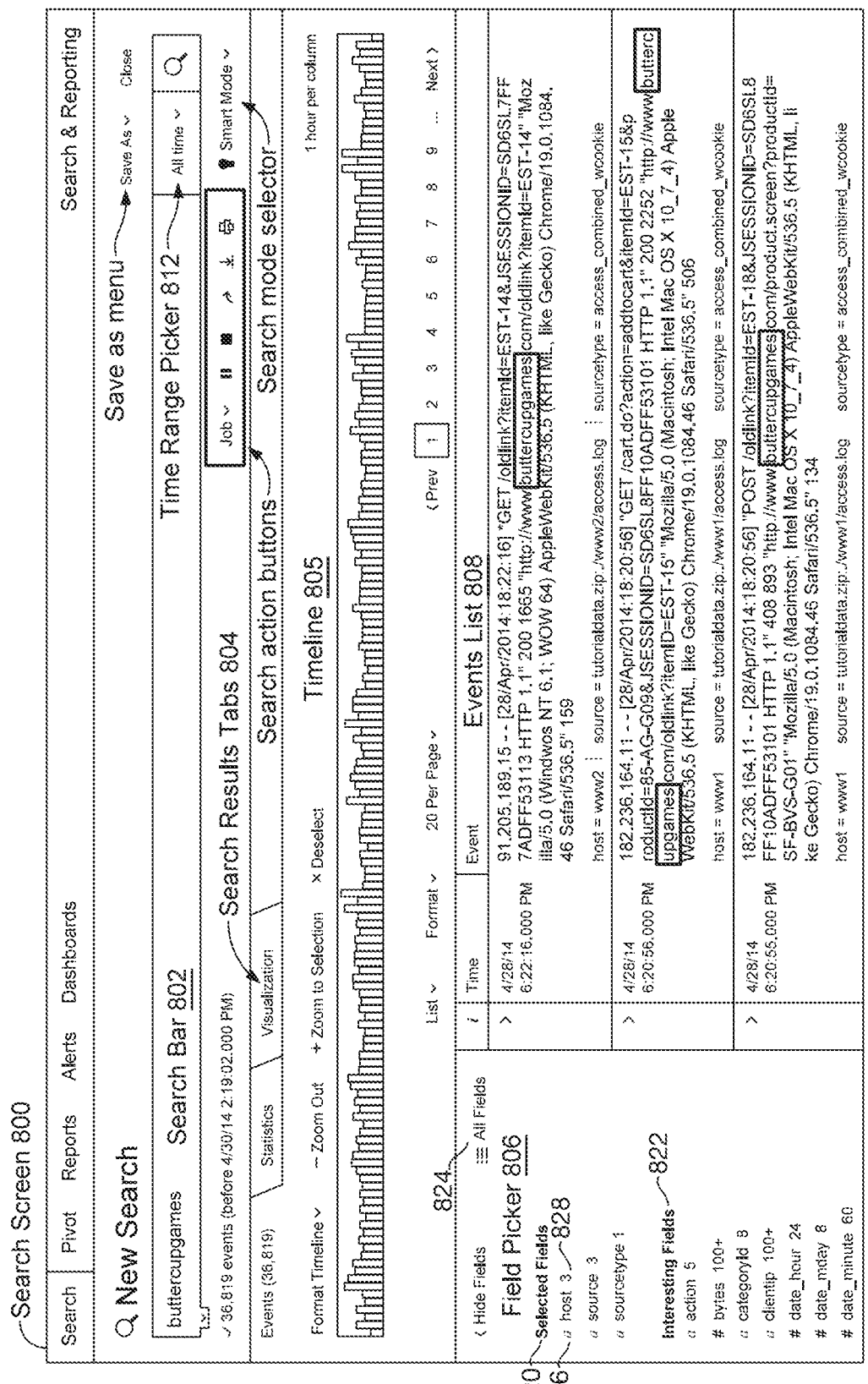
FIG. 8A is an interface diagram of an example user interface for a search screen, in accordance with example embodiments.

FIG. 8A is an interface diagram of an example user interface for a search screen 800, in accordance with example embodiments. Search screen 800 includes a search bar 802 that accepts user input in the form of a search string. It also includes a time range picker 812 that enables the user to specify a time range for the search. For historical searches (e.g., searches based on a particular historical time range), the user can select a specific time range, or alternatively a relative time range, such as "today," "yesterday" or "last week." For real-time searches (e.g., searches whose results are based on data received in real-time), the user can select the size of a preceding time window to search for real-time events. Search screen 800 also initially displays a "data summary" dialog as is illustrated in FIG. 8B that enables the user to select different sources for the events, such as by selecting specific hosts and log files.

After the search is executed, the search screen 800 in FIG. 8A can display the results through search results tabs 804, wherein search results tabs 804 includes: an "events tab" that displays various information about events returned by the search; a "statistics tab" that displays statistics about the search results; and a "visualization tab" that displays various visualizations of the search results. The events tab illustrated in FIG. 8A displays a timeline graph 805 that graphically illustrates the number of events that occurred in one-hour intervals over the selected time range. The events tab also displays an events list 808 that enables a user to view the machine data in each of the returned events.

The events tab additionally displays a sidebar that is an interactive field picker 806. The field picker 806 may be displayed to a user in response to the search being executed and allows the user to further analyze the search results based on the fields in the events of the search results. The field picker 806 includes field names that reference fields present in the events in the search results. The field picker may display any Selected Fields 820 that a user has pre-selected for display (e.g., host, source, sourcetype) and may also display any Interesting Fields 822 that the system determines may be interesting to the user based on pre-specified criteria (e.g., action, bytes, categoryid, clientip, date_hour, date_mday, date_minute, etc.). The field picker also provides an option to display field names for all the fields present in the events of the search results using the All Fields control 824.

Each field name in the field picker 806 has a value type identifier to the left of the field name, such as value type identifier 826. A value type identifier identifies the type of value for the respective field, such as an "a" for fields that include literal values or a "#" for fields that include numerical values.

Each field name in the field picker also has a unique value count to the right of the field name, such as unique value count 828. The unique value count indicates the number of unique values for the respective field in the events of the search results.

Each field name is selectable to view the events in the search results that have the field referenced by that field name. For example, a user can select the "host" field name, and the events shown in the events list 808 will be updated with events in the search results that have the field that is reference by the field name "host."

2.12. Data Models

A data model is a hierarchically structured search-time mapping of semantic knowledge about one or more datasets. It encodes the domain knowledge used to build a variety of specialized searches of those datasets. Those searches, in turn, can be used to generate reports.

A data model is composed of one or more "objects" (or "data model objects") that define or otherwise correspond to a specific set of data. An object is defined by constraints and attributes. An object's constraints are search criteria that define the set of events to be operated on by running a search having that search criteria at the time the data model is selected. An object's attributes are the set of fields to be exposed for operating on that set of events generated by the search criteria.

Objects in data models can be arranged hierarchically in parent/child relationships. Each child object represents a subset of the dataset covered by its parent object. The top-level objects in data models are collectively referred to as "root objects."

Child objects have inheritance. Child objects inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user can simply select an "e-mail activity" data model object to access a dataset relating to e-mails generally (e.g., sent or received), or select an "e-mails sent" data model object (or an e-mail sub-model object) to access a dataset relating to e-mails sent.

Because a data model object is defined by its constraints (e.g., a set of search criteria) and attributes (e.g., a set of fields), a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. A user iteratively applies a model development tool (not shown in FIG. 8A) to prepare a query that defines a subset of events and assigns an object name to that subset. A child subset is created by further limiting a query that generated a parent subset.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. Pat. No. 9,128,980, entitled "GENERATION OF A DATA MODEL APPLIED TO QUERIES", issued on 8 Sep. 2015, and U.S. Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model can also include reports. One or more report formats can be associated with a particular data model and be made available to run against the data model. A user can use child objects to design reports with object datasets that already have extraneous data pre-filtered out. In some embodiments, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also can be generated in a variety of formats, by reference to the data model. Reports, data visualizations, and data model objects can be saved and associated with the data model for future use. The data model object may be used to perform searches of other data.

FIGS. 9-15 are interface diagrams of example report generation user interfaces, in accordance with example embodiments. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 9:
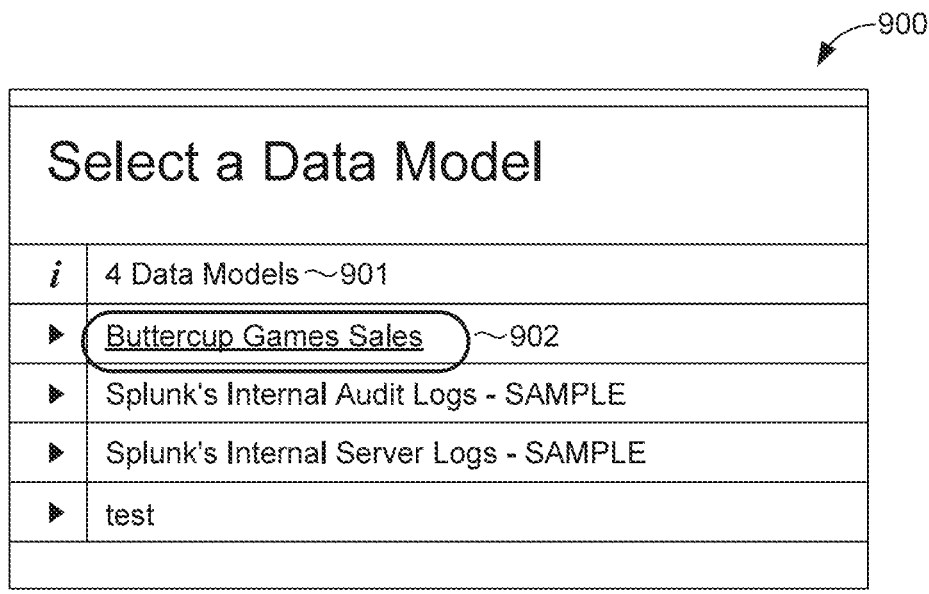

The selection of a data model object for use in driving a report generation may be facilitated by a data model object selection interface. FIG. 9 illustrates an example interactive data model selection graphical user interface 900 of a report editor that displays a listing of available data models 901. The user may select one of the data models 902.

Figure 10:
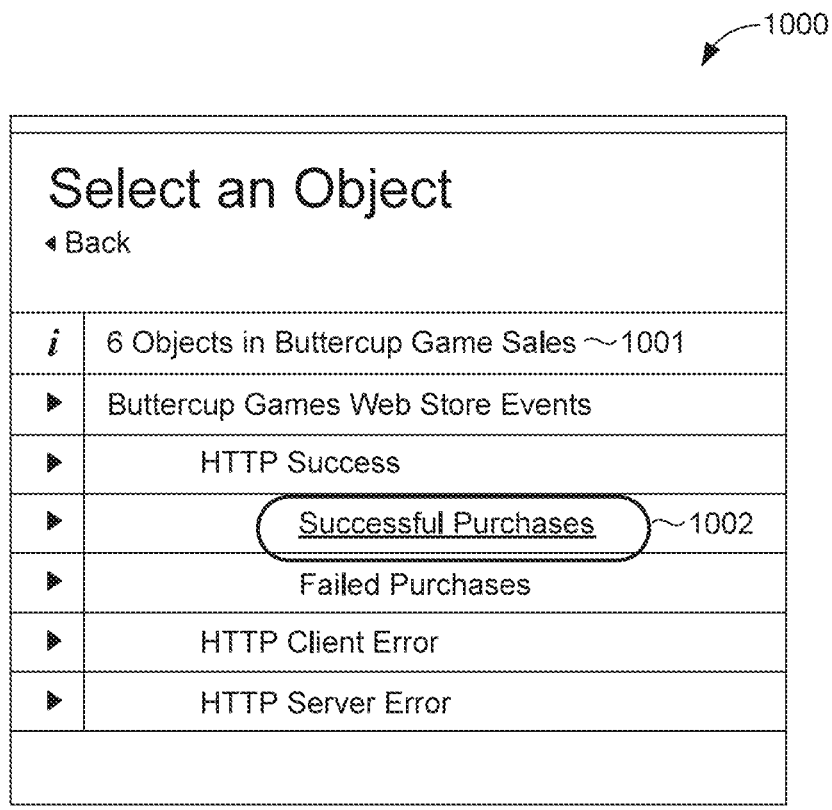

FIG. 10 illustrates an example data model object selection graphical user interface 1000 that displays available data objects 1001 for the selected data object model 902. The user may select one of the displayed data model objects 1002 for use in driving the report generation process.

Figure 11A:
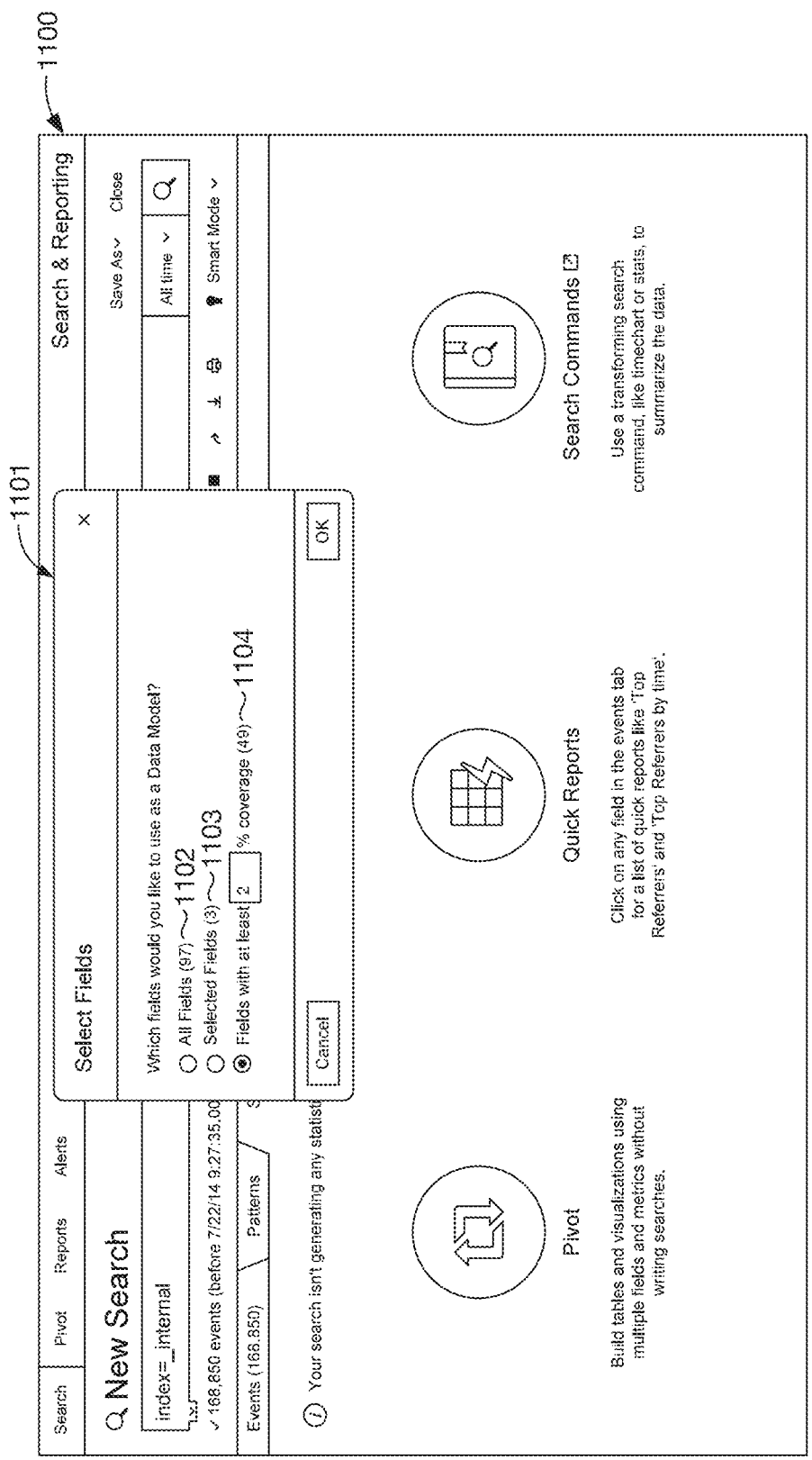

Once a data model object is selected by the user, a user interface screen 1100 shown in FIG. 11A may display an interactive listing of automatic field identification options 1101 based on the selected data model object. For example, a user may select one of the three illustrated options (e.g., the "All Fields" option 1102, the "Selected Fields" option 1103, or the "Coverage" option (e.g., fields with at least a specified % of coverage) 1104). If the user selects the "All Fields" option 1102, all of the fields identified from the events that were returned in response to an initial search query may be selected. That is, for example, all of the fields of the identified data model object fields may be selected. If the user selects the "Selected Fields" option 1103, only the fields from the fields of the identified data model object fields that are selected by the user may be used. If the user selects the "Coverage" option 1104, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 1102 indicates that 97 fields will be selected if the "All Fields" option is selected. The "3" displayed next to the "Selected Fields" option 1103 indicates that 3 of the 97 fields will be selected if the "Selected Fields" option is selected. The "49" displayed next to the "Coverage" option 1104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 11B:
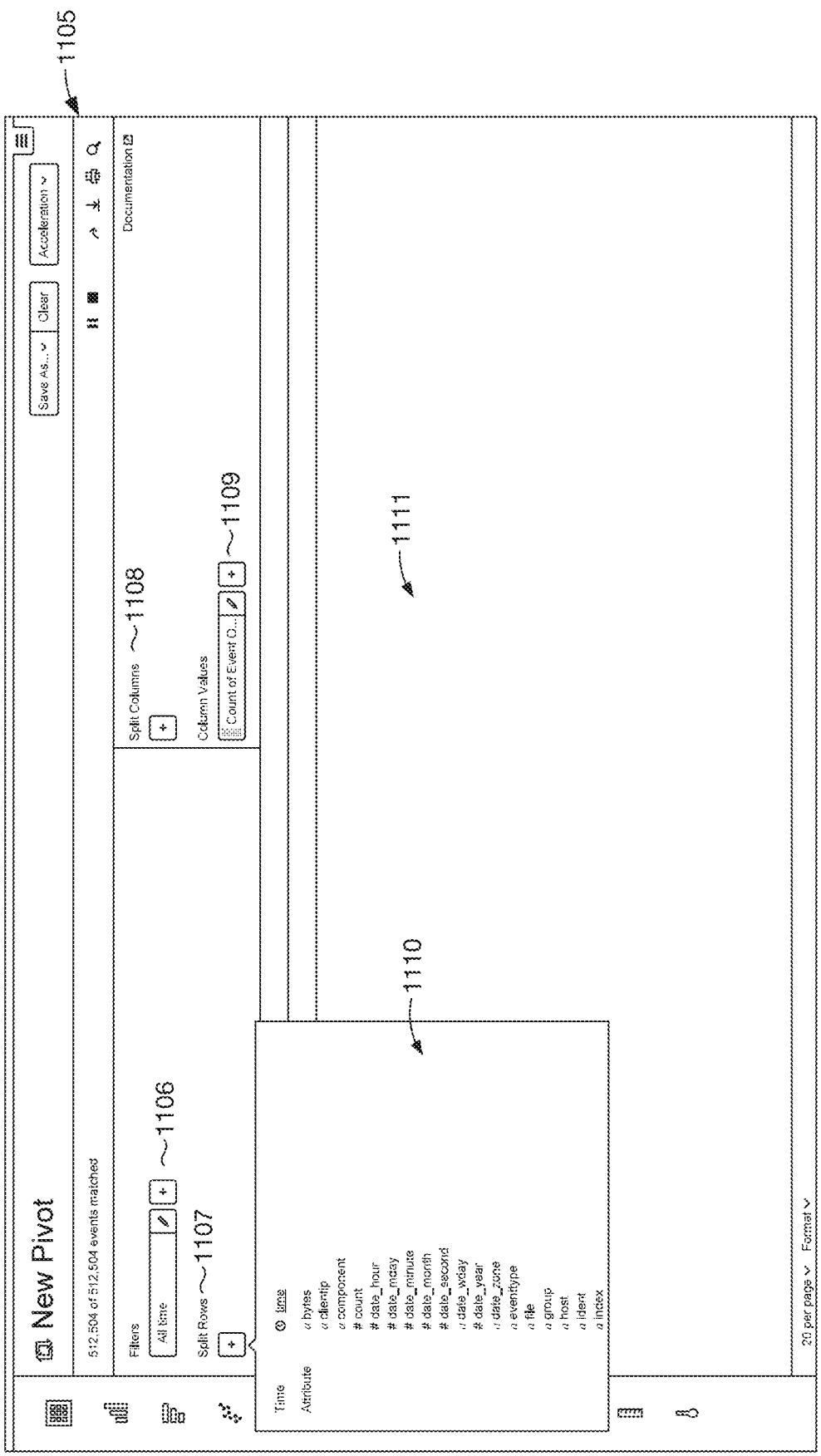
Figure 11C:
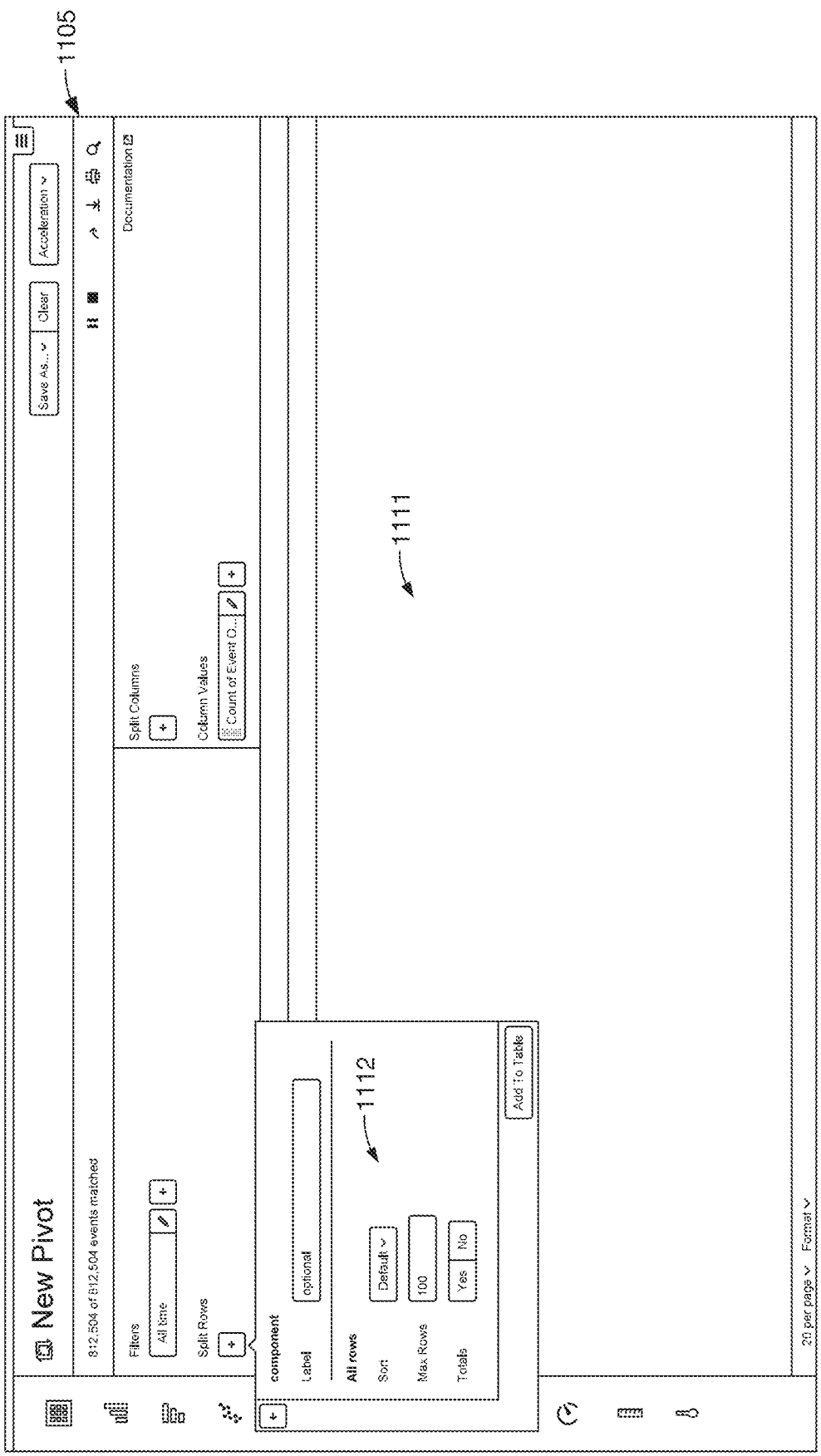

FIG. 11B illustrates an example graphical user interface screen 1105 displaying the reporting application's "Report Editor" page. The screen may display interactive elements for defining various elements of a report. For example, the page includes a "Filters" element 1106, a "Split Rows" element 1107, a "Split Columns" element 1108, and a "Column Values" element 1109. The page may include a list of search results 1111. In this example, the Split Rows element 1107 is expanded, revealing a listing of fields 1110 that can be used to define additional criteria (e.g., reporting criteria). The listing of fields 1110 may correspond to the selected fields. That is, the listing of fields 1110 may list only the fields previously selected, either automatically and/or manually by a user. FIG. 11C illustrates a formatting dialogue 1112 that may be displayed upon selecting a field from the listing of fields 1110. The dialogue can be used to format the display of the results of the selection (e.g., label the column for the selected field to be displayed as "component").

Figure 11D:
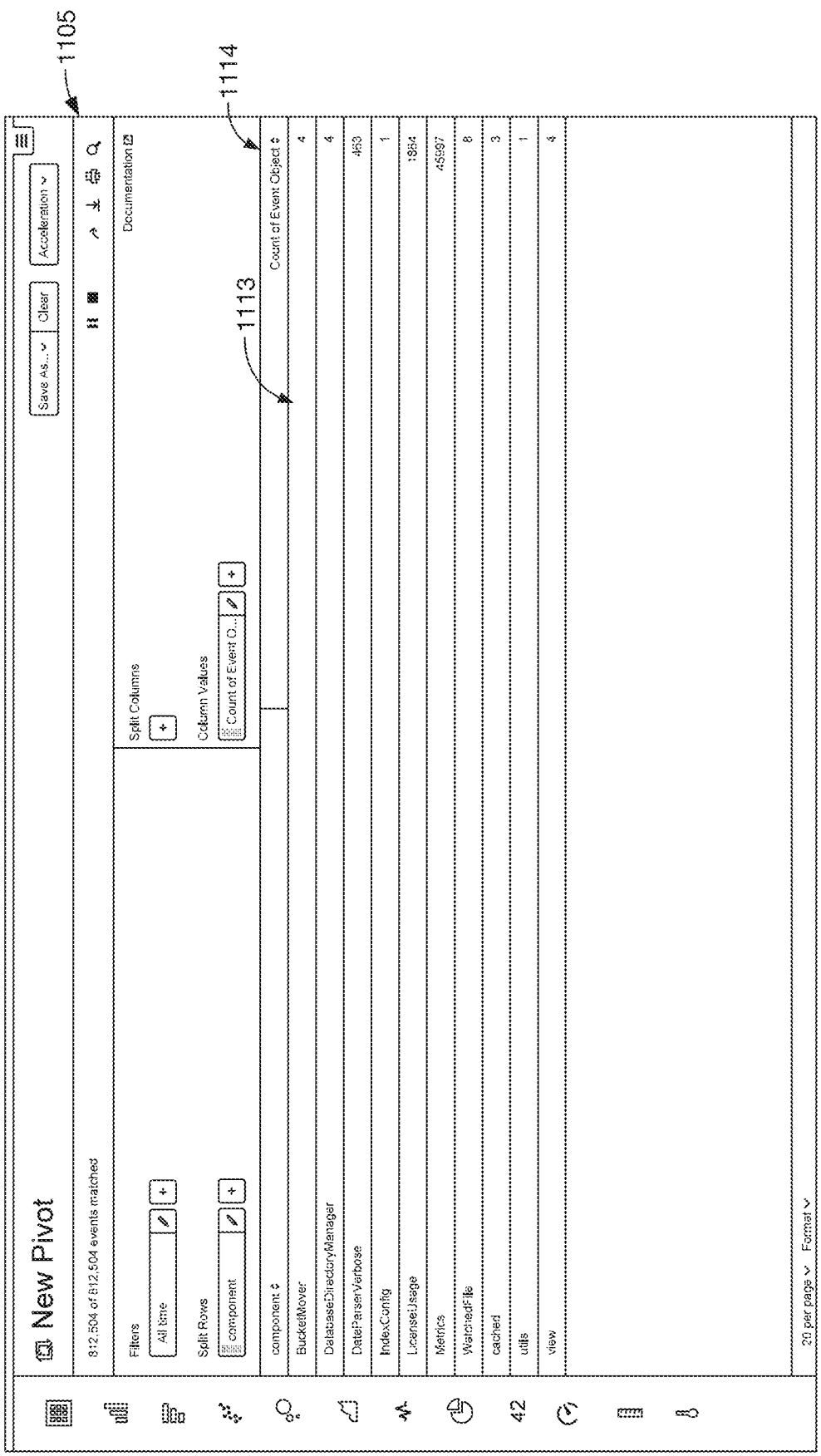

FIG. 11D illustrates an example graphical user interface screen 1105 including a table of results 1113 based on the selected criteria including splitting the rows by the "component" field. A column 1114 having an associated count for each component listed in the table may be displayed that indicates an aggregate count of the number of times that the particular field-value pair (e.g., the value in a row for a particular field, such as the value "BucketMover" for the field "component") occurs in the set of events responsive to the initial search query.

Figure 12:
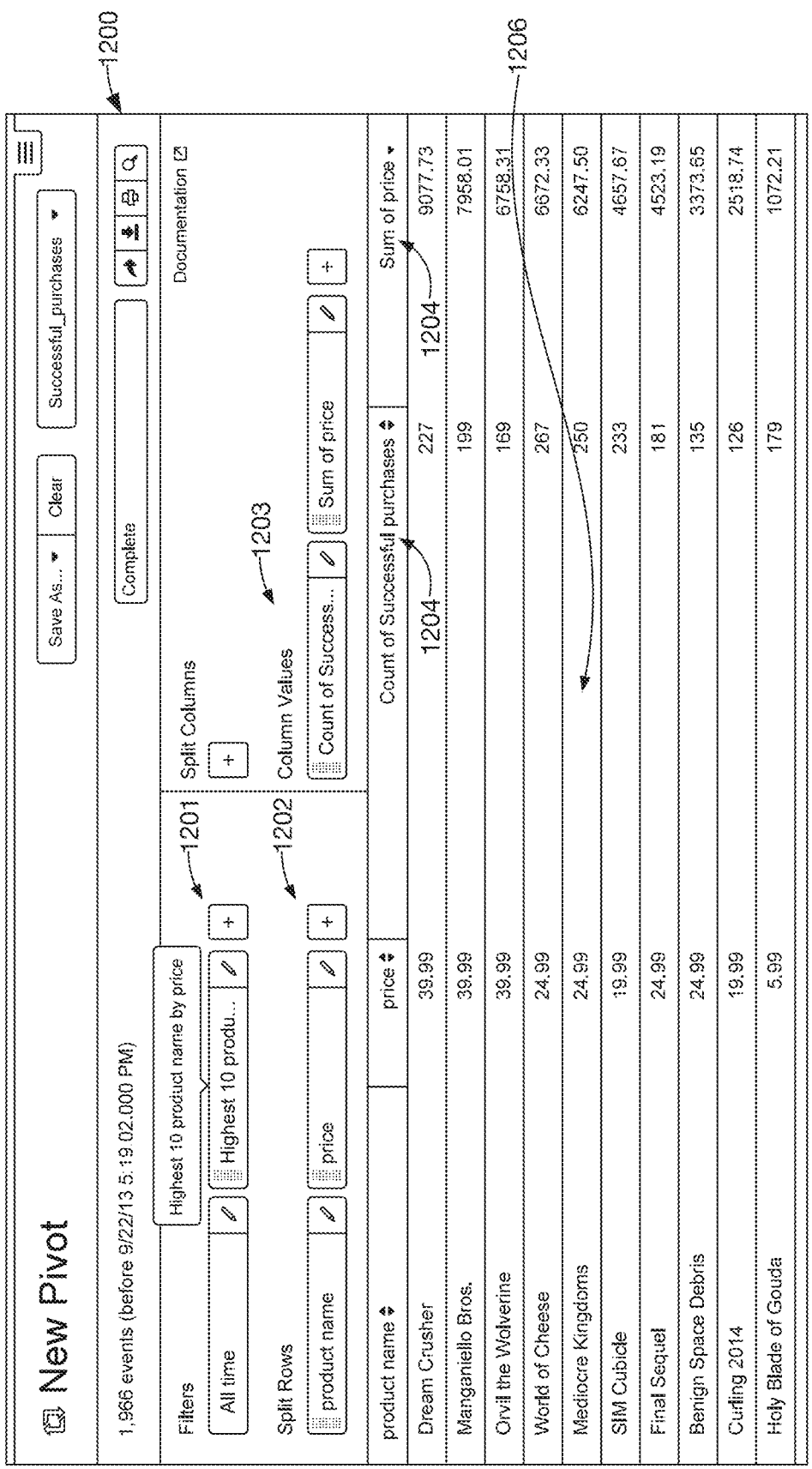

FIG. 12 illustrates an example graphical user interface screen 1200 that allows the user to filter search results and to perform statistical analysis on values extracted from specific fields in the set of events. In this example, the top ten product names ranked by price are selected as a filter 1201 that causes the display of the ten most popular products sorted by price. Each row is displayed by product name and price 1202. This results in each product displayed in a column labeled "product name" along with an associated price in a column labeled "price" 1206. Statistical analysis of other fields in the events associated with the ten most popular products have been specified as column values 1203. A count of the number of successful purchases for each product is displayed in column 1204. These statistics may be produced by filtering the search results by the product name, finding all occurrences of a successful purchase in a field within the events and generating a total of the number of occurrences. A sum of the total sales is displayed in column 1205, which is a result of the multiplication of the price and the number of successful purchases for each product.

Figure 13:
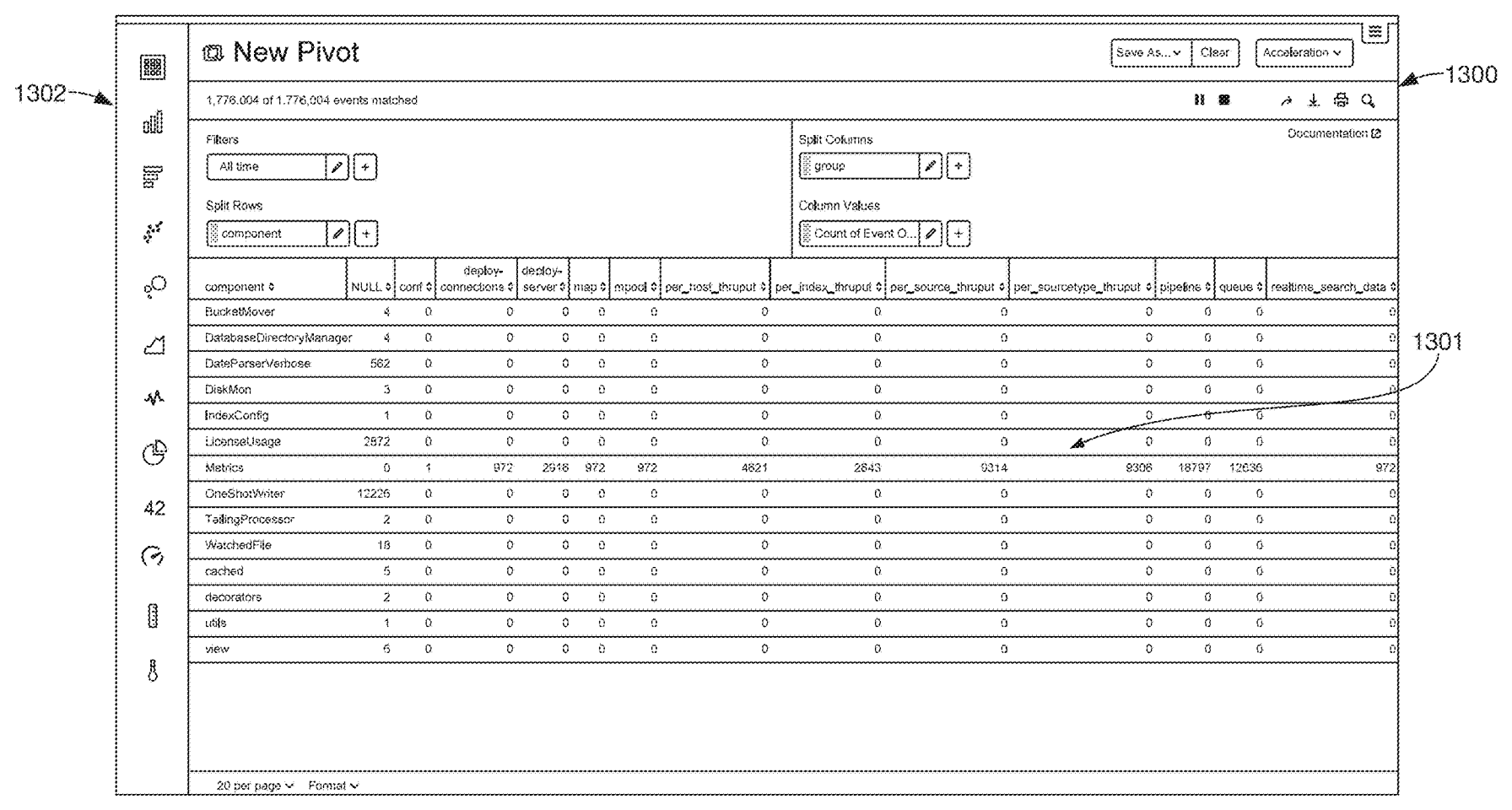
Figure 14:
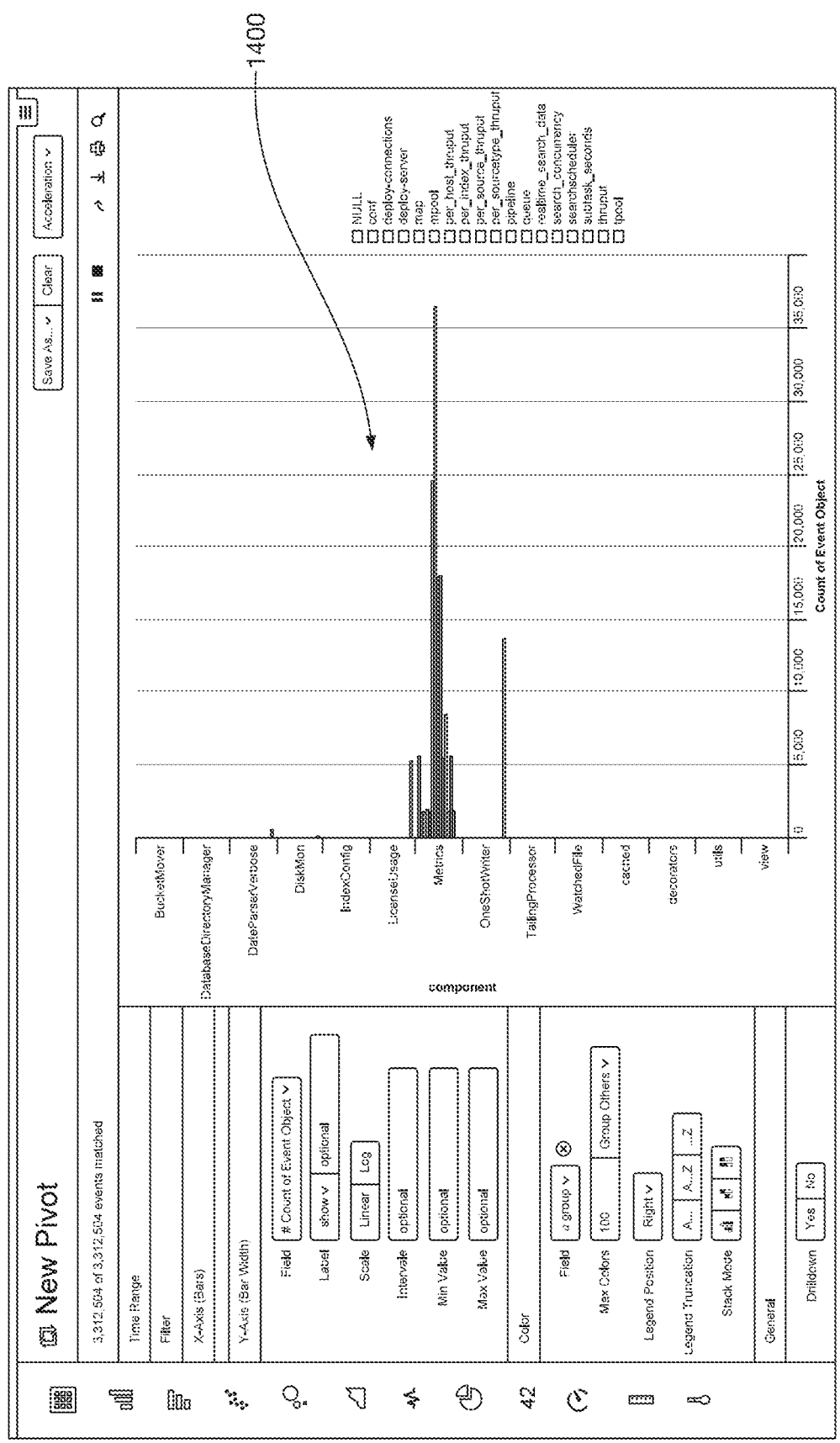
Figure 15:
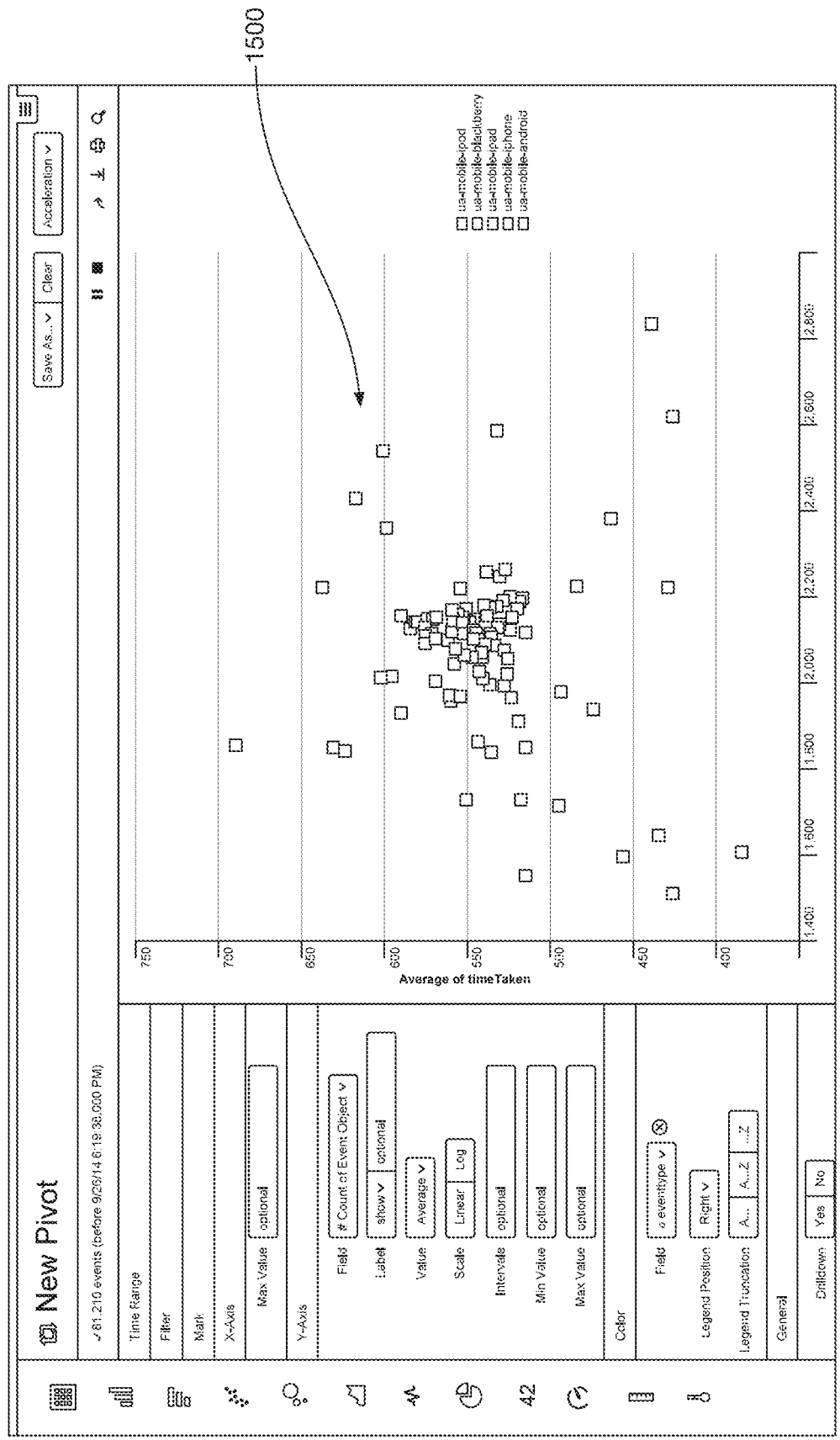

The reporting application allows the user to create graphical visualizations of the statistics generated for a report. For example, FIG. 13 illustrates an example graphical user interface 1300 that displays a set of components and associated statistics 1301. The reporting application allows the user to select a visualization of the statistics in a graph (e.g., bar chart, scatter plot, area chart, line chart, pie chart, radial gauge, marker gauge, filler gauge, etc.), where the format of the graph may be selected using the user interface controls 1302 along the left panel of the user interface 1300. FIG. 14 illustrates an example of a bar chart visualization 1400 of an aspect of the statistical data 1301. FIG. 15 illustrates a scatter plot visualization 1500 of an aspect of the statistical data 1301.

2.13. Acceleration Technique

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, the data intake and query system also employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.13.1. Aggregation Technique

Figure 16:
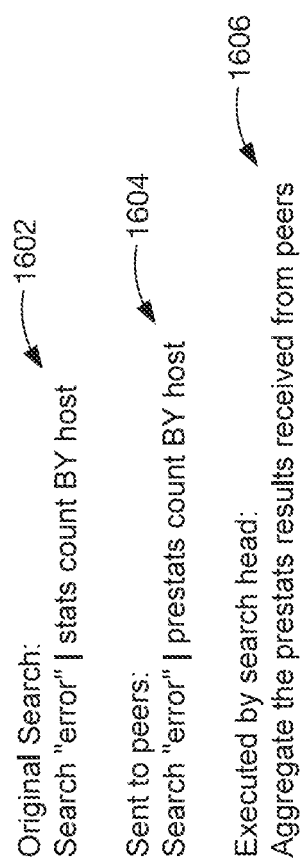
FIG. 16 is an example search query received from a client and executed by search peers, in accordance with example embodiments.

To facilitate faster query processing, a query can be structured such that multiple indexers perform the query in parallel, while aggregation of search results from the multiple indexers is performed locally at the search head. For example, FIG. 16 is an example search query received from a client and executed by search peers, in accordance with example embodiments. FIG. 16 illustrates how a search query 1602 received from a client at a search head 210 can split into two phases, including: (1) subtasks 1604 (e.g., data retrieval or simple filtering) that may be performed in parallel by indexers 206 for execution, and (2) a search results aggregation operation 1606 to be executed by the search head when the results are ultimately collected from the indexers.

During operation, upon receiving search query 1602, a search head 210 determines that a portion of the operations involved with the search query may be performed locally by the search head. The search head modifies search query 1602 by substituting "stats" (create aggregate statistics over results sets received from the indexers at the search head) with "prestats" (create statistics by the indexer from local results set) to produce search query 1604, and then distributes search query 1604 to distributed indexers, which are also referred to as "search peers" or "peer indexers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 6A, or may alternatively distribute a modified version (e.g., a more restricted version) of the search query to the search peers. In this example, the indexers are responsible for producing the results and sending them to the search head. After the indexers return the results to the search head, the search head aggregates the received results 1606 to form a single search result set. By executing the query in this manner, the system effectively distributes the computational operations across the indexers while minimizing data transfers.

2.13.2. Keyword Index

As described above with reference to the flow charts in FIG. 5A and FIG. 6A, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.13.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the events and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815,973, entitled "GENERATING AND STORING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some embodiments of system 108 create a high performance analytics store, which is referred to as a "summarization table," (also referred to as a "lexicon" or "inverted index") that contains entries for specific field-value pairs. Each of these entries keeps track of instances of a specific value in a specific field in the event data and includes references to events containing the specific value in the specific field. For example, an example entry in an inverted index can keep track of occurrences of the value "94107" in a "ZIP code" field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in most embodiments, the search engine will employ the inverted index separate from the raw record data store to generate responses to the received queries.

Note that the term "summarization table" or "inverted index" as used herein is a data structure that may be generated by an indexer that includes at least field names and field values that have been extracted and/or indexed from event records. An inverted index may also include reference values that point to the location(s) in the field searchable data store where the event records that include the field may be found. Also, an inverted index may be stored using well-known compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searchable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index. A collection query is not the same as a query that is used to call up or invoke a pre-existing inverted index. In one or more embodiment, a query can comprise an initial step that calls up a pre-generated inverted index on which further filtering and processing can be performed. For example, referring back to FIG. 13, a set of events generated at block 1320 by either using a "collection" query to create a new inverted index or by calling up a pre-generated inverted index. A query with several pipelined steps will start with a pre-generated index to accelerate the query.

Figure 7C:
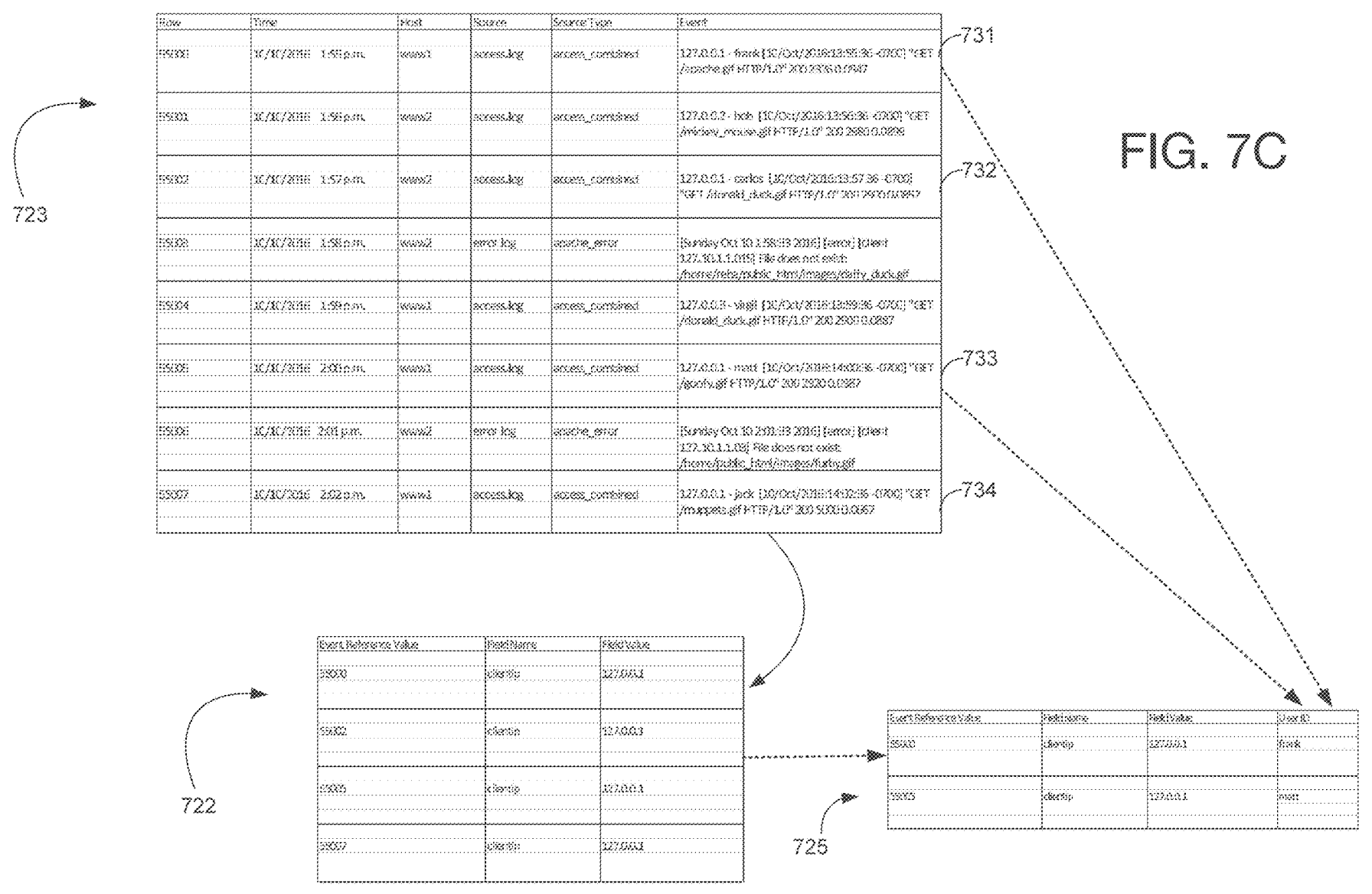

FIG. 7C illustrates the manner in which an inverted index is created and used in accordance with the disclosed embodiments. As shown in FIG. 7C, an inverted index 722 can be created in response to a user-initiated collection query using the event data 723 stored in the raw record data store. For example, a non-limiting example of a collection query may include "collect clientip=127.0.0.1" which may result in an inverted index 722 being generated from the event data 723 as shown in FIG. 7C. Each entry in inverted index 722 includes an event reference value that references the location of a source record in the field searchable data store. The reference value may be used to access the original event record directly from the field searchable data store.

In one or more embodiments, if one or more of the queries is a collection query, the responsive indexers may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, e.g., using regex rules. In FIG. 7C, prior to running the collection query that generates the inverted index 722, the field name "clientip" may need to be defined in a configuration file by specifying the "access-_combined" source type and a regular expression rule to parse out the client IP address. Alternatively, the collection query may contain an explicit definition for the field name "clientip" which may obviate the need to reference the configuration file at search time.

In one or more embodiments, collection queries may be saved and scheduled to run periodically. These scheduled collection queries may periodically update the summarization information corresponding to the query. For example, if the collection query that generates inverted index 722 is scheduled to run periodically, one or more indexers would periodically search through the relevant buckets to update inverted index 722 with event data for any new events with the "clientip" value of "127.0.0.1."

In some embodiments, the inverted indexes that include fields, values, and reference value (e.g., inverted index 722) for event records may be included in the summarization information provided to the user. In other embodiments, a user may not be interested in specific fields and values contained in the inverted index, but may need to perform a statistical query on the data in the inverted index. For example, referencing the example of FIG. 7C rather than viewing the fields within summarization table 722, a user may want to generate a count of all client requests from IP address "127.0.0.1." In this case, the search engine would simply return a result of "4" rather than including details about the inverted index 722 in the information provided to the user.

The pipelined search language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index, a "stats" query may generate their result sets rapidly from the summarization information available in the inverted index rather than directly scanning event records. For example, the contents of inverted index 722 can be pipelined to a stats query, e.g., a "count" function that counts the number of entries in the inverted index and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the system can examine the entry in the inverted index to count instances of the specific value in the field without having to go through the individual events or perform data extractions at search time.

In some embodiments, the system maintains a separate inverted index for each of the above-described time-specific buckets that stores events for a specific time range. A bucket-specific inverted index includes entries for specific field-value combinations that occur in events in the specific bucket. Alternatively, the system can maintain a separate inverted index for each indexer. The indexer-specific inverted index includes entries for the events in a data store that are managed by the specific indexer. Indexer-specific inverted indexes may also be bucket-specific. In at least one or more embodiments, if one or more of the queries is a stats query, each indexer may generate a partial result set from previously generated summarization information. The partial result sets may be returned to the search head that received the query and combined into a single result set for the query As mentioned above, the inverted index can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination. In some embodiments, if summarization information is absent from an indexer that includes responsive event records, further actions may be taken, such as, the summarization information may generated on the fly, warnings may be provided the user, the collection query operation may be halted, the absence of summarization information may be ignored, or the like, or combination thereof.

In one or more embodiments, an inverted index may be set up to update continually. For example, the query may ask for the inverted index to update its result periodically, e.g., every hour. In such instances, the inverted index may be a dynamic data structure that is regularly updated to include information regarding incoming events.

In some cases, e.g., where a query is executed before an inverted index updates, when the inverted index may not cover all of the events that are relevant to a query, the system can use the inverted index to obtain partial results for the events that are covered by inverted index, but may also have to search through other events that are not covered by the inverted index to produce additional results on the fly. In other words, an indexer would need to search through event data on the data store to supplement the partial results. These additional results can then be combined with the partial results to produce a final set of results for the query. Note that in typical instances where an inverted index is not completely up to date, the number of events that an indexer would need to search through to supplement the results from the inverted index would be relatively small. In other words, the search to get the most recent results can be quick and efficient because only a small number of event records will be searched through to supplement the information from the inverted index. The inverted index and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.13.3.1 Extracting Event Data Using Posting

In one or more embodiments, if the system needs to process all events that have a specific field-value combination, the system can use the references in the inverted index entry to directly access the events to extract further information without having to search all of the events to find the specific field-value combination at search time. In other words, the system can use the reference values to locate the associated event data in the field searchable data store and extract further information from those events, e.g., extract further field values from the events for purposes of filtering or processing or both.

The information extracted from the event data using the reference values can be directed for further filtering or processing in a query using the pipeline search language. The pipelined search language will, in one embodiment, include syntax that can direct the initial filtering step in a query to an inverted index. In one embodiment, a user would include syntax in the query that explicitly directs the initial searching or filtering step to the inverted index.

Referencing the example in FIG. 15, if the user determines that she needs the user id fields associated with the client requests from IP address "127.0.0.1," instead of incurring the computational overhead of performing a brand new search or re-generating the inverted index with an additional field, the user can generate a query that explicitly directs or pipes the contents of the already generated inverted index 1502 to another filtering step requesting the user ids for the entries in inverted index 1502 where the server response time is greater than "0.0900" microseconds. The search engine would use the reference values stored in inverted index 722 to retrieve the event data from the field searchable data store, filter the results based on the "response time" field values and, further, extract the user id field from the resulting event data to return to the user. In the present instance, the user ids "frank" and "carlos" would be returned to the user from the generated results table 722.

In one embodiment, the same methodology can be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the search engine would again use the reference values stored in inverted index 722 to retrieve the event data from the field searchable data store and, further, extract the object size field values from the associated events 731, 732, 733 and 734. Once, the corresponding object sizes have been extracted (i.e. 2326, 2900, 2920, and 5000), the average can be computed and returned to the user.

In one embodiment, instead of explicitly invoking the inverted index in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 722. The search engine, in this case, would automatically determine that an inverted index 722 already exists in the system that could expedite this query. In one embodiment, prior to running any search comprising a field-value pair, for example, a search engine may search though all the existing inverted indexes to determine if a pre-generated inverted index could be used to expedite the search comprising the field-value pair. Accordingly, the search engine would automatically use the pre-generated inverted index, e.g., index 722 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new search.

The data intake and query system includes one or more forwarders that receive raw machine data from a variety of input data sources, and one or more indexers that process and store the data in one or more data stores. By distributing events among the indexers and data stores, the indexers can analyze events for a query in parallel. In one or more embodiments, a multiple indexer implementation of the search system would maintain a separate and respective inverted index for each of the above-described time-specific buckets that stores events for a specific time range. A bucket-specific inverted index includes entries for specific field-value combinations that occur in events in the specific bucket. As explained above, a search head would be able to correlate and synthesize data from across the various buckets and indexers.

This feature advantageously expedites searches because instead of performing a computationally intensive search in a centrally located inverted index that catalogues all the relevant events, an indexer is able to directly search an inverted index stored in a bucket associated with the time-range specified in the query. This allows the search to be performed in parallel across the various indexers. Further, if the query requests further filtering or processing to be conducted on the event data referenced by the locally stored bucket-specific inverted index, the indexer is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index, or if the search engine automatically determines that using an inverted index would expedite the processing of the query, the indexers will search through each of the inverted indexes associated with the buckets for the specified time-range. This feature allows the High Performance Analytics Store to be scaled easily.

In certain instances, where a query is executed before a bucket-specific inverted index updates, when the bucket-specific inverted index may not cover all of the events that are relevant to a query, the system can use the bucket-specific inverted index to obtain partial results for the events that are covered by bucket-specific inverted index, but may also have to search through the event data in the bucket associated with the bucket-specific inverted index to produce additional results on the fly. In other words, an indexer would need to search through event data stored in the bucket (that was not yet processed by the indexer for the corresponding inverted index) to supplement the partial results from the bucket-specific inverted index.

Figure 7D:
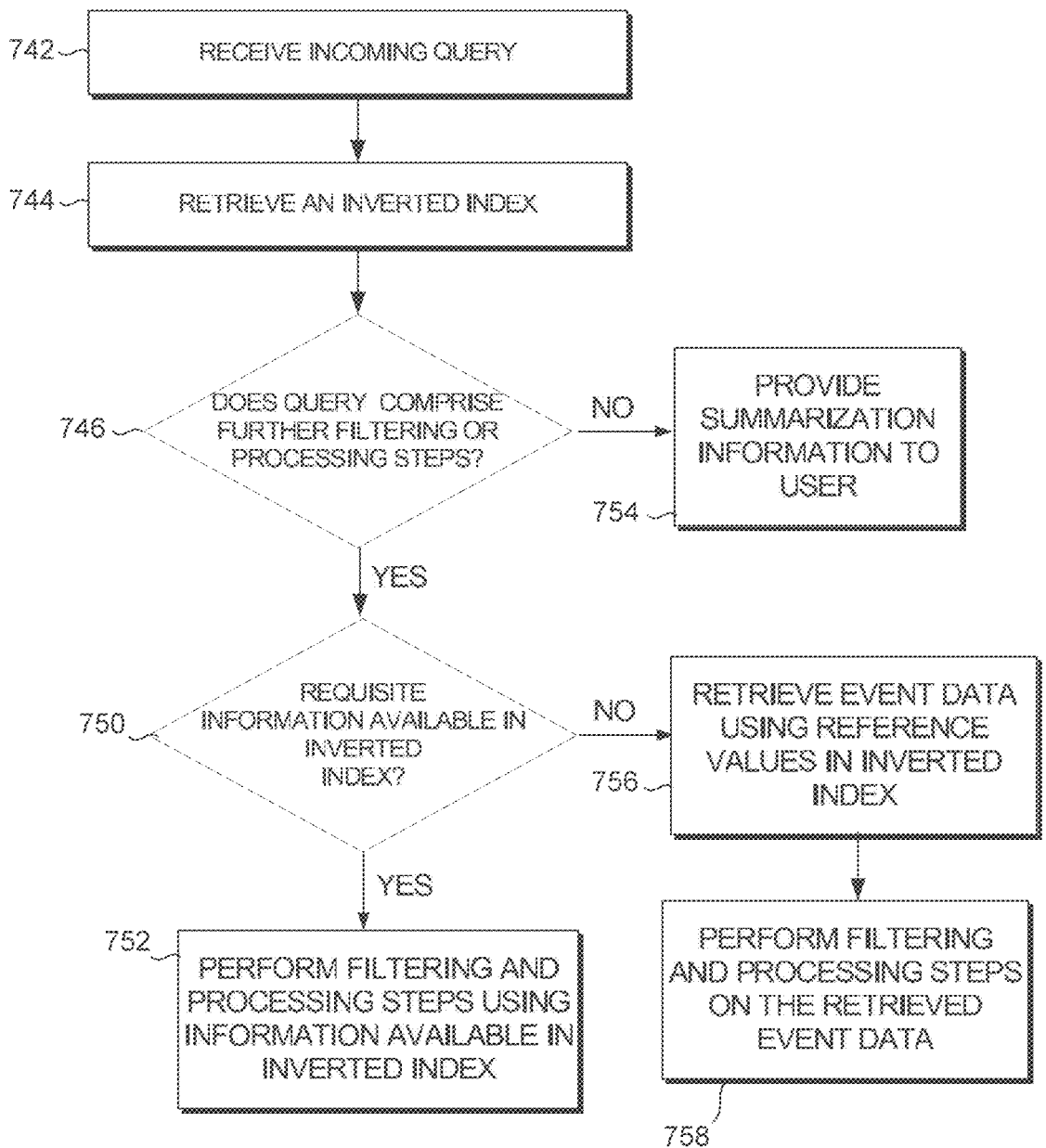
FIG. 7D depicts a flowchart of example use of an inverted index in a pipelined search query, in accordance with example embodiments.

FIG. 7D presents a flowchart illustrating how an inverted index in a pipelined search query can be used to determine a set of event data that can be further limited by filtering or processing in accordance with the disclosed embodiments.

At block 742, a query is received by a data intake and query system. In some embodiments, the query can be receive as a user generated query entered into search bar of a graphical user search interface. The search interface also includes a time range control element that enables specification of a time range for the query.

At block 744, an inverted index is retrieved. Note, that the inverted index can be retrieved in response to an explicit user search command inputted as part of the user generated query. Alternatively, the search engine can be configured to automatically use an inverted index if it determines that using the inverted index would expedite the servicing of the user generated query. Each of the entries in an inverted index keeps track of instances of a specific value in a specific field in the event data and includes references to events containing the specific value in the specific field. In order to expedite queries, in most embodiments, the search engine will employ the inverted index separate from the raw record data store to generate responses to the received queries.

At block 746, the query engine determines if the query contains further filtering and processing steps. If the query contains no further commands, then, in one embodiment, summarization information can be provided to the user at block 754.

If, however, the query does contain further filtering and processing commands, then at block 750, the query engine determines if the commands relate to further filtering or processing of the data extracted as part of the inverted index or whether the commands are directed to using the inverted index as an initial filtering step to further filter and process event data referenced by the entries in the inverted index. If the query can be completed using data already in the generated inverted index, then the further filtering or processing steps, e.g., a "count" number of records function, "average" number of records per hour etc. are performed and the results are provided to the user at block 752.

If, however, the query references fields that are not extracted in the inverted index, then the indexers will access event data pointed to by the reference values in the inverted index to retrieve any further information required at block 756. Subsequently, any further filtering or processing steps are performed on the fields extracted directly from the event data and the results are provided to the user at step 758.

2.13.4. Accelerating Report Generation

In some embodiments, a data server system such as the data intake and query system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on these additional events. Then, the results returned by this query on the additional events, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer events needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

2.14. Security Features

The data intake and query system provides various schemas, dashboards, and visualizations that simplify developers' tasks to create applications with additional capabilities. One such application is the an enterprise security application, such as SPLUNK® ENTERPRISE SECURITY, which performs monitoring and alerting operations and includes analytics to facilitate identifying both known and unknown security threats based on large volumes of data stored by the data intake and query system. The enterprise security application provides the security practitioner with visibility into security-relevant threats found in the enterprise infrastructure by capturing, monitoring, and reporting on data from enterprise security devices, systems, and applications. Through the use of the data intake and query system searching and reporting capabilities, the enterprise security application provides a top-down and bottom-up view of an organization's security posture.

The enterprise security application leverages the data intake and query system search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (SIEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application provides pre-specified schemas for extracting relevant values from the different types of security-related events and enables a user to define such schemas.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the enterprise security application facilitates detecting "notable events" that are likely to indicate a security threat. A notable event represents one or more anomalous incidents, the occurrence of which can be identified based on one or more events (e.g., time stamped portions of raw machine data) fulfilling pre-specified and/or dynamically-determined (e.g., based on machine-learning) criteria defined for that notable event. Examples of notable events include the repeated occurrence of an abnormal spike in network usage over a period of time, a single occurrence of unauthorized access to system, a host communicating with a server on a known threat list, and the like. These notable events can be detected in a number of ways, such as: (1) a user can notice a correlation in events and can manually identify that a corresponding group of one or more events amounts to a notable event; or (2) a user can define a "correlation search" specifying criteria for a notable event, and every time one or more events satisfy the criteria, the application can indicate that the one or more events correspond to a notable event; and the like. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

The enterprise security application provides various visualizations to aid in discovering security threats, such as a "key indicators view" that enables a user to view security metrics, such as counts of different types of notable events.

Figure 17A:
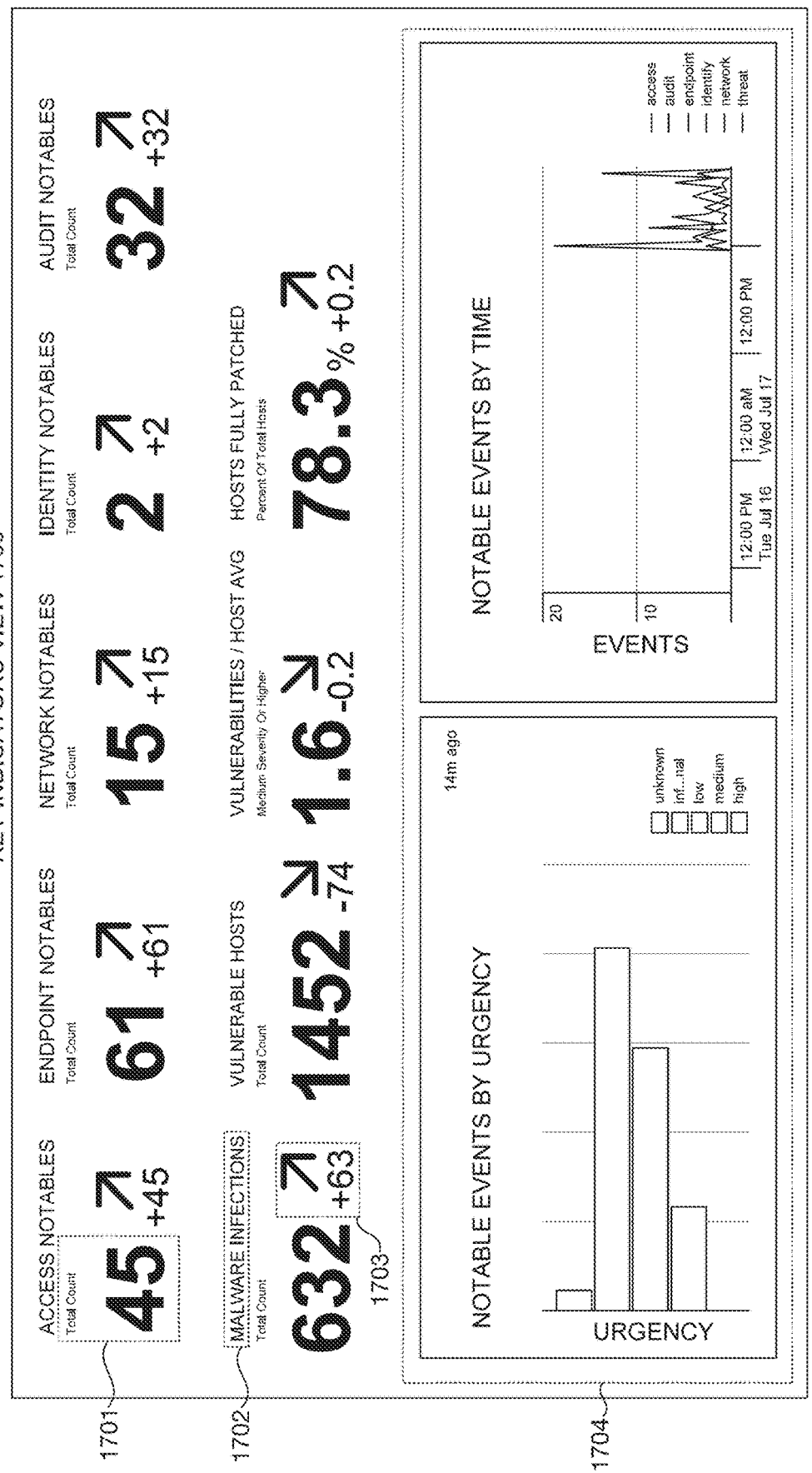
FIG. 17A is an interface diagram of an example user interface of a key indicators view, in accordance with example embodiments.

For example, FIG. 17A illustrates an example key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 17B:
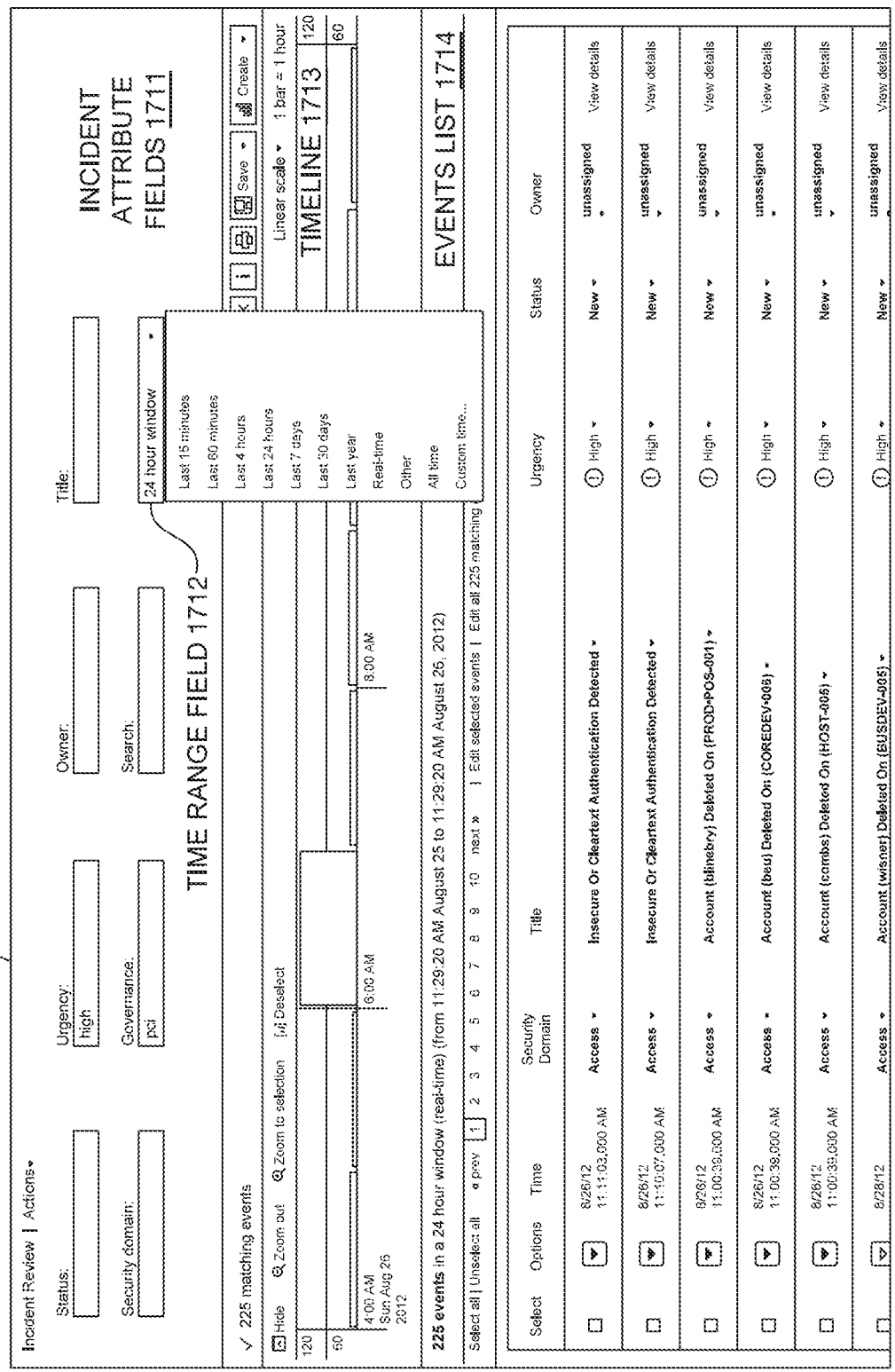
FIG. 17B is an interface diagram of an example user interface of an incident review dashboard, in accordance with example embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 17B illustrates an example incident review dashboard 1710 that includes a set of incident attribute fields 1711 that, for example, enables a user to specify a time range field 1712 for the displayed events. It also includes a timeline 1713 that graphically illustrates the number of incidents that occurred in time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.15. Data Center Monitoring

As mentioned above, the data intake and query platform provides various features that simplify the developer's task to create various applications. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the virtual machine monitoring application stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the virtual machine monitoring application provides pre-specified schemas for extracting relevant values from different types of performance-related events, and also enables a user to define such schemas.

Figure 17C:
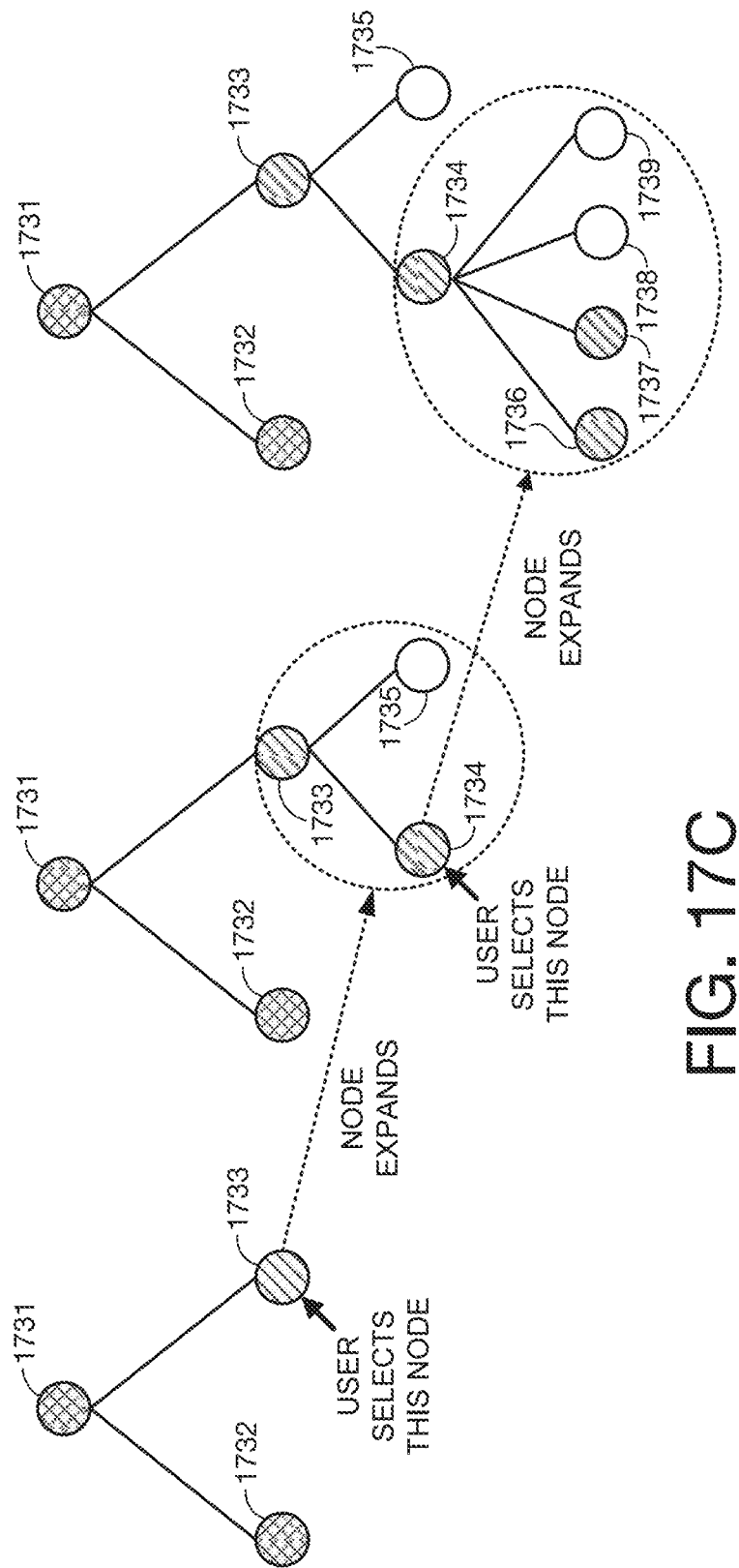
FIG. 17C is a tree diagram of an example a proactive monitoring tree, in accordance with example embodiments.

The virtual machine monitoring application additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 17C, wherein nodes 1733 and 1734 are selectively expanded. Note that nodes 1731-1739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes.

Figure 17D:
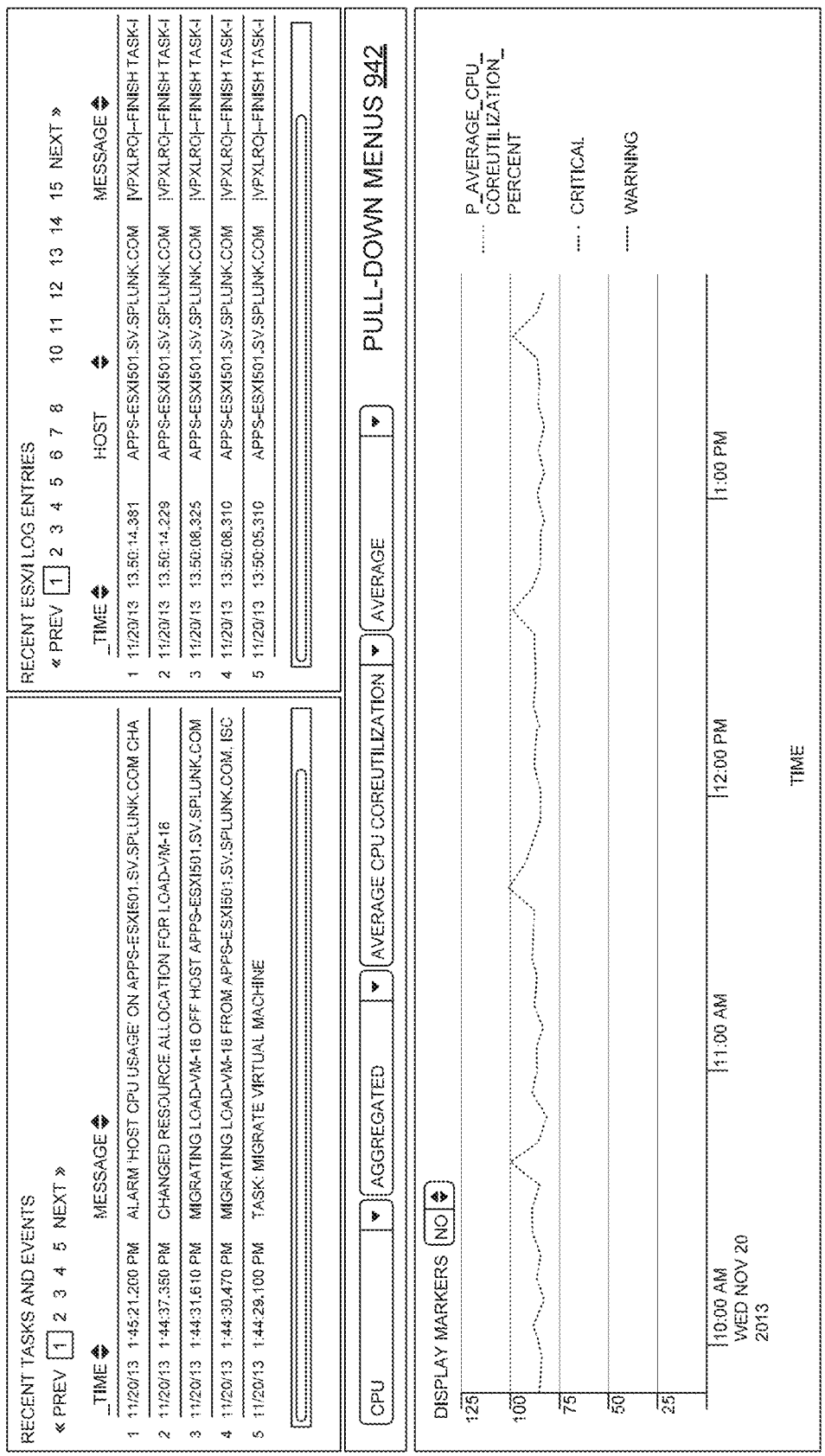
FIG. 17D is an interface diagram of an example a user interface displaying both log data and performance data, in accordance with example embodiments.

The virtual machine monitoring application also provides a user interface that enables a user to select a specific time range and then view heterogeneous data comprising events, log data, and associated performance metrics for the selected time range. For example, the screen illustrated in FIG. 17D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.16. IT Service Monitoring

As previously mentioned, the data intake and query platform provides various schemas, dashboards and visualizations that make it easy for developers to create applications to provide additional capabilities. One such application is an IT monitoring application, such as SPLUNK® IT SERVICE INTELLIGENCE™, which performs monitoring and alerting operations. The IT monitoring application also includes analytics to help an analyst diagnose the root cause of performance problems based on large volumes of data stored by the data intake and query system as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

One or more Key Performance Indicators (KPI's) are defined for a service within the IT monitoring application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

The IT monitoring application facilitates the production of meaningful aggregate KPI's through a system of KPI thresholds and state values. Different KPI definitions may produce values in different ranges, and so the same value may mean something very different from one KPI definition to another. To address this, the IT monitoring application implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. The IT monitoring application can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in the IT monitoring application can include informational fields that can serve as metadata, implied data fields, or attributed data fields for the events identified by other aspects of the entity definition. Entity definitions in the IT monitoring application can also be created and updated by an import of tabular data (as represented in a CSV, another delimited file, or a search query result set). The import may be GUI-mediated or processed using import parameters from a GUI-based import definition process. Entity definitions in the IT monitoring application can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, the IT monitoring application can recognize notable events that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of events and the KPI values generated and collected. Visualizations can be particularly useful for monitoring or investigating service performance. The IT monitoring application provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

The IT monitoring application provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

The IT monitoring application provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

The IT monitoring application provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

The IT monitoring application provides pre-specified schemas for extracting relevant values from the different types of service-related events. It also enables a user to define such schemas.

3.0 User Journeys

As described above, machine data can be ingested, for example by the data intake and query system 108, and events produced based on the machine data. The events can be utilized to provide insight into complex computing systems. For example, events can be accessibly maintained in the data stores, and queries identifying a set of data and a manner of processing the data can be executed. In this way, the machine data can be investigated (e.g., poked) via differing queries, updated field definitions, and so on, to identify useful information for requesting users.

As an example of machine data in disparate computing systems may generate data in response to events, interactions, triggers, and so on. For example, a computing system may record network access events (e.g., user account logins to a computing system), user events (e.g., a computing system may monitor user activity or user behavior), service related events (e.g., as described above with respect to Section 2.16), and so on. In some cases, the disparate computing systems can record user interactions with the computing systems. For example, the machine data may include information indicative of a particular user interacting with a computing system, along with further information describing the interaction. Further interaction with one computing system can trigger the computing system to interact with another computing system, which may generate machine data in response.

These disparate computing systems may therefore generate machine data that describes multitudes of touchpoints associated with a respective entity (e.g., a user, an object, a computing system, and so on). In this specification, a touchpoint can refer to any interaction of an entity with a computing system, or any interaction of an entity that is recorded by a computing system. For example, the entity may include a user, and a touchpoint may include the user accessing his/her user account on a particular computing system. The particular computing system, which may be a domain controller or active directory server, may generate machine data associated with the user interaction.

A second touch point may include the user account performing an action on a user device (e.g., a laptop, computer, tablet), such as causing a download of information to the user device or accessing a virtual private network (VPN). The user device may generate data associated with this second touch point. Additionally, a call received at a call center from an entity may represent a third touch point. For example, a computing system recording received calls may generate machine data in response to the call from the entity.

A combination of these touchpoints may, as an example, provide useful information related to interactions with one or more computing systems. With respect to the example of users accessing their respective user accounts, additional touchpoints may include particular types of interactions the user accounts perform, along with a touchpoint specifying that the users logged out of their respective user accounts. In this way, the touchpoints may help form a picture of a particular user's utilization of an accessed user account or interaction with various computer systems associated with the user account. For example, a time at which the particular user accessed his/her user account, along with a location from which the access occurred, can be identified from events. Similarly, the system can identify whether the particular user performed particular types of interactions, and then identify a time at which the particular user ceased accessing his/her user account.

Thus, users, or other entities, may interact with disparate computing systems as part of an ongoing process, or journey. Being able to analyze events describing these interactions, and stitching them together to generate a digestible representation of each user's journey may be beneficial to understand these interactions. For example, stitching (e.g., aggregating) events together can provide insights into specific paths typically taken by users to complete a journey. As an example, a journey may be related to processing of an application, and aggregating events may inform all the interactions (e.g., different paths) that different users have prior to their respective applications being complete. These insights may help improve future computer interactions, for example to reduce user frictions via an understanding of typical journeys.

As will be described below, a user journey may be defined that includes one or more steps. Each step can correspond to one or more events from one or more data sources. Therefore, a user journey can indicate occurrences of events across one or more disparate data sources or data systems.

In some cases, the path of a particular user across one or more steps of a user journey, or the user journey of a particular user or entity can be referred to as a journey instance. In some embodiments, a journey instance can include a path through each of the steps of a user journey, and in certain embodiments, the journey instance includes a path through a subset of the steps of a user journey. Further, in certain cases, a user journey, such as a broadly defined grouping of touchpoints, steps, or events, a particular sequence of steps or touchpoints, or a grouping of multiple particular user's journeys may also be referred to as a journey model.

A system (e.g., the data intake and query system 108) can execute queries based on the steps, and provide results (e.g., in one or more user interfaces) to reviewing users. For example, the results can indicate occurrences of touchpoints that may occur along a user journey. To relate these results to individual entities (e.g., users), for example touchpoints of a specific entity, the system can stitch events together that are related to each entity. However, as different events may include machine data generated from disparate systems, these events may not be easily relatable. For example, an event describing a first touchpoint of a user may identify the user in a first way (e.g., a name of the user), while an event describing a second touchpoint of a user may identify the user in a second way (e.g., a phone number of the user).

As will be described below, with respect to FIG. 19, one or more stitching schemes can be utilized to relate events. As described above, each step may be associated with a particular data source. For steps associated with a same data source, the events which satisfy search queries corresponding to these steps may be rapidly relatable. For example, the events from this same data source that are related to a same entity may include a portion of same information. A particular field, for example a Session ID or User ID, may include a same value for events related to a same entity. Therefore, a stitching scheme for these events may specify that events including a same value for the particular field are related to a same entity.

However, for steps associated with different data sources, the events which satisfy search queries corresponding to these steps may not be immediately relatable. A stitching scheme for these events may therefore include utilization of a lookup table that correlates events associated with different data sources. For example, and with respect to the example described above, a lookup table can correlate names of users with their phone numbers. Another stitching scheme for these events may utilize 'gluing events', which can represent intermediate events that include information associated with a first a data source and information associated with a second data source. As an example, a first computing system may trigger a second computing system, and the triggering may specify a Session ID or User ID related to an entity. The second computing system may record this specified information in machine data, and further record its Session ID or User Id. The system can execute one or more search queries to identify these gluing events, and therefore relate events that are associated with the first computing system and the second computing system.

While reference is made herein to a search query, it should be understood that search query can encompass any search of information that causes the system to determine satisfaction of particular constraints, such as whether particular values, fields, and so on, are included in events. As an example, a search query may be specified according to the Splunk Processing Language (SPL) described above.

As an example of a user journey, a user journey can include steps related to processing of a user application (e.g., application for particular network credit application, job application, and so on). For example, a first step may be associated with receipt of an application. The first step may specify a query to identify occurrences of a particular value for a field included in events. The field may be related to actions performed by users, and the particular value may reflect the action of receiving an application submitted by a user. In the example first step, the data sources may include information received from, or generated by, computing systems at which applications are received. As described above, these data sources may be specified by a user creating the user journey, or optionally these data sources may be automatically selected by the system (e.g., based on analyzing the user journey). For the example user journey, additional steps may further specify queries associated with the application's processing and/or status. Each of these additional steps may cause application (e.g., execution) of search queries on differing data sources, such that a user's application may be monitored across the data sources.

As will be described below, for example with respect to FIGS. 19-27, a user can create a user journey through efficient user interfaces that succinctly mask the complexities associated with analyzing millions, billions, and so on, of events produced from machine data of disparate computing systems. With respect to the example of an application described above, a user can indicate data sources which include events describing status information of an application. The user can then indicate how events correlate across data sources (e.g., stitching schemes as described above). For example, as described above a lookup table can be utilized to correlate information included in events that are associated with different data sources. Steps can then be defined for the user journey, and, as will be described, the search queries specified by each step can be generated via minimal user interactions with a user interface. Optionally, the search queries can be generated by the user, for example, using a query language (e.g., SPL as described above).

As will be described, at least with respect to FIG. 21, to improve efficiency and ease of creating user journeys, common field identifiers can be created and utilized across data sources. For example, a user creating a user journey can indicate that a field name specific to a first data source corresponds with a particular common field identifier. Similarly, the user can indicate that a different field name specific to a second data source also corresponds to the particular common field identifier. In this way, the user can create a user journey via a set of common field identifiers such that steps can be rapidly defined. An example common field identifier may include 'UserID', and the user can indicate that a first field (e.g., a field specifying user name) in events associated with a first data source corresponds to 'User ID'. Similarly, the user can indicate that a second field (e.g., a field specifying phone number) in events associated with a second data source similarly corresponds to 'UserID'. Therefore, the user can create steps that can be used to generate queries to be applied to events associated with different data sources, with the queries specifying the common field identifier 'UserID'.

Upon creation of a user journey, the system can execute queries defined based on information provided by steps of the journey, and relate resulting events. As will be described, at least with reference to FIGS. 29 and 30, the system can analyze events being received in real-time, or the system can analyze events previously produced and stored in data stores, including field-searchable data stores. Additionally, as described below at least with reference to FIGS. 18 and 31-36, the system, or a presentation system in communication with the system, can generate user interfaces for presentation on user devices that describe the relating.

Figure 18:
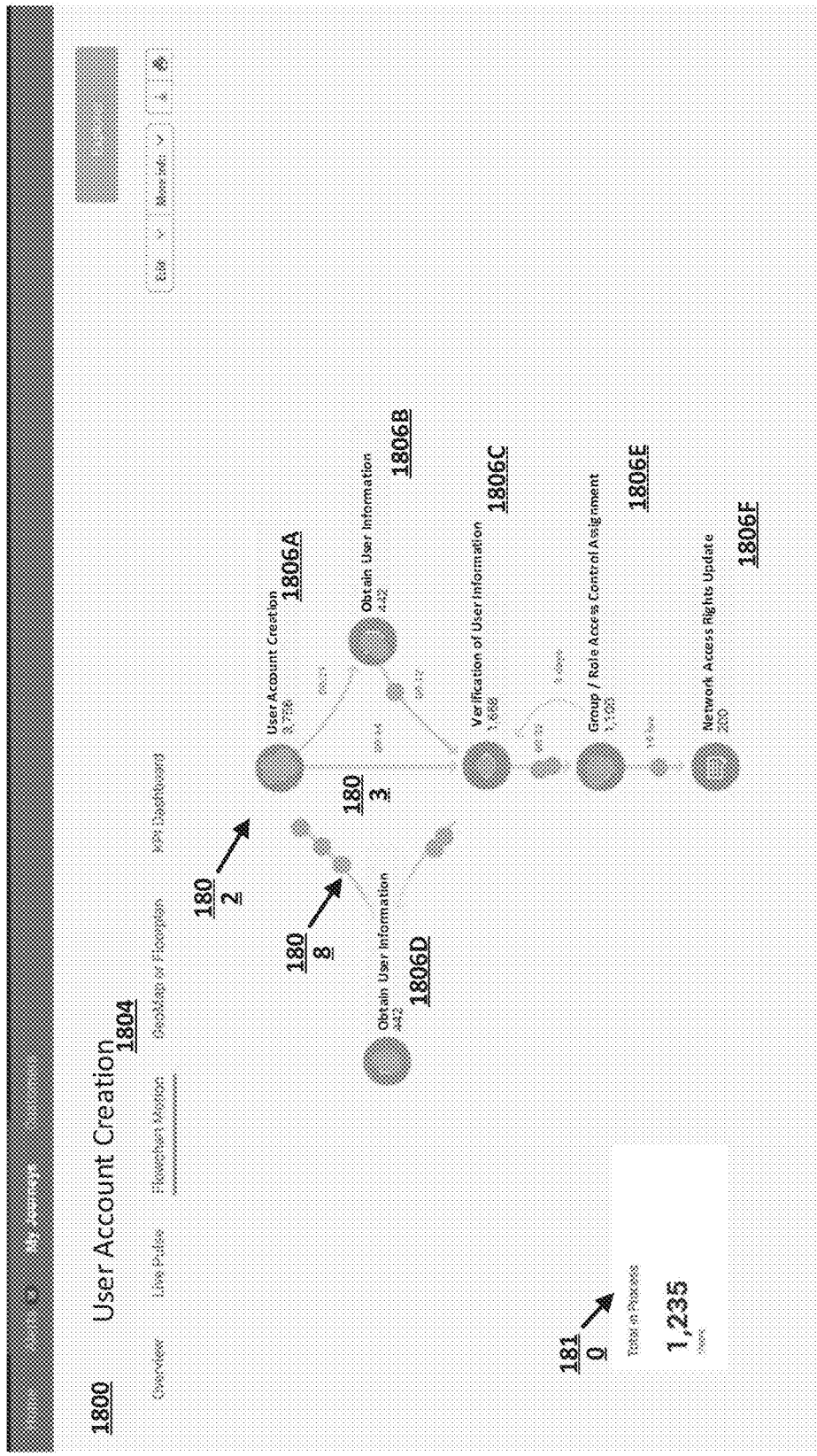
FIG. 18 illustrates an example user interface displaying a user journey.

FIG. 18 illustrates an example user interface 1800 displaying a user journey 1802. The user interface 1800 can be an example of an interactive user interface generated, at least in part, by a system (e.g., a server system, the data intake and query system 108, and so on), and which is presented on (e.g., rendered by) a user device (e.g., a laptop, a computer, a tablet, a wearable device). For example, the user interface 1800 can be presented via a webpage being presented on the user device. As another example, the webpage may be associated with a web application (e.g., executing on the data intake and query system 108) that receives user input on the user device and updates in response. Optionally, the user interface 1800 can be generated via an application (e.g., an 'app' obtained from an electronic application store) executing on a user device, and the application can receive information for presentation in the user interface 1800 from an outside system (e.g., the data intake and query system 108).

User interface 1800 includes a graphical depiction of an example user journey 1802 that includes example steps 1806A-F. As described above, a user journey includes one or more steps, with each step corresponding to one or more queries to be applied to events associated with data sources. A particular entity, such as a user or object, can be monitored as it traverses a user journey. For example, an initial event identifying an example user that satisfies one or more queries corresponding to a first step may be correlated with (e.g., related to) a second event identifying the example user satisfying queries corresponding to a second step. In this way, the example user can be determined to have traversed from the first step to the second step. Similarly, events identifying multitudes of users can be similarly monitored, and related to determine which events are associated with a same user. User interface information describing results of the relating can be presented.

FIG. 18 illustrates summary information associated with example user journey 1802. As illustrated, steps 1806A-F are graphically connected via respective visual links 1803 between the steps. These links indicate transitions between steps, for example the visual link 1803 indicates users' transitioning from step 1806A to step 1806C. Based on monitoring events for occurrences of the steps 1806A-F, user interface 1800 presents indications of a total number of users 1810 who have initiated user journey 1802, indications of a quantity of users associated with each step (e.g., visual element 1808 may represent a quantity of users, with the element 1808 optionally sized according to a number of users associated with the visual element 1808 as compared to the total number of users 1810), and so on. Additional summary information includes average times associated with each step (e.g., transition between step 1806A and step 1806B is illustrated as taking 44 minutes). In this way, a reviewing user can utilize the user interface 1800 to view information otherwise buried inside complex machine data and events, via an easy to digest user interface 1800.

Optionally, the visual element 1808 can represent a single user. As illustrated, visual element 1808 is illustrated as transitioning between step 1806D and step 1806A. The example user journey 1802 may illustrate particular steps (e.g., major steps, for example as specified by a user), but the user journey 1802 may include additional steps not illustrated. Thus, there may be steps between the illustrated steps 1806D and 1806A. To determine the single user's location along with a visual link between step 1806D and 1806A, the system can utilize a number of remaining (e.g., uncompleted) steps between the steps 1806D, 1806A. Optionally, even without these additional steps, the system can predict that the single user is transitioning (e.g., the single user is likely to be transitioning) between the steps 1806D, 1806A, based on a time since the single user completed step 1806D. That is, the system can determine an average time from completion of step 1806D to completion of step 1806A across all users, or users with that share features similar to the single user (e.g., location, demographics, historical information, and so on). In this way, the system can model the visual element's 1808 location along a visual link based on a time since the single user completed step 1806D. For example, the system can identify an event satisfying a query corresponding to step 1806D, and utilize timestamp information included in the event.

In the example of FIG. 18, user journey 1802 describes steps towards completion of creating a user account. Initial step 1806A indicates creation of a user account, for example an event can be identified that includes machine data associated with the initial creation of the user account. The final step 1806F indicates implementation of assigned network access rights associated with the created user account. As illustrated, different paths from the initial step 1806A to the final step 1806F are included. For example, a first path can traverse steps 1806A, 1806C, 1806E, and 1806F. A second path can traverse steps 1806A, 1806B, 1806C, 1806E, and 1806F. This second path differs from the first path in that, for at least one user, user information was obtained (e.g., step 1806B). For example, one or more events specifying the example user may have indicated that user information was obtained (e.g., an event can indicate that a network call to a storage system was performed, or an event can indicate that a request for user information, such as an email, was provided, and so on). As described above, each step can correspond to, or be used to generate, one or more queries to be executed, and the executed queries for step 1806B may have identified events specific to the example user. In contrast, a different example user who traversed the first path may have had his/her user information entered at a time of user account creation in step 1806A.

As will be described in more detail below, with respect to FIG. 28, an ordering of the steps 1806 A-F, and thus a determination of the links 1803 between steps 1806A-F, can be determined by the data intake and query system 108 based on monitoring and/or relating events. For example, the data intake and query system 108 can identify occurrences of each step for a particular user, and identify a path traversing the steps based on timestamp information. Similarly, the data intake and query system 108 can determine alternate paths based on monitoring multitudes of users. In this way, the data intake and query system 108 can operate with limited assumptions, such that all paths between steps that users take can be empirically determined. As will be described below, with respect to FIG. 22, the data intake and query system 108 can determine most-used paths, and further cluster entities (e.g., users) according to paths they traverse.

The user interface 1800 further illustrates representations of users who are transitioning between steps. For example, visual element 1808 (e.g., the visual element can be a circle, square, an arbitrary shape or polygon, and so on) can represent a particular number of users who have completed a step and are traversing to a subsequent step. Optionally, the user interface 1800 can illustrate movement of the visual elements between steps. For example, an animation of the visual elements transitioning between steps 1806A-F can be presented. Optionally, a speed associated with the movement can be based on a measure of central tendency of an amount of time a transition takes. As will be described below, the data intake and query system 108 can monitor occurrences of steps, and determine statistical information associated with the monitoring. In this way, the system 108 can determine that, for example, transitioning from step 1806A to step 1806C takes 44 minutes (e.g., a measure of central tendency of transitions can be determined to take 44 minutes).

Additionally, the user interface 1800 includes textual information 1804 associated with the user journey (e.g., "User Account Creation"). This textual information 1804 can be specified by a user creating the user journey 1802. Optionally, the textual information 1804 may be automatically generated by the data intake and query system 108 based on an analysis of included steps 1806A-F. As an example, utilizing machine learning techniques the data intake and query system 108 can analyze queries specified in the steps 1806A-F, and determine corresponding textual information that reflects the queries. For example, the system 102 can compare the queries with queries utilized in other user journeys, to determine similar user journeys. The textual information 1804 associated with these similar user journeys may be analyzed and updated via the machine learning techniques based on the specific queries of user journey 1802.

Figure 19:
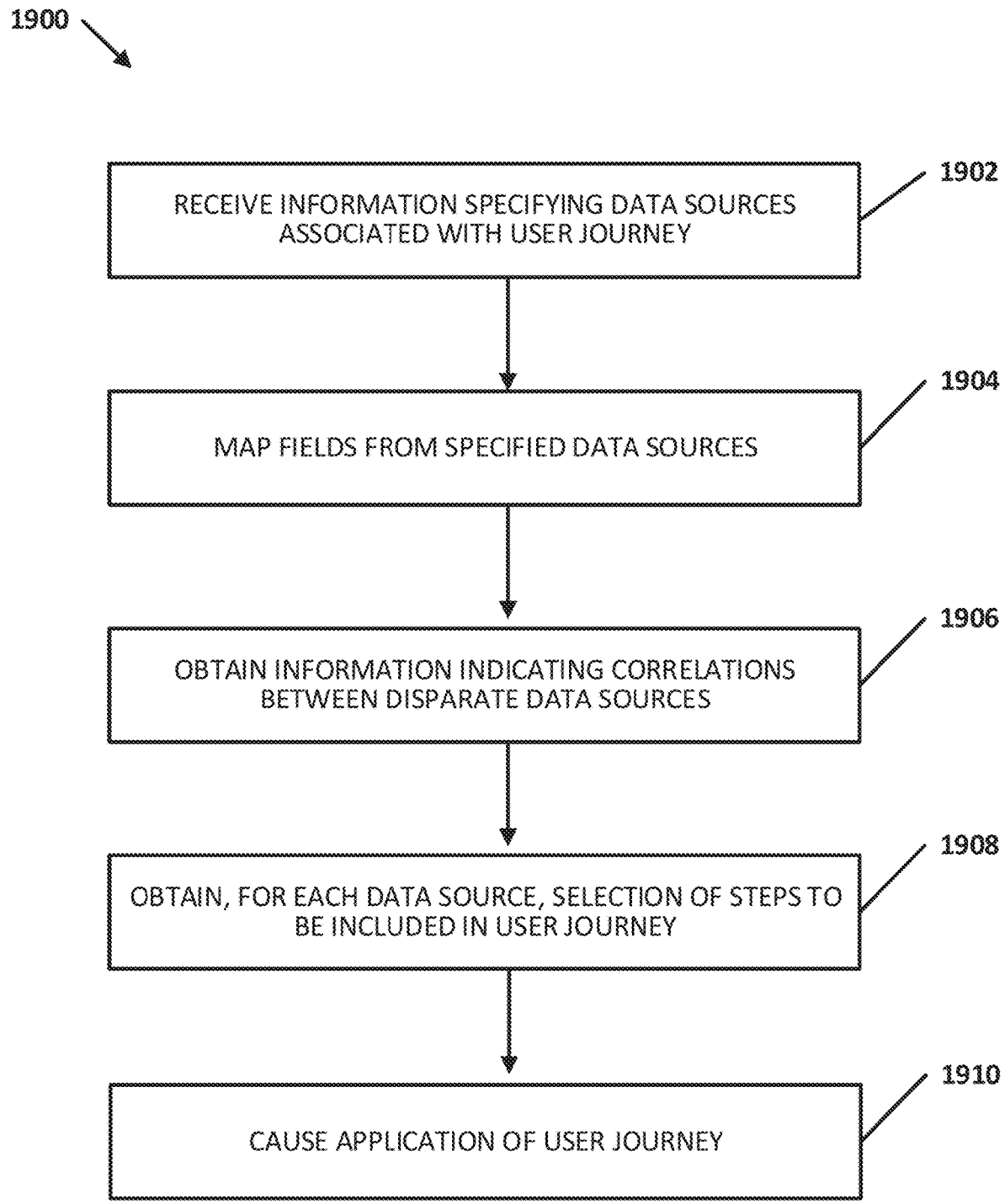
FIG. 19 illustrates an example process for creating a user journey.

FIG. 19 illustrates an example process 1900 for creating a user journey. For convenience, the process 1900 will be described as being performed by a system of one or more computers (e.g., the data intake and query system 108).

At block 1902, the system receives information specifying data sources associated with a user journey. As described above, a user journey can utilize events associated with particular data sources. For example, a user creating the user journey may be interested in particular touchpoints (e.g., user interactions) with disparate computing systems. The user can therefore indicate data sources related to these touchpoints. For example, if a touchpoint is associated with an entity placing a call to a call center, the user creating a user journey can specify a data source that records information associated with such calls.

Optionally, as the system receives information specifying data sources, the system can utilize machine learning techniques to recommend additional data sources that may be of interest to the user. For example, if the user specifies a data source associated with a call center, the system can recommend a data source storing touchpoints (e.g., user interactions) with a front-end system. The system may assume that the user will want to understand why a call center was called, and therefore can recommend a data source indicating specific user interactions that led to a call being placed. That is, the front-end system may record machine data describing user interactions on a web page, with the web page specifying a call number. Therefore, if a call to the call number was placed, the user creating the user journey may be interested in the user interactions with the web page which led to the call. The system can analyze prior created user journeys, and determine clusters of data sources which are generally utilized together. In this way, the system can recommend data sources to the user to increase a speed at which the user journey is created.

At block 1904, the system maps fields included in events associated with the specified data sources to common field identifiers. Each data source may include events with differing field identifiers. For example, values of identifying information included in events associated with a first data source may correspond to a different field identifier than values of identifying information included in events associated with a second data source. The system can map these different field identifiers to a same common field identifier.

Figure 20:
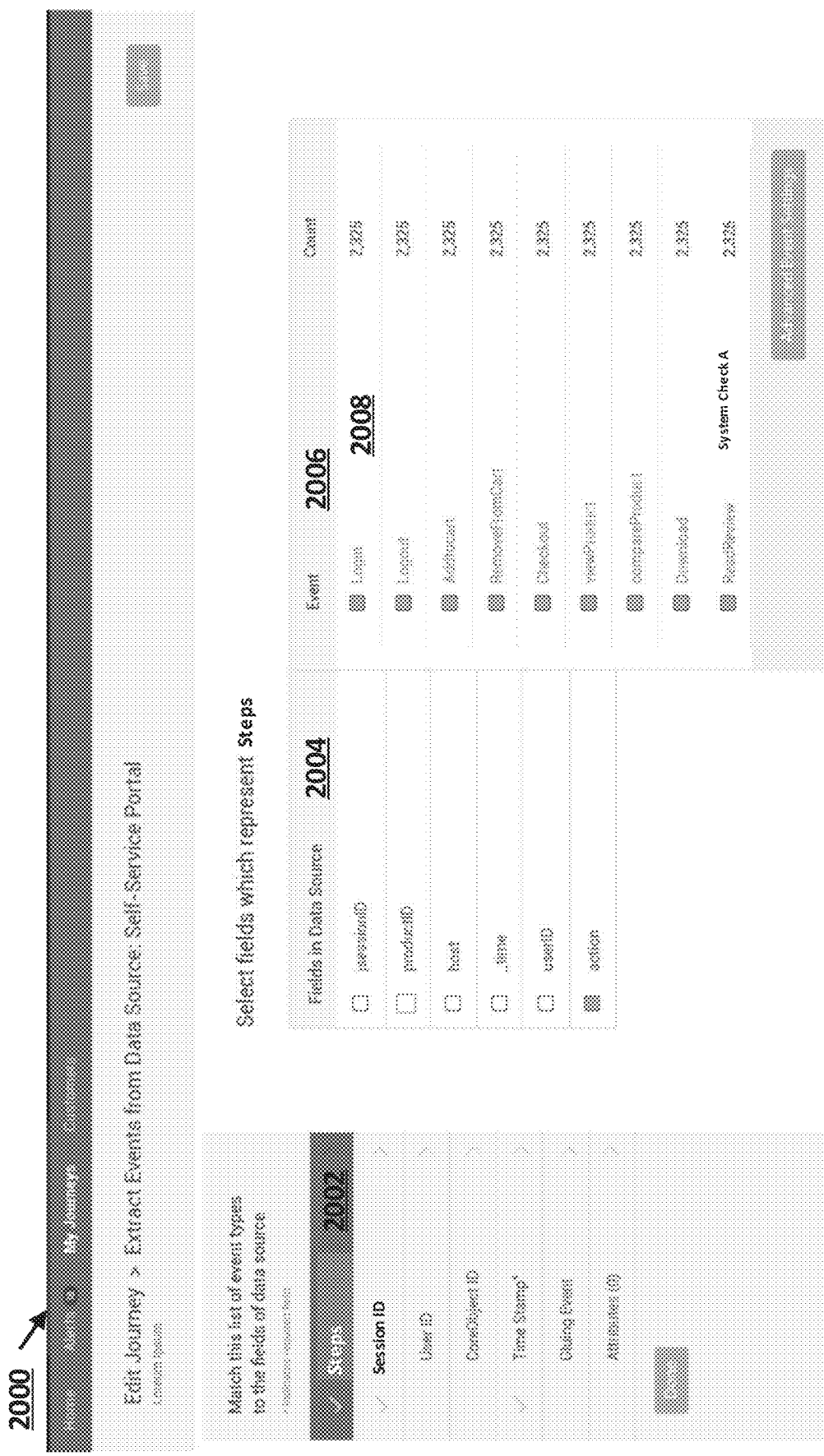
FIG. 20 illustrates an example user interface for mapping a field identifier in a particular data source.

As an example, and as will be described in more detail with respect to FIG. 20, a common field identifier may relate to a step. For example, a step may optionally be defined as corresponding to values of a particular field included in events. For example, field values for a field named 'action' of events associated with a particular data source may indicate user interactions. Therefore, the system can receive a mapping of the 'actions' field to a common field identifier (e.g., "Steps" as illustrated in FIG. 20).

Figure 21:
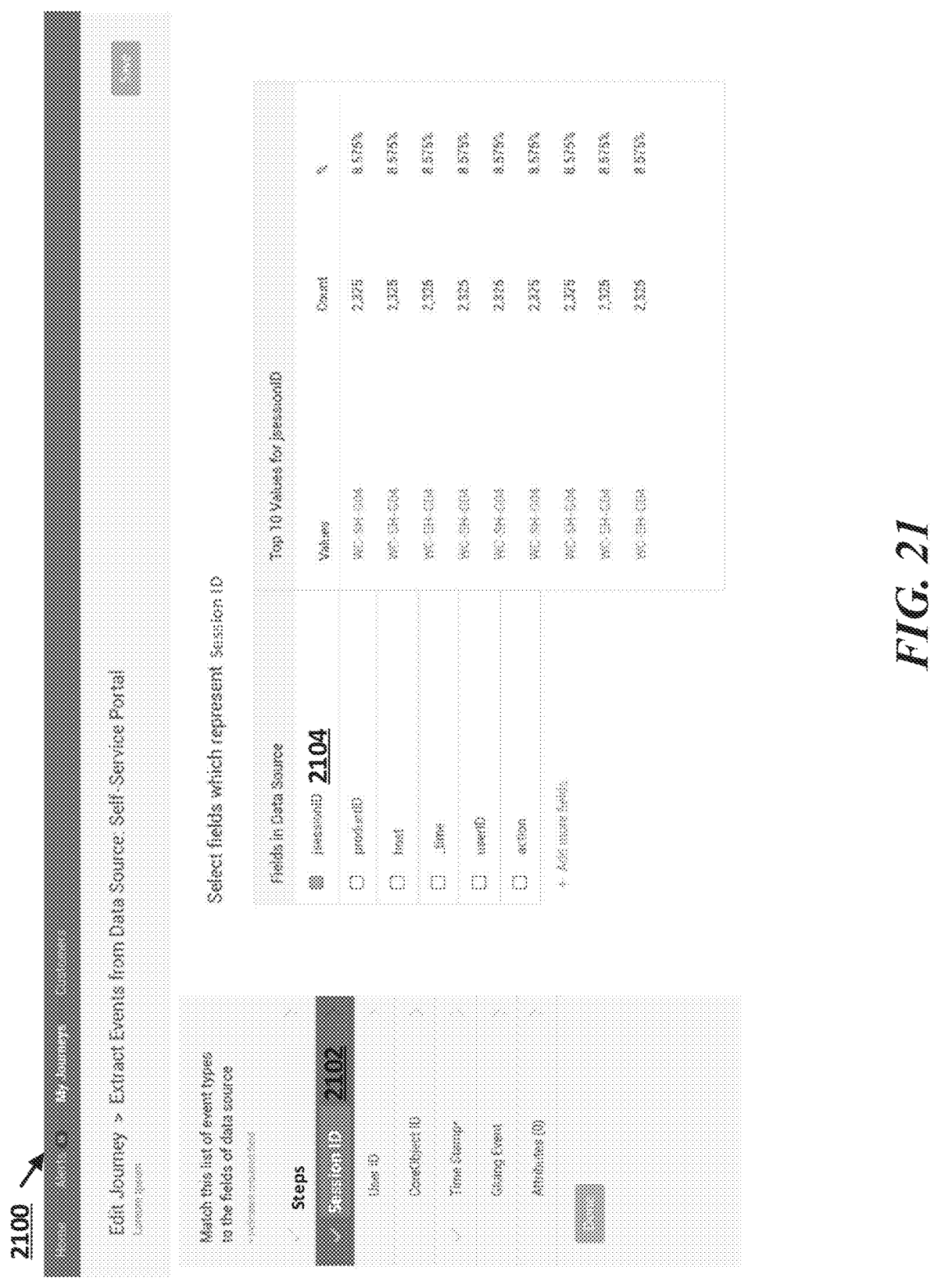

As another example, and as will be described in more detail below with respect to FIG. 21, a common field identifier may relate to a session identifier (e.g., 'Session ID' as illustrated in FIG. 21). A session identifier can indicate a particular session of an entity, and can be utilized by a computing system to reflect interactions of the entity. For example, the computing system may generate machine data that tracks interactions of an entity using the same session identifier. To stitch events together that relate to a particular entity, the system can therefore identify all events that include a same session identifier.

At block 1906, the system obtains information indicating correlations between data sources. As described above, and as illustrated in FIGS. 24-27, stitching schemes can be utilized to relate events from same data sources, and also relate events across data sources. That is, to determine whether an entity has completed a user journey, the system may have to relate events together to identify that the entity has completed the user journey.

A user of the system can specify these stitching schemes. For example, the user can indicate that for events associated with a same data source, a particular field is to be utilized to identify related events. As described above, with respect to block 1904, a particular field may be a session identifier, and the user can specify that the session identifier field be utilized to identify related events. As another example, the user can indicate that a user identifier be utilized to relate events from a particular data source. For example, events from the particular data source may include a user name associated with an interaction. The user can therefore specify that user name be utilized to identify related events from the particular data source.

Figure 24:
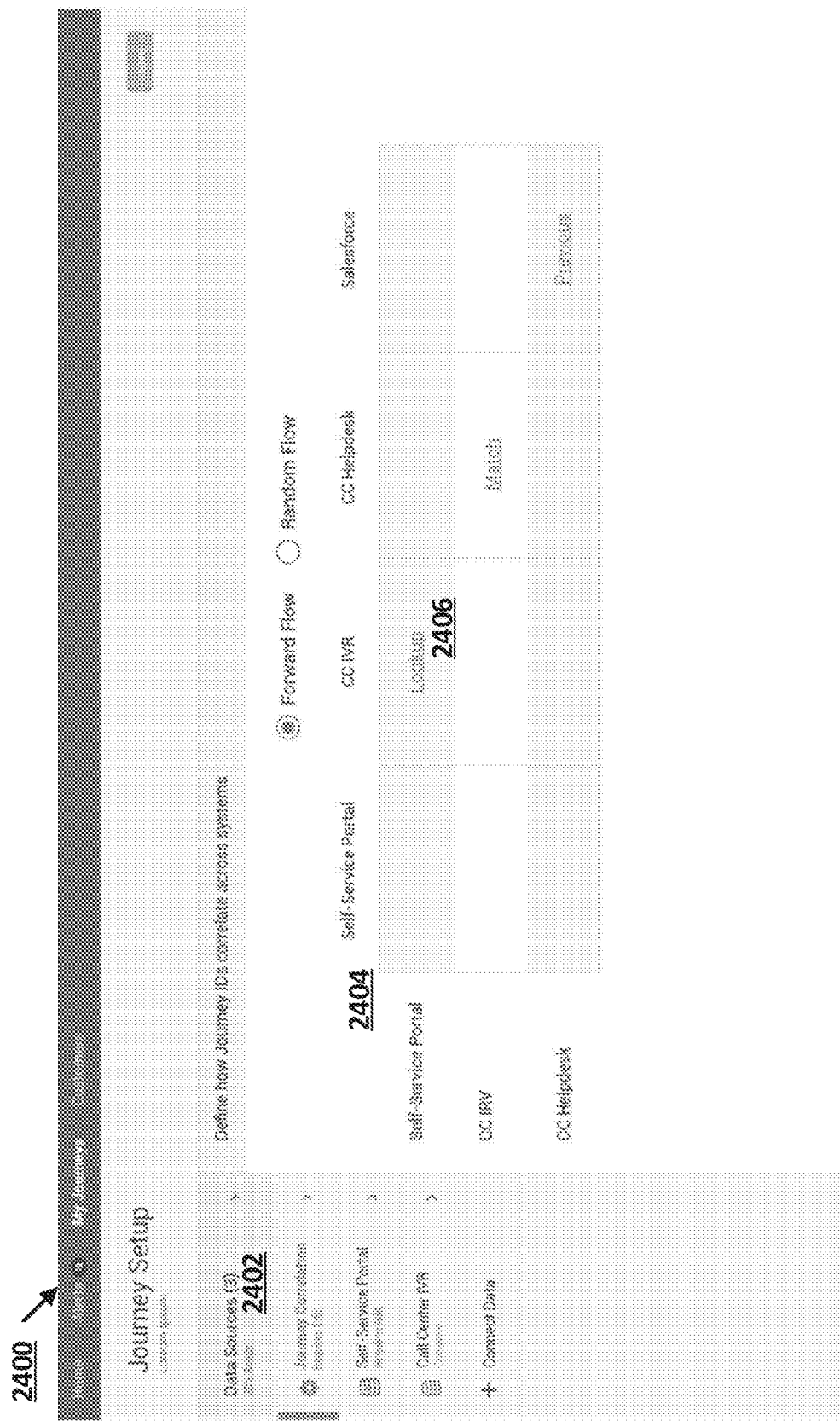
FIG. 24 illustrates an example user interface for specifying correlations between data sources selected for a user journey.

Additionally, to relate events associated with different data sources, the user can indicate stitching schemes for these different sources. As an example, and as illustrated in FIG. 24, a user interface can be presented to the user identifying the data sources selected in block 1902. The user can then specify a stitching scheme between each of the identified data sources. For example, the user can indicate that a lookup table is to be utilized between a first data source and a second data source. In this example, the user can specify a field in events associated with the first data source that are correlated with events associated with the data source via a lookup table. As another example of a stitching scheme, the user can indicate that a gluing event is to be utilized to relate events from a first data source and a second data source. In this example, the system can execute a query to identify events (e.g., gluing events) from, for example, the second data source that include a field associated with the first data source and a field associated with the second data source. Based on these identified events, identifiers associated with the first data source and second data source can be related. Further description of a gluing event is included below, with respect to FIG. 28.

The system may optionally utilize machine learning techniques to determine a stitching scheme. For example, the system can analyze field identifiers included in events associated with the selected data sources. Utilizing similarity rules (e.g., a Levenshtein distance), the system can determine that identifying information may be similarly labeled (e.g., a field identifier labeled 'processID' in a first data source may correspond with a field identifier labeled 'process ID' or 'process identifier' in a second data sources). Optionally the system can automatically select stitching schemes utilized in prior created user journeys. For example, the system can store information indicating correlations between the data sources, and can be automatically utilize stitching schemes created for prior user journeys.

At block 1908, the system obtains selections of steps to be included in the user journey. As will be described below, with respect to FIG. 23, the system can present steps that are able to be selected for inclusion in the user journey. For example, the steps may have been previously created. Additionally, each step may optionally be specific to a particular data source. Therefore, the steps can correspond to values of a particular field identifier included in events associated with a particular data source. For example, and as described above, a field identifier can be associated with user interactions or touchpoints (e.g., a field identifier 'action'). The system can present common values of this field identifier as determined from the events associated with the particular data source, and the user can select one or more of these values to correspond to steps of the user journey. Subsequently, the user can select a different data source, and select values of a field identifier as corresponding to steps for this different data source.

In some cases, the system can recommend additional steps to the user based on current selections of steps. That is, the system can analyze prior created user journeys and determine clusterings of steps (e.g., steps that are commonly included in a same user journey). The system can therefore cause presentation of recommend steps, which the user can select or discard.

At block 1910, the system causes application of the created user journey. Upon selection of the steps, a user can indicate that the user journey is to be applied to events. For example, the user journey can be applied as will be described below with respect to FIG. 29. It will be understood that fewer, more, or different steps can be included in routine 1900. For example, the system can generate the queries for each step based on the information received from the user via one or more user interfaces.

Figure 22:
FIG. 22 illustrates an example user interface for specifying information that is to be recorded for a particular step.
Figure 23:
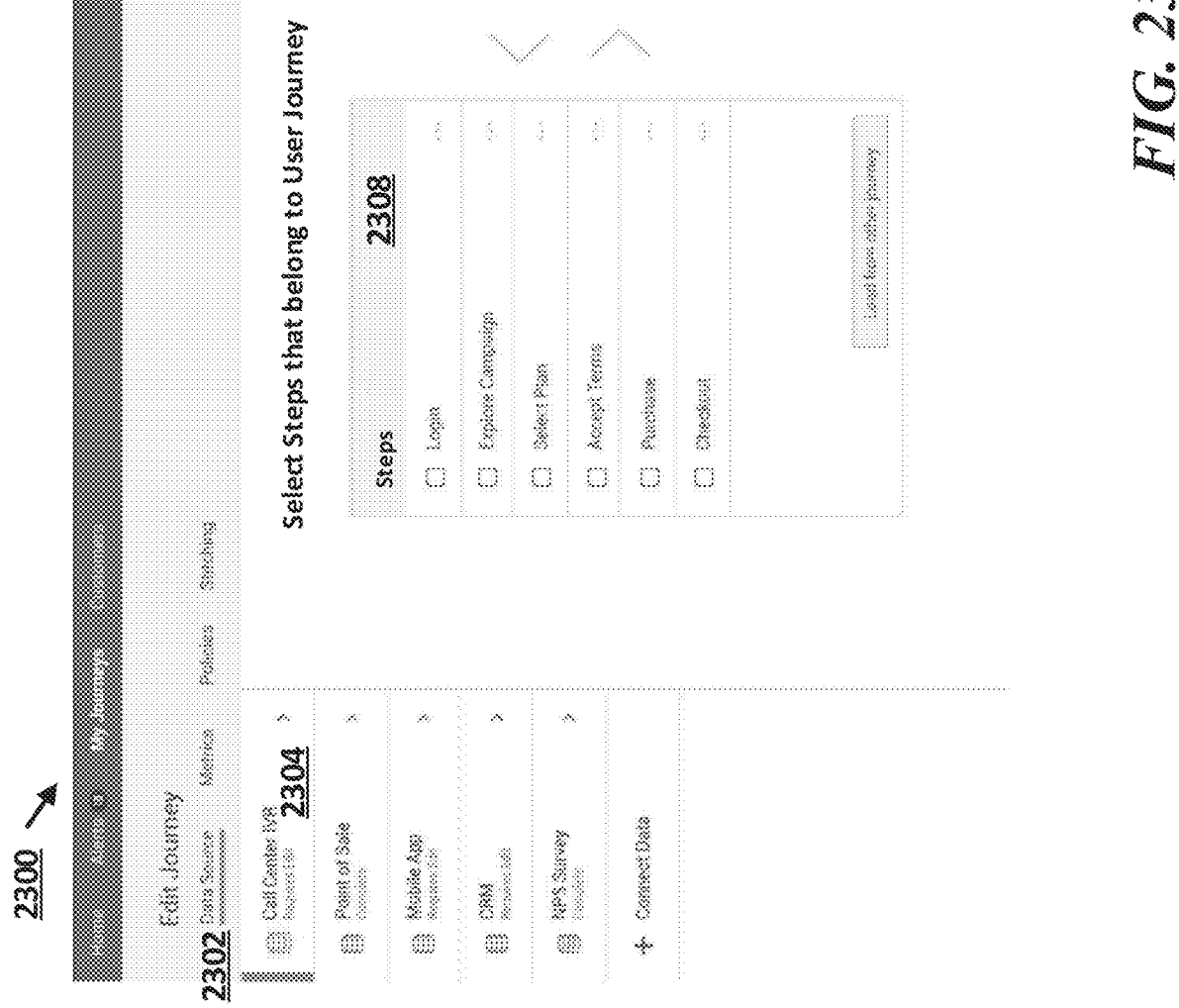
FIG. 23 illustrates a user interface for selecting steps to be included in a user journey.

FIGS. 20-27 illustrate user interfaces associated with creation of a user journey, for example as described in FIG. 19. For example, FIG. 20 illustrates a user interface for specifying a field included in events of a particular data source (e.g., "Self-Service Portal") that is to correspond with a common field identifier associated with available steps. FIG. 21 illustrates a user interface for specifying a field included in events that is to be utilized to relate events associated with a same data source (e.g., "Self-Service Portal"). FIG. 22 illustrates a user interface for specifying information included in events that is to be stored when events satisfying a step's queries are located. For example, if a step is related to a user adding an item to a cart, FIG. 22 can be utilized to specify that for events satisfying this step, the system is to store an identification of the specific items being added. FIG. 23 illustrates a user interface for selecting steps to be included in a user journey. FIGS. 24-27 illustrate user interfaces for relating events between different data sources, for example user interfaces to specify stitching schemes.

FIG. 20 illustrates an example user interface 2000 for identifying a field identifier whose field values are to indicate potential steps of a journey in a particular data source. As described above, steps of a user journey can be created, with each step being associated with a touchpoint or user interaction. In the example illustrated in FIG. 20, a common field identifier 'Steps' 2002 can represent generic steps for a journey, and the user interface 2000 can be utilized to identify a particular field identifier from the data source fields 2004 that is mapped to the generic step of the journey. That is, field values of field identifier selected from the data source fields 2004 can be utilized to identify occurrences of steps in a journey.

In the illustrated embodiment, the user interface 2000 includes a list of data source fields 2004 of events associated with the particular data source (e.g., data source 'Self-Service Portal'). A user of the user interface 2000 can indicate which field identifier from the data source fields 2004 is to be used to identify steps in a journey, e.g., the data source field 2004 whose field values correspond to steps of the user journey. In the illustrated embodiment, the user of user interface 2000 has selected field identifier 'action'. Upon selection, user interface 2000 has updated to list one or more field values 2006 associated with the selected field identifier. That is, the data intake and query system 108 identifies events associated with the particular data source, and identifies field values included in events for the field 'action'. In the illustrated embodiment, the field values for the field 'action,' include at least: Login, Logout, Addtocart, RemoveFromCart, Checkout, viewProduct, compareProduct, Download, and ReadReview. In some cases, the field values 2006 can correspond to the most common field values for the field 'action'. However, it will be understood the system can determine and display the field values 2006 using a variety of techniques.

As described in greater detail herein with reference to FIG. 23, a user can select one or more of the field values 2006 as being a step in a user journey. Further, the data intake and query system 108 can generate, for each step, a query that identifies the field identifier 'action' and a respective selected value of the field identifier. In this way, if the user later selects value 'Login' 2008 as a step, the data intake and query system 108 can execute a query on events associated with the particular data source that causes identification of events that include the value 'Login' 2008 for the field 'action'.

FIG. 21 illustrates another example user interface 2100 for mapping a field identifier in a particular data source (e.g., "Self-Service Portal") to a common field identifier 2102. User interface 2100 enables a user to map a specific field identifier 2104 of events associated with the particular data source to a common field identifier 2102. In the example, the user is mapping the specific field identifier 2104 'jsessionID' to the common field identifier 2102 'Session ID'. As described above, the common field identifier 2102 'SessionID' can be utilized to stitch events together into a particular user's journey. For example, the common field identifier 2102 'SessionID' can be utilized to relate events associated with the particular data source. As another example, the user can map field identifiers included in other data sources selected for use with a user journey to the same common field identifier 2102. Since field values for the common field identifier 2102 'SessionID' in the various events or machine data can be unique, the data intake and query system 108 can utilize the field values for the common field identifier 2102 'SessionID' of each data source to stich events together as part of a particular user's journey. For example, all events in a data source that have the value "WC-SH-G68" for the field "jsessionID" can be mapped together as part of a particular user's journey.

In some embodiments, the common field identifier 'User ID' can be utilized to stich events together. In some cases, the system can automatically map a specific field identifier 2104 from the particular data source to a common field identifier 2102. For example, the system can automatically map the specific field identifier 2104 "_time" for the events associated with the particular data source with the common field identifier 2102 'Time Stamp', and so forth.

FIG. 22 illustrates an example user interface 2200 for specifying information that is to be recorded for a particular step. As described above, the system can execute queries generated based on steps and obtain events satisfying the queries. In the example of FIG. 22, a particular step 2202 is associated with a user interaction of adding a product to a cart. A user of the data intake and query system 108 may wish to record, for this particular step 2202, information associated with the user interaction. That is, upon identifying an event satisfying a query associated with adding a product to a cart, the system 108 can record (e.g., store) relevant information included in the event (e.g., the information can be utilized to provide context).

Accordingly, the user interface 2200 presents field identifiers 2204 included in a data source that are associated with the particular step 2202 "Addtocart." A user of the user interface 2200 can select one or more of the field identifiers 2204, indicating that values of these field identifiers will be recorded. In the example of FIG. 22, the user has selected fields 'productID' and 'ProductName'. In this way, upon a determined occurrence of the particular step, the data intake and query system 108 can obtain a 'productID' and 'ProductName' associated with the occurrence. Therefore, the system 108 can identify events associated with the 'Addtocart' 2202 step, and obtain contextual information from the identified events (e.g., product id and product name).

In some cases, the system can automatically record other information related to the events identified in the queries, such as the field values that correspond to the common field identifiers. For example, the system can automatically record the time stamp of the events, the field value that corresponds to the field identifier of the data source that was related to the common field identifier Session ID, and so on.

FIG. 23 illustrates a user interface 2300 for selecting steps to be included in a user journey. As described above, with respect to FIG. 19, multiple data sources may be selected for a user journey being created. For each of these data sources, one or more steps of the user journey may be selected. That is, each step may be associated with a user interaction or touchpoint that is specific to a respective data source.

User interface 2300 includes indications of five data sources 2302 selected for a user journey (Call Center IVR, Point of Sale, Mobile App, CRM, NPS Survey). A user of the user interface 2300 has selected the data source 'Call Center IVR' 2304, and the system displays the steps 2306 that are available to be selected from the data source 'Call Center IVR' 2304 for inclusion in the user journey. In some cases, the available steps 2306 can correspond to field values of a data source field 2004, where the field values are included in events associated with the data source 'Call Center IVR' 2304. For example, with reference to FIGS. 20 and 23, the available steps 2306 (e.g., Explore Product, Compare Product, Add Product to . . . , Remove Product, Checkout, Changbe profile, Add credit card) can correspond to field values of an 'action' field in the data source 'Call Center IVR' 2304. For example, once a user selects the 'action' field in user interface 2000, the available steps 2304 are obtained as field values for the selected field 'action'. In the illustrated embodiment, a user of user interface 2300 has selected six steps 2308 for the user journey.

For the selected steps 2308 that are associated with the same data source 2304, the system can relate the steps as described above with respect to FIG. 21. That is, events satisfying these steps can include the same field value for one or more fields (e.g., the same field value for the field 'jsessionID'), as they are all associated with the same data source 2304. Therefore, the events can be related based on, for example, Session ID or User ID as described above. For selected events 2308 that are associated with different data sources, the system can relate the steps using a variety of technique, examples of which are described below with reference to FIGS. 24-27.

FIG. 24 illustrates an example user interface 2400 for specifying correlations between data sources 2402 selected for a user journey. As described above, with respect to FIG. 19, events associated with different data sources 2402 may include different information associated with an entity, such that determining that a first event and a second event from different data sources are associated with a same entity (e.g., user) can be difficult.

User interface 2400 presents a matrix 2404 specifying various combinations of the selected data sources 2402. A user of user interface 2400 can indicate for any combination, how events associated with the combination correlate. For example, a user has specified that events associated with data source 'Self-Service Portal' and events associated with data source 'CC IVR' can be correlated using a lookup table 2406. That is, to stitch events together from these data sources, the system can use a lookup table to translate between the identifying information of one to the identifying information of the other. As an example, events associated with 'Self-Service Portal' may specify a name of an entity, and events associated with 'CC IVR' may specify an address of the entity. A lookup table may therefore be utilized to translate between name and address.

Figure 25:
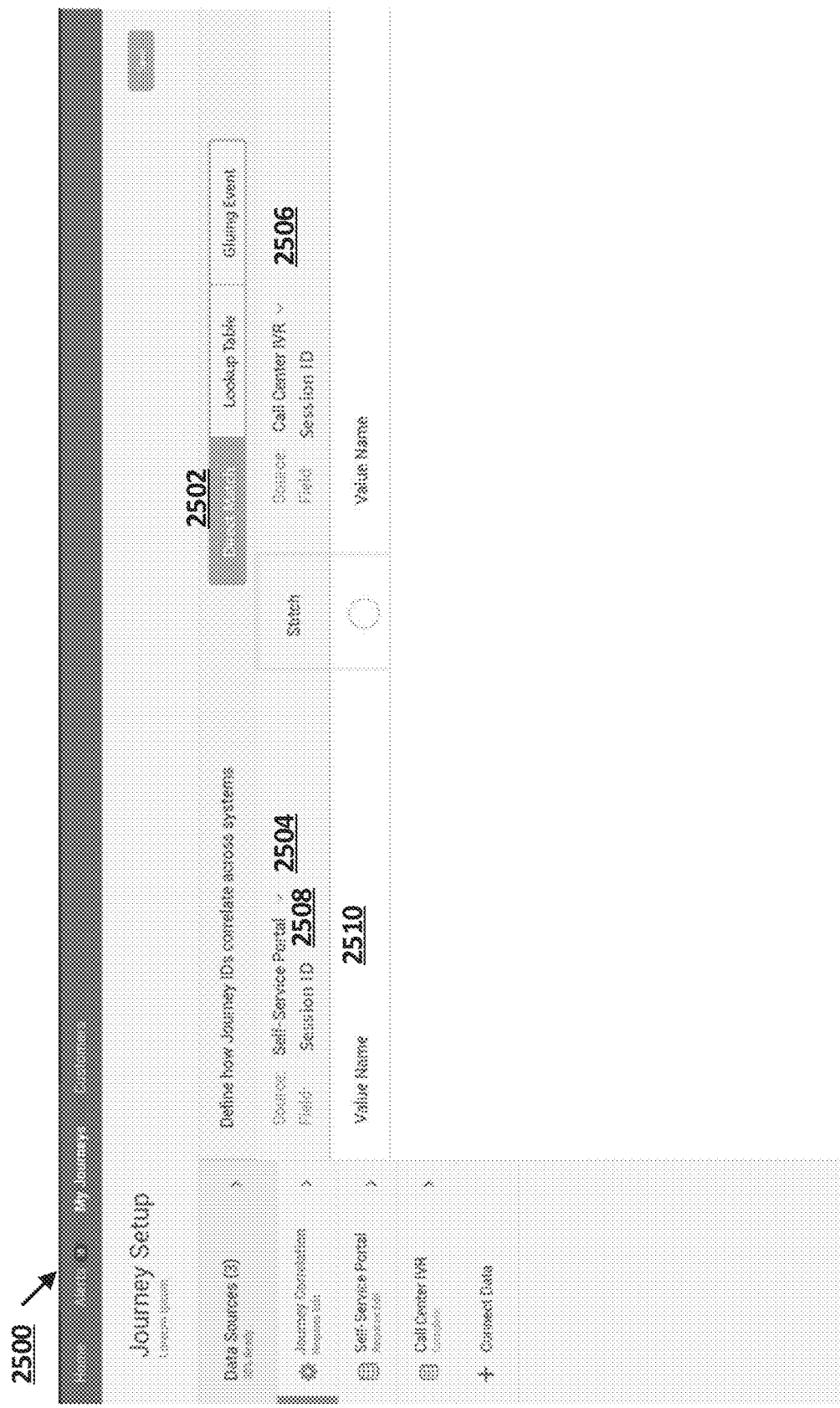
FIG. 25 is a user interface illustrating a first example stitching scheme.

FIG. 25 is a user interface 2500 illustrating a first example stitching scheme 2502. To correlate between a first data source 2504 and a second data source 2506, a user of user interface 2500 has selected the stitching scheme, 'Direct Match'. A direct match can indicate that events associated with the data sources 2504, 2506, include same identifying information, which may be found in fields having the same or a different field identifier. For example, one data source may use the field identifier 'username' for a user's full name, whereas another data source may use the field identifier 'userID' for the user's full name. Although the field identifiers are different, the field values for events in the two systems that are related can be the same.

In the illustrated embodiment, events associated with data source 2504 and events associated with data source 2506 may both include a field 'Session ID' 2508, and the field values for the events in the different data source can match. Accordingly, the user can specify the field identifiers 'Session ID' 2508 for each data source for association. Upon selection, the user interface 2500 can update with example matching values 2510 associated with each field identifier 2508, to ensure that a correct field identifier 2508 was selected. In some embodiments, when relating events based on a 'Direct Match', the system can use a variety of techniques to identify the related events. In some cases, the system can determine whether the field values based on identical matches or similar matches using fuzzy logic. For example, the system can determine that a field value in an event in one system of 'David G Smith' can be related to an event from a different data source having 'Dave Smith', 'David Smith', or David Smth', etc.

In some embodiments, the user interface 2500 can be used to identify a field identifier in different data sources that are to correspond to the common field identifier 2102. For example, a user can enter a field identifier for a field in the Self-Service Portal data source and a corresponding field identifier for a field in the Call Center IVR data source that are to be used as the common field identifiers 2102 'Session ID' for the respective data sources. The entered field identifiers can be used to correlate events from different data sources as part of the same journey.

Figure 26:
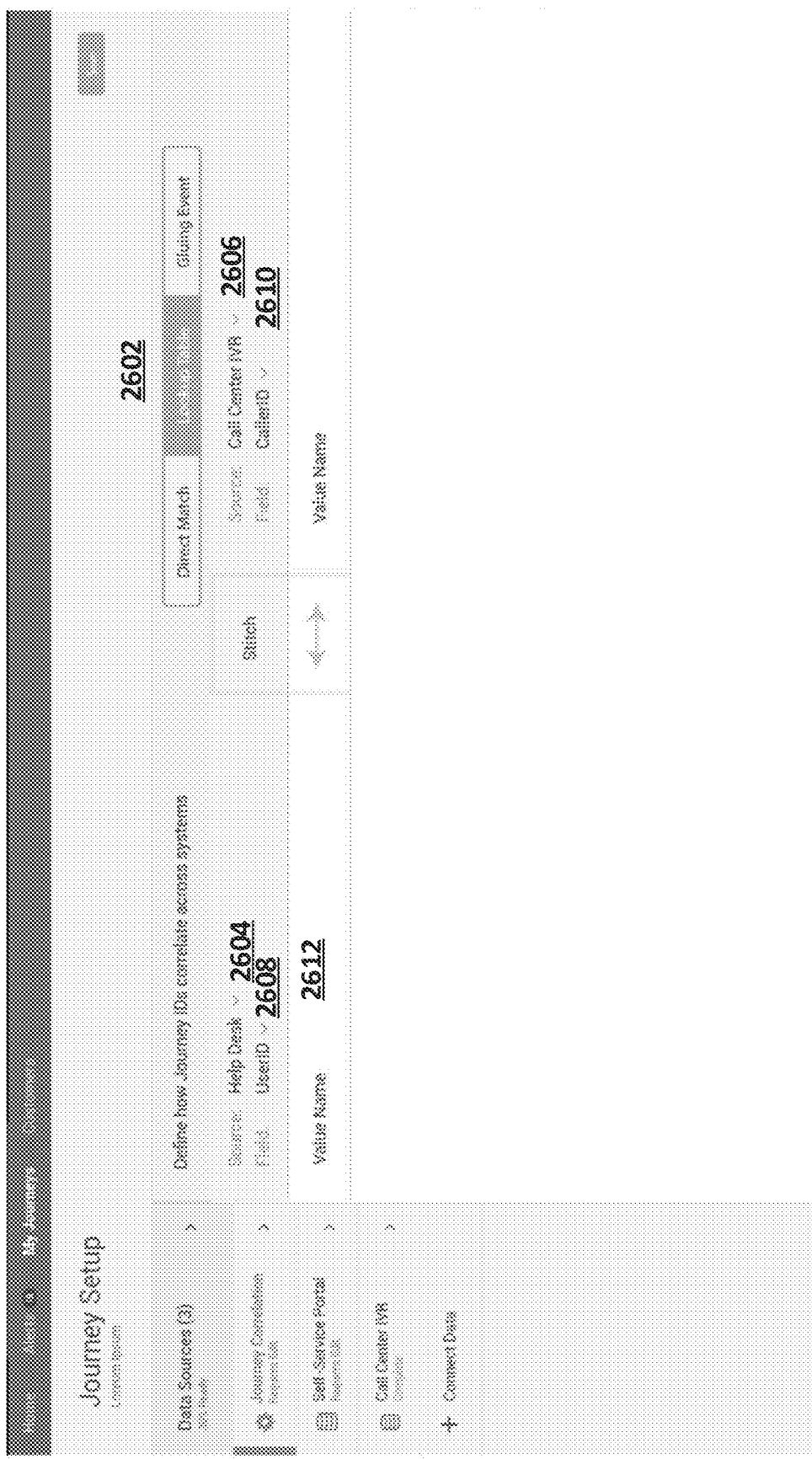
FIG. 26 is a user interface illustrating a second example stitching scheme.

FIG. 26 is a user interface 2600 illustrating a second example stitching scheme 2602. To correlate between a first data source 2604 and a second data source 2606, a user of user interface 2600 has selected the stitching scheme, 'Lookup Table'. As described above, a lookup table can indicate that events associated with the data sources 2604, 2606, include different field identifiers for the same or similar information. The user can specify field identifiers 2608, 2610, associated with each data source 2604, 2606, that include values specifying identifying information. That is, to relate events from these data sources 2404, 2406, a lookup table translating between values of field identifier 2608 and values of field identifier 2610 is to be utilized. The user can specify a lookup table (e.g., a network address of a lookup table, a file address, and so on) that includes information correlating between the identifying information. The user interface 2600 can then update to specify values 2612 determined to correspond to a same entity based on the specified lookup table. In this way, a user of user interface 2600 can ensure the proper field identifiers 2608, 2610, were selected.

Figure 27:
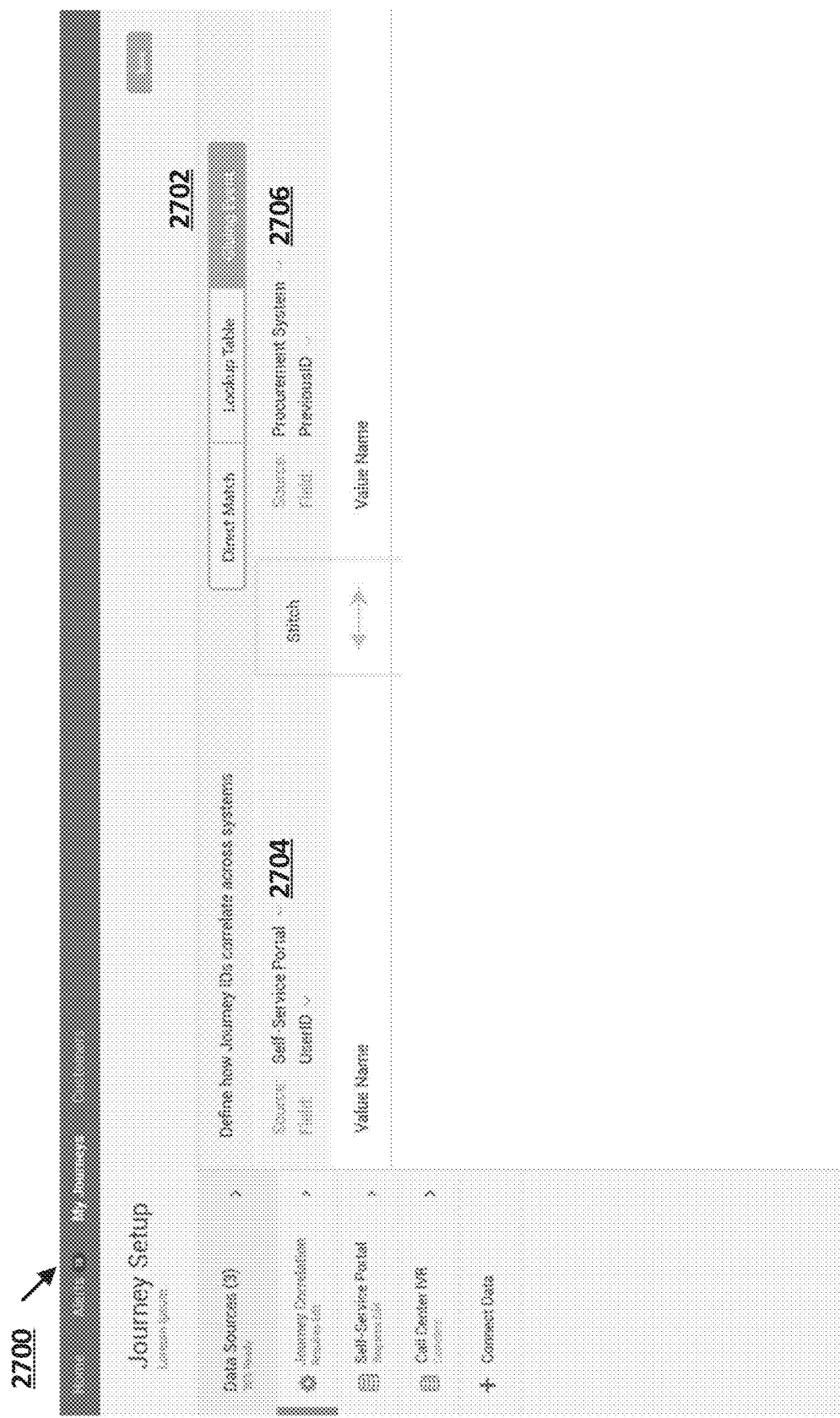
FIG. 27 is a user interface illustrating a third example stitching scheme.

FIG. 27 is a user interface 2700 illustrating a third example stitching scheme 2702. To correlate between a first data source 2704 and a second data source 2706, a user of user interface 2700 has selected the stitching scheme, 'Gluing event' 2702. As described above, a gluing event can indicate that an event specifies identifying information from both the first data source 2704 and the second data source 2706. For example, a first computing system may trigger a second computing system, and the second computing system may generate machine data that includes identifying information received from the first computing system along with identifying information utilized by the second computing system. In some cases, the data intake and query system 108 can execute a query from events associated with the second data source 2706, and therefore obtain occurrences of the handoff between the first computing system and second computing system. In this way, events associated with data sources 2704, 2706, can be related to a same entity. In the illustrated embodiment, a user has identified that field values of the 'UserID' field of the 'Self-Service Portal' data source 2704 correspond to field values of the 'PreviousID field of the 'Procurement System' data source 2706. As such, the system can identify a gluing event from the 'Self-Service Portal' data source 2704 or the 'Procurement System' data source 2706 that maps a 'UserID' from the Self-Service Portal' data source 2704 to the 'PreviousID' of the 'Procurement System' data source 2706. The field values for the UserID and PreviousID can then be used to identify steps of a journey that span the two data sources 2704, 2706.

Utilizing example FIGS. 20-27, a user can create a user journey and specify how events are to be related (e.g., events associated with a same entity). Upon creation, the data intake and query system can execute queries based on the steps of the user journey, and relate events satisfying the queries. In this way, a user's progress through the user journey can be monitored, and user interfaces describing results of the user journey can be presented to a user (e.g., as will be described below, with respect to FIGS. 31-36).

FIG. 28 illustrates a representation of steps 2802-2810 included in a user journey. As described above, steps can be included in a user journey being created. For example, a step can be selected from a pre-existing list of steps, a user can specify unique queries corresponding to a step, a step can be automatically included based on the data intake and query system's 108 analysis of steps already selected for inclusion (e.g., the system 108 can utilize machine learning techniques to recommend additional steps), and so on. These steps can be specific to particular data sources, for example search queries corresponding to the steps can be applied to events from the particular data sources.

Panel 2800 illustrates example steps 2802-2810 that have been included in an example journey. As described above with respect to FIG. 18, the steps may have no order associated with them. That is, each step may be defined, such that events satisfying associated search queries, and thus occurrences of each step, can be located—however, an order may not be specified for the steps.

As the data intake and query system 108 relates events (e.g., executes search queries corresponding to the steps 2802-2810, and relate the returned events), the system 108 can identify occurrences of the steps 2802-2810 that are associated with a same entity (e.g., user). For example, the system 108 can identify events that satisfy the queries associated with the steps 2802-2810. As described above with respect to at least FIG. 5, each event can include a timestamp. The data intake and query system 108 can therefore determine an order associated with each step, based on a respective timestamp of an event satisfying queries corresponding to the step.

Optionally, a user may specify a particular order of one or more steps, such as an initial step and a final step. For example, particular entities may traverse through a portion of the user journey, or initiate at a different step than expected. Based on information indicating an initial step and a final step, the data intake and query system 108 can therefore identify that these particular entities have not completed the user journey, or have avoided one or more initial steps.

Panel 2820 illustrates the steps 2802-2810 presented with links specifying paths traversed by users. For example, as the data intake and query system 108 relates events returned as a result of application of queries corresponding to the steps, the system 108 can determine connections between the steps 2802-2810. These connections can therefore indicate a determined order associated with the steps 2802-2810. For example, FIG. 28 illustrates each step along with a directed link connecting to another step. In this way, the user journey can represent a directed graph, such that differing paths can be traversed from the initial step 2802 to the final step 2810. To determine the order associated with each path, the data intake and query system 108 can stitch together events associated with respective users that satisfy search queries corresponding to the steps 2802-2810. Based on analyzing timestamps associated with each user's stitched together events, the data intake and query system 108 can determine an order of the steps 2802-2810 for the user.

As an example of stitching together events, the data intake and query system 108 can identify a first event satisfying search queries corresponding to step B 2804. Based on analysis of the first event, the data intake and query system 108 can identify an entity (e.g., user) specified in the first event (e.g., a value of a field associated with user identification can be obtained). Similarly, the data intake and query system 108 can identify additional events that satisfy search queries corresponding to step C 2806. The data intake and query system 108 can then stitch the first event together with one of the additional events that specifies the same entity, for example based on a stitching scheme.

In this example, the first event and the additional event may include a field that indicates the same value associated with user identification (e.g., a user name) or session identification (e.g., a process ID). While these fields may optionally have different identifiers (e.g., field names), as described above with respect to FIG. 25, the data intake and query system 108 can store information indicating field identifiers that are to be used to stitch the events.

As another example, the first event and the additional event may include respective fields that indicate values associated with user identification, but with values that may be different. For example, and as described above with respect to FIG. 26, the data intake and query system 108 can utilize information (e.g., a lookup table) to correlate between values of the respective fields. As an example, a user's name or other identifier may be included in the first event, while a user's phone number may be included in the additional event. The data intake and query system 108 can determine that the first event and additional event are associated with a same user based on the utilized information.

As an additional example, the first event and the additional event may be stitched together via information included in an intermediate event (e.g., a 'gluing event', as illustrated in FIG. 27). For example, the first event may include information specifying a user's name. The additional event may include a different identifier, and no information correlating the two may be obtained a priori (e.g., the system 108 may not have access to a lookup table as described above). However, an intermediate event may include the user's name along with the different identifier. The data intake and query system 108 can therefore determine that the first event and the additional event can be stitched together, based on the intermediate event.

As a more detailed example of a gluing event, a first event may be identified as satisfying search queries corresponding to step A 2802. This first event may be associated with a first data source, and the first data source may include machine data generated by a first computing system. This first computing system can generate machine data that references user names. Therefore, events produced by the data intake and query system 108 from this machine data can include user names referenced by a field. Similarly, a second event may be identified as satisfying search queries corresponding to step B 2804. This second event may be associated with a second, different, data source, and the second data source may include machine data generated by a second computing system. This second computing system may record interactions (e.g., touchpoints as described above) differently than the first computing system. For example, the second computing system may utilize different information to identify a user.

The first computing system may provide information to the second computing system, for example the first computing system may trigger a particular action or interaction on the second computing system. In response to the trigger, the second computing system may generate machine data specifying an identifier provided with, or determined based on, the trigger (e.g., an identifier of a user utilized by the first computing system). The generated machine data may further specify an identifier utilized by the second computing system. Therefore, this handoff between the first computing system and the second computing system may specify identifiers of a same entity (e.g., user) as used by the respective computing systems. The data intake and query system 108 can produce an event that includes this generated machine data, with a first field specifying the identifier utilized by the first computing system and a second field specifying the identifier utilized by the second computing system. Similarly, instead of user identifiers, a gluing event may utilize session or process identifiers. That is, the first computing system may include session identifiers in machine data, and the second computing system may record these session identifiers along with its own session identifiers.

To stitch the first event and the second event together, the data intake and query system 108 can access information specifying respective field identifiers of the first field and the second field. The data intake and query system 108 can then analyze intermediate events (e.g., the system 108 can execute a query to identify 'gluing events' as illustrated in FIG. 27) that include both the first field and the second field. For example, the data intake and query system 108 can analyze events produced from machine data generated by the second computing system for occurrences of the intermediate events. Upon identification of an intermediate event, the data intake and query system 108 can obtain respective values of the first field and second field. Since these values correspond to a same user, or same session, the data intake and query system 108 can utilize the obtained values to stitch together the first event and second event. In this way, the data intake and query system 108 can determine that a same user completed step A 2802 and step B 2804.

Each of the stitching schemes described above, may be utilized when correlating entities across data sources. For example, a first data source may be correlated with a second data source according to the direct matching scheme. Similarly, the first data source may be correlated with a third data source according to the lookup table, or intermediate event (e.g., 'gluing event') schemes. For ease and efficiency of use, and as described above, a user creating a user journey can utilize a user interface to rapidly indicate the appropriate stitching scheme. For example, FIG. 24 illustrates a user interface 2400 that enables the rapid indication of stitching schemes across data sources.

Thus, since the data intake and query system 108 can monitor each entities' (e.g., users) traversal through the user journey, the system 108 can determine one or more path's orderings of the steps 2802-2810 as illustrated in panel 2820.

Figure 29:
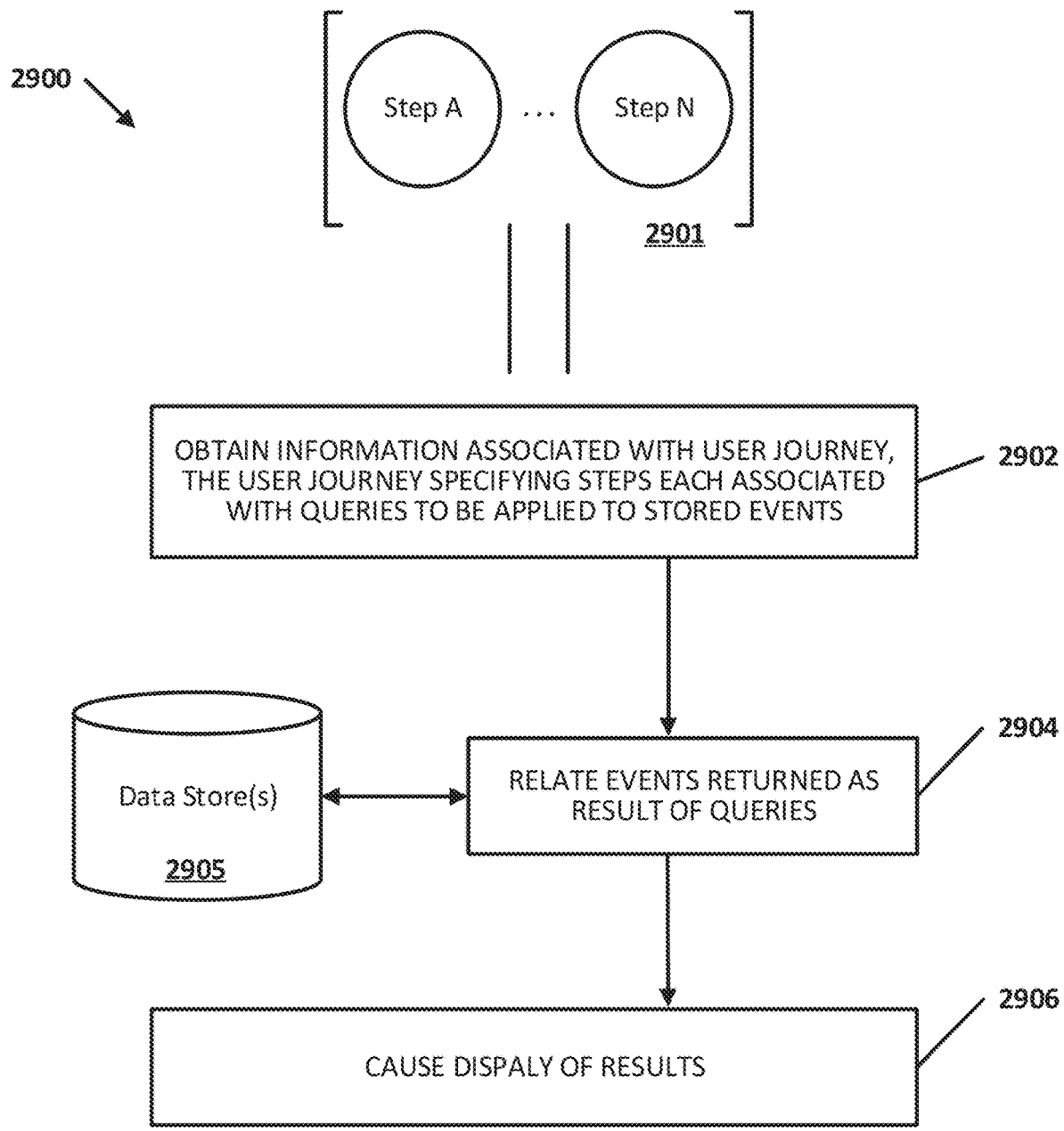
FIG. 29 is a flowchart of an example process for presenting results associated with a user journey.

FIG. 29 is a flowchart of an example process 2900 for presenting results associated with a user journey. For convenience, the process 2900 will be described as being performed by a system of one or more computers (e.g., the data intake and query system 108).

At block 2902, the system obtains information associated with a user journey. The obtained information can relate to steps of the user journey, one or more queries performed as part of a step, field values to be extracted from events identified by the queries, etc. For example, events can be events as described above with respect to FIG. 5.

As described above, a user journey can include steps that identify relevant data from one or more data sources. In some embodiments, the system can use the information to define or generate one or more search queries to be applied to events. In certain embodiments, the system can use the information to generate one or more search queries for each step of the user journey. Accordingly, the obtained information can include a definition of the steps of the journey, such as steps A-N 2901 as illustrated in FIG. 29.

As described above, a user journey can be utilized to provide a representation of specific interactions (e.g., touchpoints) associated with entities (e.g., users). Each step may therefore correspond to search queries that cause identification of events recording these specific interactions. For example, using the information from a step, the system may define a query that causes identification of events recording users adding an item to a cart, or removing an item from a cart. This defined query can therefore specify a particular field identifier associated with user actions, along with a specific value indicating addition, or removal, of an item from a cart. In addition, the example step may further specify one or more data sources associated with the events that satisfy the query. As an example, a particular data source may produce events recording user interactions on a front-end web page presented on user devices. For example, the events may be produced from machine data generated by a server system (e.g., a web application on the server system, a front-end module recording user interaction logs, and so on). The example step may specify that only events associated with this particular data source are to be analyzed.

Additionally, and as described above, the accessed information can indicate stitching schemes to enable correlation across data sources. For example, the user journey may optionally include steps that specify multiple data sources. To ensure that a same entity (e.g., user) is able to be monitored in each step, the accessed information can indicate particular stitching schemes between the data sources. For example, the accessed information can indicate that events associated with a first data source include a field identifier with same values as values of a different field identifier included in events associated with a second data source. In this way, the system does not require guarantees that field identifiers are utilized consistently across data sources. Similarly, utilizing a lookup table and gluing events (e.g., as described above), the system can stitch events together that include both differing field identifiers and differing values.

Optionally, in addition to one or more search queries corresponding to a step, the step can further define information included in events satisfying the search queries that is to be stored. For example, an example step may be used to generate a query that causes identification of events recording users' adding items to their carts. As described above, this example step may correspond to a query that specifies a particular field identifier along with a value of the field identifier (e.g., a value indicating an action to add an item to a cart). The system can identify events that satisfy this query, and as will be described below with respect to block 2904, generate information indicating, at least, that a user associated with each event completed the example step. In this way, each users' traversal through the user journey can be monitored. In addition to this generated information, the example step can specify that values of one or more additional fields are to be stored. For example, the example step can specify that values of a field associated with a product being added to a cart are to be stored. (e.g., the field can indicate values specifying a product name, a product identifier, a product SKU, and so on).

At block 2904, the system relates events returned as result of queries. As described above, the system executes the search queries based on the steps to obtain events satisfying the search queries. For example, and as illustrated in FIG. 29, the system can execute the search queries on events stored in the data stores 2905. Optionally, these data stores 2905 may be field-searchable data stores, and the system can apply a late binding schema to execute a query on the data stores 2905. In some cases, the data stores 2905 can correspond to Oracle databases, MySQL databases, and so on. The system can then relate events returned as a result of these queries, for example to stitch the events as being associated with respective entities.

To increase efficiency and speed at which events can be returned, the system can optionally execute each step's search queries in parallel. For example, if the events are stored in data stores 2905, the system can rapidly analyze the events according to the accessed information describing the user journey. Since each step's search queries may not be dependent on each other, that is there may be no data dependency across steps, the system can rapidly execute the search queries in parallel. For any returned event, the system can generate information specifying the satisfied step along with an identifier of an entity associated with the returned event (e.g., a user). In this way, the user's traversal through the steps can be monitored. For example, the system can return events indicating that a particular user completed the user journey. As another example, the system can return events indicating that a different user completed a portion of the steps. The system can update this generated information as new events are produced from newly received machine data. Optionally, the generated information can be an inverted index, with the inverted index referencing, for each entity, the returned events.

In certain cases, some returned events may include differing identifying information. That is, a first event returned as a result of execution of a first step's queries may include a name associated with an entity. The system can therefore generate information specifying that the entity completed the first step. Similarly, a second event returned as a result of execution of a second step's queries may include an address associated with an entity instead of the name. The system may therefore generate information specifying that an entity associated with the address completed the second step. Since the respective queries of the first step and the second step may optionally be executed in parallel, a system may be unable to stich these two events together. However, the system can utilize a stitching scheme, for example as described in FIG. 19, to determine that the name of the entity, as included in the first event, corresponds with the address of the entity as included in the second event. For example, a lookup table may be stored in memory, such that the system can rapidly determine the correspondence. In this way, the system can stitch the first event and second event together, such that the system generates information specifying that the entity completed both the first step and the second step.

Optionally, the system may execute each step's search queries on events being received in substantially real-time. For example, disparate computing systems may generate substantially real-time machine data recording, as an example, interactions with the computing systems. The system can receive this machine data, and as described above, produce events that incorporate the machine data. As these events are produced, the system can optionally execute each step's search queries to determine whether the events satisfy any of the steps.

Optionally, as an event being received in substantially real-time is determined to satisfy a step's search queries, the event may be modified to reflect that satisfaction. For example, metadata describing completion of the step may be generated and included in the event. As an example with respect to a step of adding an item to a cart, the metadata can indicate that the step associated with an adding an item to a cart was completed. For ease of reference, an inverted index associated with a user identified in the event can be updated to reference the event. In this way, the system can monitor and update the inverted index to determine the user's status with respect to completion of the user journey. That is, the events referenced in the inverted index can be modified to reflect respective steps that were completed. In this way, the system can access the inverted index for a particular user, and based on the references to events, rapidly identify the steps completed by the particular user.

Figure 36:
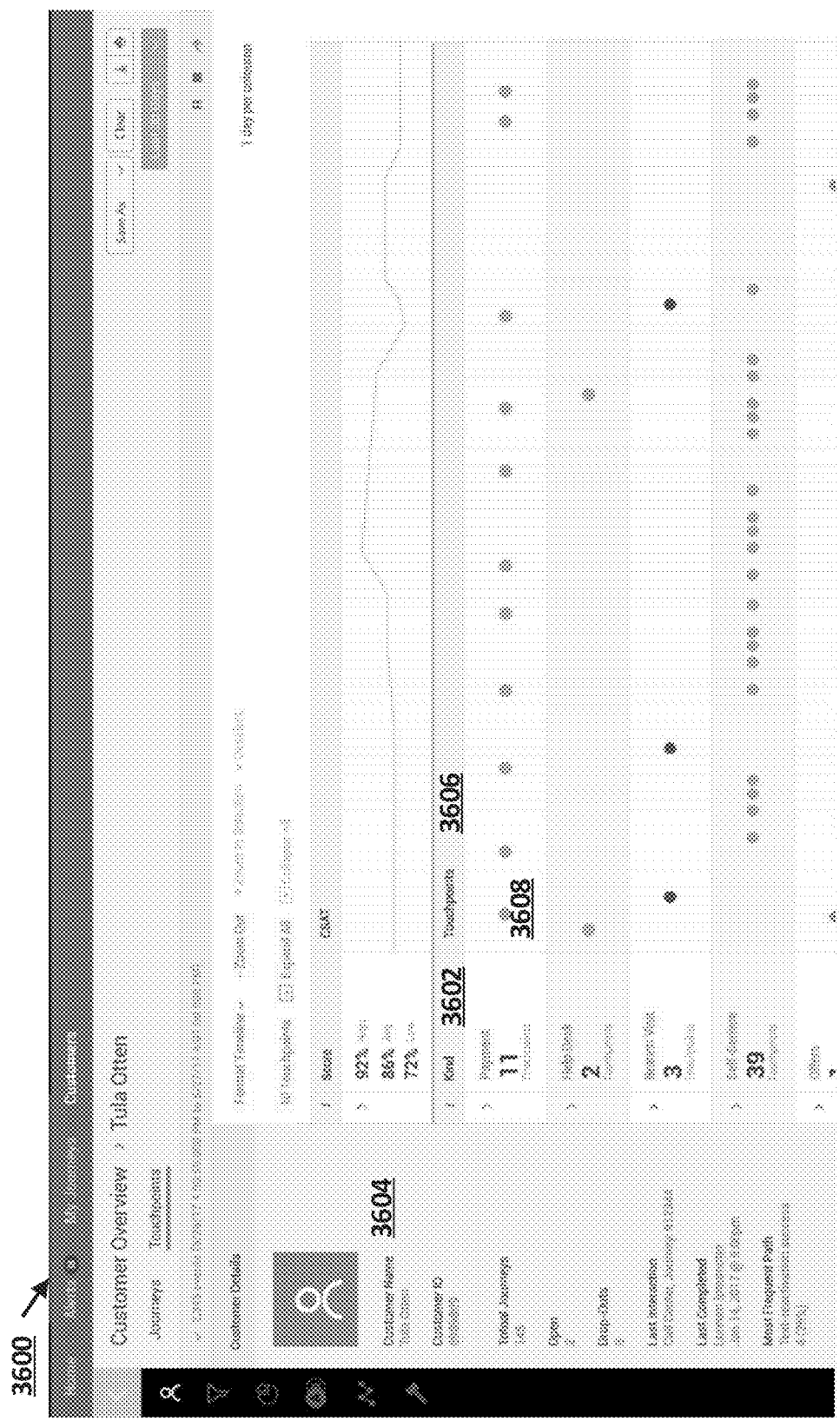
FIG. 36 illustrates an example user interface presenting touchpoints associated with a particular entity.

Furthermore, an inverted index can be utilized to reference all events that indicate some, or all, user interactions (e.g., touchpoints) of each user, thereby creating a timeline of touchpoints. For example, the user interactions may be associated with steps of one or more user journeys. A user of the system may request, for example via a user interface as illustrated in FIG. 36 presented on his/her user device, that all touchpoints of a specified user be presented in the user interface. The system can therefore access the inverted index associated with the specified user and present information obtained from the referenced events. For example, the system can present times at which the touchpoints occurred (e.g., based on respective timestamps included in the events), along with information identifying the touchpoints. Similarly, and as illustrated in FIG. 27, a user of the system may request that specified touchpoints of a specified user be presented.

While relating the returned events, as described above, the system can determine statistical information associated with the steps. For example, based on timestamps included in the events, the system can determine an average (e.g., measure of central tendency) time that it takes to transition between the steps. As an example, the system can determine an average time for a user to add a product to a cart and then checkout. Alternatively, if the user removed the item from his/her cart, the system can determine an average time that the user has the product in his/her cart prior to removal. Similarly, the system can determine an average time that it takes users to complete all steps included in the user journey.

Optionally, the user journey may include differing versions, and each version may be monitored. For example, a designer may modify a web page that is presented to a first set of users, while retaining an original design of a web page that is presented to a second set of users. The designer may desire to understand whether the modified web page results in a faster average time for users to transition from adding a product to a cart, to checking out. To discriminate between the modified web page and the original web page, each event associated with the web page may be tagged as either the modified web page or the original web page. As an example, a computing system may provide machine data (e.g., log data specifying whether a user received the modified or original web page) to the system. The system can produce events from the received machine data, as described above with respect to FIG. 5, and can include a field indicating whether a user received the original or modified web page. The system can then determine statistical information associated with each version of the user journey. In this way, the designer can obtain empirical information related to his/her design choice.

At block 2906, the system causes display of at least a portion of the results. Example user interfaces describing results of the relating are described below, and illustrated in FIGS. 31-36. As described above, with respect to FIG. 18, these user interfaces can be presented on user devices of users. For example, the system can respond to requests from users of the system, and cause display of easy to understand information based on the requests.

Figure 30:
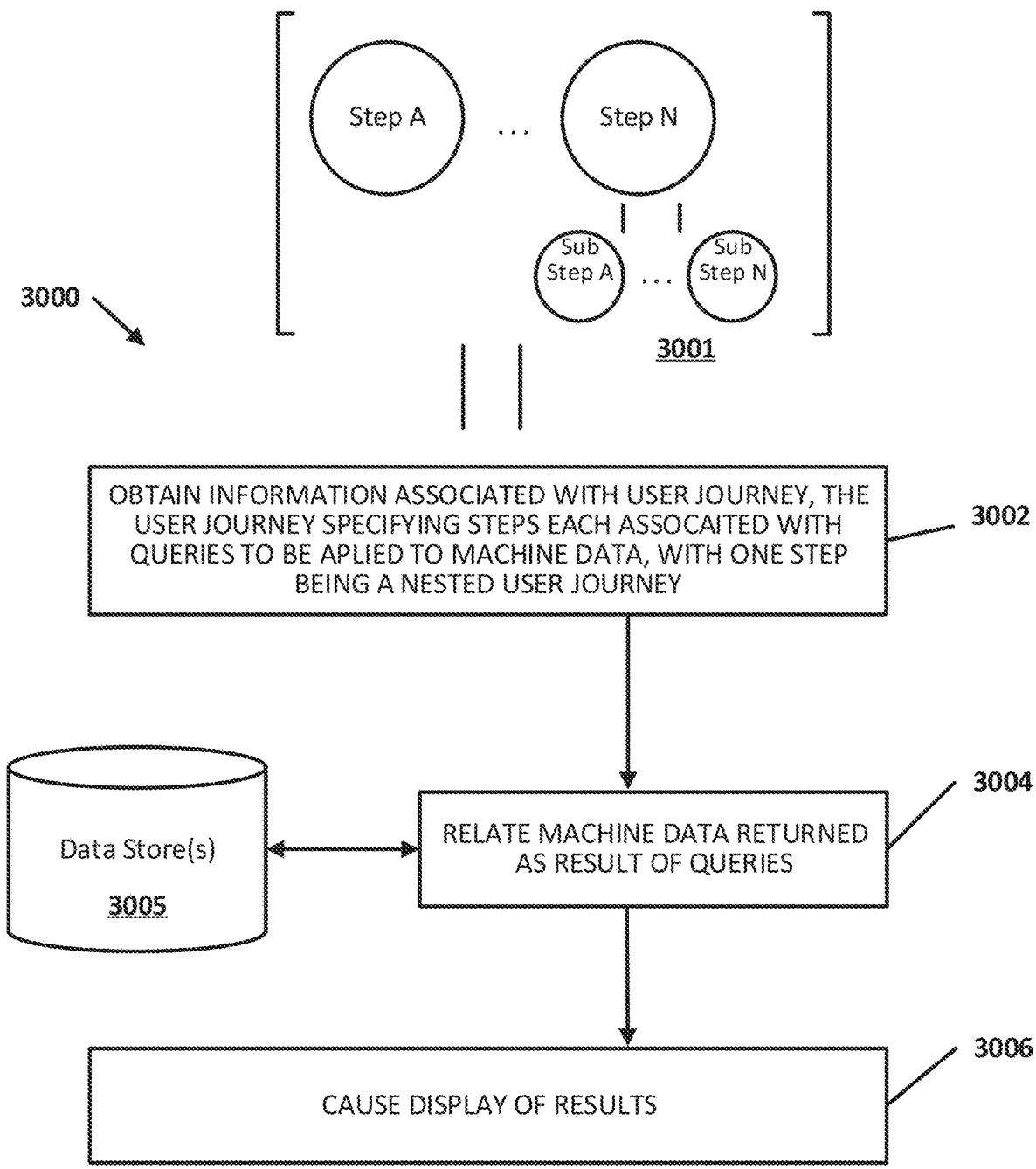
FIG. 30 is a flowchart of another example process for presenting results associated with a user journey.

FIG. 30 is a flowchart of another example process 3000 for presenting results associated with a user journey. For convenience, the process 3000 will be described as being performed by a system of one or more computers (e.g., the data intake and query system 108, a server system in communication with disparate computing systems that generate machine data).

At block 3002, the system accesses information associated with a user journey. As illustrated in FIG. 30, information describing a user journey 3001 can be accessed. Similar to the description of FIG. 29, the example user journey 3001 may include multiple steps each corresponding to one or more search queries. As will be described below, these search queries may be applied (e.g., executed) to identify events that satisfy the search queries.

The example user journey 3001 further indicates that a particular step includes one or more sub-steps. That is, the particular step is a nested user journey that defines sub-steps that are completed as part of the particular step. As illustrated, 'Step N' includes Sub-steps A-N, with each sub-step corresponding to respective search queries. Similar to a user journey, the sub-steps of a nested user journey can specify multiple data sources. That is, sub-step A may be defined as searching for machine data stored in a first data source, while sub-step N may be defined as searching for machine data stored in a second data source. In this way, a user creating a user journey can build off of prior created user journeys by incorporating them into the user journey as nested user journeys represented as single steps including sub-steps. A graphical representation of a user journey that includes a nested user journey is described below, and illustrated in FIG. 34. While a nested user journey is described with respect machine data in FIG. 30, a nested user journey may similarly be utilized with events (e.g., events as described above with respect to FIG. 29).

At block 3004, the system relates machine data returned as results of the queries generated based on the user journey. As similarly described above, with respect to FIG. 29, the system can access data stores 3005 storing the machine data and relate returned machine data (e.g., relate the machine data as being associated with respective entities). For example, the data stores 3005 can be oracle databases, MySQL databases, field-searchable data stores, and so on. Optionally, the system may generate one or more database tables for each entity identified in the returned machine data. For example, as a particular user is identified in returned machine data (e.g., associated with completion of a step), the system can generate a database table that records information included in the machine data. With respect to this example, if subsequent machine data identifies the particular user (e.g., associated with completion of a different step) is returned, the system can update the generated database table to record information included in the subsequent machine data. In this way, the system can maintain each entity's status with respect to the user journey. Optionally, the system can maintain a database table associated with each step, and can record (e.g., in respective rows) information included in machine data returned as a result of executing search queries corresponding to the step.

With respect to the nested user journey that includes sub-steps A-N, the system can relate machine data returned as a result of executing the search queries corresponding to the sub-steps. Optionally, if all of the sub-steps are indicated as being completed for a particular entity, the system can store information indicating completion of the nested user journey. For example, the system can update a database table generated for the particular entity to indicate completion of the nested user journey. Optionally, if sub-step N is determined to be completed for the particular entity, the system can update the database table to indicate completion of the nested user journey. That is, the system may optionally assume that completion of the final sub-step indicates completion of the nested user journey. As described above, with respect to FIG. 28, steps included in a user journey may be defined without respect to order. As the system relates events or machine data, the system can identify a traversal order of the steps that each entity took. The system may therefore identify that sub-step N corresponds to a final step based on monitoring historical information associated with the nested user journey. For example, the system can determine that sub-step N corresponds to a final step. Additionally, and as described above with respect to FIG. 28, a user who creating the nested user journey may have specified that sub-step N corresponds to a final step. Therefore, the system can identify that machine data returned as a result of executing search queries corresponding to sub-step N, indicates completion of the nested user journey.

As described above with respect to FIG. 29, machine data associated with a same entity may include different identifying information. Therefore, the system can utilize one or more stitching schemes to stitch this machine data together. For example, first machine data may be returned as satisfying one or more search queries corresponding to a first step, and second machine data may be returned as satisfying search queries corresponding to a second step. As described above the first machine data and second machine data may include different values for respective fields associated with identification information. The system can utilize, for example, a database table specifying correlations between values of these respective fields to identify a particular entity that is associated with both the first and the second machine data. Optionally, a database table generated for this particular entity may be updated to include information from the first machine data and the second machine data.

At block 3006, the system causes display of at least a portion of the results. As described above, with respect to FIG. 29, the system can display results of the relating performed on the machine data. For example, the user interfaces described in FIGS. 31-36 can be examples of user interfaces presented in response to the relating.

Figure 31:
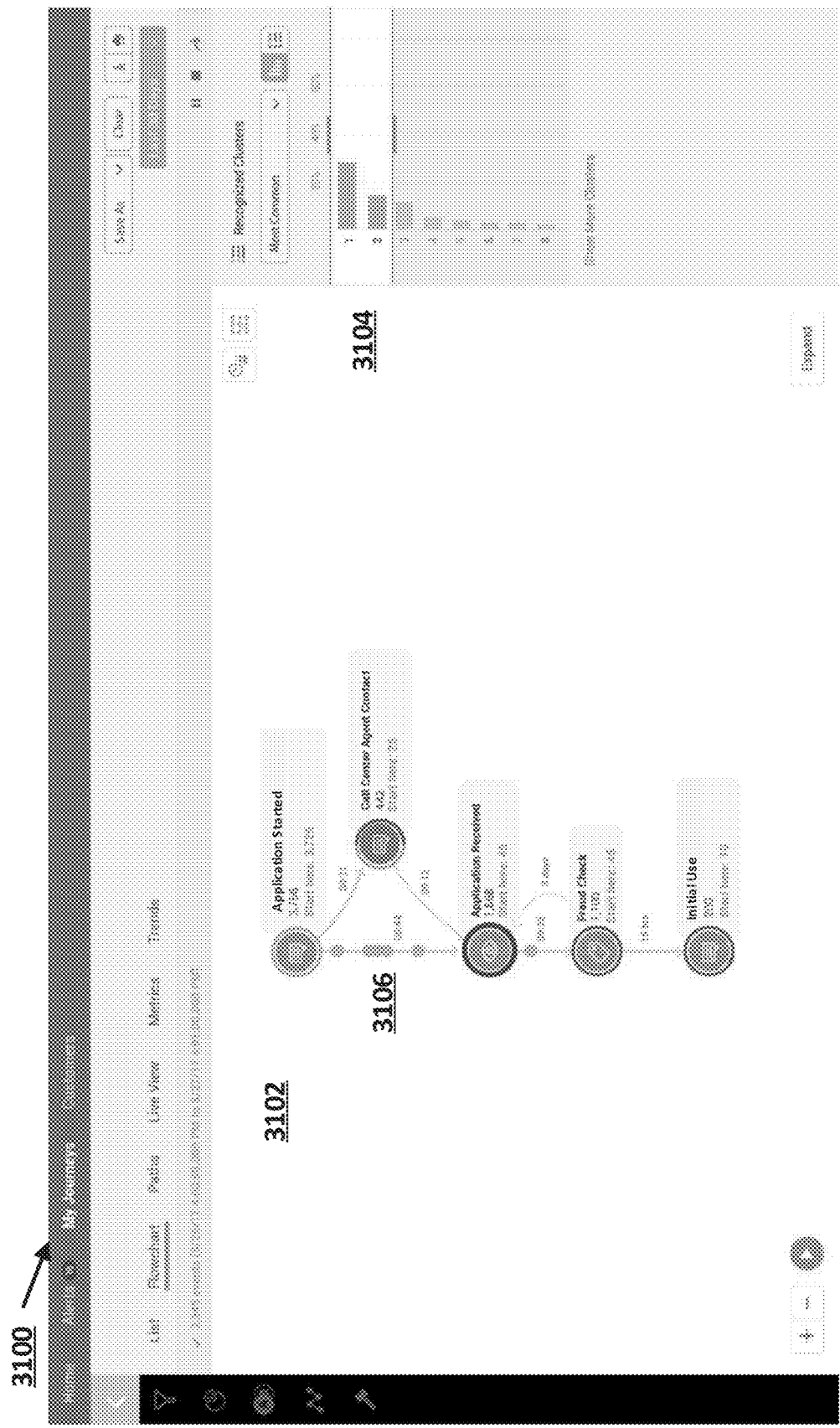
FIG. 31 illustrates an example user interface that includes a user journey and information indicating clusters associated with the user journey.

FIG. 31 illustrates an example user interface 3100 that includes a user journey 3102 and information indicating clusters associated with the user journey. As described above, an entity may traverse through steps included in a user journey according to different paths. The system can monitor these different paths, and determine a frequency with which each of the paths is followed. Additionally, the system can determine a likelihood associated with an entity (e.g., user) following one of the paths.

As illustrated in FIG. 31, a user interface 3100 includes a user journey 3102 and steps of the user journey. As similarly described above with respect to FIG. 18, the user journey 3102 further illustrates a quantity of entities transitioning between each of the steps (e.g., as represented by visual elements 3106). On the right of the user interface 200 includes a clustering 2204 of entities along with a likelihood of any entity being included in the cluster (e.g., the likelihood can represent how common a particular path is). As described above, a cluster of entities can represent entities who traversed a same path through a user journey. As illustrated, a user of the user interface 3100 has selected the first two clusters, and in response the user interface 3100 can update the user journey 3102 to present information associated with entities of the first two clusters. For example, a quantity of the entities traversing the user journey can be presented. Additionally, an average time for transitioning between each step can be presented, with the average time being determined based on entities included in the selected clusters 3104.

Optionally, the user journey 3102 presented in user interface 3100 may include only steps that were traversed by entities included in the selected clusters 3104. For example, the presented steps may have been determined (e.g., by the data intake and query system 108) to be included in paths traversed by the entities included in the selected clusters 3104. If a user of the user interface 3100 selects one or more additional clusters (e.g., cluster 3), the user interface 3100 may update to present one or more additional steps traversed by entities in the additional clusters.

Figure 32:
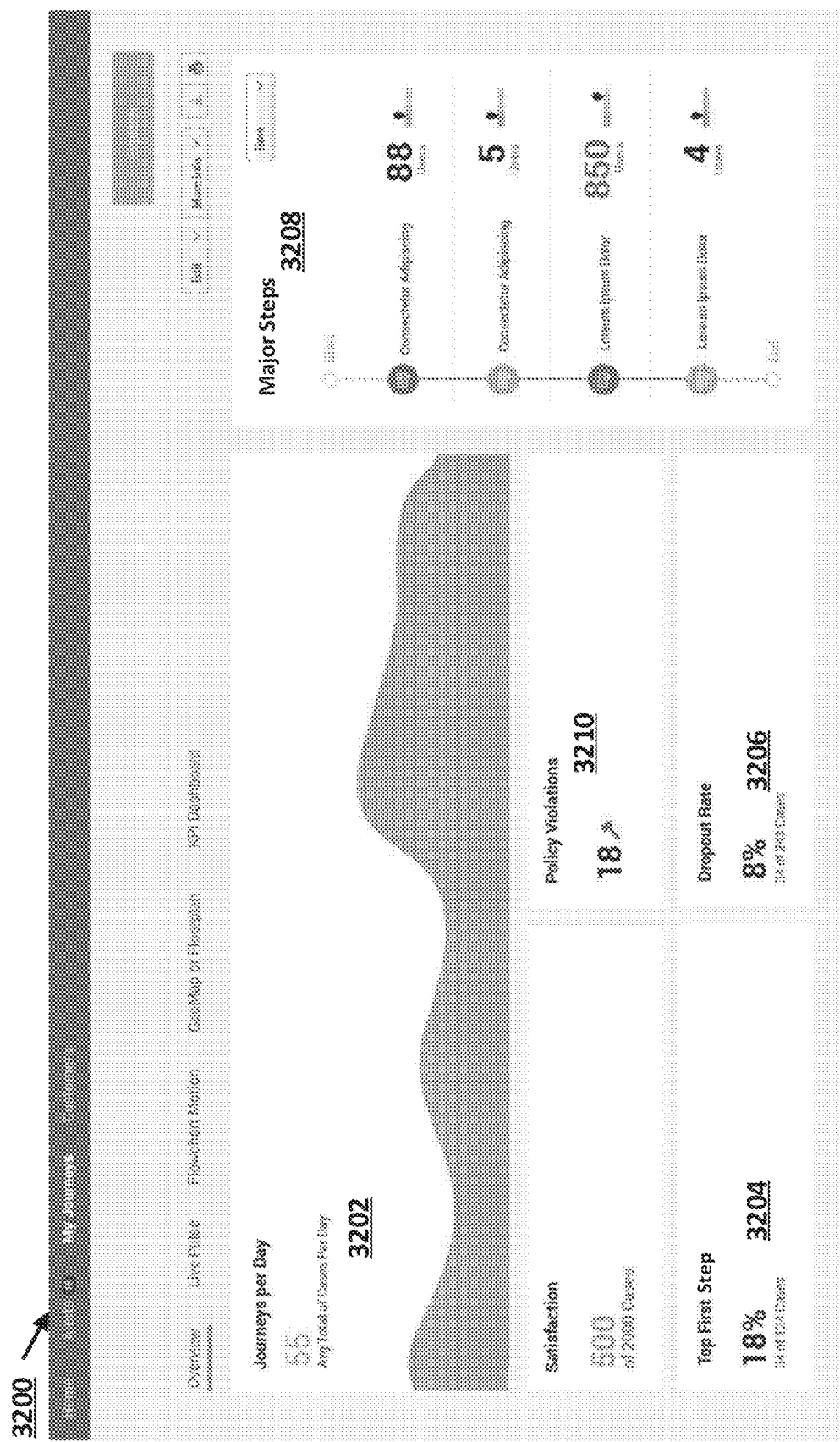
FIG. 32 illustrates an example user interface presenting summary information associated with a user journey.

FIG. 32 illustrates an example user interface 3200 presenting summary information associated with a user journey. Based on executing queries and relating returned events, for example as described above with respect to FIG. 29, the data intake and query system 108 can determine summary information associated with each user journey. As illustrated, the system 108 has determined an average number 3202 of entities (e.g., users) who are traversing an example user journey per day. The user interface 3200 also includes statistical information related to the user journey. For example, the statistical information includes an indication of an empirically determined initial step 3204 in the user journey. Additionally, the statistical information indicates a percentage 3206 of entities who completed at least one step of the user journey, but who have since dropped out from the user journey. Major steps 3208 are illustrated, which as described above with respect to FIG. 18, can represent milestones that are to be depicted on a graphical representation of the user journey or optionally a step that is a nested user journey. Additional steps may be included between the major steps 3208.

User interface 3200 further includes a number of policy violations 3210 (e.g., "18" violations in the example). A user (e.g., a user creating the user journey) can specify particular constraints or potential occurrences that are to be monitored, and if detected, are to be indicated as a policy violation. For example, a policy violation can represent a particular step taking longer than a set amount of time to complete, or a transition between two steps (e.g., completion of both steps) taking longer than a set amount of time. As another example, a policy violation can represent a user following a particular path (e.g., a user completing a first step and then completing a second step, which this order being disfavored or other thought to be disallowed).

Figure 33:
FIG. 33 illustrates another example user interface presenting summary information associated with a user journey.

FIG. 33 illustrates another example user interface 3300 presenting summary information associated with a user journey. The user interface 3300 indicates real-time information associated with the user journey. For example, the user interface 3300 presents a count 3302 associated with entities traversing the user journey, along with a count associated with entities in each event. For example, to identify a count of users in a step, the data intake and query system 108 can obtain indication of a last known step for the users. Additionally, user interface 3300 includes average wait times 3304 of the user journey. As an example, a wait time 3304 can indicate an amount of time subsequent to completion of a step, that completion of a subsequent step is detected. Additionally, the user interface 3300 indicates a throughput 3306 associated with each step, with the throughput representing a number of users completing the step per unit of time (e.g., hour).

Figure 34:
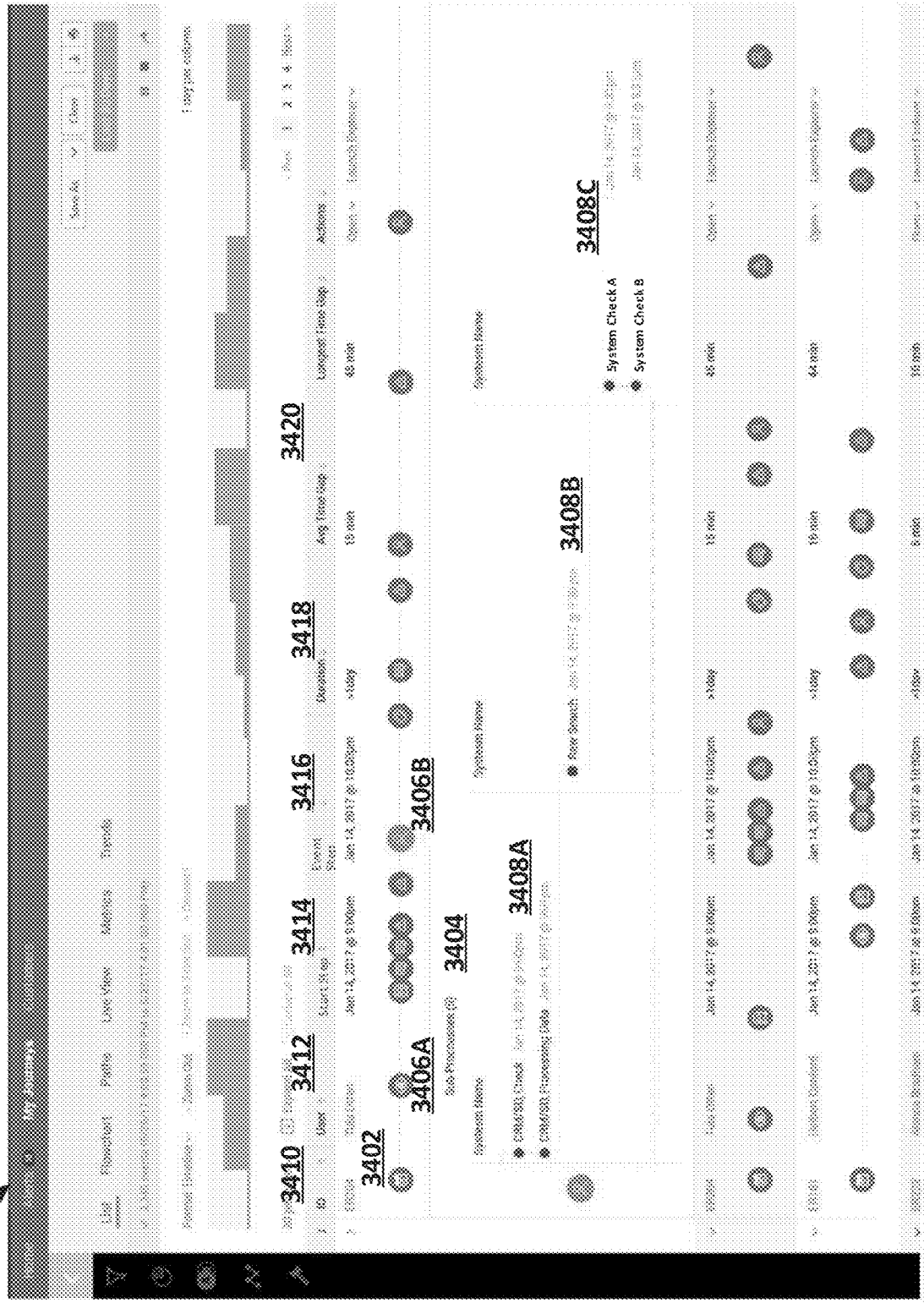
FIG. 34 illustrates an example user interface presenting a nested user journey included in a user journey.

FIG. 34 illustrates an example user interface 3400 presenting a nested user journey 3404 included in a user journey 3402. As described above, a step of a user journey can include sub-steps, with the sub-steps defining a nested user journey. Nested user journeys can enable the rapid creation of user journeys through re-use of previously created user journeys. That is, a user of the data intake and query system 108 can utilize previously created steps, user journeys, and so on, as building blocks to create a new user journey.

As illustrated in FIG. 34, a user journey 3402 that includes steps is presented. Each of the steps is presented along a horizontal line representing the user journey 3402. The user interface 3405 can respond to selections of steps, and present detailed information related to the step. For example, upon selection of step 3406A, the user interface 3400 can update to indicate a time at which an entity (e.g., user 'Tula') completed the step 3406A. Additionally, the user interface 3400 can present an event or other information that was returned as a result of execution of one or more search queries corresponding to the step 3406A, or the information from the event that was stored per the user journey.

In the example of FIG. 34, a user of user interface 3400 has selected step 3406B. Upon selection, the user interface 3400 has updated to indicate the sub-steps 3408A-C included in the step 3406B. That is, step 3406B is illustrated as being a nested user journey 3404. Times at which the entity completed the sub-steps of the nested user journey 3404 are specified in user interface 3400. As described above, each of the steps shown can correspond to one or more events that were identified as a result of the system 108 executing a query. Similarly, each of the displayed steps of the journey can correspond to one or more events that were identified as a result of the system 108 executing a query.

User interface 3400 further indicates an ID 3410, which can represent a unique identifier associated with a user journey. As described above, different versions of a user journey can be created, and results from each version can be analyzed. Additionally, each user journey may be associated with a unique identifier such that it can be monitored by the data intake and query system 108. An entity 3412 is identified (e.g., user 'Tula Otten'), along with a start step 3414 and end step 3416. The start step 3414 can represent an initial step satisfied by the entity 3412, and the end step 3416 can represent a final step completed by the entity. Additionally, an average time gap 3420 can be determined (e.g., an average time between completion of the steps), along with a longest gap.

Figure 35:
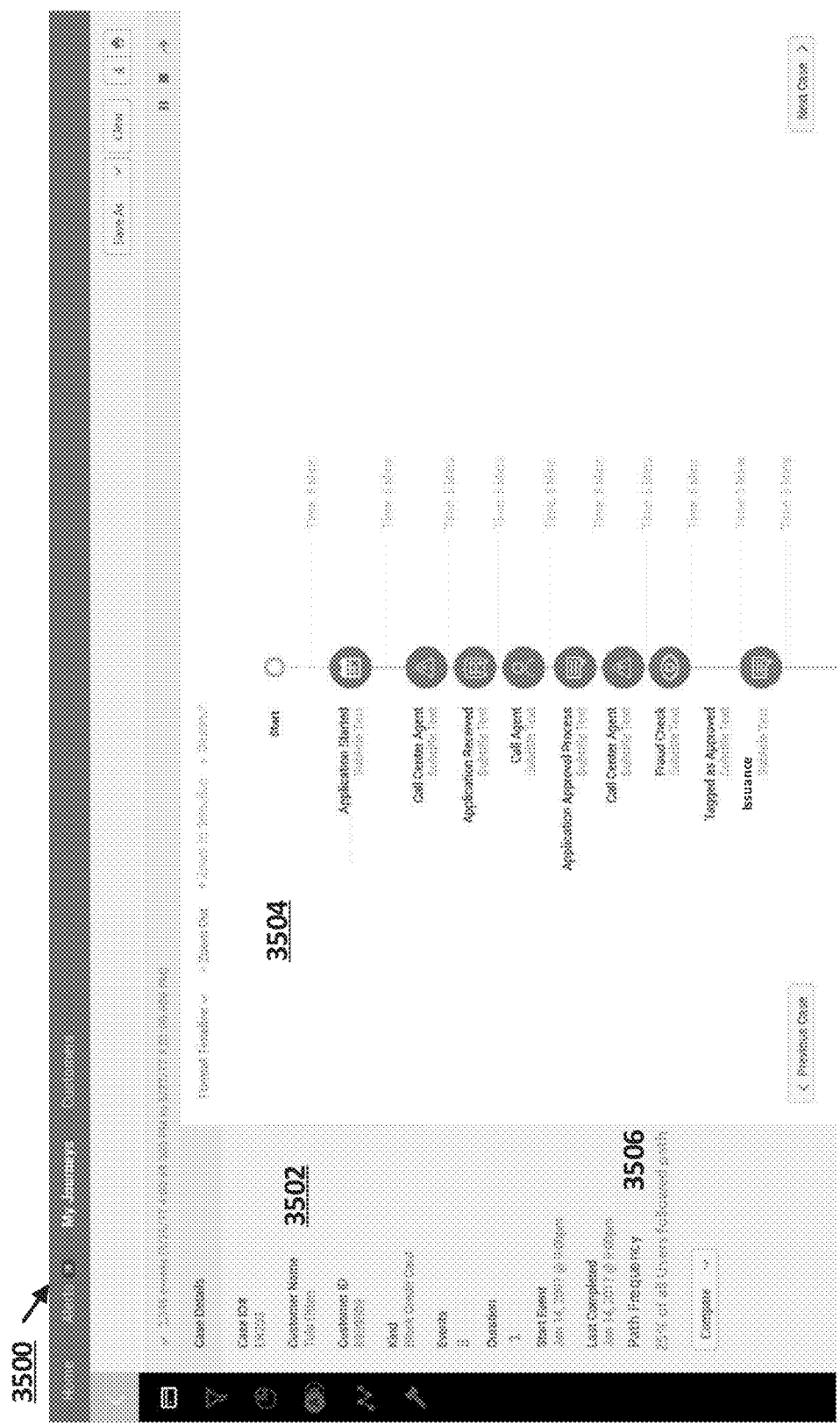
FIG. 35 illustrates an example user interface indicating a path a particular entity took through steps included in a user journey.

FIG. 35 illustrates an example user interface 3500 indicating a path 3504 a particular entity 3502 took through steps included in a user journey, which may also be referred to herein as a journey instance. As illustrated, steps of a user journey are presented, along with indications of a time the entity 3502 took to transition between the steps. The illustrated steps represent the particular steps that the entity 3502 completed. That is, in contrast to FIG. 18 which illustrates all paths traversed by any entity for a user journey, FIG. 35 presents the specific path 3504 that entity 3502 traversed through the user journey. This path 3504 is indicated in user interface 3500, as per the path frequency 3506 portion, as having been traversed by a particular number of all users (e.g., 25% of users). A user of the user interface 3500 can search for a particular entity, and the data intake and query system 108 can analyze its related event information (e.g., as described in, at least, FIG. 29) to present a path traversed by the searched entity.

FIG. 36 illustrates an example user interface 3600 presenting touchpoints 3602 associated with a particular entity 3604. As described above, each step may represent a particular touchpoint of an entity with respect to disparate computing systems. For example, the touchpoint can represent a user interaction being recorded by a computing system. A timeline of touchpoints can be generated by the data intake and query system 108, for example touchpoints across user journeys.

As illustrated, touchpoints 3602 of a particular entity 3604 are presented. These touchpoints 3602 are based on a total number of user journeys associated with the particular entity 3602 (e.g., 145 user journeys). For example, the total number can include user journeys started (e.g., the particular entity 3604 satisfied at least one step), or include user journeys completed (e.g., the particular entity 3604 completed a final step, for example as described in FIG. 28). As described above, with respect to FIG. 29, particular touchpoints (e.g., user interactions) can be specified to be monitored by the data intake and query system 108. In this way, a timeline of the specified touchpoints can be presented.

In the example of FIG. 36, touchpoints 3602 are specified along with particular times 3606 at which the touchpoints were recorded. For example, user interface 3600 presents a visual element 3608 as representing a recorded touchpoint. A user of user interface 3600 can select the visual element 3608, and the user interface 3600 can update to specify detailed information related to this touchpoint. For example, the user interface 3600 can present a time at which the touchpoint was recorded (e.g., an event including information related to this touchpoint can be presented).

Journey Instances and Models

As described herein, a computing system can generate machine data in response to touchpoints or interactions that it has with users, other computing systems, or other entities. The machine data may include information indicative of a particular user (or system) interacting with the computing system, along with further information describing the interaction. Furthermore, the interaction with the computing system can trigger that computing system to interact with another computing system, which may generate its own set of machine data in response.

The machine data generated by various computing systems can be ingested, for example by the data intake and query system 108, which can produce events based on the machine data. The events can be utilized to provide insight into the complex computing system environments. For example, the events can be accessibly maintained in data stores, and queries identifying a set of data and a manner of processing the data can be executed. In this way, the machine data can be investigated (e.g., poked) via differing queries, field definitions updated, and so on, to identify useful information related to the computing systems and users.

In some cases, multiple interactions with one or more computing systems, and the machine data generated in response thereto, can be related. For example, during a single session of a user, multiple events can be generated that each relate to the user or session. In some cases, these events can be generated by one computing system or by multiple similar or heterogeneous computing systems.

A combination of these related interactions and associated machine data (or events) may be referred to herein as a journey instance. Thus, a journey instance can include one or more events or step instances that relate to a particular user, session, entity, or the like. Further, the events or step instances of the journey instance can be generated by the same or different data sources or computing systems and have the same or heterogeneous data formats. Therefore, a journey instance can indicate occurrences of events across one or more disparate data sources or data systems. This includes occurrences of events across heterogeneous data sources and/or heterogeneous data systems.

A journey instance can provide useful information related to the functioning and operation of the one or more computing systems. For example, a journey instance can provide useful information regarding how a user, system, or other entity interacts with, e.g., "contacts" or "touches," a computer system or set of computer systems. In addition, in some cases, a journey instance may help form a picture of a particular user's utilization of a user account or interaction with various computer systems associated with the user account. Furthermore, multiple journey instances (e.g., multiple groupings of related events or machine data), may help form a picture of the system's utilization rate, efficiency, or help identify the cause of an error. In addition, multiple journey instances can form a picture of common interactions (and a sequence of those actions) that a computing system has with users. For example, multiple journey instances may be used to determine the most common, relatively, interactions (and a sequence of those actions), or to determine interactions that happen infrequently. In various implementations, journey instances may include information regarding time spent interacting with various computer systems.

In some cases, multiple journey instances can be used to generate a journey model. For example, in some cases, the system 108 can combine multiple journey instances to generate the journey model. The journey model can include steps that correspond to all, or a subset, of the step instances (which may be ordered temporally or otherwise) found within any one of the journey instances and can indicate the various paths that the journey instances take through the steps. Thus, while a single journey instance can indicate a particular path through a particular group of steps (based on the step instances of the journey instance), which may not be all of the steps in a set of data, the journey model can, in some embodiments, indicate the various paths taken through any step found within the set of data. Further, the system 108 can generate multiple journey models depending on the journey instances being analyzed. In some cases, the system 108 can generate a first or primary journey model that corresponds to all of the journey instances generated from a set of data. The system 108 can generate additional journey models based on a user filtering or identifying a subset of the journey instances for review.

Moreover, where a journey instance can include a particular sequence of step instances related together based on a pivot ID, user, or entity, a journey model can include a particular number of steps (ordered or unordered) without relation to a particular pivot ID, user, or entity. In this way, a journey instance can be an instance, representation, or example of a journey model, and a step instance can be an instance, representation, or example of a step of the journey model.

In certain embodiments, a journey model can be generated by identifying one or more related steps or events with or without combining journey instances. In some cases, a user can identify certain events as steps within a journey model and/or identify certain values within events as indications of a step within a journey model. For example, a user can identify a field associated with events as a step identifier and identify each unique field value (or a selected subset of the field values) of the identified field as a step in a journey model. Similarly, if multiple fields are identified as step identifiers (across one or more data sources), the unique field values across the identified fields (or a selected subset of the field values) can be identified as steps in the journey model. In addition, in certain cases, a user may specify a preferred or expected order of the steps, which can be used to order the steps of the journey model. In some cases, one or more journey instances can be used to determine the order of steps of a journey model. Accordingly, in some embodiments, a journey model can include an ordered or unordered set of steps. Thus, the journey models can be ordered journey models or unordered journey models. The ordered journey models can include a set of steps ordered in a particular way. The unordered journey models can include a set of steps, but may not include a particular order for the steps.

As will be appreciated by one of skill in the art in light of the description above, the embodiments disclosed herein substantially increase the ability of computing systems, such as the data intake and query system, to process related data from one or more disparate data sources or computing systems that generate heterogeneous machine data. Specifically, the embodiments disclosed herein enable the data intake and query system to parse heterogeneous machine data across disparate computing systems to identify and group related events and to generate visualizations of the related machine data to facilitate understanding of the system topology and the interactions with and between disparate computing systems. The aforementioned features enable the system to reduce the computing resources used to correlate heterogeneous data across disparate computing systems. Thus, the presently disclosed embodiments represent an improvement in the functioning of such data intake and query systems. Moreover, the presently disclosed embodiments address technical problems inherent within computing systems; specifically, the limited capacity of computing systems to parse and correlate machine data from one or more disparate computing systems, as well as the limited ability of such systems to generate visualizations of correlated data in a manner that facilitates the understanding of the underlying computing topology and interactions between and with disparate computing systems. These technical problems are addressed by the various technical solutions described herein, including the utilization of particular data structures and computing resources to identify related data across one or more disparate computing systems and particular data structures to indicate the relationship of the data. Thus, the present application represents a substantial improvement on existing data intake and query systems and computing systems in general.

Non-limiting examples of visualizations of multiple subsets of events, multiple journey instances, clusters of journey instances, or one or more journey models are shown at least in FIGS. 18, 31, 39A, 39B, 40A, 40B, and 41. Further, as a non-limiting example, a visualization of subsets of events or a journey instance, such as the visualization of a journey instance in FIG. 35, can be similar to the visualization of a journey model, but in some cases, may only show the steps and paths between steps associated with a particular user, entity, session, etc. The ability to analyze and relate individual events to generate journey instances or journey models facilitates the understanding of the complex interactions that take place across one or more computing systems, and allows visualization, analysis, and/or inferences from the journey instances and/or the data underlying the journey instances.

While identifying related data can be helpful, it can be difficult to do given the large amounts of data ingested by the data intake and query system. This can be further complicated when the related data is located across disparate data sources that store heterogeneous data. Thus, as will be discussed in more detail herein, various embodiments allow identification of related data, including in systems in which large amounts of data are ingested and/or when the related data is located across multiple or disparate data sources that may store heterogeneous data.

4.1 User Interface Overview

Figure 37A:
FIGS. 37A and 37B illustrate an example user interface for identifying one or more pivot identifiers and one or more step identifiers.
Figure 37B:
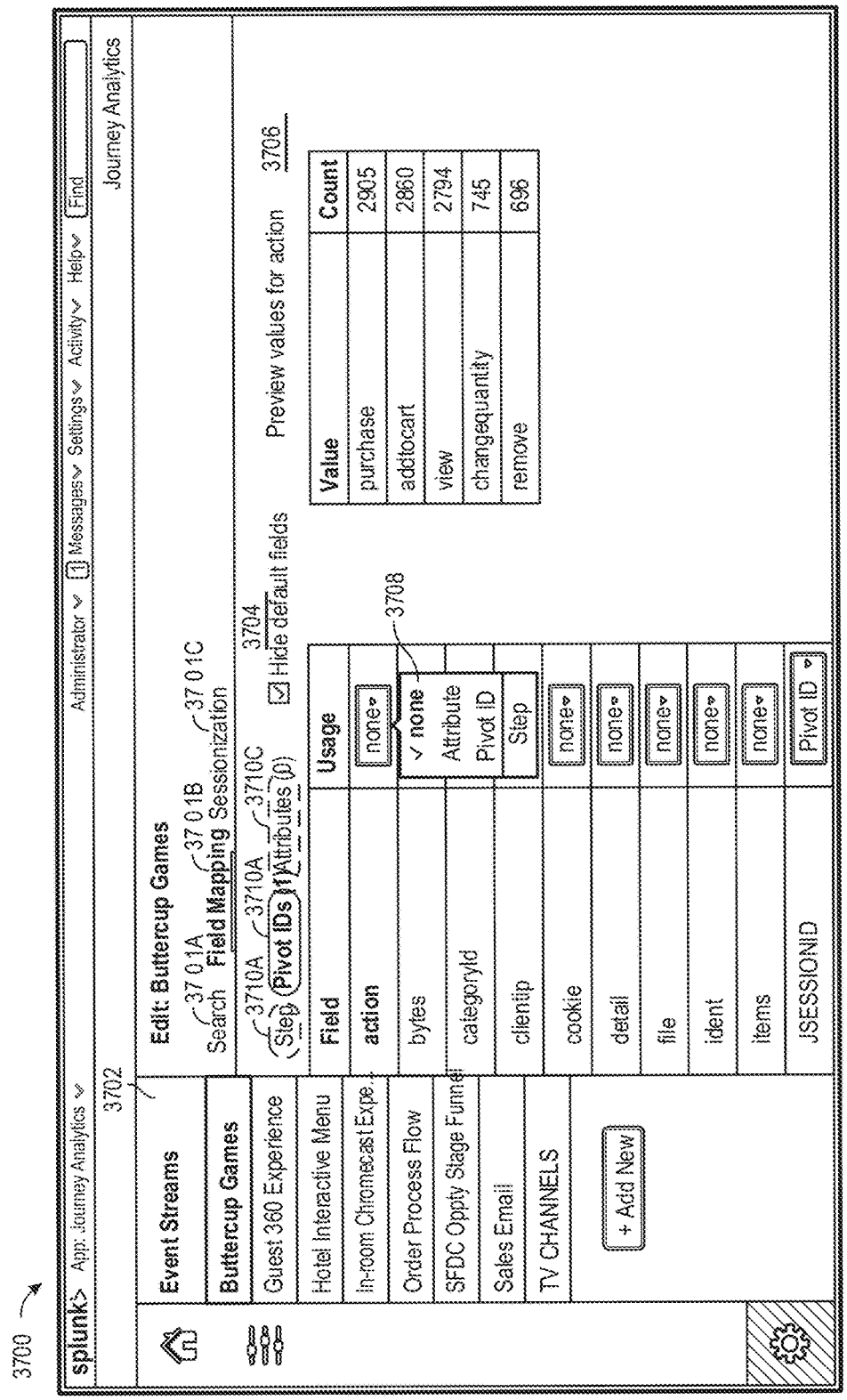

FIGS. 37A and 37B illustrate an example user interface for identifying one or more pivot identifiers and one or more step identifiers that can be used to identify related data (e.g., events) from a set of data and to form journey instances and/or journey models. The set of data can correspond to data identified by selecting one or more data sources and/or by executing a query.

In the illustrated embodiment, the user interface 3700 includes interface control objects 3701A-3701C, a data source section 3702, a field identifier section 3704, and a field value preview section 3706. It will be understood that the interface 3700 can include fewer or more sections, display objects, features, etc.

The interface control objects 3701A-3701C, can be used to select various portions of the user interface 3704 for display. For example, the search interface control object 3701A can be used to select an interface that includes a search bar for entering a query. Similarly, the sessionization interface control object 3701C can be used to select an interface that includes sections to indicate a time period or time constraints for the query, or for the events that can satisfy the query, or other constraints or conditions regarding the query. In the illustrated embodiment, the field mapping interface control object 3701B is selected. Based on the selection of the field mapping interface control object 3701B, the interface 3700 displays the field identifier section 3704 and the field value preview section 3706.

The data source section 3702 can be used to select a data source for review. In some embodiments, the data source section 3702 can identify the data sources or data streams corresponding to the data that satisfies a query. For example, if the query indicates that the set of data to be processed corresponds to all data from a particular index, the data source section 3702 can identify each data source corresponding to the events in the particular index. In certain embodiments, the data source section 3702 can correspond to the data sources managed by the user or the data sources selected for review as part of generating the journey instances and/or journey models. In the illustrated, the data source Buttercup Games is selected. The data source section 3702 may allow the user to add additional data sources for review, or, in other implementations, the data source section 3702 may be populated automatically through various predetermined settings, configurations and configuration files, etc.

4.1.1 Displaying Field Identifiers

Based on a query and or a selection of a particular data source, the data intake and query system 108 can identify and display in the field identifier section 3704 the field identifiers of events from the particular data source or that satisfy the query. In some cases, to identify the field identifiers to be displayed in the field identifier section 3704, the data intake and query system 108 can consult one or more configuration files. As described in greater detail above, the data intake and query system 108 can include one or more configuration files for each data source that provides data to the data intake and query system 108. The configuration files can include field identifiers for the data received by the data intake and query system 108 from the data source. Furthermore, the configuration files can include one or more field definitions or regex rules to extract field values corresponding to the field identifiers. For example, the data intake and query system 108 can include a configuration file that includes some or all of the field identifiers for data that the data intake and query system 108 has received from the data source Buttercup Games, as well as field definitions for extracting field values corresponding to the field identifiers found in data received from the data source Buttercup Games. In other implementations, the field identifiers may be obtained using other techniques, including user input, machine-learning inferences about field identifiers, or other field identification techniques described in this and the incorporated applications.

In the illustrated embodiment, the data intake and query system 108 has identified and displays in the field identifier section 3704 a number of field identifiers corresponding to the data source Buttercup Games. For example, the data intake and query system 108 has determined that data from the data source Buttercup Games includes the fields: "ident," "items," "JSESSIONID," "method," "msg," "other," "product," "productid," "q," etc. As mentioned above, in some embodiments, the data intake and query system 108 can identify the aforementioned fields by consulting a configuration file that corresponds to the data source Buttercup Games. In certain embodiments, the data intake and query system 108 can identify the aforementioned fields based on user input, machine learning, extracting the fields from the set of data, using a lookup table or other system resource that indicates fields for a particular set of data, etc.

In some cases, the field identifiers shown in the field identifier section 3704 can correspond to field identifiers of the data that satisfies a query. As mentioned above, a query can be used to identify a set of data to be processed. In some cases, the identified set of data can correspond to data from one or more data sources. The data intake and query system 108 can analyze the set of data (e.g., a group of events) that satisfies the query to identify field identifiers to display in the field identifier section 3704. In some cases, the data intake and query system 108 can use one or more configuration files to identify the field identifiers corresponding to the data that satisfies the query. Accordingly, in some embodiments, the fields "ident," "items," "JSESSIONID," "method," "msg," "other," "product," "productid," "q," can correspond to fields associated with data from multiple data sources.

Upon selection of a field identifier, the user interface 3700 can display, in the field value preview section 3706, one or more field values corresponding to the selected field identifier. In certain embodiments, the data intake and query system 108 determines that a field identifier has been selected based on user interaction with the field identifier, such as, but not limited to, hovering over, pointing to, clicking on, etc.

In the illustrated embodiment of FIG. 37A, based on a selection of the field identifier "JSESSIONID," the user interface 3700 populates the field value preview section 3706 with a list of field values for the field "JSESSIONID." In addition, the field value preview section 3706 includes a count of each displayed field value for the field "JSESSIONID," identifying the number of unique events that include the particular field value or the number of instances of the particular field value across the set of data. Similarly, in the illustrated embodiment of FIG. 37B, based on selection of the field identifier "action," the user interface 3700 populates the field value preview section 3706 with a list of field values for the field "action."

In some embodiments, the system 108 can consult one or more inverted indexes, as described in greater detail above with reference to at least FIG. 5B, to populate the field value preview section 3706 with field values and counts. For example, once a field identifier is selected from the field identifier section 3704, the system 108 can identify one or more inverted indexes (e.g., inverted index 507B) that include a field-value pair 513A that includes the selected field identifier as the field portion of the field-value pair 513A. Once the appropriate inverted index(es) is identified, the system 108 can identify the unique field values that correspond to the identified field based on the field-value pairs 513A. The identified unique field values identified from the inverted index can be displayed as the field values in the field value preview section 3706. Further, the system 108 can determine the count for the field values in the field value preview section 3706 using the inverted index(es). For example, as each field-value pair entry 513 identifies events with the field-value pair 513A, the system 108 can sum the number of events for each field-value pair entry 513 to identify the count value for each field value in the field value preview section 3706. In other implementations, the system 108 can identify the field values based on an analysis of the events (e.g., extracting field values from the events) or a subset of the events (e.g., the first 1,000 events of a set of data), pre-processing the set of data, etc. In some embodiments, as the system 108 obtains the field values it can dynamically update the field value preview section 3706. For example the field values or counts in the field value preview section 3706 can be updated as the system 108 parses the events, inverted or keyword indexes, etc.

4.1.2 Selecting Pivot Identifiers and Step Identifiers

In addition to displaying field identifiers in the field identifier section 3704, the user interface 3700 can enable a user to identify one or more pivot IDs, one or more step IDs, one or more attributes, etc. This can be done in a variety of ways, including, but not limited to, drop-down menus, text boxes, checks boxes, fields, etc. In the illustrated embodiments of FIGS. 37A and 37B, the user interface 3700 includes a drop-down menu 3708 that enables a user to identify a particular field identifier as an attribute, pivot ID, or a step ID. In the illustrated embodiment of FIG. 37A, the user has selected the field "JSESSIONID" and is determining whether to make the field "JSESSIONID" an attribute, pivot ID, or step ID. In the illustrated embodiment of FIG. 37B, it is shown that the user selected "JSESSIONID" as a pivot ID and is determining whether to identify "action" as an attribute, pivot ID, or step ID. With reference to the FIGS. 38-42, it will be under that "action" is selected as a step ID.

The selection status indicators 3710A-3710C, can be used to indicate whether and how many step IDs, pivot IDs, and attributes have been selected. In the illustrated embodiment of FIG. 37A, no step IDs, pivot IDs, or attributes have been selected. However, in the illustrated embodiment of FIG. 37B, one pivot ID has been selected as indicated by the pivot ID selection status indicator 3710B. Further, as shown in the FIG. 37B, the field "JSESSIONID" has been selected as the pivot ID.

As mentioned above, in some embodiments, the field identifiers displayed in the field identifier section 3704 can correspond to all of the field identifiers associated with the events in the set of data or can correspond to the field identifiers associated with the events from a one or more data sources associated with the set of data, such as the data source "Buttercup Games" as illustrated in FIGS. 37A and 37B. In embodiments where the field identifier section 3704 includes field identifiers associated with a single data source, the user interface 3700 can enable a user to select other data sources so that one or more step identifiers, pivot identifiers, and attributes, can be selected for the other data sources. For example, with reference to the illustrated embodiment of FIG. 37A, a user can select the data source "Sales Email." In response, the field identifier section 3704 can be updated to show field identifiers corresponding to data from the data source "Sales Email." As such, a user can use the updated field identifier section 3704 to identify one or more fields for events from the data source "Sales Email" as a pivot ID, step ID, or attribute. This process can be repeated for as many data sources that correspond to data that satisfies the query or that is part of the set of data to be used to generate the journey instances or journey models.

In embodiments, where field identifiers displayed in the field identifier section 3704 correspond to all of the field identifiers associated with the events in the set of data, the user interface 3700 can enable a user to identify one or more fields as one or more step identifiers, one or more pivot identifiers, or one or more attributes. In certain embodiments, a single step ID can be selected for all data sources associated with events that satisfy the query. For example, certain fields within each data source can be associated with a universal field, and that field can be identified as the step ID.

Using one or more pivot IDs and one or more step IDs, the data intake and query system 108 can parse the set of data, or events, to identify one or more journey instances and journey models, as well as identify particular steps within the journey instances and journey models. Further, the data intake and query system 108 can display visualizations corresponding to the journey instances and journey models.

4.2 Pivot Identifiers

In some embodiments, the data intake and query system uses one or more pivot IDs to identify related events from the set of data and/or to create journey instances. In some embodiments, the data intake and query system 108 can identify related events and/or generate journey instances based on field values associated with the pivot identifier. For example, the data intake and query system 108 can identify the events from a data source that include the same field value for the field associated with the pivot ID (also referred to as the pivot ID field). The system 108 can then associate the identified events as part of a journey instance. For example, with reference to FIG. 37A, the events from the data source Buttercup Games with a field value of "SD5SLFF8ADFF4961" for the "JSESSIONID" field can be grouped as a set of events associated together as part of a journey instance. Further, the data intake and query system can generate a journey instance for each of the unique field values identified in the field value preview section 3706, which would result in at least 13 distinct journey instances.

In some embodiments, the user interface 3700 can enable an identification of a subset of the field values in the field value preview section 3706 as field values for the pivot ID. In some cases, the system can ignore deselected field values and not use them to relate events, build sets of events, or generate journey instances or journey models. For example, the user interface 3700 can include checkboxes or some other indicator to enable a user to deselect "SD5SLFF8ADFF4961" (or any other field value). Based on the deselection, the system 108 can ignore, discard, or not use events with the field value "SD5SLFF8ADFF4961" to build sets of events, journey instances, journey models, etc.

In embodiments where events from multiple data sources are to be associated together as part of a single journey instance, the data intake and query system 108 can identify a relationship between a unique field value of a field in a first data source with a unique field value of a field in a second data source. Once the relationship between the two unique field values from different data sources is identified, the data intake and query system 108 can associate the events from the first data source that have the first unique field value with the events from the second data source with the second unique field value.

Accordingly, in certain embodiments, the data intake and query system 108 can identify a journey instance for unique combinations of related field values across different data sources. As a non-limiting example, suppose events with the information identified in Table 1 are related.

TABLE 1

| Field Value | Pivot ID Field | Data Source |
|---|---|---|
| SD5SL5FF8ADFF4961 | JSESSIONID | Buttercup Games |
| X12245YZ | sess_ID | Sales Email |
| 6812-TUXKE1 | user_ID | Order Process Flow |

Based on an identified relationship between the field values identified in Table 1, the data intake and query system 108 can generate a journey instance that includes all events from Buttercup Games that include the field value "SD5SL5FF8ADFF4961" for the field "JSESSIONID," all events from Sales Email that include the field value "X12245YZ" for the field sess_ID, and all events from Order Process Flow that include the field value "6812-TUXKE1" for the field user_ID. In an implementation, the identified pivot ID or pivot IDs will be used to facilitate determination of relationships between field values. Specifically, in an implementation, identified pivot ID fields will be examined for field values that can be used to cross-correlate events across disparate data sets. It will be understood that the data intake and query system 108 can use a variety of techniques to generate journey instances. For example, in some embodiments, based on the Table 1 above, the data intake and query system can generate a journey instance that includes all events from any one of the data sources that includes any one of the identified field values.

By identifying intra-data source related events and inter-data source related events, the data intake and query system 108 can generate a journey instance that includes related events across one or more data sources. In some embodiments, the data intake and query system 108 identifies intra-data source related events and inter-data source related events concurrently. In certain embodiments, the data intake and query system identifies intra-data source related events before or after inter-data source related events.

As a non-limiting example and with reference to table above, the data intake and query system 108 can first separately identify the events from the data source Buttercup Games with the field value "SD5SL5FF8ADFF4961" and the events from the data source Sales Email that include the field value "X12245YZ" before interrelating the events from the data source Buttercup Games and the data source Sales Email. Alternatively, the data intake and query system 108 can concurrently identify and relate events from the same data source and from multiple data sources.

4.2.1 Gluing Events

In some embodiments, the data intake and query system 108 can identify a relationship between two unique field values of events from different data sources based on a gluing event that includes both field values within the event. In some cases, when one computing system interacts with another computing system, one or both computing systems generate an event that includes an identifier from both computing systems. For example, if a first data source that includes a value of "1234" for a field "cust_ID" interacts with a second data source, the second data source may include an event with the value "1234," as well as the value "ABC" for a "trackID" field. Further, the value "ABC" for the "trackID" field may be found in each event of the second data source that relate to the same user or session, and the value "1234" for the "cust_ID" field may be found in each events of the first data source that relate to the same user or session.

Accordingly, the system 108 can identify the event in the second data source that includes the value "ABC" for the "trackID" field, as well as the value "1234." Based on the identification of this "gluing event," the system 108 can determine that events with the value "1234" for the field "cust_ID" from the first data source are related to events with the value "ABC" for the field "trackID" from the second data source. Based on this relationship, the system 108 can generate a journey instance that includes events or steps across data sources, e.g., multiple or disparate data sources. Moreover, there may be multiple gluing events within a particular data source, which would allow data sources having no fields in common to be connected, provided that an intermediate data source (or intermediate data sources) including gluing events that linked to each of the data sources to be logically connected and searched. Further, the system 108 can use gluing events within a particular data source to identify primary and nested journey instances. For example, events in a primary journey instance can be associated based on a first pivot ID and events in a related nested journey instance can be identified based on a second pivot ID. Specifically, a first data source could share a gluing event with a second data source, and the second data source could share a gluing event with a third data source. The first data source and the third data source could then be linked and searched together, despite having no fields in common (or no fields in common capable of linking the two data sources).

In certain cases, to identify the gluing event, the system 108 can identify the field value for a pivot ID field in a first data source and then perform a search for that field value among the events from the second data source. In some embodiments, the search can be performed by analyzing the machine data of each event and/or by analyzing an inverted index or keyword index, as described herein. In embodiments where an inverted or keyword index is searched, in some cases, the system 108 can identify a field-value pair entry that includes the searched for value as the field value portion of the field-value pair or identify a token entry that includes the searched for value as a token or keyword. It will be understood that the system 108 can identify and/or search the inverted or keyword index in a variety of ways. For example, the system 108 can search for the searched for value in any location of an inverted or keyword index.

With reference to the example above, if the "cust_ID" field is identified as the pivot ID field for the first data source with a field value of "1234," the system 108 can perform a search on the events from the second data source to identify any events with the value "1234" located within the data of the event. As mentioned, the search can include a review of the data (e.g., machine data) of each event from the second data source and/or a review of an inverted or keyword index that corresponds to the events from the second data source. With reference to searching an inverted or keyword index, the system 108 can identify an inverted or keyword index that includes information about the events from the second data source, and then identify a field-value pair entry or token entry in the inverted/keyword index that includes the value "1234." For the field-value pair entry, the system 108 can review the value portion of a field-value pair for the value "1234." For the keyword entry, the system 108 can review the keyword portion of the keyword entry for the value "1234."

The identified event(s) can be used to link the value "1234" to the field value of the pivot ID field for the second data source. Once the two field values are linked, the system 108 can relate events with either field value as part of the same journey instance.

In some embodiments, when searching for a gluing event, the system 108 can limit the search to events from the second data source that include the pivot ID field for the second data source. In this way, the system 108 can exclude events from the second data source that will not have a field value that can be linked with the field value from the first data source. With reference to the example above, the system 108 can exclude from the search events from the second data source that will not have a field value that can be linked with the field value "1234" from the first data source.

In some cases, the system 108 can identify a field in one or more events from the second data source that includes the field value from the first data source. Such a field may be referred to as a linking field. For example, one or more events in the second data source may have the field value from a different computing system identified in a field "previousID." Based on an identification of the linking field in the events from the second data source, the system 108 can tune its search for events in the second data source with a field value that matches the field value from the first data source to events from the second data source that include the identified linking field.

With continued reference to the above example, once the system 108 identifies the previousID field, it can narrow its search to those events that include a field "previousID.". In this way, rather than searching across all events from the second data source for the field value "1234," the system 108 can limit its search to a subset of the events from the second data source (e.g., those events in the second data source that include a field "previousID"). By targeting the search in this way, the system 108 can reduce the processing overhead used to identify a gluing event.

Further, if using an inverted or keyword index to identify gluing events, the system 108 can focus or narrow its search to field-value pair entries that include the identified linking field as the field portion of a field-value pair. With reference to the example, the system 108 can tailor its search in the inverted or keyword index to field-value pair entries that include previousID as the field portion of the field-value pair.

In some cases, the system 108 can suggest certain fields as potential linking fields to the user. For example, the system can suggest to a user that fields with certain names or frequency may be useful as linking fields. For example, fields like "previousID," "prevID," "oldSession," etc. may be suggested as they may be linking fields. The system 108 can obtain the list of fields using a configuration file or inverted or keyword index, as described herein. Similarly, the system 108 can identify a particular event, such as an earliest-in-time event for a journey instance, or set of related events potential gluing event(s). The fields from the potential gluing events can be suggested to a user as potential linking fields. In other implementations, machine learning techniques, e.g., training on known data sources with similarities to the data sources that are the subject of the instant search, may be used to suggest potential gluing events.

4.3 Step Identifiers

In certain embodiments, the data intake and query system 108 uses the one or more step IDs to identify events that correspond to steps, order individual journey instances, and/or generate journey models. In some embodiments, each unique field value, or a subset thereof, for a field identified as the step ID (also referred to as a step ID field) corresponds to a step in a journey instance or journey model. Accordingly, based on the field value for the step ID field, the system 108 can determine the step to which a particular event belongs. For example, if the event includes the field value "purchase" for the step ID field "action," the system 108 can determine that the event is a "purchase" step.

In some cases, the data intake and query system 108 can parse journey instances using the step ID to identify the individual steps within the journey instance. For example, with reference to FIG. 37B, once a particular journey instance is identified, the data intake and query system can use the field values "purchase," "addtocart," "view," "changequantity," and "remove," (field values of the step ID field "action") to identify individual steps within the journey instance. In some cases, the journey instance may include each of the unique field values of the step ID field, multiple instances of one or more of the field values of the step ID field, or a subset of the field values of the step ID field. For example, with continued reference to FIG. 37B, a journey instance can include zero, one, or more "purchase," "addtocart," "view," "changequantity," or "remove," steps.

In some embodiments, the user interface 3700 can enable an identification of a subset of the field values in the field value preview section 3706 as field values for the step ID. In some cases, the system can ignore deselected field values and not use them to identify steps, categorize events, build subsets of events, or generate journey instances or journey models. For example, the user interface 3700 can include checkboxes or some other indicator to enable a user to deselect "addtocart" (or any other field value) Based on the deselection, the system 108 can ignore, discard, or not use events with the field value "addtocart" to build subsets of events journey instances, journey models, etc.

In some embodiments, multiple step IDs can be used to categorize events or build subsets of events. For example, as described herein, one step ID can be selected for one data source and a second step ID can be selected for another data source. Each step ID can identify a particular field in the data source as the step ID field.

Further, in some embodiments, the system can use a second step ID to categorize events in nested journey instances, which can be located in the same or a different data source as each other or as the events in the primary journey instance. In some cases, the nested journey instances can have a field value for a step ID field for a primary journey instance and a field value for a step ID field for the nested journey instance. In cases, where the events in the journey instance have a field value for the parent primary journey instance, the field values may be the same (indicating they are all part of the same step) or different.

Moreover, in certain embodiments, multiple events (or a subset of events) can correspond to a single step instance. For example, the system 108 can determine that to satisfy the "addtocart" step or step instance, three events need to occur. As such, the system 108 can identify the three events that make up the "addtocart" step. Based on an occurrence of the three events (ordered or unordered), the system 108 can determine that the "addtocart" step has occurred. In such embodiments, events that make up a step instance or subset of events can be categorized by one or more step IDs (e.g., can be categorized as part of the journey instance using one step ID and categorized between each other using a second step ID) and may or may not form part of a nested journey instance.

In some cases, the system 108 can exclude one or more events using the step ID. In some cases, if a particular event does not include a step ID (e.g., does not include the field identified by the step ID, does not include a field value corresponding to the field identified by the step ID, or includes an excluded field value for the step ID), the data intake and query system 108 can discard the particular event as not part of a journey instance. For example, a gluing event may include a field value for a pivot ID field, but may not include a field value for a step ID field. As such, it may be discarded from a journey instance (but still used by the system 108 to identify related events across different systems or related events from nested journey instances).

Furthermore, the step ID can be used to generate the journey model. For example, the field values (or a subset thereof) of the step ID field can be identified as steps within a journey model. In certain cases, some or all of the journey instances identified from the set of data can be used to form a journey model (e.g., by combining the journey instances or identifying journey model's step order from the journey instances). Thus, where a single journey instance may include a subset of the field values of the step ID field, a journey model can include all of the field values for the step ID field or all of the field values for the step ID field found within any single journey instance. Furthermore, the journey model can identify the different paths between its steps or the steps of the different journey instances.

In some embodiments, the data intake and query system can use a timestamp associated with each event or step to identify and order the steps of a journey instance. For example, based on a timestamp for a "view" step that is earlier in time than the timestamp for a "purchase" step, the system 108 can determine that the "view" step precedes the "purchase" step for the journey instance. If there are not intervening timestamps from related steps, the system 108 can determine that the "view" step immediately precedes the "purchase" step. In certain embodiments, such as when steps are taken in a particular order, the step ID can be used to identify the order. For example, if a "login" step is required before a "view" step, then the system 108 can determine the order of the steps based on their identification. In other implementations, the journey instance may be ordered using other techniques, such as analyzing the underlying data or metadata that makes up the steps of the journey instance.

In certain embodiments, the data intake and query system 108 can identify and order a journey instance without the use of a step ID. For example, the data intake and query system 108 can identify related events using one or more pivot IDs, and can order the related events as journey instances based on timestamps associated with the identified related events.

Although reference in the above examples is made to parsing journey instances/models to identify steps within them, it will be understood that the data intake and query system 108 can parse events to identify steps using one or more step IDs and then interrelate the steps into journey instances using one or more pivot IDs, or concurrently identify journey instances and steps. For example, it will be understood that the one or more pivot IDs can be selected before, after, or concurrently with the one or more step IDs. In some embodiments, based on a selection of the one or more pivot IDs prior to one or more step IDs, the data intake and query system can identify journey instances from the events. Upon selection of one or more step of IDs, the data intake and query system 108 can then parse the journey instances to identify one or more steps within them. In certain embodiments, based on a selection of one or more step IDs prior to one or more pivot IDs, the data intake and query system 108 can identify events that correspond to steps. Upon selection of one or more pivot IDs, the data intake and query system can parse the events identified as steps to identify journey instances.

4.4 Attributes

The attributes can be used to track, categorize, or group events, subsets of events, journey instances, or journey models. In some cases, when the user selects a field as an attribute, the system 108 can track the field values for the selected field as the system generate the journey instances or models. For example, with reference to FIG. 37A, if the field "method" is selected as an attribute and includes field values of "email," "phone," "SMS," "FTP," and "instant message," the system 108 can track which step instances or events in the journey instances include the different field values.

Using the field values of the attribute field, the system 108 can filter, group, sort, visualize, or otherwise manipulate the journey instances or models. For example, the system 108 can build one or more journey instances or journey models using only events that include the field value "SMS," or some other subset of field values, for the attribute field. Similarly, the system can build a journey model with journey instances that only include events with the field value "phone" for the attribute field or generate visualizations of journey instances that include an event with the field value "email" for the "method" field. As yet another example, the system can group or sort journey instances or journey models based on the field value for the attribute field. Thus, one or more fields identified as one or more attributes can enable the system to manipulate subsets of events, journey instances, or journey models in a variety of ways. In this way, the system 108 can facilitate the understanding of the machine data and the interactions within the computing system.

4.5 Journey Summarization Overview

Based on the selection of one or more pivot IDs and one or more step IDs and the processing of the events of the set of data, the data intake and query system 108 can identify and organize journey instances. As discussed herein, in some embodiments, the data intake and query system 108 can identify a path through a journey instance based on timestamps associated with the events of the journey instance. For example, the data intake and query system 108 can order the step instances of the journey instance in chronological order and show paths between the step instances. As mentioned, in some cases, a journey instance may include multiple step instances of the same step (e.g., system recording that a user is interacting with a computer system in the same way multiple times, or is iteratively going through a set or subset of interactions with a computer system) or pass through each step instance of the journey instance once.

In some embodiments, the journey instances can be used to form a journey model. For example, a group of journey instances can be combined to form the journey model. In some cases, some or all of the identified journey instances for a set of data can be combined to form the journey model. For example, the journey model may be based on only those journey instances that include a certain number of step instances or a particular order of step instances. In addition, the journey model can indicate the various pathways between its different steps as taken by the individual journey instances. Furthermore, the data intake and query system 108 can determine various analytics associated with the journey model, such as, but not limited to, common paths through the steps of the journey model, average time between each step, average length of time of a journey instance, most common steps in a journey, etc. The system 108 can display visualizations of the journey instances, journey models, and/or associated analytics to facilitate the understanding of relationships between events, data sources, and computing systems.

Using the pivot ID and step ID, the system 108 can more efficiently (e.g., using less computing resources) identify related events and an ordering of those events to generate or build journey instances or journey models. Using the journey instances and the journey model, the data intake and query system 108 can more efficiently identify relationships between events across one more heterogeneous data systems and facilitate the understanding of the complex interactions with the various data sources. Furthermore, based on the identification of the one or more pivot IDs in one or more step IDs, the data intake and query system can more efficiently process the events to identify related events and typical journeys through the related events.

Figure 38:
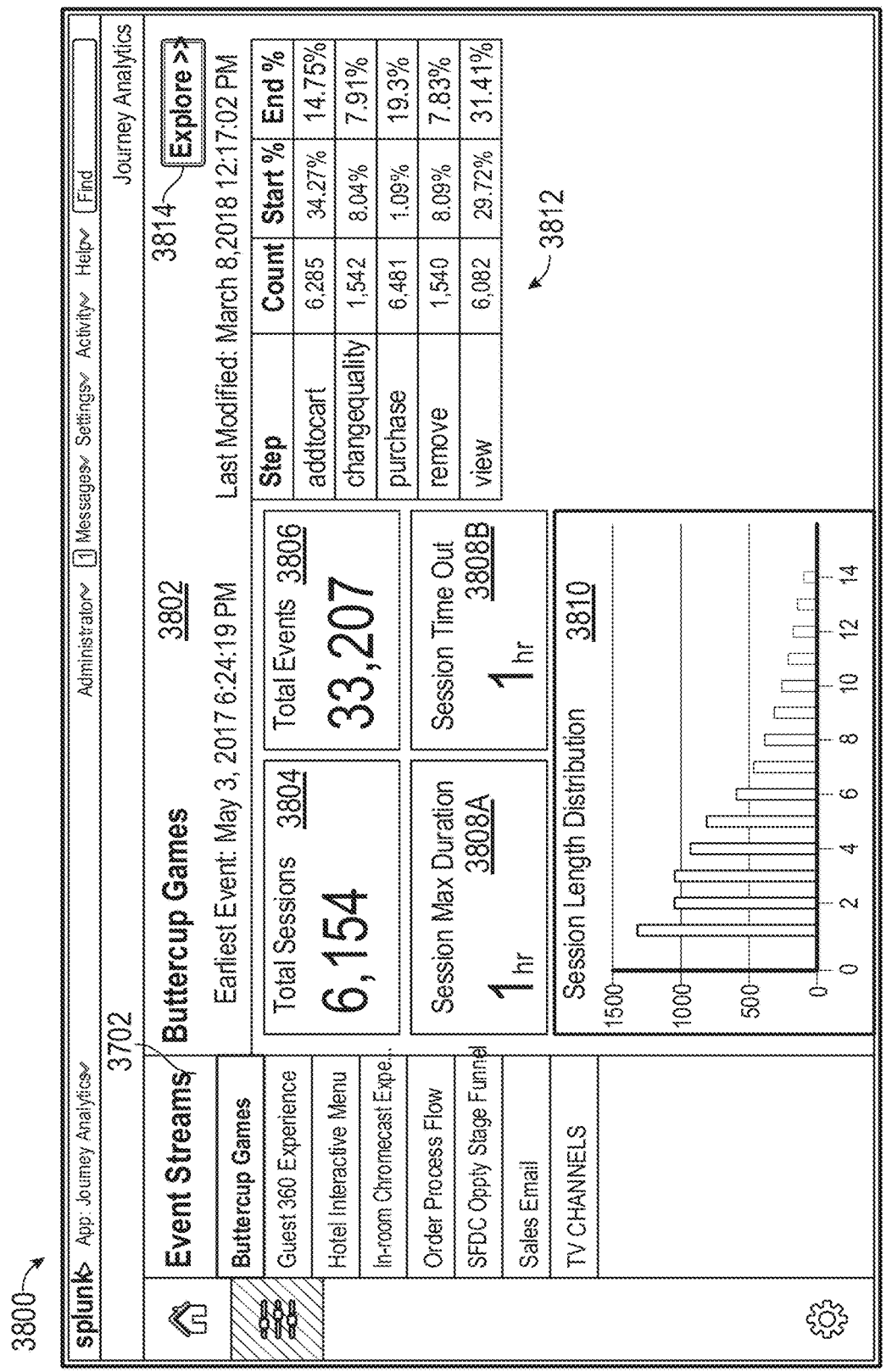
FIG. 38 is a diagram illustrating an example user interface displaying an embodiment of a journey summarization.

FIG. 38 is a diagram illustrating an example user interface 3800 displaying an embodiment of a journey summarization. In the illustrated embodiment, the user interface 3800 includes a data source section 3702 and a journey overview section 3802. The journey overview section 3802 can include analytics of the events, steps, one or more journey instances, or one or more journey models. For example, in the illustrated embodiment, the journey overview section 3802 includes a total journey instances section 3804, total events section 3806, timing parameters 3808A, 3808B, journey instance distributions graphic 3810, and a step analytics section 3812. It will be understood that the journey overview section 3802 can include fewer or more analytics and information associated with the events, journey instances, or journey model(s), as desired. For example, the user interface 3800 can include portions of events of one or more journey instances, identify common pathways through one or more journey models, etc.

The total journey instances section 3804 can indicate the total number of journey instances identified from the analyzed events or set of data. As discussed above, in some cases, the total number of journey instances can correspond to a total number of unique field values for a pivot ID field, or a total number of unique combinations of related field values for multiple pivot ID fields across one or more data sources.

The total events section 3806 can indicate the total number of events analyzed in order to form the journey instances. In some cases, all of the events can be included in a journey instance. However in certain cases some of the events may be excluded from a journey instance. For example, an event from a data source may not include a field identifier that corresponds to the selected pivot ID field(s) or step ID field(s), or may include a field value that was excluded from a pivot ID field or step ID field. Such an event may not be included in a journey instance.

The timing parameters sections 3808A, 3808B, can indicate certain parameters used to identify journey instances. For example, with reference to FIG. 37A, a user can select the sessionization interface control object 3701C to identify time limits to identify journey instances or to identify one or more additional command or constraints for the set of data. Based on the indicated time limits, the data intake and query system 108 can determine when a journey instance is supposed to end. For example, in the illustrated embodiment of FIG. 38, a max time limit of one hour has been set. Accordingly, in some cases, the data intake and query system 108 can determine that if two events include the same field value for the pivot ID field but are separated by more than one hour, then they correspond to different journey instances. In some cases, the data intake and query system 108 can use the timing parameters to determine when the journey instance has terminated. For example, if no event with a matching field value for a pivot ID field has a timestamp within one hour of the latest-in-time event of a journey instance (e.g., based on a timestamp associated with the events of the journey instance), then the data intake and query system 108 can determine that the identified latest-in-time event is the last event for the journey instance.

The journey instance length distribution graphic 3810 can be used to graphically illustrate the quantity of journey instances of a particular length or having a particular number of step instances. In some cases, the journey instance length distribution graphic 3810 can group journey instances with the same number of step instances together and display the number of journey instances with that particular number of step instances. For example, in the illustrated embodiment, the largest share of journey instances have one step instance and there are progressively fewer journey instances for each additional step instance (e.g., there are approximately 1,000 journey instances with two or three journey instances, approximately 550 journey instances with six step instances, etc.). It will be understood that additional graphics can be used to illustrate information about the journey instances, journey models, or events, as desired.

The step analytics section 3812 can identify the steps of one or more journey model or step instances of one or more journey instances as well as various analytics associated with each. In the illustrated embodiment, the step analytics section 3812 identifies a count, start percentage, and end percentage for each step. The count can correspond to the number of journey instances that include that a step instance that corresponds to the particular step and/or the number of instances of that step found within the events (e.g., one step may occur multiple times within a single journey instance). The start percentage and end percentage can indicate the percentage of journey instances that include a step instance that corresponds to that particular step as the first or last step (e.g., number of journey instances that include a step instance that corresponds to the step as the first or last step instance/the total number of journey instances), respectively, or the percentage of times that the particular step is the first or last step instance in a journey instance (e.g., the number of time that the step is found as the first or last step instance of a journey instance/the total number of instances of that step), respectively. It will be understood that fewer or more analytics can be displayed as part of the step analytics section 3812. For example, the steps analytics section 3812 can include information about common orders or relationships between steps, the number of instances of a particular order of steps, average time between steps, average time on a particular step, number of journey instances that started with a step instance that corresponds to that step, number of journey instances that ended with a step instance that corresponds to that step, number (and identification) of steps that occurred before or after that step for one or more journey instances, most/least common steps (and identification) that occurred before/after that step, number of journey instances that include a step instance that corresponds to that step more than once, number of journey instances that include a threshold number of step instances that correspond to that (or visited that step more or less than a particular number of times), number of journey instances that visited that include a step instance that corresponds to the step but does not include a step instance that corresponds to a particular different step, number of journey instances that include a step instance that corresponds to step directly before or after a particular step, any of the foregoing metrics applied to a number of journey instances or users that meet a particular attribute, etc.

4.5 Journey Visualizations

FIGS. 39A, 39B, 40A, 40B, 41, and 42 are diagrams illustrating an example user interface 3900 displaying embodiments of journey summarizations, which can include, but are not limited to visualizations of events, subsets of events, journey instances, journey models, or a listing of related events, journey instances, or journey models. In the illustrated embodiments of FIGS. 39A, 39B, 40A, 40B, and 41 the journey summarization corresponds to a visualization of one or more journey instances, clusters of journey instances, or one or more journey models 3908, 3910, 4002, 4006, and 4102, respectively. For simplicity, reference will be made to journey visualizations 3908, 3910, 4002, 4006, and 4102. In the illustrated embodiments of FIG. 42, the journey summarization corresponds to a listing of journey instances.

In the illustrated embodiments of FIGS. 39A, 39B, 40A, 40B, 41, and 42, the user interface 3900 includes a display area 3902, summarization selection objects 3904A, 3904B, 3904C, and control selection objects 3906A, 3906B, 3906C, 3906C, 3906D. In certain embodiments, the user can navigate to the user interface 3900 by selecting the Explore display object 3814, illustrated in FIG. 38. However, it will be understood that a user can navigate to the user interface 3900 using a variety of methods.

The summarization selection objects 3904A, 3904B, 3904C can be used to select a visualization for the summarization. Although only three summarization selection objects are shown, it will be understood that fewer or more summarization selection objects can be used to provide different visualizations for the summarization.

In certain embodiments, selection of the list summarization selection object 3904A can result in the display of one or more lists of events, journey instances, or journey models. In some embodiments, selection of the flow chart summarization selection object 3904B, can result in the display of one or more flow charts corresponding to one or more related events, journey instances, or journey models. Furthermore, in some cases, selection of the metrics summarization selection object 3904C can result in the display of a summarization that includes one or more metrics associated with the journey instances, events, or journey models generated by the data intake and query system 108, such as but not limited to a completion rate (number of percentage of journey instances or models that started with a particular step instance or step and ended with a particular step instance or step), time to completion (average time of the journey instances that were completed, average time for all journey instance, or a subset, etc.), or other analytics described herein. Accordingly, the summarization selection objects 3904A-3904C can be used to select various summarizations to aid a user in visualizing the journey instances or journey models generated from the events analyzed by the data intake and query system 108.

With reference to the illustrated embodiments of FIGS. 39A, 39B, 40A, 40B, and 41, the flowchart summarization selection object 3904B is selected, which results in the display of the journey visualizations 3908, 3910, 4002, 4006, 4102, respectively, in the display area 3902. In the illustrated embodiment of FIG. 42, the list summarization selection object 3904A is selected, which results in the display of a listing of the journey instances in the display area 3902.

4.6.1 Control Selection

The control selection objects 3906A-3906D can be used to select different controls for display in the summarization control area 3912. The displayed controls can be used to modify the summarization displayed in the display area 3902. Although only four control selection objects are shown, it will be understood that fewer or more control selection objects can be used to provide additional controls or to further modify the visualizations for the summarization.

In some embodiments, selection of the list steps control object 3906A can result in the summarization control area 3912 displaying the steps identified in one or more journey instances or one or more journey models. In certain embodiments, selection of the filter control object 3906B can result in the summarization control area 3912 displaying one or more controls that enable a user to set certain filters on the journey instances used to generate one or more journey models. In some cases, selection of the clustering control object 3906C can result in the summarization control area 3912 displaying one or more controls that enable a user to view journey models formed from similar journey instances, such as journey instances that include the same steps and/or the same order of steps, etc., or to view clusters of journey instances. In certain cases, selection of the settings control object 3906D can result in the summarization control area 3912 displaying one or more controls that enable a user to modify one or more settings of the journey instances, journey models, or data sources, whose events are used to generate the journey instances and models.

Using the controls displayed in the summarization control area 3912, a user can manipulate the view of the various journey instances generated by the data intake and query system 108. Further, based on the particular settings or controls selected from the summarization control area 3912, the data intake and query system 108 can generate and display one or more journey visualizations based on the journey instances that satisfy the conditions selected by the controls in the summarization control area 3912.

4.6.2 Journey Model Visualization

Figure 39A:
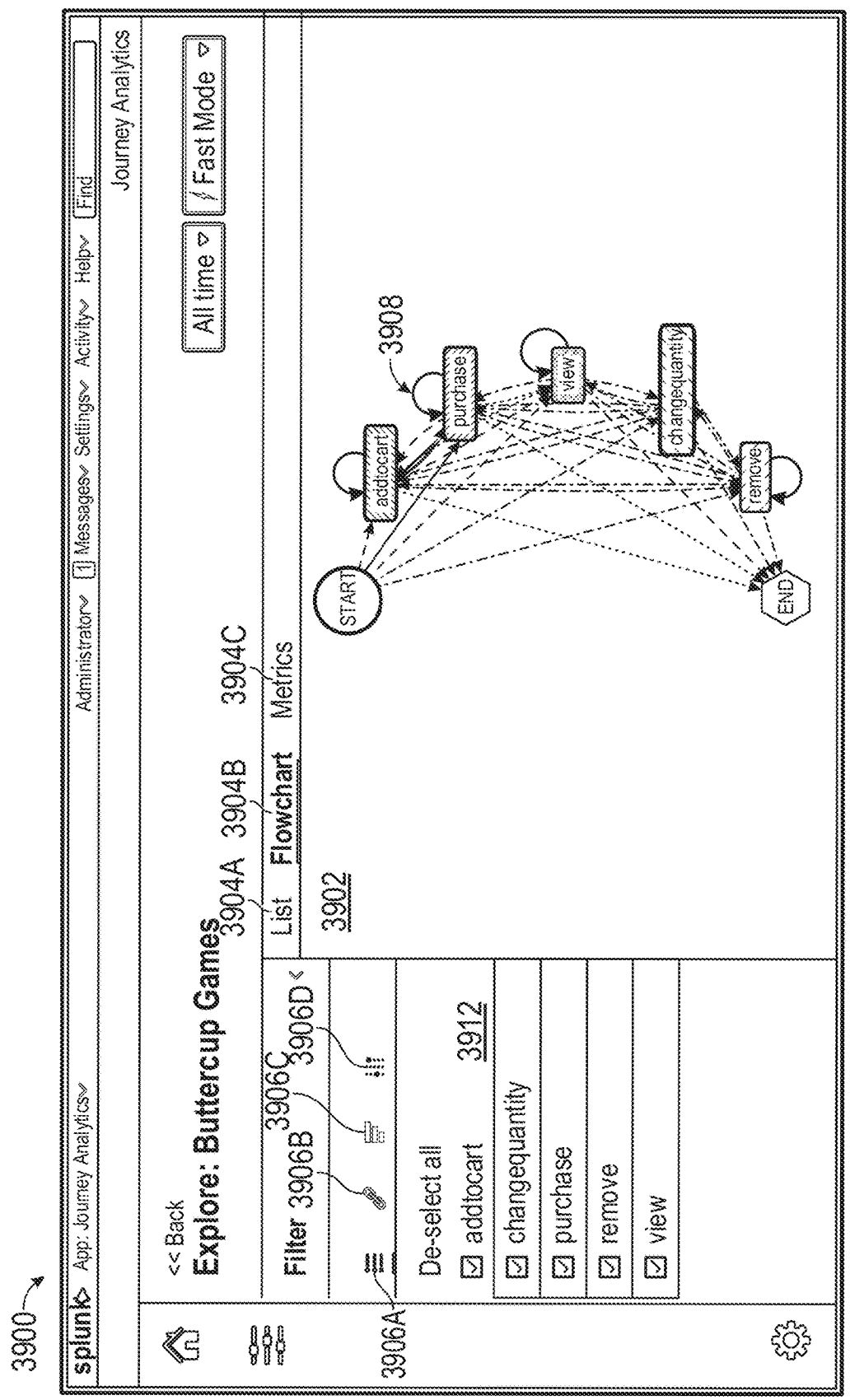
Figure 39B:
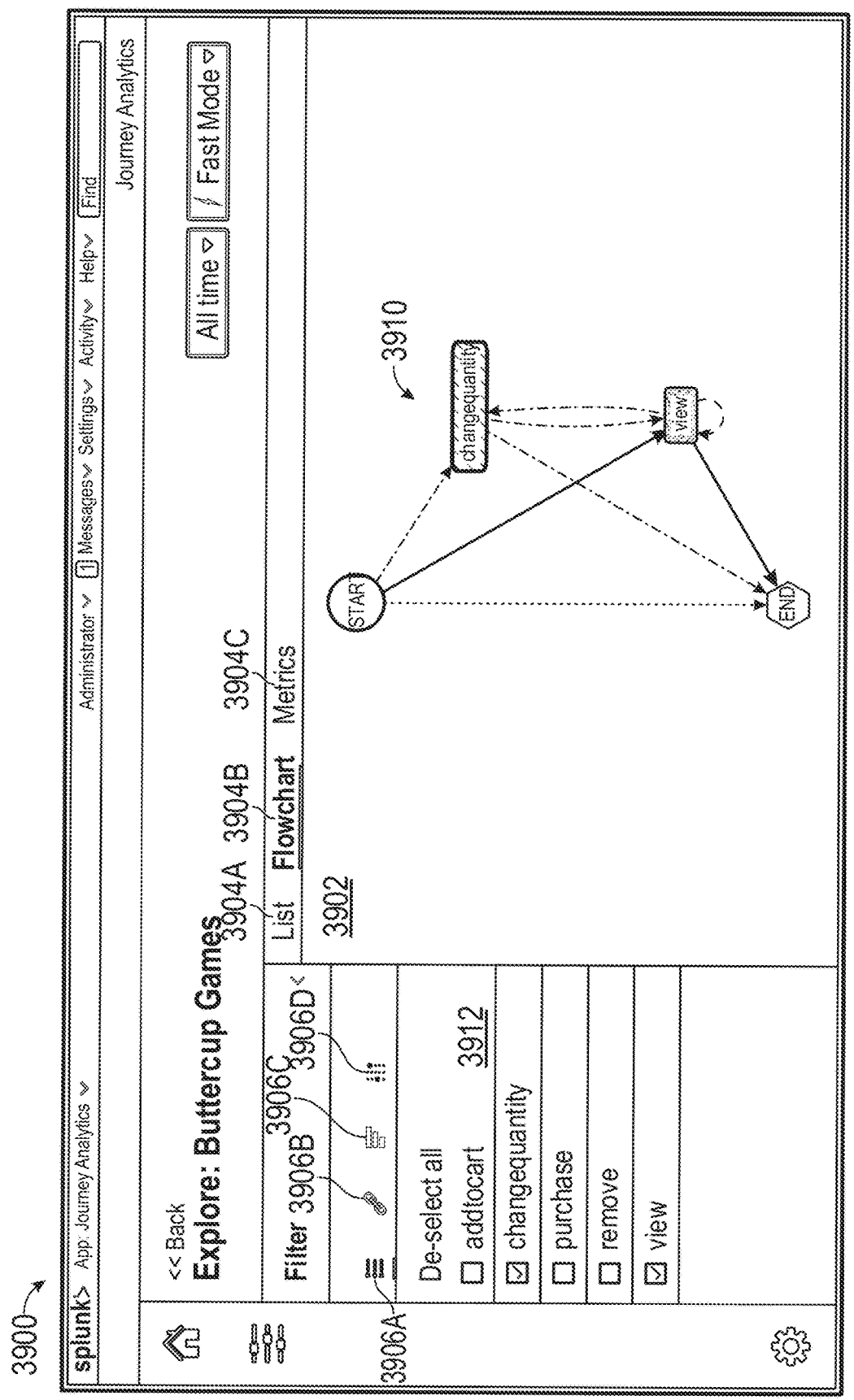

In the illustrated embodiment of FIGS. 39A and 39B, a list steps control object 3906A is selected, which results in the summarization control area 3912 displaying steps identified in the journey instances that correspond to the journey visualizations 3908, 3910 displayed in the display area 3902. In addition, the summarization control area 3912 enables the user to select or deselect certain steps. Based on the selected steps, the data intake and query system can generate a journey visualization 3908 that corresponds to journey instances or one or more journey models that include the selected steps. In some cases, the data intake and query system 108 can exclude any journey instances that include a deselected step from being used to generate the journey visualization.

In the illustrated embodiment of FIG. 39A, all displayed steps (e.g., addtocart, changequantity, purchase, remove, view) are selected. As a result, the journey visualization 3908 corresponds to the journey instances or journey model(s) that include any one of the displayed steps. However, it will be understood that that the system 108 can generate the journey visualization 3908 in a variety of ways. For example, in some embodiments, the system 108 can generate the journey visualization 3908 using only the journey instances or journey model(s) that include each and every step identified in the summarization control area 3912, etc.

In the illustrated embodiment of FIG. 39B, some of the displayed steps (addtocart, purchase, remove) are deselected. As a result, the journey visualization 3910 corresponds to journey instances or journey model(s) that include any one of the selected steps. As mentioned, in some embodiments, the system 108 excludes any journey instances or model(s) that include a deselected step from being used to generate the journey visualization 3910, even if the journey instance or model includes one or more of the selected steps. However, it will be understood that that the system 108 can generate the journey visualization 3908 in a variety of ways. For example, in some embodiments, the system 108 can generate the journey visualization 3908 using the journey instances or model(s) that include any one of the steps selected from the summarization control area 3912, etc.

In addition to the steps of the journey instances, the journey visualizations 3908, 3910 can include start/end nodes. The start/end nodes may or may not correspond to one or more step instances of a journey instance or steps of a journey model. In certain embodiments, the system 108 can use the start/end nodes to indicate which steps or step instances are first or last in a journey model or journey instance, respectively. For example, arrows from the start node can indicate which step or step instances is the first step or step instance of a journey model or journey instances, respectively (e.g., node corresponding to a step or step instance pointed to from the start node). Similarly, arrows to the end node can indicate which step or step instance is the last step or step instance of a journey model or journey instances, respectively (e.g., nodes corresponding to a step or step instance from which an arrow that points to the end node originate).

In the illustrated embodiments of FIGS. 39A and 39B, the journey visualizations 3908, 3910 are shown as a semi-circle or ring with the step nodes of the journey visualization being spaced along the arc of the semi-circle. In this way, the system 108 can make it easier to observe the various paths between the step nodes. In some cases, the system 108 can generate the visualization such that the step nodes are equally spaced along the arc of the semi-circle. In such embodiments, if additional step nodes are to be displayed, the system 108 can automatically arrange the step nodes along the arc. In some embodiments, the step node closest to the start node corresponds to the step that is most frequently identified as the first step or step instance of a journey model or journey instance, respectively. In certain embodiments, the step node closest to the start node corresponds to the step that is identified for being displayed in that location. Although, illustrated as a semi-circle or ring, it will be understood that the journey visualizations 3908, 3910 can be displayed in a variety of formats, such as a full circle, line, triangle, square, rectangle, or other shape, etc. In various implementations, the journey instances or model(s) may have their steps (or step instances) ordered by time, as previously discussed. In such implementations, the journey visualizations 3908, 3910, may roughly flow from an origin point to an ending point (e.g., top-to-bottom or bottom-to-top with top/bottom being earliest in time and bottom/top being latest in time, left-to-right or right-to-left with left/right being earliest in time and right/left being latest in time), however even within such an exemplary visualization, some steps may not follow that strict placement, e.g., to improve readability.

In some embodiments, individual steps that appear in more journey instances relative to other steps may appear along a first arc and steps that appear in fewer journey instances relative to other steps may appear along a second arc. In some embodiments the first or second arc can be closer to a "center" of the semi-circle, such that distance from the center in the visualization may roughly correspond to frequency of appearance of that step in the various journey instances. Those skilled in the art will appreciate that other, similar adaptations to the visualizations are also contemplated here. For example, more than three arcs can be used or different lines can be used. As another example, the system can use highlights, colorization, or patterns to indicate the frequency with which steps appear in step instances, etc.

With continued reference to the journey visualizations 3908, 3910, various relationships between the steps in the journey model or steps instances in the journey instances can be identified. For example, journey visualizations 3908, 3910 can include edges (e.g., lines, arrows, etc.) between different step nodes. The edges can indicate the traversal from one step to another step and/or identify which step preceded another step in a journey model (or step instances in a journey instance). In some embodiments, the system 108 can determine the traversal from one step or step instance to another step or step instance based on a timestamp associated with an event that corresponds to a step or step instance. For example, the system 108 can determine that a journey instance traversed from a purchase step instance to a view step instance based on a timestamp associated with an event that corresponds to the purchase step instance that immediately precedes (relative to any other steps in the journey instance) a timestamp associated with an event that corresponds to the view step instance. As shown in the illustrated embodiment of journey visualization 3908, in some instances a step node can be immediately preceded by the same type of step node, or steps may be repeatedly traversed as part of a journey model or instance.

In addition, characteristics of the edges of a journey visualization can indicate the frequency of a particular traversal or progression. For example, if a majority of journey instances indicate a traversal or progression from the addtocart step to the purchase step, and a minority of journey instances indicate a traversal from the addtocart step to the remove step, the journey visualization can indicate this relationship by making an arrow from the addtocart step node to the purchase step node more pronounced than an arrow from the addtocart step node to the remove step node. In some cases, the more pronounced edge can be thicker, darker, or have a different pattern (e.g., solid vs. dashed) or color than a less pronounced edge. As such, more pronounced edges between steps nodes can indicate a greater frequency of a particular traversal than less pronounced edges between step nodes.

It will be understood that the edges can be configured to convey information as desired. For example, less pronounced edges can indicate that a particular traversal is more common, etc. Accordingly, the journey visualization 3908 can communicate significant amounts of information to a user about the underlying events, data sources, and computing systems, including, but not limited to, the step instances of journey instances, steps of a journey model, order of steps/step instances, frequency of traversals between steps/step instances, starting steps/step instances and ending steps/step instances, etc. In other implementations, not shown here, numeric representations of information regarding the underlying events, e.g., the frequency of traversals between steps/step instances, may be shown within or in proximity to the various steps/step instances. In still other implementations, those numeric representations may be hidden until some interaction with the step node in the visualization, e.g., selection of that step node or zooming in on that step node.

It will be understood that the journey visualization can be displayed in a variety of ways. In some cases, more common steps can be shown as part of a first ring and less common steps can be shown as part of a second ring, such as an outer or inner ring relative to the first ring. In this way, the system 108 can communicate to a user a relationship between the various steps of the journey model. For example, the system 108 can identify steps that are found within a threshold number or percentage of journey instances as part of a first ring and identify steps that are not found within a threshold number or percentage of journey instances as part of a second ring. In some cases, the threshold number can vary depending on the total number of journey instances. In certain embodiments, the threshold number can depend on a percentile. For example, steps found in at least 30% of the journey instances can form part of a first ring and steps found in less than less than 30% of the journey instances can form part of a second ring. Additional rings can be used as desired.

In certain embodiments, sub-journeys or nested journeys can be displayed as part of a second ring. For example, if the step changequantity initiates a number of sub-processes or steps (also referred to as dependent steps), then the dependent steps can be shown as a loop next to the changequantity step. In this way, the journey visualization 3908 can indicate to a user steps related to nested journeys, etc. In some cases, the journey visualization can hide or group dependent steps together until a user interacts with the parent step (e.g., step that lead to or relates to the nested journey). With reference to the example above, based on an interaction of the user with the changequantity step node, the journey visualization can display step nodes corresponding to the dependent steps related to the changequantity step.

In some embodiments, the user interface 3900 can enable a user to move the steps of the journey visualization 3908 in order to more readily view relationships. For example, it may be difficult to see which steps precede other steps, but by moving a step, the connections thereto from different steps may become more visible.

4.6.3 Clusters of Journey Instances

Figure 40A:
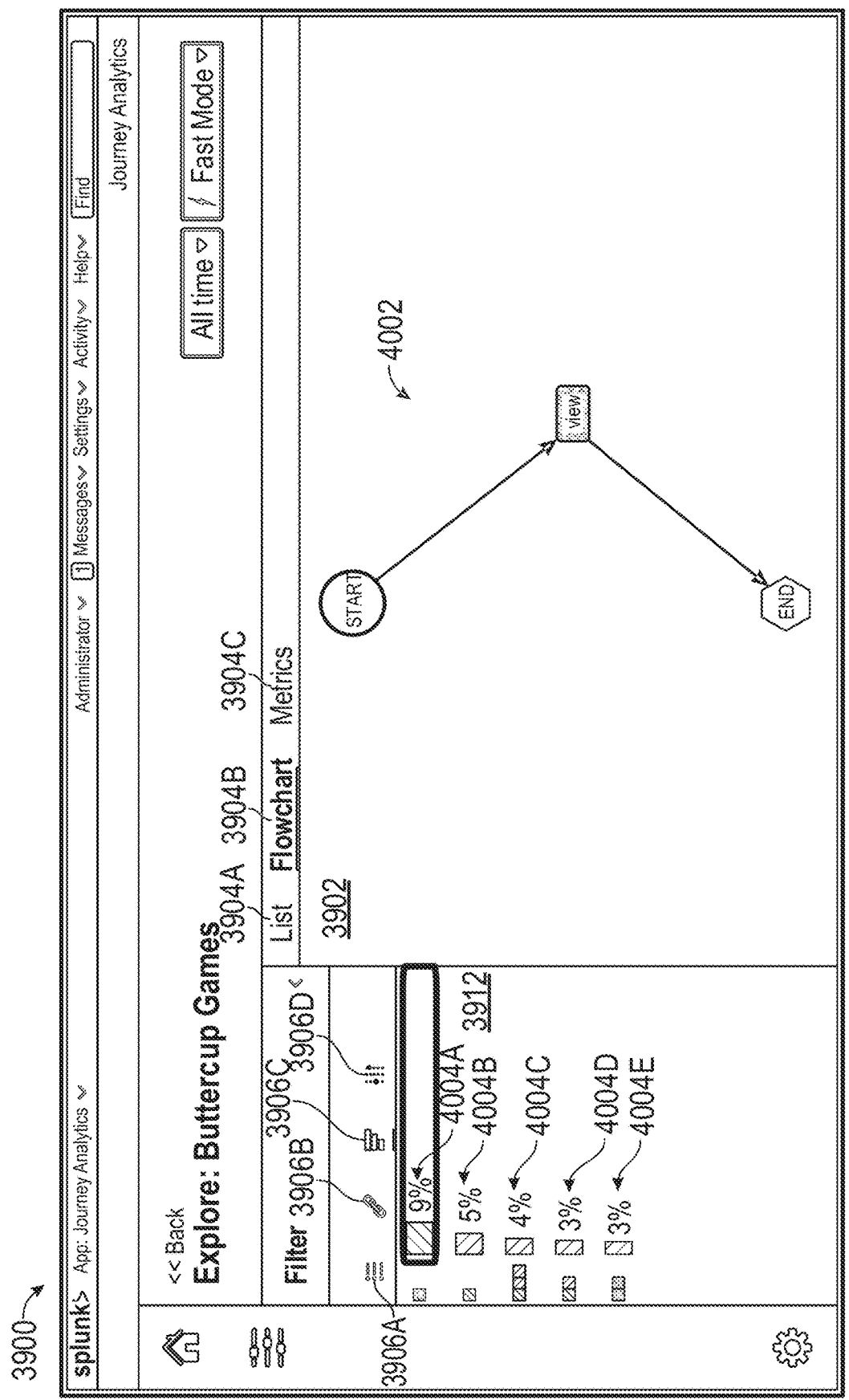
Figure 40B:
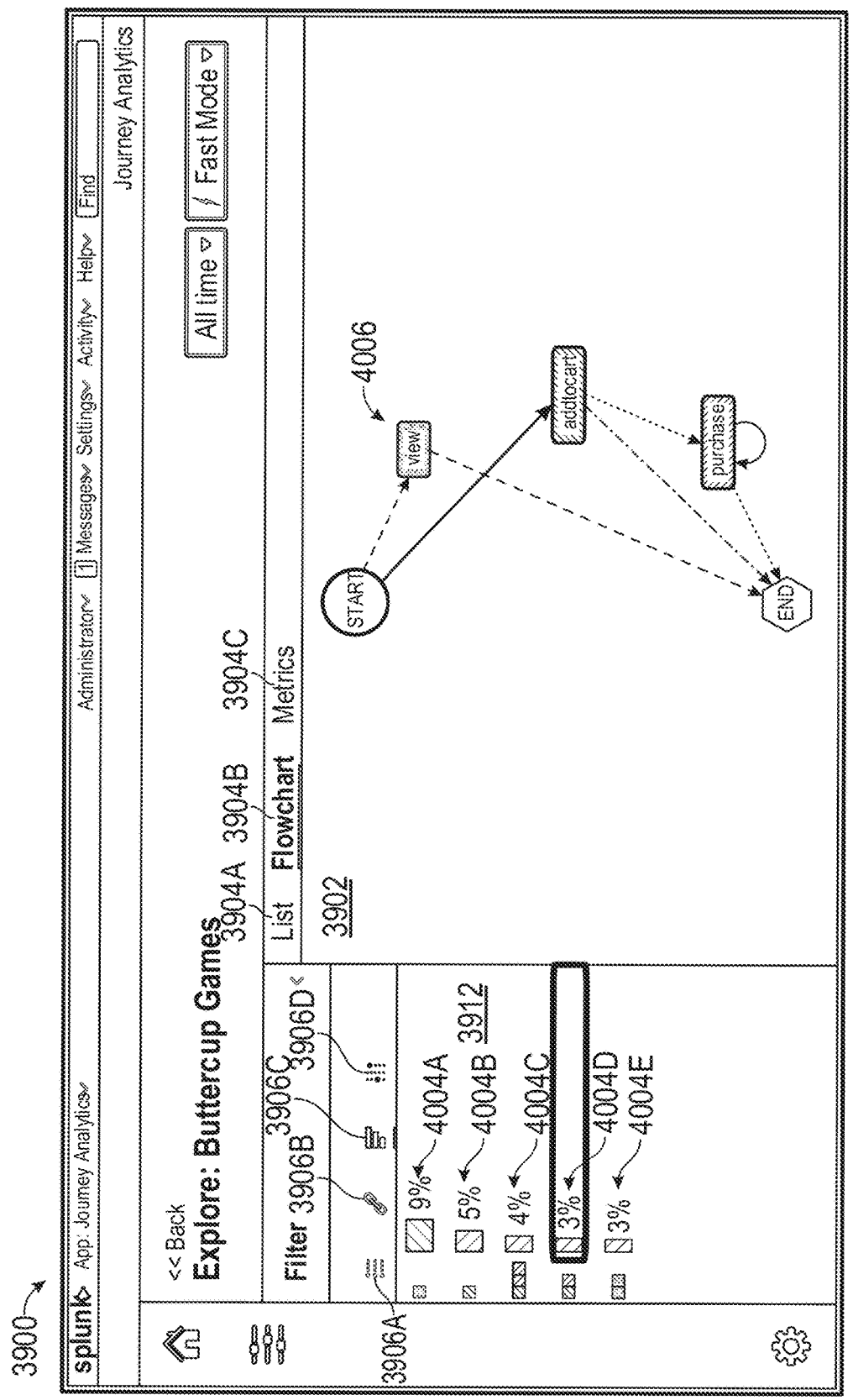

With reference to FIGS. 40A and 40B, a cluster control object 3906C is selected, which results in the summarization control area 3912 displaying information regarding various clusters of journey instances, and enabling a user to select the clusters as a journey visualization.

The clusters can correspond to one or more journey instances that include a particular grouping of steps and/or a particular order of steps. For example, some journey instances may include traversal through multiple steps, whereas other journey instances may include traversal through only one step. The data intake and query system 108 can analyze the identified journey instances to determine how many or what percentage of journey instances are similar. The data intake and query system 108 can group or cluster the similar journey instances together and provide information about the clusters to a user.

In the illustrated embodiments of FIGS. 40A and 40B, the data intake and query system 108 has identified multiple clusters of journey instances. Information about five of the identified clusters is displayed in the summarization control area 3912. The displayed information about the clusters 4004A-4004E can include an identification of the different clusters, analytics about the different clusters, and/or an indication of the steps included in the different clusters, etc.

In the illustrated embodiments of FIG. 40A, 40B, the displayed information about a first cluster 4004A indicates that the journey instances in that cluster make up 9% of the journey instances generated from the set of data, and further indicates that the first cluster includes a single step. Accordingly, the journey instances that form part of the first cluster include a step instance corresponding to the same step.

The displayed information about the third cluster 4004C indicates that the journey instances in the third cluster make up 4% of the journey instances generated from the set of data. The displayed information 4004C further indicates the steps identified in the journey instances of the third cluster, as well as an order of the steps. In some embodiments, the order of steps indicates the order of steps for all journey instances of the third cluster. In certain embodiments, the order of steps indicates a common or most common order of step instances for journey instances of the third cluster. Accordingly, in some embodiments, the journey instances that form part of the third cluster include step instances of the same steps, as well as the same order of steps. In certain embodiments, the journey instances that form part of the third cluster include the step instances of the same steps, but not necessarily the same order of steps.

In some embodiments, to indicate the steps and/or order of steps for journey instances of a particular cluster, the summarization control area 3912 can include an indicator, such as a graphic, name, etc., for each step. In certain cases, each distinct step can be uniquely identified, such as by color, shading, pattern, word, etc. Thus, by looking at the summarization control area 3912, a user can identify which steps are found in the journey instances of a particular cluster, and in some cases, the order of those steps. In the illustrated embodiment of FIG. 40A, the summarization control area 3912 includes a distinct box for each step. Further, the box is patterned after the box used for the step nodes in the journey visualization 4002.

Similarly, displayed information 4004B, 4004D, 4004E is included for the second, fourth, and fifth clusters, indicating a percentage of the journey instances that make the respective cluster and identifying at least the steps found in each cluster. It will be understood that the displayed information 4004A-4004E can include less or more information about the clusters. For example, the displayed information 4004A-4004E can indicate a total number of journey instances in each cluster, display information about each and every cluster, etc.

As mentioned, the user interface 3900 enables the user to select a cluster in order to display a journey model associated with the cluster. In the illustrated embodiment of FIG. 40A, the display information 4004A corresponding to the first cluster has been selected. In response, the user interface displays a journey visualization 4002 that corresponds to the selected cluster. In some embodiments, the data intake and query system 108 generates a journey model based on the selection of a cluster. In certain cases, the data intake and query system 108 can generate the journey model by combining the journey instances that form the cluster. As illustrated, the journey visualization 4002 includes a single step node "view." As such, a single arrow goes to the "view" step node from the start node and a single arrow goes to the end node from the "view" step node.

In the illustrated embodiment of FIG. 40B, the display information 4004D which corresponds to the fourth cluster is selected. In response, the system 108 aggregates the information about the clusters corresponding to display information 4004A-4004D and displays a journey visualization based on the aggregate information. For example, the journey visualization 4006 can demonstrate the various paths found in 21% (sum of journey instances of the first four clusters) of the journey instances generated from the set of data.

With reference to the illustrated embodiment, 9% of the journey instances include a "view" step instance, 5% of the journey instances include an "addtocart" step instance, 4% of the journey instances include "addtocart," "purchase," "purchase" step instances (in that order), and 3% include "addtocart," "purchase," step instances (in that order). Based on the selection of the display information 4004D, the system 108 generate and displays the journey visualization 4006 that shows the paths for the journey instances of the different clusters.

Further, as "addtocart" is the most frequent first step of the combined clusters (e.g., it makes up the first step in 12% of the journey instances or >50% of the selected journey instances), the system 108 includes an indication that "addtocart" is the most frequent first step using a solid line, whereas a dashed line to the "view" step node is used to indicate that the "view" step occurs less frequently as the first step. Similarly, the journey visualization 4006 uses different weights or patterns to indicate the frequency of transitions between the steps corresponding to the step nodes (other indications of frequency can be used as desired). As mentioned herein, in some cases, the journey visualization 4006 can include multiple arcs or paths and include more frequent steps on a first arc or path and less frequent steps on a second arc or path.

In some embodiments, the system 108 can use the clusters or selected clusters to generate one or more journey models (ordered or unordered). For example, the journey visualization 4006 can correspond to an unordered journey model that includes the steps "view," "addtocart," and "purchase." Thus, the journey visualization can illustrate the various paths that journey instances take through the steps of the unordered journey model.

In certain embodiments, the journey visualization 4006 can illustrate multiple ordered journey models. For example, the system can generate one journey model based on the first cluster of journey instances (ordered journey model with the sequence "view"), a second journey model based on the second cluster of journey instances (ordered journey model with the sequence "addtocart"), a third journey model based on the third cluster of journey instances (ordered journey model with the sequence of steps "addtocart," "purchase," "purchase"), and a fourth journey model based on the fourth cluster of journey instances (ordered journey model with the sequence of steps "addtocart," "purchase"). Thus, the journey visualization 4006 can illustrate the various paths of four journey models.

4.6.4 Filtering Journey Instances

Figure 41:
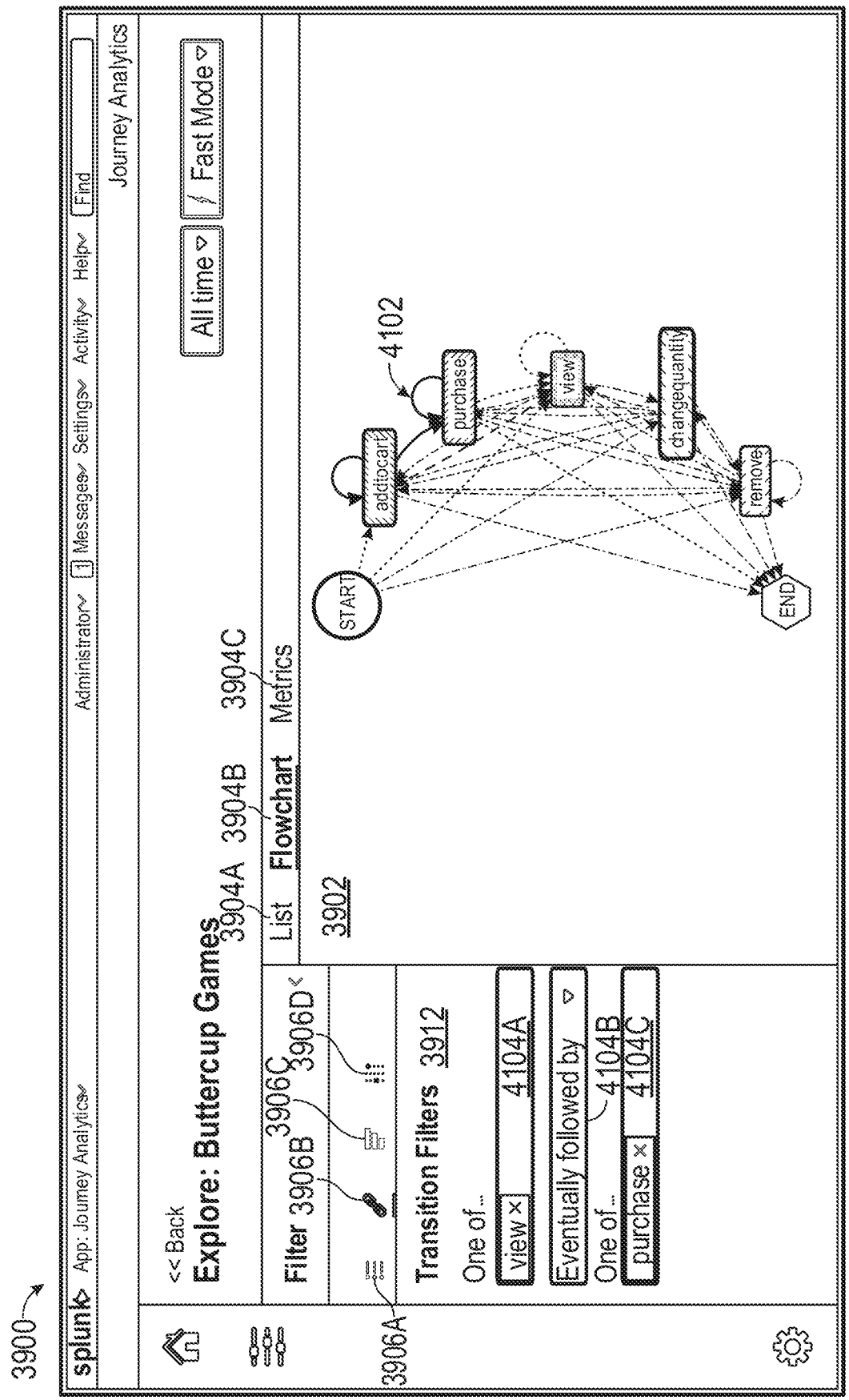

In the illustrated embodiment of FIG. 41, a filter control object 3906B is selected, which results in the summarization control area 3912 displaying various filter controls 4104A, 4104B, 4104C that enable a user to filter journey instances or models used to generate the journey visualization 4102. Although only three filter controls are shown, it will be understood that fewer or more filter controls can be included as desired.

The filter controls 4104A-4104C can be implemented as fields, drop-down menus, check boxes, etc., as desired. In the illustrated embodiment, the filter controls 4104A, 4104C are implemented as fields and the filter control 4104B is implemented as a drop-down menu.

The filter controls 4104A, 4104C can be used to identify one or more steps used to filter the journey instances or models. For example, in the illustrated embodiment of FIG. 41, the user has entered "view" and "purchase" to indicate that the journey instances or models are to be filtered based on some relationship between the view step and purchase step. In some embodiments, as a user types in the filter controls 4104A, 4104C, the data intake and query system can provide a list of the steps that can be selected. For example, as the user types "view," the user interface 3900 can display "purchase," "addtocart," "view," "changequantity," and "remove," to enable a user to identify the steps associated with the events/journey model.

The filter control 4104B can be used to identify the type of relationship between the selected steps that is to be used to filter the journey instances. In the illustrated embodiment of FIG. 41, the user has selected the relationship "eventually followed by," to indicate that the journey instances that include a "view" step instance (or journey models with a "view" step) that is eventually followed by (e.g., intervening steps are ok) a "purchase" step instance (or journey models with a "view" step) are to be used to generate the journey visualization 4102. It will be understood that additional or different controls can be used to identify a relationship between the steps identified in filter controls 4104A, 4104C. For example, the identified relationship can include, but is not limited to, "immediately followed by" or "immediately preceded by" indicating that a particular step is to immediately follow or precede another step with no intervening steps, "ends with" or "start with" indicating that a journey instance is to end or begin with a particular step, respectively, or "passes through" indicating that a journey instance is to include a particular step and/or the particular step is not to be found at the beginning or end of the journey instance. In some embodiments, the data intake and query system can filter out journey instances that do not satisfy the requirements of the filter controls 4104A-4104C. Additionally, multiple filters, or multi-step filters, although not pictured in the visualization of FIG. 41, can be used. For example, the filters could include a particular sequence of three or more steps/step instances, transition between steps/step instances within a threshold amount of time, etc. As such, the journey model and corresponding visualization 4102 can be formed from a subset of the total journey instances generated by the data intake and query system 108 from the set of data.

4.6.5 List Display of Journey Instances

Similar to FIG. 41, in the illustrated embodiment of FIG. 42, the filter control object 3906B is selected, which results in the summarization control area 3912 displaying various controls 4104A, 4104B, 4104C that enable a user to filter journey instances or journey models. As described in greater detail above with reference to FIG. 41, the filter controls 4104A-4104C can be used to filter journey instances for the display area 3902 and journey model.

However, differing from FIG. 41, in the illustrated embodiment of FIG. 42, the list summarization selection object 3904A is selected, which results in the display area 3912 displaying a listing of information related to journey instances that can be used to generate one or more journey models.

In the illustrated embodiment, the listing includes a pivot ID column 4202, start time column 4204, end time column 4206, total duration column 4208, event count column 4210, and a sequence column 4212, as well as journey instance rows 4214A-4214H (generically referred to as journey instance row 4214) for each journey instance. It will be understood that the information displayed can include fewer, more, or different information, as desired. For example, the information displayed can include, but is not limited to, an identification of similar journey instances or clusters of journey instances, etc.

The pivot ID column 4202 can identify the field value of the pivot ID field used to identify the journey instances. With reference to FIGS. 37A and 37B, it will be noted that some of the field values displayed in the pivot ID column 4202 correspond to some of the field values displayed in the field value preview section 3706 of FIGS. 37A and 37B. Further, as shown, each row in the pivot ID column 4202 includes a unique value. As discussed previously, the field values can be used to identify related events. In some embodiments, such as when multiple data sources are used, the pivot ID column 4202 can include the combination of field values from the different data sources used to generate a particular journey instance. In certain embodiments, when multiple data sources are used, multiple pivot ID columns 4202 can be included, with each column displaying a pivot ID associated with the particular journey instance.

The start time field 4204, end time column 4206, and total duration 4208, can indicate the start time, end time, and total duration, respectively, of a particular journey instance. The event count column 4210 can indicate the total number of events or step instances in a journey instance or total number of unique events or step instances in a journey instance. As mentioned, in some cases, some steps may be repeated in a journey instance (e.g., multiple step instances corresponding to the same step). Thus, the total number of events or step instances in a journey instance may be different from the total number of unique events or steps in a journey instance.

The sequence column 4212 can indicate a particular sequence of a journey instance. For example, the sequence column 4212 can identify the first and last steps or step instances of a journey instance, as well as the sequence of steps between the first and last steps. In some embodiments, each step can be uniquely identified, such as by, using a different color or pattern. For example, with reference to the steps identified on FIG. 39A, the "addtocart" step can be colored yellow, the "purchase" step can be colored maroon, the "view" step can be colored orange, the "changequantity" step can be colored gray. In such embodiments, the sequence column 4212 can use the unique identification of the steps to indicate the particular sequence between steps of a particular journey instance. For example, with reference to journey instance row 4214A, the sequence column can include an orange block, yellow block, and maroon block indicating that the sequence for the three events/steps in that journey instance was "view," "addtocart," and "purchase." Furthermore, in some embodiments, the sequence column 4212 can indicate whether certain steps are repeated within a particular journey instance, as illustrated in journey instance row 4214E.

It will be understood that a variety of user interfaces can be used to display journey visualizations in a myriad of ways. For example, it will be understood that any one of the user interfaces described above with reference to FIGS. 18 and 31-26 can be used to display the journey instances, clusters of journey instances, nested journey instances, or journey models generated by the data intake and query system 108.

4.7 Journey Instance and Model Flows

Figure 43:
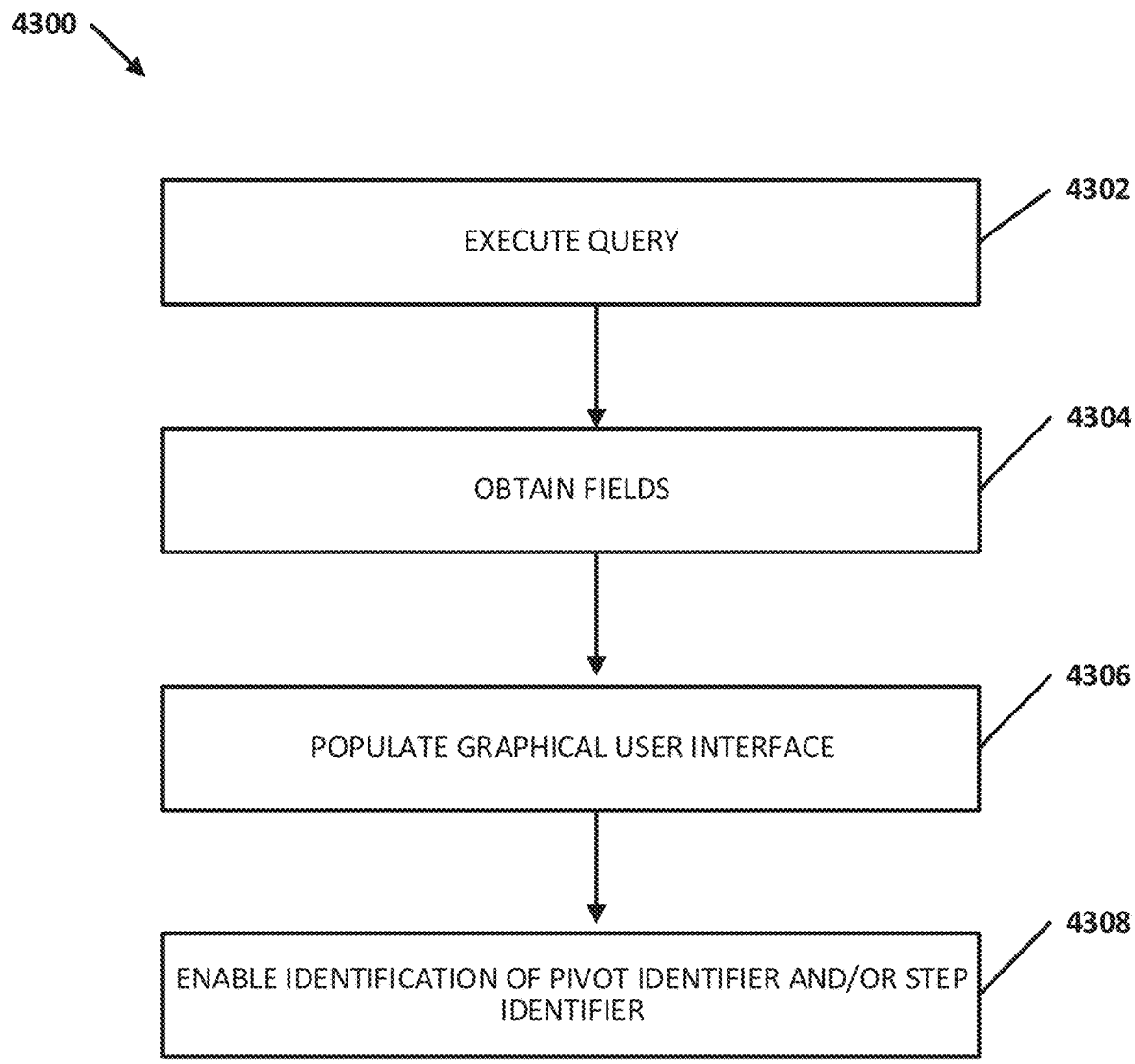
FIG. 43 is a flow diagram illustrating an embodiment of a routine for enabling identification of one or more pivot identifiers and/or one or more step identifiers.

FIG. 43 is a flow diagram illustrating an embodiment of a routine 4300 implemented by one or more computing devices in a networked computer environment 100 for enabling identification of one or more pivot identifiers and/or one or more step identifiers. For example, the routine 4300 can be implemented by a client device 102, host device 104, and/or any one, or any combination, of the components of the data intake and query system 108. However, for simplicity, reference below is made to the system 108 performing the various steps of the routine 4300.

At block 4302, the system executes a query. The query can include one more commands or filters to identify a set of data, which can include events. For example, the query can identify one or more time constraints or time ranges, one or more data sources, one or more fields or field values, etc. Based on the filters or commands in the query, the system can identify events that satisfy the filters or commands. For example, if the query identifies one or more data sources, the system can identify a set of data from the one or more data source and/or exclude data or events from data sources not identified by the query. Similarly, the system can, using the query, identify a set of data that satisfies one or more time constraints or ranges, or identify events with a particular field or field value. In some embodiments, the system can receive the query via one or more user interfaces. In certain embodiments, the query is in search processing language, or can be generated based on a selection of one or more icons in a user interface. In some embodiments the query can be based on a data stream identified by user. The data stream can include events from one or more data sources, etc.

As described herein, the events of the set of data can include raw machine data associated with a timestamp. In some embodiments, the events can be derived from or based on machine data and be associated with heterogeneous data source having heterogeneous formats. In certain embodiments, the events can include performance information for metrics information.

At block 4304, the system obtains or extracts fields. The fields can be obtained or extracted based on the set of data or the events in the set of data identified from the query. In some embodiments, the obtained fields can correspond to fields in the events or to fields associated with the events. For example, in some cases, the events themselves may not include fields or field identifiers. As a non-limiting example, the events may only include data and/or a timestamp or only include raw machine data associated with a timestamp. Accordingly, in some embodiments, fields related to the events can be obtained or extracted from one or more files associated with the events, such as one or more configuration files.

As described herein, the configuration files can relate to one or more data sources and identify field definitions for events associated with those data sources. For example, data coming from a particular source may have a particular format (and data from different source may have different heterogeneous formats), and field definitions in the configuration files, can identify how to extract field values for different fields from the data of a particular data source. Accordingly, based on an identification of the data sources associated with the set of data, the system can identify one or more configuration files. The system can then parse the configuration files to identify field definitions and field identifiers for fields associated with the set of data. In some cases, the system can identify the data sources associated with the set of data based on input received from a user or based on an analysis of the events and/or inverted or keyword indexes associated with the set of data.

Although described above with reference to using configuration files to obtain fields associated with the set of data, it will be understood that the system can identify the fields in a variety of ways. For example, the system can use a lookup table that relates events of a set of data to fields associated with the events or set of data. In some cases, the events or set of data can include the fields and the system can obtain the fields from the events or the set of data itself, etc.

At block 4306, the system populates a graphical user interface. As described herein, the system can generate and cause the display of a graphical user interface for a user. Some non-limiting examples of graphical user interfaces that can be generated are described herein with reference to FIGS. 37A and 37B. As described herein, the user interface can include various sections. For example, the user interface can include a data source section, a field identifier section, a preview field value section, etc.

In certain embodiments, the data source section of the user interface can include identifiers for data source(s) and/or stream(s) associated with the set of data or events. In some cases, the system interface can enable a user to add new data sources or data streams. Further, in certain cases, upon selection of a particular data source or stream, the user interface can update the field identifier section to identify fields associated with data from the selected data source, etc.

In some embodiments, a field identifier section of the user interface can include field identifiers that correspond to the fields associated with the set of data. As described herein, the field identifiers can be associated with the data sources related to the set of data. Further, the user interface can include one or more interface objects to enable the selection of the field identifiers by a user. For example, the user interface can include checkboxes, drop down menus, fillable fields, etc.

In some embodiments, the preview field value section of the user interface can identify field values associated with one or more of the field identifier in the field identifier section. In some cases, the user interface can include field values corresponding to a field identifier selected from the field identifier section. In certain embodiments, the preview field value section can also include a count for each field value displayed therein indicating the number of events that include the respective field value.

The system can identify the field values for the preview field value section in a variety of ways. In some embodiments, the system can identify the field values based on an analysis of the set of data. For example, the system can parse events in the set of data to identify field values found therein. In some embodiments, the system can analyze a subset of the set of data or a subset of the events and identify the field values found in the subset of data or events. As the system analyzes the set of data or events, it can update the preview field value section with additional field values or updated counts, etc.

In certain embodiments the system can identify the field values based on one or more inverted or keyword indexes associated with the set of data or events. As discussed in greater detail herein, the system can include one or more inverted or keyword indexes that identify field-value pairs for data and/or events processed or stored by the system. Specifically, the inverted or keyword indexes can identify particular fields for the data and/or events, as well as field values in the data and/or events that correspond to the fields. The inverted or keyword indexes can also identify which events have a particular field-value pair.

Accordingly, using the identification of the events from the set of data, the system can analyze one or more inverted or keyword indexes that includes information about the events from the set of data to identify field values for the preview field value section. Specifically, the system can identify the inverted or keyword indexes that include field-value pair entries that identify the events of the set of data. For each event identified as part of a field-value pair entry, the system can ascertain the field value for the event from the field-value pair of the field-value pair entry. The identified field values can then be added to the preview field value section of the user interface.

Furthermore, in some cases, the system can use the inverted or keyword indexes to execute the query. As such, during the execution of the query, the system can identify the inverted or keyword indexes used to execute the query and refer back to them to identify the field values for the preview field value section.

The user interface can include additional graphical indicators as desired. In some cases, the user interface can indicate the number of fields identified as a pivot identifier, step identifier, attribute, etc. Further, the user interface can provide graphical indicators that enable a user to enter a query or one or more commands for the query, etc.

At block 4308, the system enables identification of one or more pivot identifiers and one or more step identifiers. For example, via the user interface, the system can enable a user to identify one or more pivot identifiers and/or one or more step identifiers used to process the set of data or events.

As described herein, the pivot identifiers can be used to relate different events or generate or build sets of events. In some cases, one or more events are related based on a pivot identifier to form at least part of a journey instance. In some cases, the system enables identification of one or more pivot identifiers based one or more drop down menus, check boxes, fillable fields, etc. For example, the user interface can enable a user to identify a particular field identifier (and its corresponding field) from the field identifier section as a pivot identifier.

Further, in certain embodiments the system suggests certain fields as possible field identifiers. In some cases, the system suggests fields based on a name or identifier for that field, the frequency with which it appears in the set of data, or the field values of a field. For example, the system can identify the fields associated with the set of data and identified names or field identifiers that have been used in the past as a pivot identifier.

In certain cases, the system can determine that fields like "sessionID," "userID," or others that appear to indicate an identifier are frequently used as pivot identifiers. As such, the system can use fuzzy logic to suggest fields with a name or identifier that is the same as or similar to fields used for pivot identifiers in the past, fields identified in the system as ID fields, or fields identified in the system as useful fields for identifying related events.

In some cases, the system can identify the top 10, 50, or 100, etc. field identifiers frequently used as a pivot identifier. The system can then use fuzzy logic to compare the identified top field identifiers with the field identifiers associated with the set of data. Field identifiers associated with the set of data that are similar to or match the top field identifiers can be suggested for use as a pivot identifier. In some cases, the system can make suggestions based on the user. For example, the system can identify the top 10, 50, or 100, etc. field identifiers typically selected by a particular user and suggest a field identifier associated with the set of data based on the identified top field identifiers of the user as described above.

In some embodiments, the system can suggest a field identifier based on its frequency within the set of data. For example, the system can identify the fields that are found in the most, least, or threshold number events of the set of data and suggest those fields as pivot identifiers.

In certain embodiments, the system can suggest field identifiers based on the field values of the field. In some cases, if the system determines that the number of unique field values for a particular field satisfies a threshold number, then the system can recommend the field as a pivot identifier. For example, if the system determines that from a set of 1,000 events there are one hundred unique field values, then the system may recommend the field as a pivot ID. However, if the system determines that there are 950 unique field values for the set of 1,000 events, the system may determine not to suggest the field as a pivot identifier. However, it will be understood that the threshold for the number of unique field values or whether to recommend fields based on the fields being greater than or less then the threshold can be adjusted as desired.

In some embodiments, the system can determine the threshold based on a percentage of the events in the set of data. For example, the system can determine that for every 5, 10, or 20 events there should be a unique field value (e.g., the number of unique field values divided by the total number of events should be 5%, 10%, or 20%). Fields that have a quantity of unique field values that are closer to the threshold or target can be given a higher ranking and be more likely to be suggested by the system as potential pivot identifiers than fields that have a quantity of unique field values that are farther away from the threshold or target.

Similarly, if the system determines that the number of events that have the same field value satisfies a threshold, then the system can recommend the field as a pivot identifier. For example, if one field value is found in 50% of the events, then the system may rate the field lower than for a set of events that has a field value in <1%, 2%, or 5% of the events. Accordingly, the system can use information about the set of data itself and/or the user to suggest pivot identifiers.

In certain embodiments, the system can rank fields based on one or more criteria to determine which fields to suggest as pivot identifiers. As described above, the criteria can be based on any one or any combination of field name or identifier, field frequency in the set of data, number of unique field values, etc.

In certain embodiments, the step identifiers can be used to categorize the different events or group sets of events into subsets of events. For example, the system can use the step identifiers to group events into a particular step or step instance. In some cases, events similarly categorized based on a step identifier can correspond to the same step of a journey model, but may relate to different journey instances, e.g., because one or more field values identified as pivot IDs are not the same, or because other fields, field values, or other data is not the same. In some cases, the system enables identification of one or more step identifiers based one or more drop down menus, check boxes, fillable fields, etc. For example, the user interface can enable a user to identify a particular field identifier (and its corresponding field) from the field identifier section as a step identifier.

In some embodiments, the system can use all of the unique field values of the field that corresponds to the step identifier (or step ID field) as different steps. In certain embodiments, the system can enable a user to deselect one or more field values as steps. In such embodiments, events that include a deselected field value may not be included as part of journey models or instances even though they include a field value for the step ID field. In this way a user can identify the field values that are relevant for grouping and categorizing the events.

Similar to the pivot identifiers, the system can suggest one or more step identifiers. As discussed above, the system can suggest fields as step identifiers based on field identifiers, number of unique field values, and/or number of events that have a particular field value. However, in some embodiments, the thresholds for suggesting fields as step identifiers may be different than for suggesting fields as pivot identifiers. In some cases, the threshold for number of unique field values may be higher than the threshold for the number of unique field values for a pivot ID field (or vice versa). Similarly, in certain cases, the threshold for the number of number of events with the same field value for a step ID may be lower than the threshold for the number of number of events with the same field value for a pivot ID (or vice versa). For example, it may be desirable to have fewer unique steps compared to the number of unique journey instances (or vice versa).

Further, in some embodiments, the system can compare the number of unique field values for the step ID field with the number of unique field values for the pivot ID field and make suggestions accordingly. For example, if the number of unique field values for the step ID field is greater than the number of unique values for the pivot ID field (or vice versa), the system can suggest that either the pivot ID or step ID be changed. It will be understood that the system can use a variety of techniques to suggest fields as pivot IDs, step IDs, and the like.

The system can use fewer, more, or different blocks as part of routine 4300, or perform the blocks of routine 4300 in a different order or concurrently. For example, in some embodiments, the system may not generate a graphical user interface. In such embodiments, a user can communicate selections of step identifier(s) or pivot identifier(s) via email, command line, etc. Further, any of the steps described herein with reference to routine 4300 can be combined with one or more steps described herein with reference to routines 4400 and 4500.

In certain embodiments, the user interface can enable a user to select fields for attributes, enter a query, enter filters for the query, etc. In some embodiments, based on a selection of a field as an attribute, the system can track the field values for the identified field in each event and display commands for the user to filter, sort, or process journey instances based on the attribute field.

In some embodiments, the system can use the identified pivot identifier(s) and step identifier(s) to generate or build sets or subsets of events, journey instances, clusters of journey instances, and/or journey models. For example, the system can use the pivot identifiers to identify events that are part of a particular journey instance and use the step identifier(s) to group the events into subsets of events or as step instances of the journey instance. As another example, the system can use the step identifiers to identify steps of an unordered journey model, and use the pivot identifiers to identify an ordered journey model.

Furthermore, in certain embodiments, the system can generate visualizations based on the identified pivot identifier(s) and step identifier(s). For example, the system can build sets of events, subsets of events, journey models, and/or journey instances, and display visualizations of them, as described in greater detail herein. Further, the visualizations can include indications of an ordering of, transitions between, or progression through, step instances of one or more journey instances or steps of a journey model.

Figure 44:
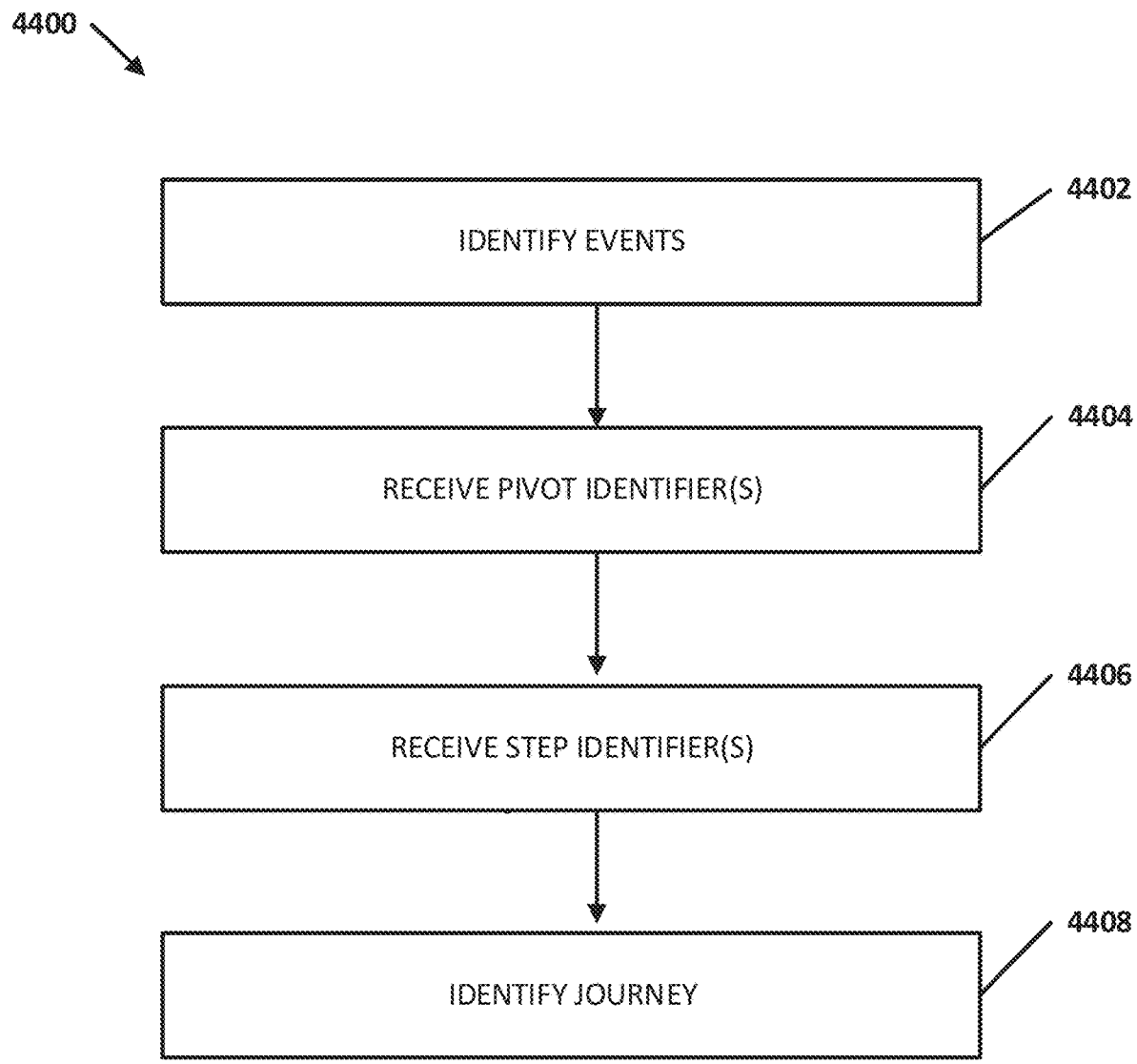
FIG. 44 is a flow diagram illustrating an embodiment of a routine for generating a journey instance or model.

FIG. 44 is a flow diagram illustrating an embodiment of a routine 4400 implemented by one or more computing devices in a networked computer environment 100 for generating a journey instance or model. For example, the routine 4400 can be implemented by a client device 102, host device 104, and/or any one, or an combination, of the components of the data intake and query system 108. However, for simplicity, reference below is made to the system 108 performing the various steps of the routine 4400.

At block 4402, the system identifies a set of data, which can include events. As described herein the system can identify the set of data based on the execution of a query as described in greater detail above at least with reference to block 4302 of FIG. 43.

At block 4404, the system receives one or more pivot identifiers. As described herein, in some embodiments, the system can receive one or more pivot identifiers via a user interface. However, it will be understood that the system can receive the pivot identifier in a variety of ways. The pivot identifier(s) can be used to relate, identify, or otherwise associate sets of events. As described herein, in some cases, the pivot identifier can correspond to a field associated with the set of data or events of the set of data. The system can use the field, or pivot ID field, to identify the sets of events. For example, the system can relate events with the same field value for the pivot ID field as a set of events.

In some embodiments, the system can identify a set of events based on multiple pivot identifiers. In some cases, the set of events identified based on multiple pivot identifiers can correspond to events from multiple data sources. For example, the system can identify a first group of events from a first data source that have a first field value for a first pivot ID field and the second group of events from second data source that have a second field value for the second pivot ID field. Based on one or more gluing events that include the first field value and the second field value, the system can identify a relationship between the first field value and the second field value. Based on the identified relationship between the first field value and the second field value, the system can relate the first group of events and the second group of events as a set of events. In some embodiments, multiple gluing events in a particular data source can be used to relate events that do not have a gluing event in common or are not otherwise relatable. For example, a first gluing event can be used to relate events in Group A and Group B and a second gluing event can be used to relate events in Group B and Group C. As such, events in Group A and Group C can be related without a gluing event that links them directly. The different groups of events may correspond to events from the same, similar, or heterogeneous data sources.

In some cases, the one or more gluing events can be found in the first group of events or the second group of events. Further, in some instances, a gluing event may have the first field value in a location corresponding to the first field, and may have the second field value in a location that does not correspond to the second field (or may not have the second field). Accordingly, in some instances, the system can perform a search on the event or consult a keyword entry of an inverted or keyword index to identify the second field value in the gluing event.

In certain cases, multiple pivot identifiers can be used to identify a set of events and a nested set of events that are interrelated. For example, the system can identify a first group of events that have a first field value for a first pivot ID field and a second group of events that have a second field value for a second pivot ID field. In some cases, events in the first group may also have the second field value for the second pivot ID field and/or events in the second group may also have the first field value for the first pivot ID field. Further, the events in the first group and the events in the second group may be associated with the same data source.

In some cases, the events of the second group may occur as a result of the occurrence of an event in the first group. For example the occurrence of a particular event may spawn one or more sub processes that results in one or more events (also referred to as dependent events), which can be identified using a separate pivot ID. The dependent events may or may not include the same field value for the first pivot ID field, and may also share the same field value for a different pivot ID field.

Based on one or more gluing events that include the first field value and the second field value, the system can identify relationship between the first field value and second field value. Based on the identified relationship, the system can relate the first group of events with the second group of events as a set of events. Further, based on an identification of a relationship between the dependent events and the parent event, the system can determine that the second group of events corresponds to a nested set of events or a nested journey instance.

At block 4406, the system receives one or more step identifiers. As described herein, in some embodiments, the system can receive one or more step identifiers via a user interface. However, it will be understood that the system can receive the step identifier in a variety of ways.

The step identifier(s) can be used to categorize events as one or more steps or step instances and/or group the sets of events as one or more subsets of events. As described herein, in some cases, the step identifier can correspond to a field associated with the set of data or events. The system can use the field to categorize the events and/or group events in a set of events into one or more subsets of events. In some cases, the system can use the step identifier to identify a journey model or to identify steps of a journey model. In certain embodiments, the identified steps can form an unordered journey model. Further, in some cases, based on user input or based on one or more journey instances, the system can build an ordered journey model from the unordered journey model.

As described herein, in some cases, the field values of the step ID field can be used to identify events as steps or step instances. In some embodiments, each unique field value of a step ID field can be identified as a separate step. In certain embodiments, a subset of the field values of the step ID field can be identified as separate steps. For example, a step ID field may have twenty unique field values, but the system may use fewer than the twenty unique field values to identify different steps or step instances. As described herein, in some cases, the system can exclude certain field values of the step ID field for use as steps based on input received from a user or based on an analysis of the field values of the step ID field.

As described herein, in certain embodiments, the system can use multiple step identifiers to categorize events and/or group events in a set of events into subsets of events. For example, as described above with reference to pivot identifiers, multiple step identifiers can be used to group sets of events that come from multiple data sources into subsets of events. For example, in some cases, the system can receive a step identifier for each data source. In this way, the system can identify a field in events from each data source to categorize the events from the data source. In certain embodiments, one step identifier can be used for multiple data sources. For example, fields from different data sources used to categorize the events into steps can have the same or a similar field identifier. In such embodiments, the step identifier can identify the common field between the different data sources as the step ID field.

Further, similar to the pivot identifiers, the system can receive multiple step identifiers for a particular data source. In such embodiments, the system can use the step identifiers to identify events that are part of a nested set of events or nested journey instance. For example, events that are part of a nested set of events can include a different field that can be used to categorize them apart from the field used to categorize other steps that are part of the set of events. Accordingly, using a first step ID field to categorize events in the set of events and a second step ID field to categorize events in the nested set of events, the system can identify the events in a journey instance, as well as the events in a nested journey instance.

In some cases, the system can group multiple events together as part of the same step. Thus, a subset of the events of a journey instance can include one or more events. For example, if the system determines that multiple events are related to a "purchase" action, the system can group the events together as part of a "purchase" step. In some cases, the system can determine that multiple events are part of the same step based on the one or more pivot ID fields, step ID fields, or timestamps. For example, the multiple events related to the "purchase" step may all have the "purchase" as the field value for the step ID field, may all have a field value for the pivot ID field that matches the other events in the journey instance, and/or may all have iterative timestamps (e.g., no other events of the set of events fall between the events related to the "purchase" action). However, the events grouped together as part of the "purchase" step may have a field value for a second pivot ID field that matches each other. In this way, the system can identify the events as part of the journey instance and also group them together as part of a subset of steps or a single step.

Further, in some cases, the system can determine that a particular step has not occurred until a certain events are observed. With reference to the example above, the system can determine that a "purchase" action is not complete until it receives three events with particular step IDs. Accordingly, the system can group the three events as a subset of events or a step instance.

At block 4408, the system identifies or builds a journey. The journey can correspond to one or more journey instances and/or one or more journey models. As described herein, the system can identify journey instances and journey models in a variety of ways.

In some cases, to identify a journey instance, the system identifies a set of events based on the one or more pivot identifiers, groups the set of events into one or more subsets of events based on the one or more step identifiers, and orders the subset of events. In certain cases, the system identifies step instances or subsets of events from a set of data based on the one or more step identifiers, and then relates the step instances or subset of events based on the one or more pivot identifiers. Accordingly, in certain embodiments, the pivot identifier(s) are used to identify related events or set of events and the step identifier(s) are used to categorize the related events into step instances or subsets of events.

In addition, as described herein the subset of events or step instances can be ordered based on a timestamp or other information associated with the events. The system can order the events before, after, or concurrently with identifying the related events or sets of data and identifying the step instances or subsets of events.

In some cases, the set of events can be based on the step identifier. For example, if an event includes a field value for a pivot ID field, but does not include a step ID field, field value for a step ID field, or includes an excluded field value for the step ID field, the system can exclude the event from the set of events.

As described herein, in some embodiments, events in a journey instance include a common field value or have the same field value for a field associated with or identified by a pivot identifier. Furthermore, when multiple journey instances are generated, each journey instance can correspond to a unique field value for the pivot ID field.

In certain embodiments, such as when multiple pivot identifiers are used, events in a journey instance can include at least one field value from a group of related field values. Each of the field values in the group of related field values can be associated with a different pivot identifier. In some cases, the system can use one or more gluing events to identify and form the group of related field values.

As described herein, in some instances, multiple events may correspond to a subset of events or a single step instance. For example, multiple events may be generated for a single action, such as a purchase. The system can identify the events generated for the single action and group them together as a subset of events or a step instance. In some embodiments, these related events may correspond to a nested journey instance.

As mentioned above, the system can categorize an event as any one of a plurality of steps or a step instance. In some cases, the system can determine the number of steps for a set of data based on a field associated with a step identifier. In some cases, each unique field value for the field associated with the step identifier can be identified as a step. In certain cases, as described herein, a subset of the unique field values of the step ID field can be identified as a step. Based on the field value for the step ID field in the event, the system can identify an event or subset of events as a particular step instance.

As discussed, as part of generating a journey instance, the system can identify an ordering of the subset of events or step instances. In some cases, the ordering can be based on a timestamp associated with each event or step instance. For example, the step instance with the earliest-in-time timestamp can be identified as the first step instance in the journey instance and the step instance with the latest-in-time time stamp can be identified as the last step instance in the journey instance, and so on. The ordered related events, ordered subset of events, or ordered steps instances can correspond to a journey instance.

Similarly, the system can identify a progression through the set of events, subset of events, or step instances based on the time stamp. For example, if a timestamp of Event1 is :33 and the timestamp of a Event2 is :56, and there are no events in the set of events with a timestamp between :33 and :56, the system can determine that the journey instance progressed from Event1 to Event2. However, if the timestamp of Event10 is :45 (and no other events between :33 and :56), then the system can determine that the journey instance progressed from Event1 to Event10 to Event2.

In addition to journey instances, the system can also generate one or more journey models. The journey models can include ordered journey models or unordered journey models. An ordered journey model can correspond to a certain number of steps in a particular order, and an unordered journey model can correspond to a certain number of steps without any particular order. Accordingly, in some embodiments a journey instance can be a representation or an example of an ordered or unordered journey model.

In some embodiments, the journey models can be built or generated based one or more journey instances or one or more ordered subsets of events. For example, one or more journey instances that include the same steps and the same order of steps can be combined to form an ordered journey model. Similarly journey instances that include the same steps but in different orders can be combined to form an unordered journey model. Furthermore, in some cases multiple journey instances with different steps and different orders of steps can be combined to form a journey model. For example, the system can identify steps for a journey model based on the different step instances used to form the journey model. The system can also identify journey instances that follow different paths through the steps of the journey model. The journey model generated from the journey instances can show all of the different paths through the identified steps of the journey model. In such embodiments, the various journey instances may have different steps and different orders of those steps, however, each journey instance can traverse through at least one step of the journey model.

In certain embodiments, a journey model can be built based on field values of one or more step ID fields. For example, the system can identify one or more field values of a step ID field as steps of an unordered journey model. In some cases, the system can generate an ordered journey model from the unordered model based on one or more timestamps, one or more pivot identifiers, and/or one or more journey instances or sets of events.

The system can use fewer, more, or different blocks as part of routine 4400, or perform the blocks of routine 4400 in a different order or concurrently. For example, the routine 4400 can include a block between blocks 4404 and 4406 for generating or building a set of events and/or include a block between blocks 4406 and 4408 for grouping the set of events into one or more subset of events. Further, any of the steps described herein with reference to routine 4400 can be combined with one or more steps described herein with reference to routines 4300 and 4500.

In some embodiments, as part of routine 4400, the system can identify clusters of journey instances. Each cluster of journey instances can correspond to journey instances that follow the same path through the same steps. In some embodiments, a cluster of journey instances can correspond to an ordered journey model.

In certain embodiments, the system can generate one or more journeys without the one or more step identifiers. For example, based on the one or more pivot identifiers the system can identify related events, which can correspond to a journey instance. Further, in such embodiments, the system can order the events in the journey instance based on a timestamp associated with each event of the journey instance.

In some embodiments, the system can generate one or more journeys without the one or more pivot identifiers. For example, based on the one or more step identifiers the system can categorize the events of the set of data, which can correspond to a journey model. Accordingly, based on the one or more pivot identifiers, the system can identify the steps of a journey model.

In certain embodiments, as part of routine 4400, the system can generate and display visualizations of the journeys. As mentioned, the journeys can correspond to journey instances or journey models. Accordingly, the system can generate and display visualizations of one or more journey instances and/or one or more journey models. Furthermore, the visualizations can identify progressions through the set of events, subset of events, journey instances, or journey models.

Figure 45:
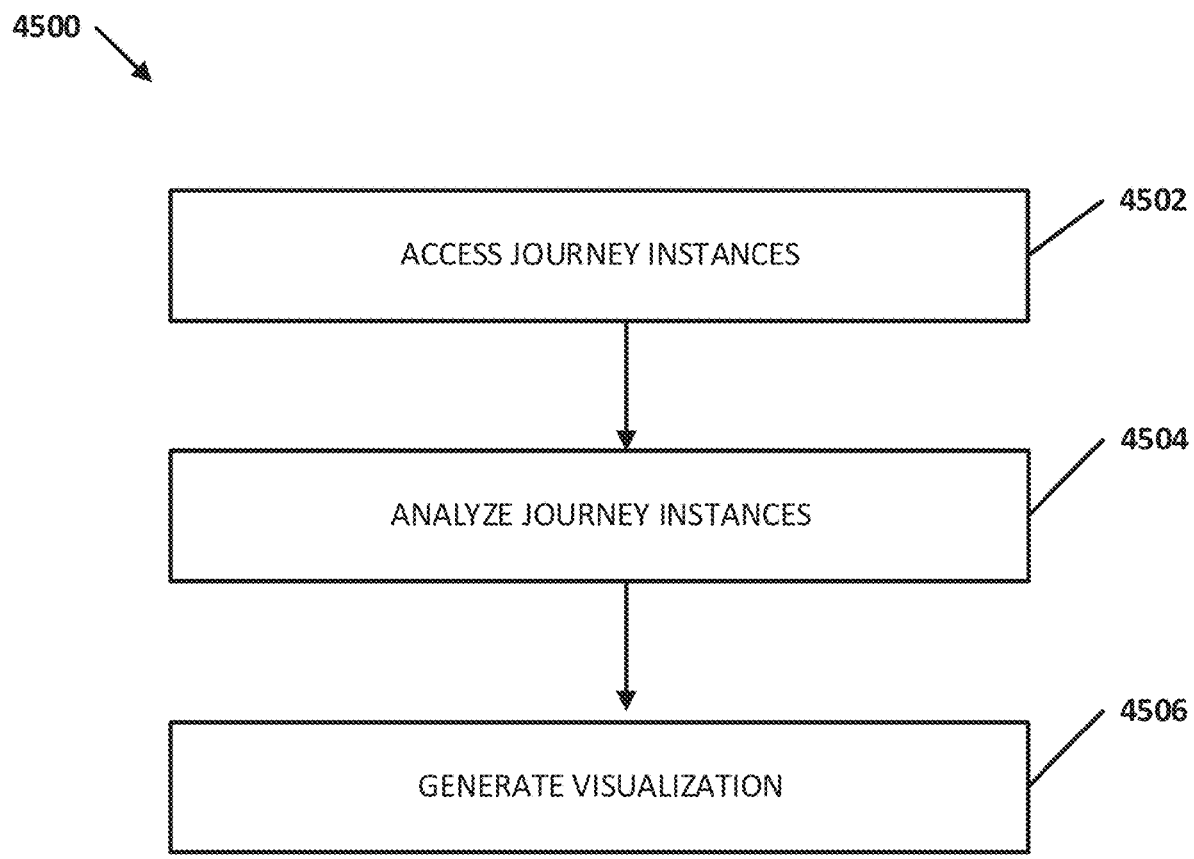
FIG. 45 is a flow diagram illustrating an embodiment of a routine for analyzing journey instances.

FIG. 45 is a flow diagram illustrating an embodiment of a routine 4500 implemented by one or more computing devices in a networked computer environment 100 for analyzing journey instances. For example, the routine 4500 can be implemented by a client device 102, host device 104, and/or any one, or any combination, of the components of the data intake and query system 108. However, for simplicity, reference below is made to the system 108 performing the various steps of the routine 4500.

At block 4502, the system accesses journey instances. As described herein, in some embodiments, each journey instance can include one or more step instances, and each step instance can correspond to one or more events of a set of data. The step instances of the journey instances or subsets of events can be ordered. Further, the journey instances can be generated based on one or more pivot identifiers, one or more step identifiers, and/or one or more timestamps. The journey instances can be stored in memory or on disk. In some embodiments, to access the journey instances, the system can access a file that identifies particular events of a journey instance and an order of those particular events. In certain embodiments, this information can be stored in a relational database. In some embodiments, the file can include an identifier for each of the particular events. In this way, the system can reduce the memory required to store the journey instances.

Further, in certain embodiments, the events of a particular journey instance can correspond to events from one or more data sources. The data sources can be heterogeneous data sources that have heterogeneous data formats. In some embodiments, a journey instance can include a nested journey instance. For example, as described herein, the occurrence of one event can spawn one or more sub processes that generate one or more events. The dependent events can be related to each other as part of a nested journey instance and can be related to a larger or primary journey instance.

At block 4504, the system analyzes the plurality of journey instances to generate a summary. In some embodiments, the summary can correspond to a single journey instance or multiple journey instances. In certain embodiments, the summary can correspond to one or more journey models or one or more clusters of journey instances.

The summary can include various analytics about the journey instances or journey models. For example, as described herein, the summary can indicate the number of journey instances built from a set of data, the number of events in the set of data, the identity of steps in a journey model, a sequence of the step instances in the journey instances, a sequence of steps in a cluster of journey instances or ordered journey model, a percentage of journey instances that represent or are an example of different ordered or unordered journey models, an indication of the frequency of steps across the different journey instances, an indication of the placement of the different steps across the different journey instances (e.g., first, last, etc.), time limits of the set of data, a distribution of the lengths of the journey instances or number of events in the different journey instances, average time of the journey instances, average time on each step of the journey instances, etc.

At block 4506, the system generates a visualization. In some embodiments, the visualization can correspond to one or more journey instances or one or more journey models. In some embodiments, the visualization can correspond to multiple journey instances, or a cluster of journey instances, that include the same path through the same steps or an ordered journey model. In such cases, the journey instances can include step instances that correspond to the same steps of a journey model and that have the same order as an ordered journey model.

In certain embodiments, the visualization can correspond to multiple journey instances that have different paths through the same or different steps. For example, the visualization can include all journey instances for a set of data or all different paths between steps of a journey model based on the set of data. In some cases, one group of the journey instances may include one set of steps from the journey model and another group may include different steps, non-overlapping from the journey model.

In some embodiments, the visualization can include a numerical or non-numerical indication of the number or percentage of journey instances that include a particular order of step instances or include a particular passage between two or more step instances, or a particular passage to or from a particular step or step instance. In some cases, the visualization can include lines or arrows between different steps that are traversed by a journey instance. In some cases the errors or lines can be sized differently depending on the frequency or the number of journey instances that include a particular passage between two steps. For example, the visualization can include a larger or thicker arrow or line indicating a larger percentage or number of journey instances including a particular traversal compared to a smaller or thinner line or arrow. In some cases, the visualization can use different colors to indicate the frequency or number of journey instances that include a particular traversal. In this way, the visualization can facilitate the understanding of the topology of the system and/or the interactions between different data sources.

In some embodiments, the system can include information about each journey instance. For example, the visualization can identify field values for the different journey instances, or the field used as the pivot identifier. In certain cases, the visualization can identify a duration for each journey instance, a number of events in a particular journey instance, and/or a sequence of events for a particular journey instance.

In certain embodiments, the visualization can include a summary of the journey instances identified from a set of data, the number of events identified from the set of data, the number of unique steps in the set of data, timing requirements used to generate the journey instances or process the set of data. In some embodiments the visualization can include one or more graphics indicating a distribution of the number of events in the journey instances.

In certain embodiments, a user interface can include various controls to modify the visualization. For example, the controls can enable a user to filter journey instances based on a particular step, a particular order or sequence of steps, particular transition between steps, a particular first step, a particular last step, etc. Furthermore, in some embodiments, the user interface can include various controls to view visualizations of clusters of journey instances, journey models, or journey instances with the same steps and same sequence of steps, etc. In some cases, the user interface can include controls to modify the visualization to identify one or more journey models derived from or built based on different journey instances.

In some embodiments, the visualization can include multiple nodes along an arc, such as a circle, semi-circle, or half-moon. Some or all of the nodes can correspond to a step or step instance. In some embodiments, the nodes are ordered based on timestamps associated with the corresponding step instance. For example, nodes corresponding to steps that are earliest in time for a journey instance or model can be closer to an origin point (e.g., top, bottom, side, etc.) and nodes later in time can be progressively closer to an end point and can be located along an arc length between the origin point and end point. In certain embodiments, the steps are ordered based on frequency of transitions. For example, the first node can correspond to the node that is most frequently the first node in a journey, the second node can correspond to the step that is most frequently traversed to from the first node, and so forth. In addition, the visualization can include indications that identify transitions between the different nodes of the arc. In some implementations, the visualization may be manipulated by the user, to allow the user to move, position, zoom, and/or focus on elements of the visualization, e.g., nodes and paths. In some implementations, the visualization may include numeric representations of data underlying the visualization, e.g., corresponding to journey models, journey instances, or data underlying the respective journey instances, individually or in aggregate.

In some cases, the visualization can include multiple arcs. The first arc can correspond to steps that occur at least a threshold number of times. The second arc can correspond to steps that occur less than a threshold number of times.

Further, in some embodiments, the first arc can correspond to steps of a journey instance, and the second arc can correspond to steps of a nested journey instance. In some cases, the nodes of the second arc can be positioned proximate the node that corresponds to the step of the journey instance that is related to the nested journey instance. For example, if the nodes for the nested journey correspond to dependent events, then they can be positioned proximate the node that caused them to occur.

The system can use fewer, more, or different blocks as part of routine 4500, or perform the blocks of routine 4500 in a different order or concurrently. Further, any of the steps described herein with reference to routine 4500 can be combined with one or more steps described herein with reference to routines 4300 and 4400. For example, in some embodiments, the routine 4500 can include receiving one or more pivot identifiers and/or one or more step identifiers, generating the journey instances and models, etc.

4.8 Additional Journey Visualizations

Figure 46:
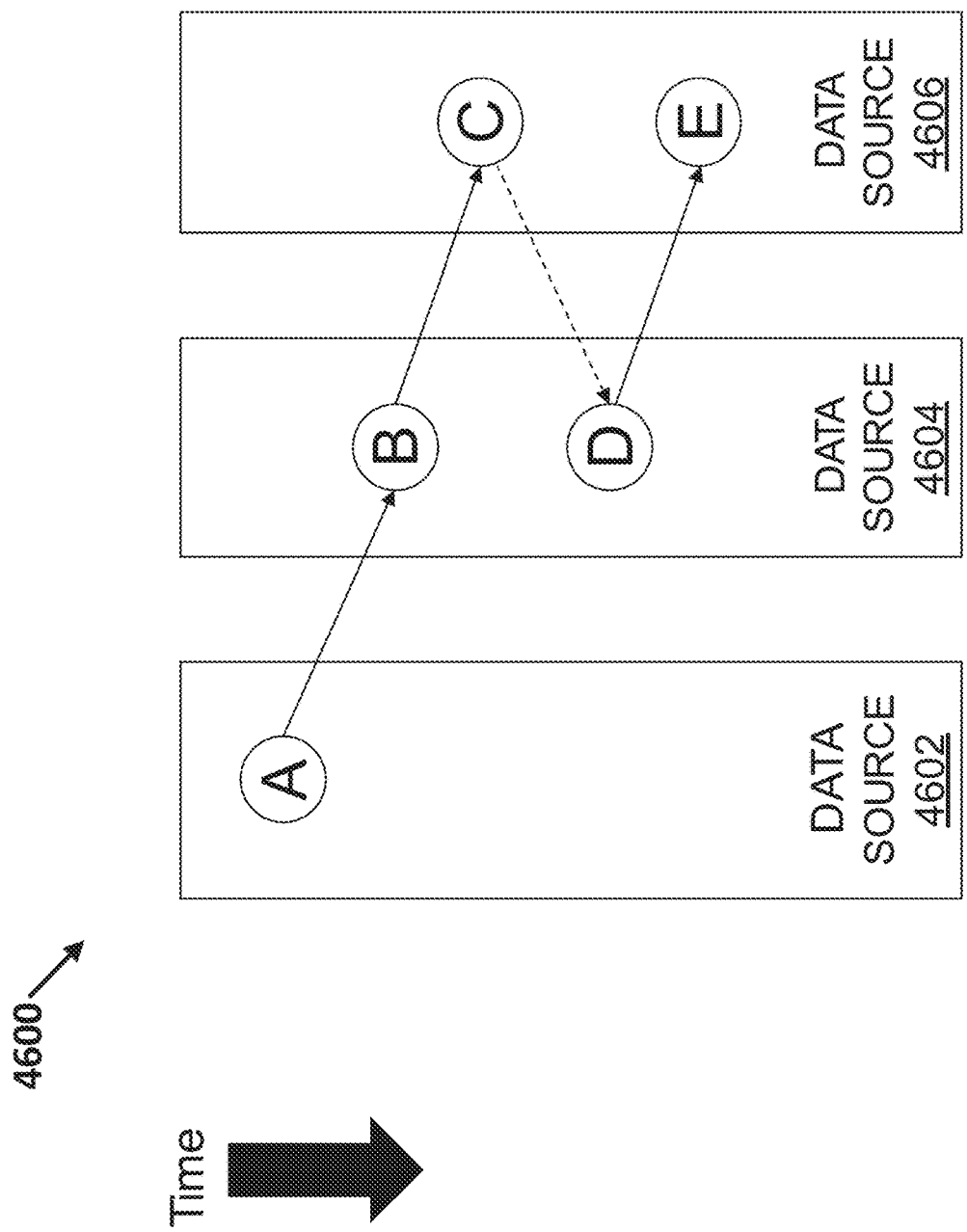
FIGS. 46, 47, and 48 are diagrams illustrating embodiments of journey visualizations.

FIG. 46 is a diagram illustrating an embodiment of a journey visualization 4600 that can be displayed in the display area 3902 or otherwise included in the user interface 3900 or displayed. As described herein, the system 108 can generate a variety of journey visualizations to indicate relationships between events and topologies. Accordingly, the journey visualization 4600 represents an embodiment of the journey visualizations that can be generated by the system 108.

In the illustrated embodiment, the journey visualization 4600 indicates a relationship between data sources and the events/steps/step instances of one or more journey instances or one or more journey models. For example, the system 108 can group the events/steps/step instances based on their data source and display a traversal through the steps across the different data sources. In the illustrated embodiment, the journey visualization 4600 includes data source indicators 4602, 4604, 4606 indicative of the data sources or streams associated with one or more journey instances or journey models, nodes A, B, C, D, E indicative of the events, steps, or step instances associated with the one or more journey instances or journey models, as well as a progression between the events, steps, or step instances of the one or more journey instances or journey models.

As a non-limiting example, suppose journey visualization 4600 represents a particular journey instance, the nodes A, B, C, D, E represent the steps instance of the journey instance, and the data source indicators 4602, 4604, 4606 indicate the data sources related to the journey instance. With reference to the example, the journey visualization 4600 indicates that the journey instance includes five step instances A, B, C, D, E across three data sources 4602, 4604, 4606. Further, the journey visualization 4600 indicates the progression through the step instances based on their placement, with step instances that occurred earlier in time being located higher in the journey visualization than step instances that occurred later in time. In the illustrated embodiment, the journey instance began with the step instance A, and progressed through step instances B, C, and D, and ended with step instance E. It will be understood that the step instances can be placed in any configuration to indicate an order (e.g., bottom-top, left-right, right-left, font size, color, pattern, etc.)

In addition, the journey visualization 4600 identifies the data sources related to each event. Specifically, the journey visualization indicates that step instance A is related to or came from data source 4602, steps B and D are related to data source 4604 and step instances C and E are related to data source 4606.

The journey visualization 4600 also includes indications of the traversal of the journey instance between the different data sources. In addition, in the illustrated embodiment, the journey visualization provides one indicator for traversals in one direction of the data sources (e.g., data source 4602→data source 4604 and data source 4604→data source 4606) and a different indicator for traversal in the opposite direction (e.g., data source 4606→4604, etc.).

Although the example identified was with reference to step instances and a journey instance, it will be understood that the journey visualization 4600 can also be used to illustrate the relationship between events of a journey instance or steps or events of one or more journey models, etc. In some embodiments, they journey visualization can indicate the traversals between the events or steps for multiple journey models or journey instances. For example, similar to the journey visualizations 3908, 3910, 4006, and 4102, the journey visualization 4600 can include multiple lines (same or different pattern) between the various nodes A, B, C, D, E. Further different patterns or weights of the lines can indicate different relationships (e.g., frequency or number of transitions, etc.) between the underlying steps, step instance, or events, as described herein.

Figure 47:
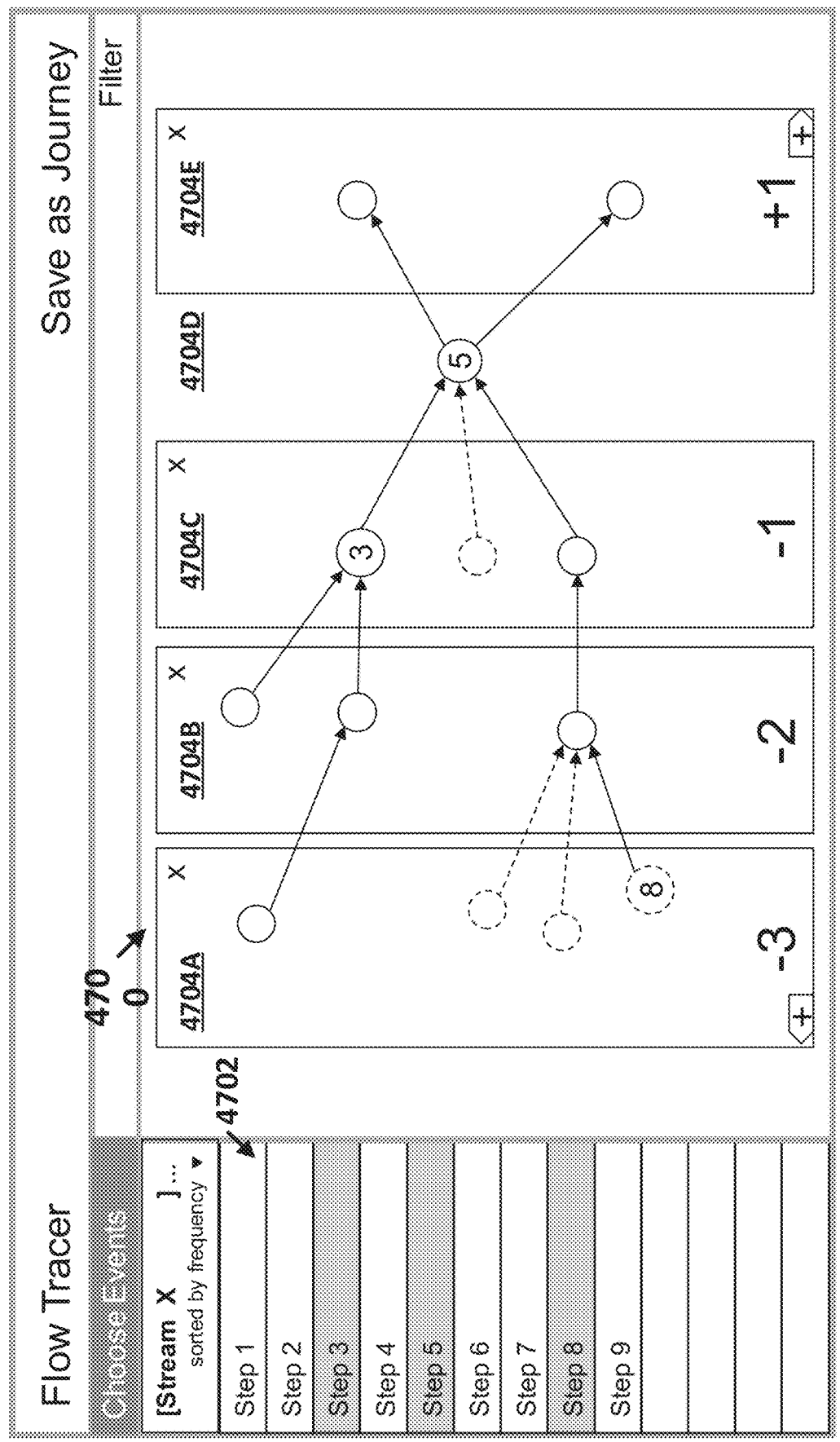

FIG. 47 is a diagram illustrating an embodiment of a journey visualization 4700 that can be displayed in the display area 3902 and step selection controls 4702 that can be displayed in the summarization control area 3912 of the user interface 3900, or otherwise included in a user interface or displayed. As described herein, the system 108 can generate a variety of journey visualizations to indicate relationships between events and topologies. Accordingly, the journey visualization 4700 represents an embodiment of the journey visualizations that can be generated by the system 108 to indicate a relationship between an event/step/step instance with other events/steps/step instance of one or more journey instances or models.

For simplicity, reference will be made to an indication of a relationship of an anchor step with other steps of a one or more ordered journey models, however, it will be understood that, depending on the embodiment, step instances or events can be used instead of steps and that journey instance (s) can be used in place of the journey models. With the above in mind, in the illustrated embodiment, the journey visualization 4700 includes various nodes indicative of steps associated with different ordered journey models. Further, the illustrated embodiment includes step selection control 4702 to select various steps of an unordered journey model.

In the illustrated embodiment a step (step 5) corresponding to node 5 has been selected as an anchor step. Based on the selection, the system 108 generates the journey visualization 4700 to indicate the relationship between step 5 and the other steps of various ordered journey models. To illustrate the relationship between step 5 and the other steps, the journey visualization 4700 includes columns 4704A, 4704B, 4704C, 4704D, 4704E, with each column indicating a distance from the anchor step. In the illustrated embodiment, node 5, corresponding to step 5, is placed in column 4704D. Thus, nodes in column 4704E indicate steps that occur one step after step 5 in one or more journey models or after step 5 with no intervening steps in that particular journey model. Nodes in column 4704C indicate steps that occur one step before step 5 in one or more journey models or before step 5 with no intervening steps in that particular journey model. Thus, nodes in column 4704B and 4704A indicate steps that occur two and three steps, respectively before step 5 in one or more journey models or before step 5 with one or two intervening steps, respectively, in that particular journey model.

By selecting steps 3 and 8, which correspond to nodes 3 and 8, in addition to step 5, the system 108 can filter out journey models that do not include any of steps 3, 5, or 8, journey models that do not include steps 3 and 5 or steps 3 and 8, or journey models that do not include steps 3, 5, and 8. Accordingly, the journey visualization 4700 can show paths of journey models that include different combinations of step 5 with other steps, such as steps 3, and 8.

In the illustrated embodiment, the journey visualization 4700 shows the paths of journey models that have steps 3 and 5 or that have steps 5 and 8. Solid lines indicate paths between steps of ordered journey models that include steps 8 and 5 (step 8 occurring three steps before step 5) and steps between ordered journey models that step 3 and step 5 (step 3 occurring one step before step 5 for one or more journey models). Thus, as seen in the journey visualization 4700 at least two ordered journey models includes steps 3 and 5 and a step that precedes step 3 (e.g., the nodes in column 4704B that connect to node 3 indicate steps in different ordered journey models that also include steps 3 and 5). Similarly, journey models with steps 5 and 3 or steps 5 and 8 only include two different paths after step 5 (e.g., the nodes in column 4704E indicate two steps that come after step five in any of the journey models).

The journey visualization 4700 can further indicate additional paths of journey models through step 5, but that do not include steps 3 or 8. In the illustrated embodiment, the journey visualization indicates these additional paths through step 5 using dashed lines and dashed circles. For example, at least three journey models include step 5, but does not include step 3 or 8 (e.g., the dashed node in column 4704C with a dashed line to node 5 and the blank dashed nodes in column 4704A with dashed lines to the solid node in column 4704B). In some embodiments, the dashed circle for node 8 can indicate that step 8 does not occur in the same ordered journey models as step 3.

It will be understood that a variety of visualizations can be used to indicate the relationship between the steps of the journey models. Further, as indicated above, the visualization 4700 is not limited to steps and journey models, but can indicate relationship between events of journey instances or journey models or relationships between step instances of journey instances.

Figure 48:
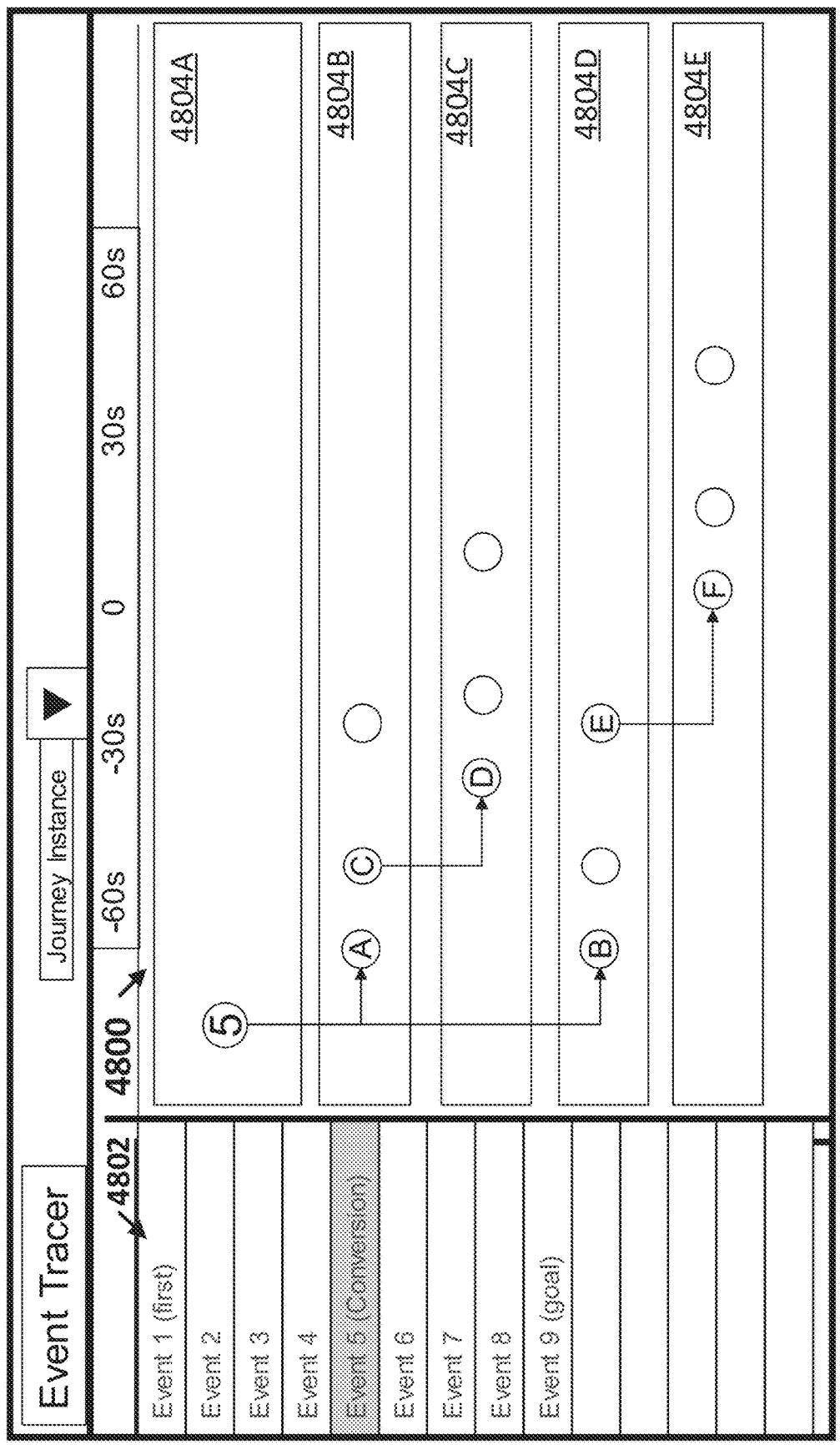

FIG. 48 is a diagram illustrating an embodiment of a journey visualization 4800 that can be displayed in the display area 3902 and event selection controls 4802 that can be displayed in the summarization control area 3912 of the user interface 3900, or otherwise included in a user interface or displayed. As described herein, the system 108 can generate a variety of journey visualizations to indicate relationships between events and topologies. Accordingly, the journey visualization 4800 represents an embodiment of the journey visualizations that can be generated by the system 108 to indicate a relationship between a parent event/step/step instances and dependent events/steps/step instances.

For simplicity, reference will be made to an indication of a relationship of a parent event with dependent events of a journey instance, however, it will be understood that, depending on the embodiment, step instances or steps can be used instead of events and that journey model(s) can be used in place of the journey instance. With the above in mind, in the illustrated embodiment, the journey visualization 4800 includes various nodes indicative of events associated with a journey instance. Further, the illustrated embodiment includes event selection control 4802 to select various events of an unordered journey model.

In the illustrated embodiment, an event (event 5) corresponding to node 5 has been selected from a various events of a journey instance. Based on the selection, the system 108 generates the journey visualization 4800 to indicate the relationship between parent event 5 and dependent events (from the same or different data sources as each other and the parent event) of the journey instance, or nested journey instances. To illustrate the relationship between the parent event 5 and the dependent events, the journey visualization 4800 includes rows 4804A, 4804B, 4804C, 4804D, 4804E, with each row indicating a distance from or relationship to the parent event, or indicating a distinct nested journey instance related to event 5.

In addition, the journey visualization indicates a timing relationship between the various events, with nodes corresponding to events occurring earlier in time located farther to the left of nodes corresponding to events occurring later in time (e.g., event related to node C occurs approximately 60 second before the event corresponding to node F).

In the illustrated embodiment, parent node 5, corresponding to parent event 5, is placed in column 4804A. Connecting lines from node 5 to nodes A and B can indicate that events corresponding to events A and are generated based on the occurrence of event 5, or are dependent events. Similarly, the lines between nodes C and D and between nodes E and F can indicate that the events corresponding to nodes D and F are dependent events (or occurred based on the occurrence of) of the events corresponding to nodes C and E, respectively. In some embodiments, all of the events corresponding to the nodes in the different rows 4804B, 4804C, 4804D, 4804E can be identified as dependent events.

Furthermore, nodes in the different rows can correspond to different nested journey instances that relate to the parent or primary journey instance. For example, nodes in row 4804B can indicate nodes in a first nested journey instance, nodes in row 4804C can indicate nodes in a second nested journey instance, nodes in row 4804D can indicate nodes in a third nested journey instance, and nodes in row 4804D can indicate nodes in a fourth nested journey instance. As such, the journey visualization 4800 can indicate that four nested journey instances are related to event 5.

As described herein, events of a nested journey instance can be identified and/or categorized based one or more step identifiers and/or one or more pivot identifiers. For example, the events of the nested journey instance indicated by row 4804B can be related based on a first pivot identifier or a common field value for a first pivot identifier field. Similarly, the events of the nested journey instances indicated by rows 4804C, 4804D, and 4804E can be related based on respective pivot identifiers or respective common field values for respective pivot identifier fields. In addition, one or more of the events in each of the nested journey instances can include a field value that matches the field value of event 5 for the pivot ID field.

In some instances, gluing events can be identified to interrelate the different nested journey instances with the event 5. In some cases, an arrow between nodes can identify a gluing event. For example, the arrows to nodes A, B, D, and F can indicate that those nodes correspond to gluing events. As also described herein, in some cases, multiple gluing events can be used to relate a nested journey instance to the primary journey instance without the presence of a single event that includes the field value for the pivot ID of the primary journey instance and the field value for the pivot ID of the nested journey instance. For example, a first gluing event can be used to identify the relationship between event 5 and the events of the nested journey instance corresponding to row 4804B and a second gluing event can be used to identify the relationship between the events of the nested journey instance corresponding to row 4804B and the events of the nested journey instance corresponding to row 4804C. However, there may not be a gluing event that explicitly identifies the relationship between event 5 and the events of the nested journey instance corresponding to row 4804C. Notwithstanding, the system 108 can determine that the events of the nested journey instance corresponding to row 4804C are related to event 5 based on the two aforementioned gluing events. In this way, the system 108 can relate the events of the nested journey instance corresponding to row 4804C to event 5 without a gluing event that explicitly relates them.

Furthermore, as described herein, the different events of each journey instance can be categorized based on one or more step IDs. For example, the event corresponding to node A can have a first field value for a first step ID field and the event corresponding to node C can have a second field value for the second step ID. Similarly, events corresponding to nodes B and E can have different field values for the same step ID field. In this way, the system can categorize the different events in the nested journeys with different steps. Although discussed above with reference to a step ID for each nested journey instance, in some cases, a single step ID can be sued for all the nested journey instance and the primary journey instance. Further, in some cases multiple events in the same nested journey can have the same field value for the step ID indicating that a particular step was repeated at a later point in time.

It will be understood that a variety of visualizations can be used to indicate the relationship between the event 5 and events of related nested journey instances. Further, as indicated above, the visualization 4800 is not limited to events and a journey instance, but can indicate relationships between step instances of journey instances with dependent step instances or between events or steps of journey models with dependent events or steps of journey models.

5.0 Hybrid Cloud/Private Data Environments

As discussed above, a data intake and query system as described herein may be implemented within a private environment, such as on-premises of an entity, or in a cloud environment provided by a service provider or hosting entity. Each configuration may provide various benefits while incurring various costs.

For example, a cloud environment may avoid the need for a user to independently provide and manage the computing devices upon which various components of data intake and query system 108 operate. Rather, such responsibility may be delegated to other entities, such as a service provider. In some instances, this may enable users to enjoy less problematic and more feature-filled applications. For example, a service provider may automatically update cloud-provided software providing access to the data intake and query system 108, such that a user is always enabled to use a most recent version of that software, without requiring the user to manage installation and provisioning of that software. This can be especially beneficial in large user environments. For example, where a "user" is in fact a business including both typical end users (who access the system 108 to, e.g., search data) and administrators (who maintain aspects of the system 108 on behalf of the business), use of a cloud-based system can enable typical end users to enjoy constant improvements without requiring intervention of an administrator.

One potential "cost" of using a cloud-based data intake and query system 108 may be that data stored by the system 108 itself exists on a system not under the direct and total control of a user (e.g., a business). While a service provider of the cloud-based system may take measures to safeguard that data (e.g., encryption, strong privacy policies, etc.), some users—and particularly those maintaining highly sensitive personal data—may prefer not to disclose any private data to a service provider or hosting entity, even in encrypted form. As such, these users may maintain an on-premises data intake and query system 108, forgoing the benefits of a cloud-based system. It would be advantageous, therefore, to create environments providing the benefits of a cloud-based data intake and query system 108, such as rapid updating of applications to access the system 108, while still enabling a user to maintain the system 108 on-premises.

In accordance with embodiments of the present disclosure, systems and methods are provided to enable the use of hybrid environments, such as hybrid cloud/private environments, whereby an application used to access functionality of one environment (e.g., a data intake and query system) 108 is provided by a cloud-based hosting system within a different environment, thereby enabling rapid modification to that application without management by an administrator. Thus, embodiments of the present disclosure address the problems identified above, providing benefits of a cloud-based data intake and query system 1006 without ramifications of those systems that may be viewed as detrimental by some users.

Specifically, in accordance with embodiments of the present disclosure, access to a data intake and query system 108 is provided by a multi-component application, including a first component provided by a cloud-based component hosting system and a second component within a private environment (e.g., "on-premises") of the data intake and query system 108. The first and second component illustratively interoperate to provide the application, thus enabling access to on-premises data or functionality. In the illustrative example, the on-premises data is a data intake and query system 108. However, a multi-component application as described herein may additionally or alternatively be used to access other on-premises data or functionality.

Division of an application into multiple components can provide a number of benefits. For example, the cloud-provided component of the application may be rapidly modified to provide new features or functionality, or to correct errors in prior features or functionality, without requiring reconfiguration of the on-premises component. For example, the cloud-provided component may correspond to user interfaces for a data intake and query system 108 (e.g., a "frontend" for that system 108), while the on-premises component may correspond to an application, server, or application executing on a server providing data or functionality to the frontend. In this configuration, a service provider associated with the cloud-provided component may periodically release new versions of the frontend, such as updated functionalities, bug-fixes, or the like, which may be used by users of the system 108 without requiring reconfiguration of the on-premises component or releases of new version of the on-premises component.

In one embodiment, a cloud-based component hosting system may provide multiple versions of a cloud-provided component, and enable users to select which version they would prefer. For example, the cloud-based component hosting system may maintain both a "stable" version (e.g., corresponding to a well-tested and verified-functional version of the component, with a fixed code base over a given period of time) and one or more other versions (e.g., a "latest," "preview," "beta," or "nightly" version corresponding to less well tested but more frequently updated versions). Various additional "versions" may be provided, each associated with different functionalities, and each configured to interact with the on-premises component to provide an application enabling a user to access on-premises data or functionality. End users may be enabled to select an implement various cloud-provided components on-demand. For example, each cloud-provided component may include an input enabling an end user to select an alternative cloud-provided component, and selection of the input may cause the alternative component to be retrieved and implemented, as discussed in more detail below.

An on-premises component, as disclosed herein, may be configured to facilitate access to on-premises data or functionality via the multi-component application. For example, the on-premises component may be configured to obtain requests for information or functionality from a cloud-provided component, and to respond to such requests accordingly (e.g., by providing the requested information, invoking the requested functionality, etc.). In some instances, the on-premises component may be configured to redirect users to a cloud-provided component, enabling use of the cloud-provided component. For example, an on-premises component may include a web server accessible by a network access program (e.g., a web browser) of a client device 102. An end user may access the web server in an attempt to access an application provided access to an on-premises data intake and query system 108. While the web server may be configured to provide direct access to the system 108 (e.g., as a purely on-premises configuration, in accordance with embodiments above), the server may additionally or alternatively be configured to redirect the user to a cloud-based component hosting system, to cause the user to obtain a cloud-provided component used to access the on-premises component (which components, in conjunction, provide the multi-component application). For example, the on-premises web server may redirect a web browser of the client device 102 to a URL of the cloud-based component hosting system.

In some instances, rather than only redirecting a client device 102 to a cloud-provided component, an on-premises component may additionally configure the client device 102 to enable interaction between the cloud-provided and on-premises components. For example, where the cloud-provided component is a web page provided by a cloud-based component hosting system, it may be difficult for that web page to directly access the on-premises component (e.g., due to firewalls or network configuration limiting access to the on-premises component). To address this, the on-premises component may, rather than completely redirecting a client device 102 to a cloud-provided component (e.g., via a 300 series status code redirect), may instruct a client device 102 such that the device 102 both maintains a connection to the on-premises component and loads a cloud-provided component. For example, the on-premises component may return a web page to a client device 102 that includes an embedded element, such as an inline frame (or "iframe"), referencing the cloud-provided component. Code executing within the embedded element may therefore utilize the already-established connection with the on-premises component to communicate with that component. For example, client-side scripting (e.g., JavaScript) within the embedded element may pass requests to client-side scripting within the web page, which may in turn pass requests to the on-premises component. Responses from the on-premises component may similarly be passed to the web page and into the embedded element. In this manner, a cloud-provided component implemented on a client device 102 may communicate with an on-premises component, without requiring direct communication between a cloud-based system and the on-premises component.

While use of a cloud-provided component as part of a multi-component application may enable rapid deployment of new features within the application, in some instances these new features may not be compatible with an on-premises component. For example, where the cloud-provided component provides a "frontend" and the on-premises component provides a "backend," a variety of improvements may be made to the frontend that do not require changes to backend functionality. However, improvements to backend processing—which may be made accessible via the frontend—may not be possible without modifying the on-premises component. Moreover, the cloud-based component hosting system that provides the cloud-provided component may provide such components to multiple users, associated with multiple on-premises environments. Thus, in practice, it may be desirable for a given cloud-provided component to maintain compatibility with whichever version of an on-premises component a user may have implemented within their on-premises environment.

To address this issue, a cloud-provided component as discussed herein may be configured to, on initialization, determine a version of an on-premises component used as part of a multi-component application (and potentially versions of other on-premises data or functionality, such as a version of a data intake and query system 108 accessed by the on-premises component), and adjust functionality of the cloud-provided component to maintain compatibility with the on-premises component (and/or other on-premises data or functionality). Illustratively, each version of a cloud-provided component may include data mapping features of the cloud-provided component to one or more compatible versions of an on-premises component (and/or other on-premises data or functionality), such as a minimum compatible version of the on-premises component. When the cloud-provided component is accessed in conjunction with an on-premises component, the cloud-provided component may determine the version of the on-premises component, and adjust its functionality to maintain compatibility with the on-premises component, such as by disabling features of the cloud-provided component that are incompatible with the on-premises component. In some instances, the cloud-provided component may be configured to notify an end user of the incompatibility, such as by responding to requests to access the incompatible features by prompting the end user to upgrade their on-premises component.

5.1 Example Hybrid Environment

Figure 49A:
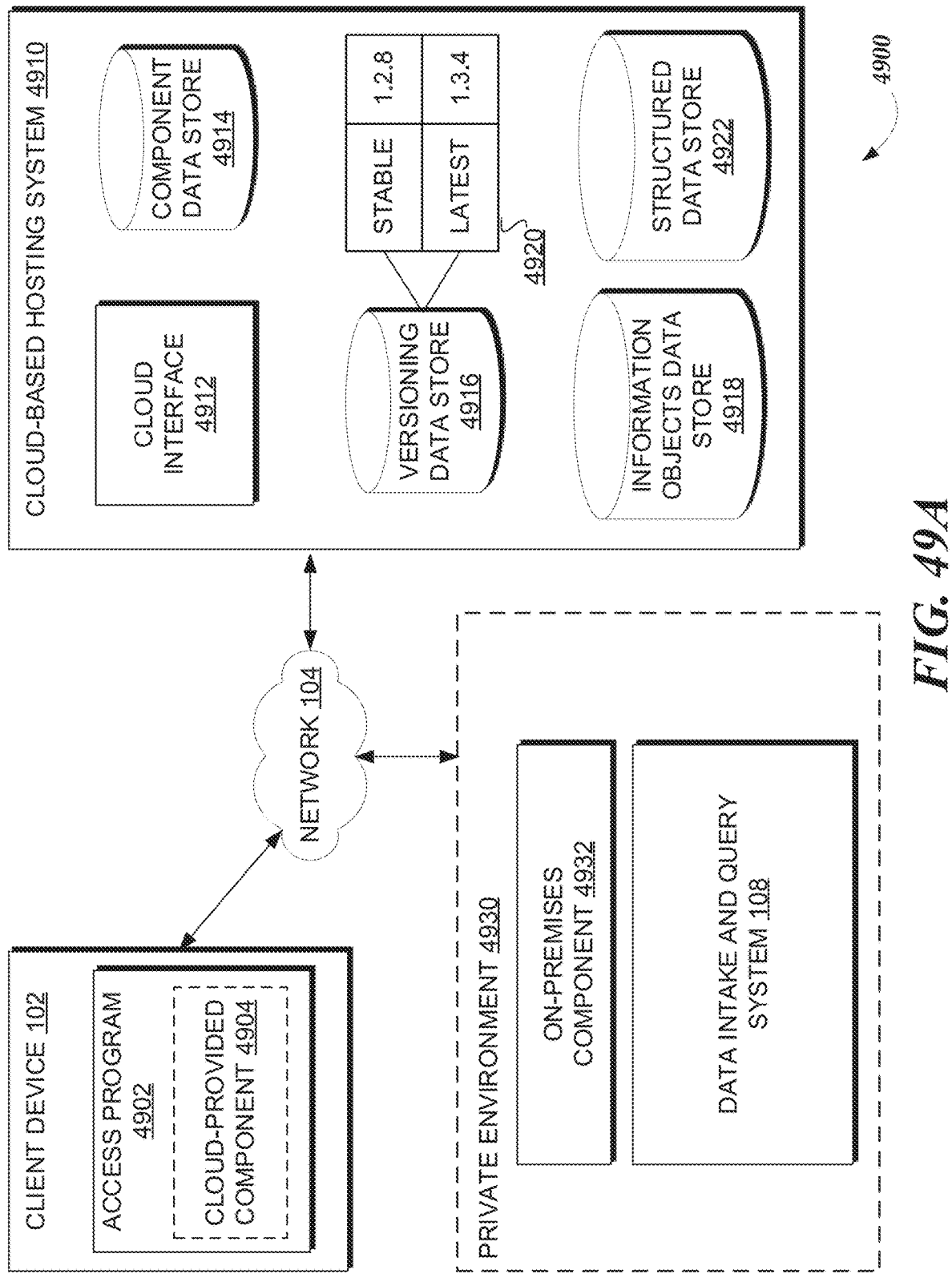
FIG. 49A is a block diagram of an example hybrid cloud/private environment, in which a multi-component application may enable access to an on-premises data intake and query system while provided benefits associated with use of cloud-provided code.

FIG. 49A is a block diagram of an example hybrid cloud/private environment 4900, in which a multi-component application may enable access to an on-premises data intake and query system 108 while providing benefits associated with use of cloud-provided code. As shown in FIG. 49A, the environment 4900 includes a client device 102, a cloud-based hosting system 4910, and a private environment 4930, all interconnected via a network 104.

While shown as a single network 104, the network 104 may represent multiple interconnected networks. For example, the client device 102 and the private environment 4930 may interact via a private network (e.g., a LAN or VPN) while the client device 102 and the cloud-based hosting system 4910 interact via a public network (e.g., the public Internet). In some instances, the private environment 4930 may have limited or no public availability. For example, the private environment 4930 may be inaccessible to the cloud-based hosting system 4910.

The private environment 4930 generally represents a collection of computing devices under control of a user, which may for example correspond to a business or organization. As shown in FIG. 49A, the private environment 4930 includes a data intake and query system 108 in an "on-premises" configuration (e.g., configured and maintained by the user providing the private environment 4930). In one embodiment, "on-premises" may refer to the system 108 being physically hosted at a location owned or operated by a user of the system 108. However, "on-premises" as used herein may also refer to an independently managed system 108 not physically hosted at a location owned or operated by the user. For example, an "on-premises" configuration may include a system 108 configured and maintained by a user, even when that system 108 is created and maintained using otherwise publically available services (e.g., as a private, independent system 108 created using public resources of a hosted computing provider).

The environment 4930 further includes an on-premises component 4932. Illustratively, the on-premises component 4932 represents a component that facilitates access to the system 108, such as by providing a web server, application programming interface (API) or the like. The on-premises component 4932 can be, for example, an application or a component of an application that can provide an interface to the system 108. While shown independently in FIG. 49A, the on-premises component 4932 may be provided by a server or other computing device within the private environment 4930. Moreover, while shown as distinct from the data intake and query system 108, the on-premises component 4932 may in some embodiments be incorporated into or formed by the system 108. For example, in some instances a search head 210 may correspond to the on-premises component 4932, or may execute code to implement the on-premises component 4932.

As noted above, a multi-component application may be formed by cooperation of the on-premises component 4932 with a cloud-provided component 4904 implemented at the client device 102, illustratively provided by the cloud-based hosting system 4910. As shown in FIG. 49A, the cloud-based hosting system 4910 includes a cloud component interface 4912, which can correspond to a server that provides an interface through which code corresponding to the cloud-provided component may be retrieved by the client device 102. For example, the cloud component interface 4912 can correspond to a web server accessible via a URL for the cloud-based hosting system 4910. In some instances, the interface 4912 is implemented as a virtual computing device within a hosted computing environment, which may include a variety of physical host computing devices configured to rapidly implement such virtual computing devices. For example, the cloud component interface 4912 may be implemented as a virtual computing "instance" on AMAZON®'s ELASTIC COMPUTE CLOUD™ ("AMAZON EC2®").

The cloud-based hosting system 4910 further includes a component data store 4919 including various versions of a cloud-provided component (e.g., in the form of code, scripts, and/or another format such as HTML). For example, where versions increment sequentially, the store may include a latest version and a past n versions of the component. In some instances, multiple "branches" (e.g., versions not in sequence with one another) may also be included within the component data store 4914. The component data store 4914 can correspond to any substantially persistent data store 4914, a wide variety of which are known in the art. In one embodiment, the component data store 4914 is a logical data store 4914 provided by a network-accessible storage service based on underlying physical data storage devices. For example, the component data store 4914 may be implemented as a data store on AMAZON®'s SIMPLE STORAGE SERVICE (or "S3").

The cloud-based hosting system 4910 further includes a versioning data store 4916 including information mapping versions of the cloud-provided component (as stored in the component data store 4914) to version indicators, which generally indicate a version type for the corresponding component version. For example, the cloud-based hosting system 4910 may maintain both a "stable" version (which has a relatively fixed code base that is infrequently changed relative to other versions) and a "latest" version of a cloud-provided component (which may be more frequently changed, such as changed each day, week, month, as needed or other at other times), and make these versions available to client devices 102 under those indicators. Over time, the code corresponds to indicator such as "latest" and "stable" may vary. For example, a new version of the cloud-provided component may be developed by a developer associated with the cloud-based hosting system 4910 and designated as a new "latest" version. After testing and revision, code previously labeled as a "latest" version may be formally released as a "stable" version on a given release date with the prior "stable" version being deleted or deprecated, etc. Thus, to facilitate identification of the code corresponding to a given version indicator, the versioning data store 4916 includes a mapping of indicators to code, shown in FIG. 49A as table 4920. In one embodiment, the versioning data store 4916 may represent a database (e.g., a cloud-hosted database, such as provided by AMAZON®'s DYNAMODB database service), and the table 4920 may represent a table within that database.

In addition to the component data store 4914 and the versioning data store 4916, the cloud-based hosting system 4910 includes an information objects data store 4918 storing information objects utilized by the cloud-provided component 4904 or the host system 4910. Like the component data store 4914, the information objects data store 4918 may be a logical data store provided by a network-accessible storage service based on underlying physical data storage devices, such as by AMAZON®'s S3 service.

In one embodiment, the information objects data store 4918 stores "metadata" regarding operation of the cloud-provided component 4904. In various examples, the cloud provided component 4904 can store information enabling a client device 102 to interact with the on-premises component and/or the data intake and query system 108, whereas the data intake and query system 108 may store the data to be interacted with by an end user. The metadata may include information specifying, for example, journeys, data flows, workflows, data visualizations, configurations, and the like. The cloud-provided component 4904, when implemented on the client device 102, may interact with the cloud-based hosting system 4910 to retrieve metadata from the information objects data store 4918 for use by the cloud-provided component 4904. In addition to metadata, the information objects data store 4918 may include permission information mapping metadata to individual end user identities.

In some embodiments, the information objects data store 4918 further stores information derived from or generated based on unstructured event data from the data intake and query system 108. As noted above, the data intake and query system 108 may provide for flexible schemas, including late-binding schemas, which beneficial enable rapid querying of data on the system 108 without the loss of information often associated with conversion to structured data. While the use of the system 108 may provide numerous benefits, the structure of the system 108 may in some instances not be ideal for storing all types of data. For example, in one embodiment, the system 108 may restrict external systems from deleting data from the data stores 208 (e.g., to avoid potential data loss). Illustratively, rather than remove data entirely, the system 108 may instead generate a "tombstone" of deleted data, indicating that the data has been deleted and potentially replaced with other data. This tombstoning functionality—while potentially guarding against data loss and therefore providing benefits—may restrict the ability of the system 108 to efficiently handle frequently modified information. For example, each modification of information may result in creation of a tombstone for a past version of the information, which tombstones are reviewed during subsequent queries of the information. While handling of tombstones may be more rapid than handling of current information, such handling may nevertheless slow query processing. Thus, it may be desirable to store rapidly modified information in a separate data store, such as the information objects data store 4918, particularly where data regarding past versions of the information is not required. In some embodiments, the information objects data store 4918 is used to store information derived from the data intake and query system 108, and thus it may be unnecessary to store data regarding past versions of the information (as such data could be recovered from the system 108). Thus, the system 108 and information object data store 4918 can operate in conjunction to provide efficient storage of various types of data.

The cloud-based hosting system 4910 further includes a structured data store 4922, which corresponds to a data store configured to store data objects that conform to a pre-defined data structure. The structured data store 4922 may correspond, for example, to a tabular database. In one embodiment, the structured data store 4922 is a columnar database, such that data objects are divided into columns of data, which columns are shared among objects. More particularly, the store 4922 may be a timeseries database, such that individual data objects (e.g., entries) are arranged according to a timestamp associated with the data object. One example of a timeseries columnar database that may be used in accordance with embodiments of the present application is APACHE DRUID™. Similarly to the information objects data store 4918, the structured data store 4922 can be used in conjunction with the system 108 to address inefficiencies of the system 108 under specific scenarios. For example, while the use of late-binding schema at the system 108 may provide extreme flexibility, queries of the system 108 may require more computing resource usage than queries of a structured data store. Accordingly, when specific information (e.g., of a known structure) is predicted to be queried in the future, such information may retrieved from the system 108 be stored within the structured data store 4922 to enable rapid retrieval of that information at a later time, without incurring a delay due to querying the system 108 at the time of retrieval.

Example embodiments utilizing the information objects data store 4918 and the structured data store 4922 to support retrieval of information derived from unstructured event data of the system 108 are described below with respect to FIGS. 63-65.

Returning to discussion of a multi-component application, to access such an application, a user may utilize a client device 102 that includes a network access program 4902. The network access program 4902 may illustratively correspond to a web browser, mobile application, or other software enabling implementation of network-hosted code (e.g., HTML, client-side scripting such as JavaScript, etc.). For example, the user may utilize the access program 4902 to obtain a cloud-provided component 4904 from the cloud-based hosting system 4910, and to implement the cloud-provided component 4904 (e.g., by rendering HTML and/or executing client-side scripting of the component 4904). The cloud-provided component 4904, when implemented by access program 4902, may interact with the on-premises component 4932, thereby provided a multi-component application that enables the user to access the data intake and query system 108. Various example interactions for providing and executing the cloud-provided component on the client device 102 are discussed in more detail below.

Figure 49B:
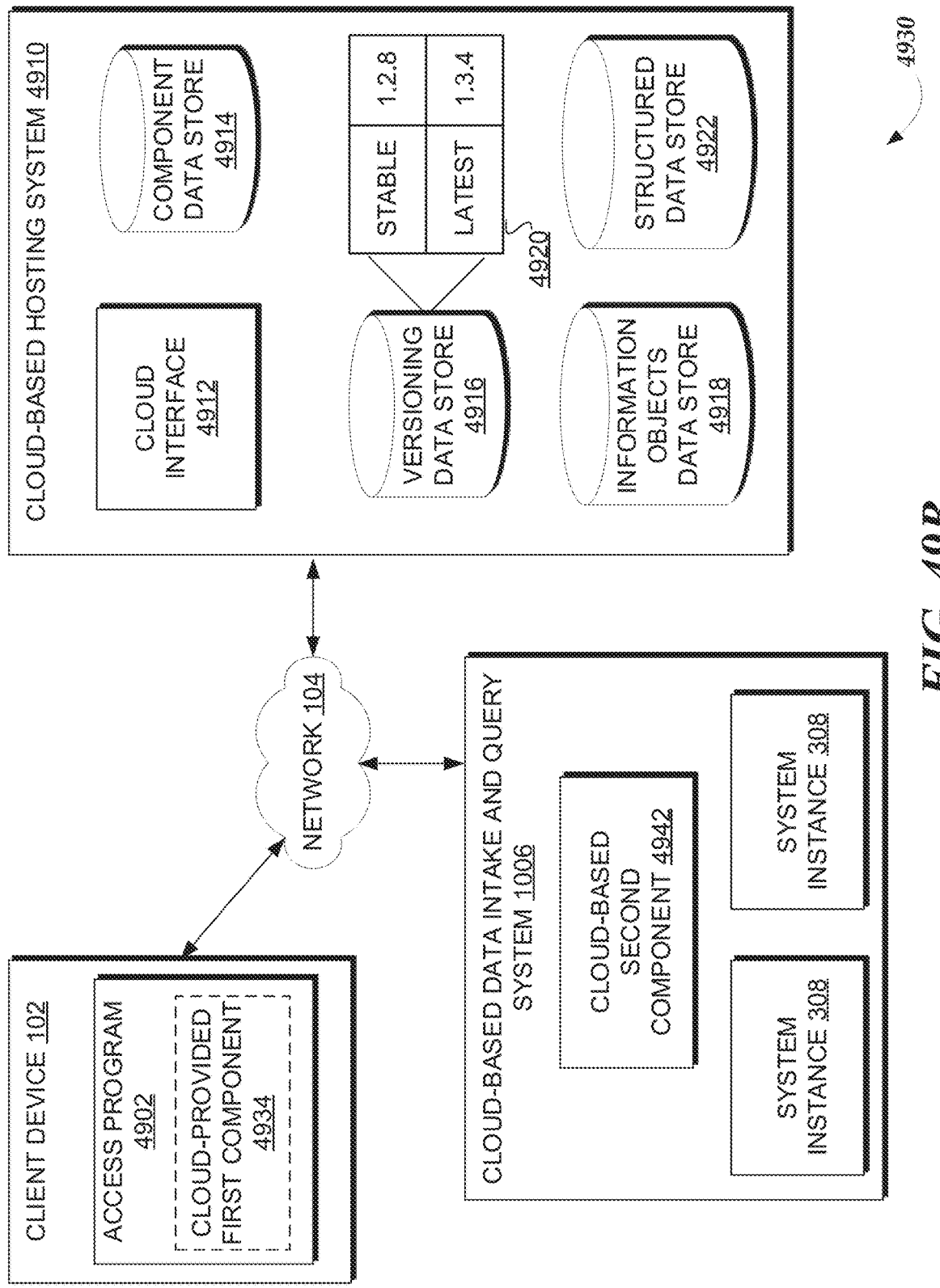
FIG. 49B is a block diagram of an example hybrid environment utilizing two distinct cloud environments.

While FIG. 49A is described with respect to a private environment 4930 including an on-premises component 4932, embodiments of the present disclosure may also be utilized to provide multi-component applications across cloud environments. For example, a first component may be provided by a cloud-based hosting system 4910 in a manner similar to as described above, while a second component may be provided by a second cloud-based environment. An example environment 4930 according to this configuration is provided in FIG. 49B. Specifically, while many elements of FIG. 49B are similar to those of FIG. 49A (and thus will not be re-described), FIG. 49B includes a cloud-based data intake and query system 1006, as generally described above, and modified to include a cloud-based second component 4942. The cloud-based second component 4942 may generally be similar to the on-premises component 4932, but may be implemented in the cloud-based system 1006, as opposed to within a private environment 4930. While shown as distinct from the system instances 308, the cloud-based second component 4942 may be implemented by those instances 308 (e.g., by a search head executing on an instance 308). Thus, while embodiments of the present disclosure are discussed with reference to an on-premises component, one skilled in the art will appreciate that these embodiments may alternatively include a cloud-based second component of a cloud-based data intake and query system 1006.

5.2 Example User Interfaces

Figure 51:

FIGS. 50 and 51 depict example user interfaces of a multi-component application, in accordance with embodiments of the present disclosure. FIG. 50 depicts an interface 5000 enabling selection of different versions of a first component, such as a cloud-provided component 4904, to be used to provide the application. FIG. 51 depicts an interface 5100 notifying a user that a feature of the first component is unavailable due to a lack of compatibility with a second component, such as the on-premises component 4932 or the cloud-based second component 4932. The interfaces of FIGS. 50 and 51 include elements similar to the interface 3700 of FIG. 37. For brevity, those elements will not be re-described.

The interface 5000 of FIG. 50 includes a "Version Selector" input selectable by an end user to display a listing 5006 multiple available versions of a first component of a multi-component application. The input may be provided in conjunction with the first component. For example, the first component may render the interface 5000 within a network access program, such as a web browser, of a client device 102. Items within the listing 5006 illustratively correspond to version indicators of the first component. As an example, the listing 5006 indicates that both a stable and a latest version of the first component are available. In FIG. 50, a user has selected to utilize a stable version of the first component, as shown by a check mark indicating the selected version 5004. Selection of a different version can cause the corresponding version to be loaded within the interface 5000, thereby enabling a user to modify functionality of the interface. In some examples, the selected version 5004 is loaded upon selection of a version from the listing 5006. In some examples, the selected version 5004 is loaded upon execution of another operation, such as when the interface 5000 is reloaded. In these examples, reloading may occur automatically or may be initiated by a user. Selection of a different version of the first component in some embodiments does not require modification to a second component. Thus, an end user may seamlessly and rapidly modify functionality of an application using the interface 5000 of FIG. 50, even when modification of the second component is difficult or not possible by the user.

As discussed above, in many instances functionality may be added to a multi-component application without requiring modification to a second component. However, in some instances new functionality added to the application via a first component may also depend on functionality provided by the second component. In the instance that an incompatible version of a second component is used, it is desirable to maintain compatibility between the first and second components. In one embodiment, compatibility is maintained by adjusting functionality of the first component, such as by disabling features of the first component that depend on functionalities unavailable within a second component. The interface 5100 of FIG. 51 provides one example of an interface to notify an end user of adjusted functionality. As an example, the interface 5100 includes an input 5102 corresponding to a new feature made available within the multi-component application, for which the first component includes executable code. In this example, the new feature depends on functionality provided only in some versions of a second component (e.g., a newer version than the currently-installed version). As such, as will be described in more detail below, the first component may detect that the second component is not a version that can provide the functionality. Should the user select the input 5102, the first component—rather than providing the new functionality—may provide a notification 5104 to the end user, notifying the end user that their provided second component is not of a correct version to provide the functionality. In one embodiment, the notification 5104 may prompt a user to upgrade their second component, in order to access the functionality. For example, as shown in FIG. 51, a link may be provided with instructions on upgrading the second component.

In contrast to traditional mechanisms of notifying end users of new functions, such as a listing of new features, the interface of FIG. 51 may enable end users to view how new features integrate into the overall application, thus incentivizing acquisition of the new features.

5.3 Multi-Component Applications in a Hybrid Environments

Figure 52:
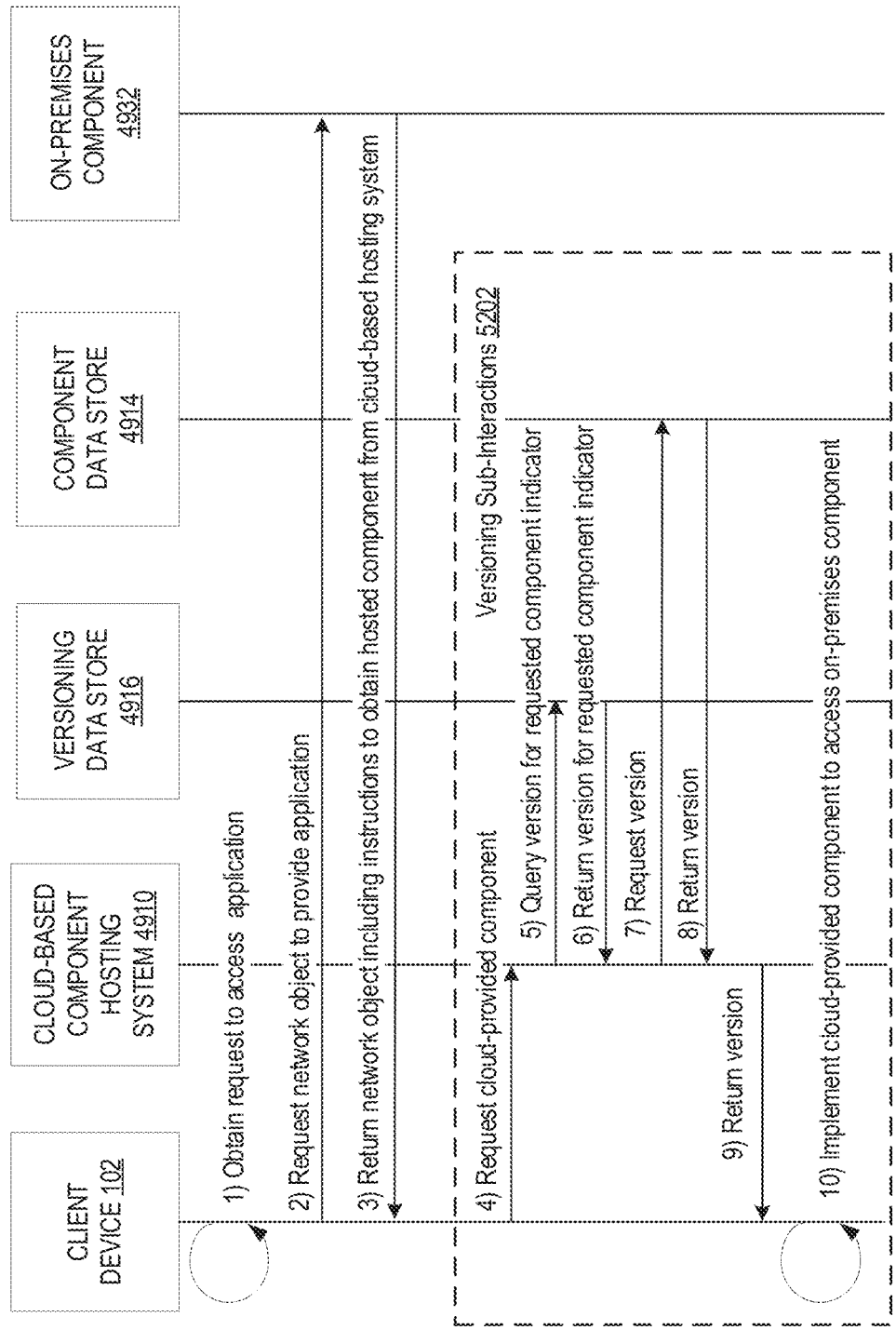
FIG. 52 depicts an illustrative flow enabling a client device to be provided with a multi-component application.

As discussed above, end users may benefit from the agile nature of the multi-component application disclosed herein, enabling aspects of the application to be altered rapidly through changes to a first component (e.g., a cloud-provided component). Moreover, end users may benefit from accessing the multi-component application in a similar manner to accessing a typical single component application (e.g., without being required to themselves configure multiple components to interact with one another). FIG. 52 depicts an illustrative flow enabling a client device 102 to be provided with a multi-component application in a manner that, from the point of view of an end user, is similar to accessing a single component application, and further enabling the end user to rapidly modify a cloud-provided component of the multi-component application to adjust functionality of the application without requiring changes in configuration of an on-premises component.

The interactions of FIG. 52 begin at (1), where a client device 102 obtains a request to access an application, such as an application enabling access to a data intake and query system 108. Illustratively, the request may be selection of a hyperlink in an access program 4902 (e.g., a web browser), typing a URL of the system 108 into the access program 4902, opening the access program 4902 (e.g., where the program 4902 is dedicated or pre-configured to access the system 108), or the like.

In response to the request, the access program 4902 at the client device 102 transmits to the on-premises component 4932 a request for a network object corresponding to the application. The request may correspond, for example, to an HTTP GET request for an HTML document. The request may illustratively be transmitted to a web server of the on-premises component 4932 based on a URL entered into or known by the client device 102. Alternatively or additionally, the request may be transmitted to an instance of a web server executing in a cloud-based hosting environment. The request may in some instances include information about the client device 102 or end user, such as authentication information of the end user (e.g., a username and password, a security token, etc.).

At (3), the on-premises component 4932 returns to the client device 102 the requested network object, which may illustratively be a HTML-formatted document renderable by the access program 4902. In a single component application, a network object may be renderable to provide direct access to the on-premises component 4932, thus enabling interaction with a data intake and query system 108 (or other on-premises data or functionality). In a multi-component application, a network object may be utilized to redirect the client device 102 to a cloud-provided component that enables use of the on-premises component. For example, the network object may be an HTML document that includes an embedded element, such as an iframe, addressed to the cloud-based hosting system 4910.

As discussed above, use of an embedded element may enable the client device 102 to maintain a network connection (e.g., an HTTP session) with both the on-premises component 4932 (by virtue of processing the network object) and with the cloud-based hosting system 4910 (by virtue of processing the embedded network object). In this manner, the client device 102 may act as a "bridge" between these two systems. For example, a cloud-provided component received from the cloud-based hosting system 4910 may obtain metadata from the cloud-based hosting system 4910, and utilize that metadata to derive queries to be passed to the on-premises component 4932 (or directly to the data intake and query system 108). In this manner, information provided by the cloud-based hosting system 4910 (e.g., a cloud-provided component 4904 and metadata) may be used to facilitate interaction with the data intake and query system 108 without requiring that the system 108 be made publically addressable, thus maintaining security and firewall protections of the system 108.

In one embodiment, the embedded element may span the entire viewing window of an access program 4902, and thus appear from the view of the end user to operate similarly to a full redirect. In other embodiments, such as where the on-premises component 4932 is publically accessible, a full HTTP redirect may be used in place of a network object with an embedded element (e.g., by the on-premises component 4932 returning an HTTP 3XX status code in place of the requested network object).

On receiving the network object, the client device 102 processes the embedded element, causing the client device to request the cloud-provided component from the cloud-based hosting system 4910, at (4). The request may, for example, correspond to an HTTP GET request for a network resource identified in the embedded element. To facilitate identification of a correct version of the cloud-provided component, the request illustratively includes a version indicator, corresponding to a version type for the cloud-provided component. In one embodiment, the version indicator indicates one of a "latest" or "stable" version type. The version indicator may be user-specified, or may be specified by the on-premises component. For example, the embedded element of the network object provided by the on-premises component may by default result in a request that includes a "stable" version indicator (e.g., by use of an HTTP GET variable set to "stable"). Additionally or alternatively, the on-premises component 4932 and/or the client device 102 may maintain preference information for the end user that specifies a version indicator, which may then be included in the request at (4). In some embodiments, preference for a version indicator may be shared among multiple end users. For example, a group of end users (such as all employees of a business entity, a subset of employees, a development team, or other grouping) may be associated with a shared preference for a version indicator. In one instance, the shared preference may be a default preference, and an individual end user may override this preference at an individual level. In another instance, the shared preference may be modifiable at a group level, such that an individual end user (e.g., with appropriate permissions) may modify the shared preference to cause each individual end user of the group, when interacting with the cloud-based hosting system 4910, to receive an on-premises component 4932 corresponding to version indicator indicated by the modified shared preference.

After requesting the cloud-provided component from the cloud-based hosting system 4910, the cloud-based hosting system 4910 processes the request for the cloud-provided component by identifying a specific version of the cloud-provided component that corresponds to the requested version indicator. For example, at (5), the cloud-based hosting system 4910 queries the versioning data store 4916 for a version of the cloud-provided component that corresponds to the specified version indicator. Illustratively, the system 4910 may query the data store 4916 for what numerical version of the cloud-provided component is currently designated as "stable." The versioning data store 4916 identifies the version, and returns information identifying the version to the system 4910. Thereafter, at (7), the system 4910 queries the component data store 4914 for the version identified by the versioning data store 4916, which version may be stored within the component data store 4914 as code. For example, the system 4910 may query the component data store 4914 for version "1.2.8" of a cloud-provided component (corresponding to a "stable" version, in this example).

At (8), the component data store 4914 returns the version to the cloud-based hosting system 4910. Illustratively, the data store 4914 may return the version as a set of code. In one embodiment, the code can include PUP, JavaScript, and/or another type of code that can be executed on the client device 102, possibly accompanied by HTML, which in combination the client device 102 may implement to provide the cloud-provided component. Thus, at (9), the cloud-based hosting system 4910 returns the version to the client device 102. The client device 102, at (10), then implements the cloud-provided component. In one embodiment, the cloud-provided component is implemented as a "single page application" (or "SPA"), which provides a variety of functionalities at the client device 102 without requiring the access program 4902 to load additional network objects or to navigate to a different network object (e.g., web page). For example, the cloud-provided component may include client-side scripting or other program code executable to implement a variety of functionalities within a single network object representing the cloud-provided component (which object may, for example, be displayed within the embedded element of a parent network object, as discussed above). In some embodiments, the client-side scripting may enable communication between the client device 102 and other systems, such as the cloud-component hosting system 4910, during implementation of the cloud-provided component. For example, the client-side scripting may implement asynchronous JavaScript ("AJAX") to retrieve and populate data into the cloud-provided component during implementation on the client device 102, without requiring the access program 4902 to navigate to a different network object. Moreover, and as will be described in more detail below, the cloud-provided component may enable use of the on-premises component, providing the multi-component application to an end user and enabling the end user to access an on-premises data intake and query system 108 (or other on-premises data or functionality).

As shown in FIG. 52, interactions (4) through (10) represent versioning sub-interactions 5202. These interactions may be repeated to rapidly alter the cloud-provided component loaded at the client device 102, thereby altering functionality of the multi-component application. For example, each version of a cloud-provided component (or, alternatively, the network object provided by the on-premises component) may include an input enabling selection of an alternative version indicator. An example of such an input is depicted, for example, in FIG. 50. End user selection of the input may cause interactions (4) through (10) to be repeated accordingly to a newly selected version indicator. Thus, for example, an end user may select the input to switch between loading a "stable" version of the cloud-provided component and a "latest" version of the component. Notably, interactions (4) through (10) do not require interaction with the on-premises component 4932. Thus, an end user may, by use of different cloud-provided components, alter functionality of a multi-component application without requiring modification to the on-premises component 4932.

As noted above, in some embodiments the cloud-based hosting system 4910 may store metadata used by the cloud-provided component, such as workflows, visualizations, or the like. This metadata may be shared between one or more end users. As such, it is desirable to authenticate end users to the cloud-based hosting system 4910, to ensure that each end user is provided only with the metadata intended for that end user. While any number of traditional authentication schemes could be used to authenticate the end user with the cloud-based hosting system 4910, these schemes often require the end user to provide specific information, such as a password, to the system 4910. Because the end user may have already authenticate with the on-premises component 4932, reauthentication may be cumbersome, and may impair providing an experience that is similar to use of a single-component application.

To address these and other possible issues, in some embodiments of the present disclosure the on-premises component 4932 may be configured to act as an identity provider on behalf of the end user. For example, after having authenticated to the on-premises component 4932, the on-premises component 4932 may provide authentication information of an end user to the cloud-based hosting system 4910, thus enabling the end user to access metadata on the system 4910 without reauthenticating to that system 4910. Interactions for using the on-premises component as an identity provider for an end user of a client device 102 are shown in FIG. 53.

Figure 53:
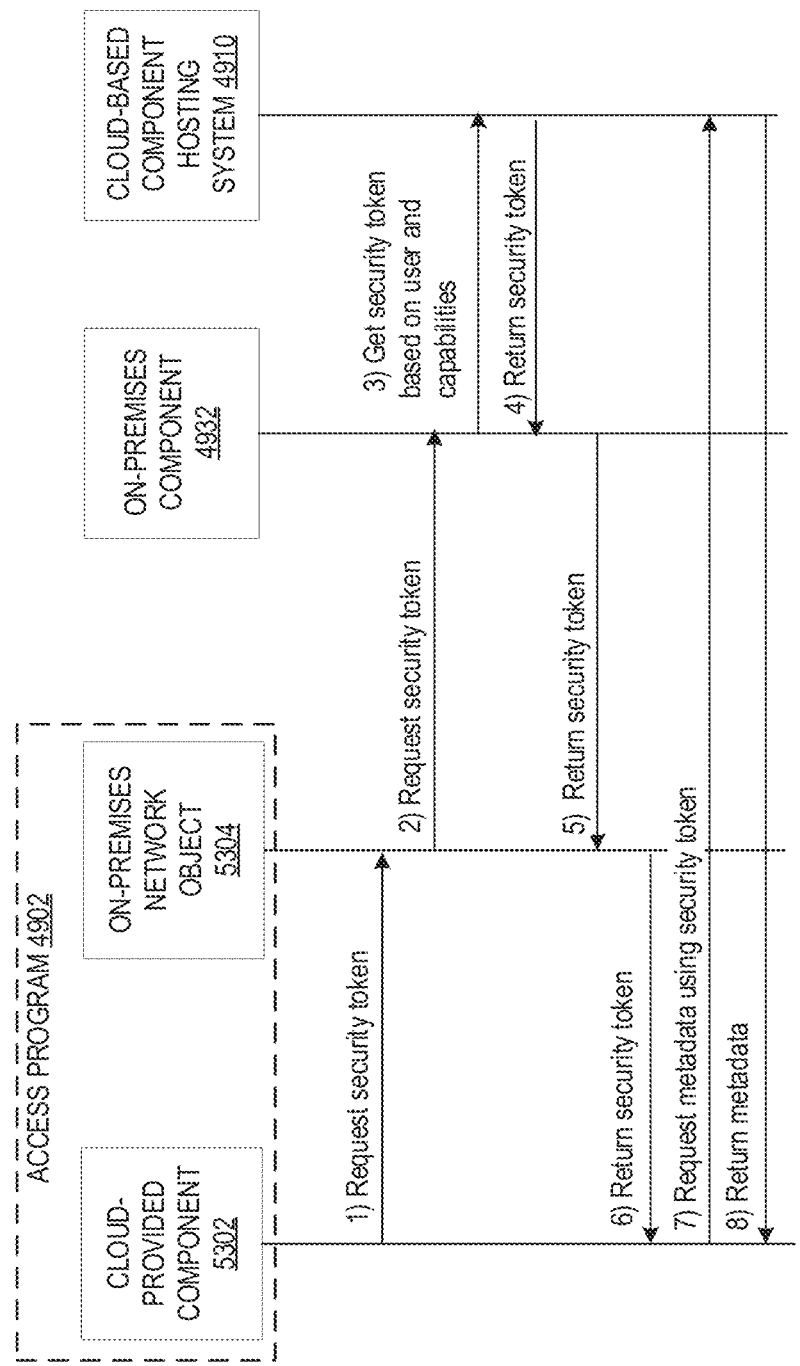
FIG. 53 depicts an illustrative flow for using the on-premises component as an identity provider for an end user of a client device.

As shown in FIG. 53, the interactions depicted occur in part between different objects loaded into an access program 4902 on a client device 102; specifically, a cloud-provided component 5302 and a network object 5304 provided by the on-premises component (referred to for brevity as an "on-premises network object"). These objects may be loaded, for example, according to the interactions of FIG. 52. In one example, the on-premises network object 5304 is a web page provided by the on-premises component 5302 and the cloud-provided component 5302 is a web page loaded within an embedded element (e.g., an iframe) of the on-premises network object 5304.

As noted above, the on-premises network object 5304 may act as a "bridge" between the cloud-provided component 5302 and the on-premises component 4932, enabling these two to communicate without compromising firewalls or other security of the on-premises component 4932. Accordingly, the interactions of FIG. 53 begin at (1), where the cloud-provided component 5302 transmits a request to the on-premises network object 5304 for a security token. The on-premises network object 5304, in turn, transmits the request (or a separate corresponding request) to the on-premises component 4932. As will be described below, the requested security token may be used by the cloud-provided component 5302 to authenticate with the cloud-based hosting system 4910, and to retrieve information (e.g., metadata) permitted to be accessed by an end user.

In the interactions of FIG. 53, it is assumed that an end user has previously authenticated with the on-premises component 4932 (e.g., during the interactions of FIG. 52). As such, the on-premises component is aware of an identity of the end user, and the capabilities of the end user within the private environment 4930. The on-premises component 4932 therefore acts as an identity provider for the end user, by at (3) notifying the cloud-based hosting system 4910 of the identity of the end user and the end user's capabilities, and requesting a security token usable by the cloud-provided component to authenticate the end user to the cloud-based hosting system 4910. In some embodiments, the request for a security token may include authentication information of the on-premises component. For example, the request may be digitally signed by the on-premises component 4932 according to public key cryptography.

The cloud-based hosting system 4910, in turn at (4), provides the requested security token to the on-premises component 4932. As shown in FIG. 53, the token is then passed back to the cloud-provided component 5302, by first being returned from the on-premises component 4932 to the on-premises network object 5304 at (5), and then being returned from the on-premises network object 5304 to the cloud-provided component 5302 at (6).

Thereafter, the cloud-provided component 5302 may utilize the security token to directly interact with the cloud-based hosting system 4910 as the authenticated end user, independent of the on-premises component. For example, as shown at interaction (7), the cloud-provided component 5302 may request metadata from the cloud-based hosting system 4910 using the security token, which is returned at (8).

During operation of the cloud-provided component 5302, metadata may be communicated between the cloud-provided component 5302 and the cloud-based hosting system 4910 at various times. For example, where a user of the cloud-provided component 5302 modifies metadata, the user may request saving of the modification, and the cloud-provided component 5302 may submit the modified metadata to the cloud-based hosting system 4910 for storage. Each such communication may use the security token to ensure authentication of the end user. In some instances, the provided security token may be associated with an expiration time (e.g., a 10, 20, or 30 minute duration, etc.). Thus, the interactions of FIG. 53 may be periodically repeated to ensure that the cloud-provided component 5302 maintains a non-expired security token.

As discussed above, use of a multi-component application may enable rapid development of functionality of the application by use of different versions of a first (e.g., cloud-provided) component, without requiring modification of a second (e.g., on-premises) component. For example, a developer of a multi-component application may provide or administer the cloud-based hosting system 4910, enabling the developer to provide new versions of a first component (such as the cloud-provided component 4904) and to designate version indicators for various versions of the first component. Illustratively, the developer may determine that a given version of the first component (which may have previously been designated as a "latest' version) should, as of a given date (e.g., a "release date") be designated as "stable." The developer may then modify the versioning data store 4916 such that the "stable" version indicator is mapped to the version of the first component. In such a case, the previous "stable" version may be deprecated, and may no longer be available. The developer may further modify the versioning data store 4916 to designate a new "latest" version, which may correspond to newly provided code of the first component. After such modification, requests from client devices 102 to obtain a given version indicator (e.g., "latest" or "stable") may be satisfied by providing the code of the newly-mapped versions, thus enabling those client devices 102, as of the release date, to obtain a most recent "latest" or "stable" version of the first component. In some instances, the developer may implement a release cadence whereby at each release date, a prior "latest" version is designated as "stable" and a new "latest" version is provided.

However, there may be instances in which functionality added to a multi-component application is required to be implemented at least partially in the second component. For example, where a first component provides a frontend for data visualization and a second component provides a backend for data processing, new visualizations may be added by modification of the first component, but new data processing may require modification of the second component. As another example, where a first component provides data analysis and a second component provides an API to retrieve data for analysis, new types of data analysis may be added by modification of the first component, but only where the API of the second component enables the first component to retrieve the necessary data. In some instances, modification of the second component may occur independently of modification of a first component. For example, while a developer may modify versions of a first component by interaction with the cloud-based hosting system 4910, the second component may be administered by a separate entity (e.g., an administrator of a private environment, an administrator of a cloud-based data intake and query system 1006, etc.). As such, various different private environments may implement various different versions of a second component. It may therefore be desirable to adjust functionality of a first component to maintain compatibility with a second component, enabling agile modification of the first component without requiring modification of the second component.

Figure 54:
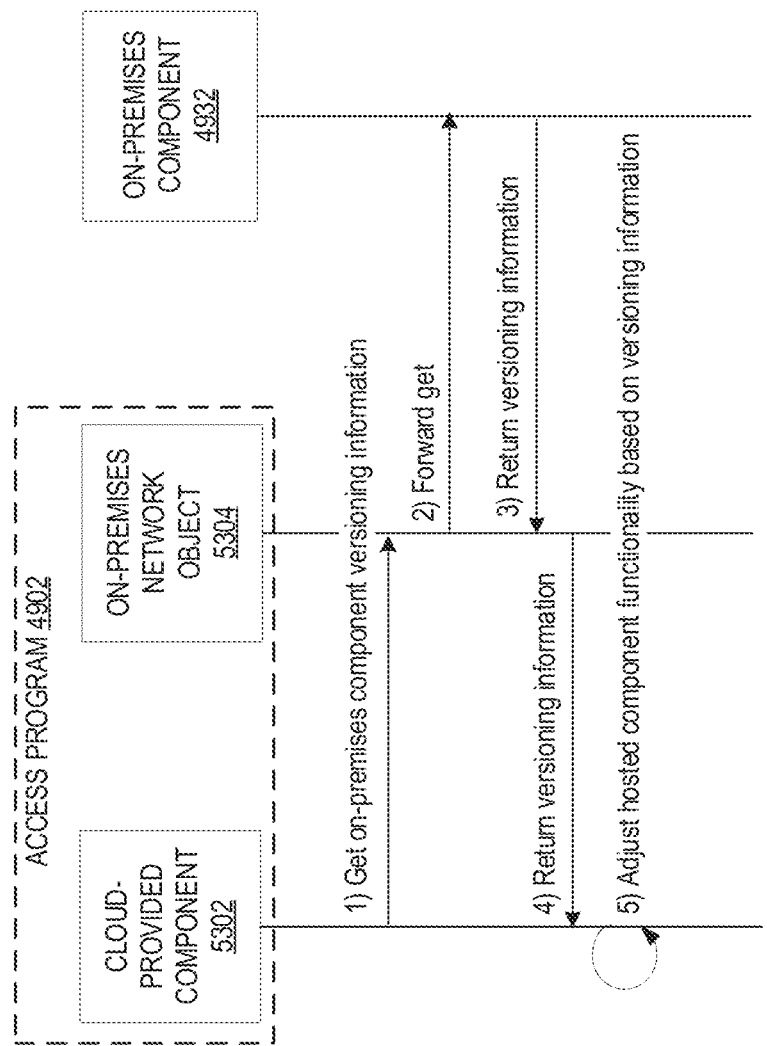
FIG. 54 depicts an illustrative flow for adjusting functionality of a first component in a multi-component application to maintain compatibility with a second component.

Illustrative interactions for adjusting functionality of a first component (illustratively a cloud-provided component) to maintain compatibility with a second component (illustratively an on-premises component) are displayed in FIG. 54. The interactions of FIG. 54 may occur, for example, on initialization of a cloud-provided component 5302 (e.g., subsequent to or concurrently with the interactions of FIG. 54).

The interactions of FIG. 54 begin at (1), where the cloud-provided component 5302 transmits a request to the on-premises network object 5304 for versioning information regarding the on-premises component 4932. In accordance with the discussion above, the request may be transmitted to the on-premises network object 5304 in order to utilize the existing network connection between the on-premises network object 5304 and the on-premises component 4932. For example, client-side scripting within the cloud-provided component 5302 may pass the request to client-side scripting of the on-premises component 4932. The on-premises network object 5304 then, at (2), forwards the request to the on-premises component 4932, such as by using the HTTP connection established when loading the on-premises network object 5304.

At (3), the on-premises component 4932 retrieves its version information, and returns that information to the on-premises network object 5304 (e.g., over the HTTP connection). The network object 5304, at (4), returns the information to the cloud-provided component 5302 (e.g., by use of client-side scripting).

Thereafter, at (5), the cloud-provided component 5302 may adjust its functionality based on the version of the on-premises component 4932. For example, the code of the cloud-provided component 5302 may designate certain functionalities of the component 4932 as requiring a minimum version of the on-premises component 4932. Thus, if the detected version of the component 4932 does not meet the minimum version, these functionalities may be disabled. In some instances, use of these functionalities may result in a notification to the end user that the functionality is disabled, and an invitation to update the on-premises component 4932 to a more recent version. An example of such an invitation is depicted, for example, in FIG. 51.

Figure 55:
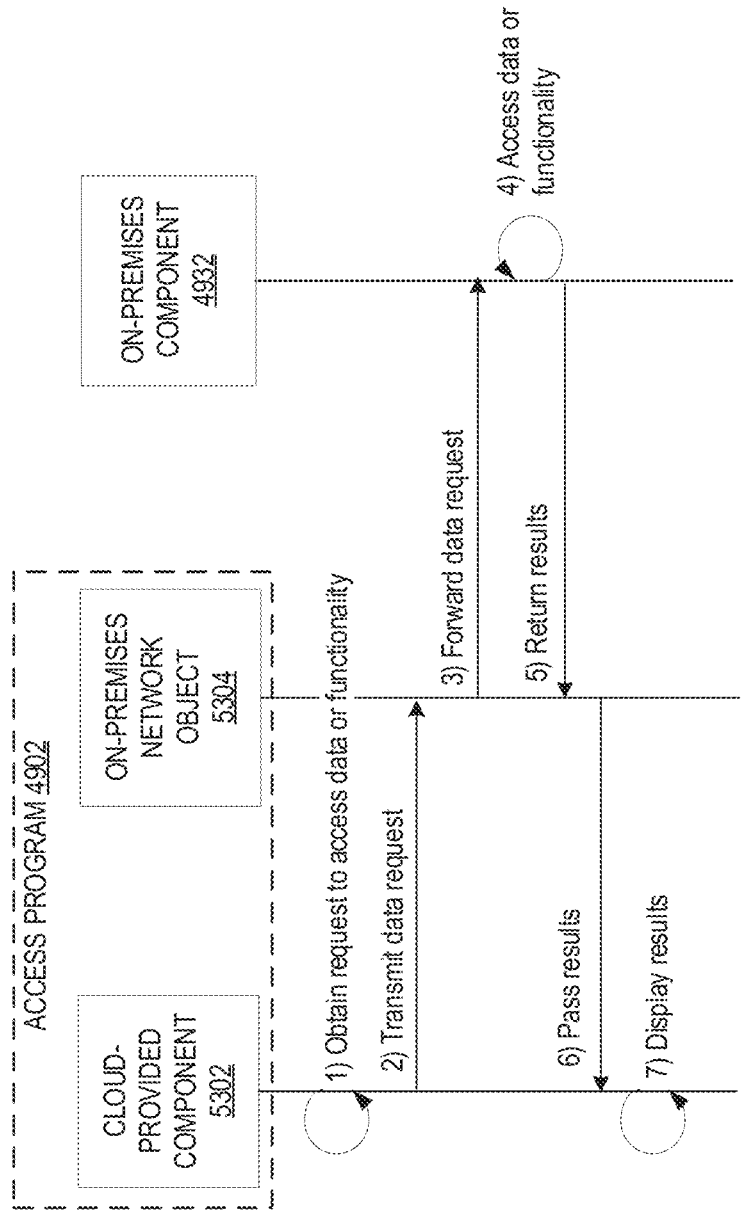
FIG. 55 depicts an illustrative flow for operation of first and second components to provide a multi-component application to an end user.

After initialization (e.g., including obtaining a security token, loading metadata from the cloud-based hosting system 4910, adjusting functionality to maintain compatibility with the on-premises component 4932, etc.), the cloud-provided component 5302 and the on-premises component 4932 can interoperate to provide the multi-component application to an end user. Illustrative interactions for operation of the cloud-provided component 5302 and the on-premises component 4932 to provide the multi-component application to an end user are depicted in FIG. 55. While the interactions of FIG. 55 are described with respect to use of a multi-component application to access an on-premises data intake and query system 108, such an application may be used to access any of a variety of data or functionalities.

The interactions of FIG. 55 begin at (1), where the cloud-provided component 5302 obtains a request to access data or functionality made available by the on-premises component, such as data of the data intake and query system 108. The request may be obtained, for example, as user interaction to an interface provided by the cloud-provided component 5302. For example, the request may take the form of an input corresponding to a query (e.g., in the SPL query language) and selection of a "run query" button within an interface. Additionally or alternatively, the request may take the form of selection of a workflow displayed within an interface, which workflow corresponds, for example, to a series of steps (each of which may correspond, for example, to a query against the system 108, data analysis of query results, visualizations of results, or the like).

At (2), the cloud-provided component 5302 transmits a data request to the on-premises network object 5304, requesting data from the on-premises component 4932 to be used to satisfy the user request. The data request may correspond to the obtained request from the user. For example, the data request may include an SPL-formatted query input by the user, a data request corresponding to a first step of a workflow, or the like. As noted above, transmission of the data between the cloud-provided component 5302 and the on-premises network object 5304 may occur via operation of client-side scripting (e.g., JavaScript). The on-premises network object 5304, at (3), forwards the request to the on-premises component 4932. Because the on-premises network object has an existing connection to the on-premises component 4932, transmission of the request may generally not require the component 4932 to be publicly accessible, thus maintaining security of the component 4932.

In one embodiment, the on-premises component 4932 may provide an interface, such as an API, with a known structure. As such, the cloud-provided component 5302 may transmit a data request formatted for that interface, and the request may be forwarded by the on-premises network object 5304. In another embodiment, the on-premises network object 5304 may act to "translate" requests between the cloud-provided component 5302 and the on-premises component 4932, such as by modifying a format of the request to comply with an interface of the on-premises component 4932.

On receiving the request, the on-premises component 4932 processes the request by accessing its available data or functionality (e.g., within the data intake and query system 108) and determining results of the request. For example, where the request specified a certain query be run against a dataset, the on-premises component 4932 may execute the query and return results. The results may then, at (5), be returned to the on-premises network object 5304, and at (6) to the cloud-provided component 5302. The cloud-provided component may then, at (7), display the results (or information derived from the results, such as a visualization, summarization, or other graphical or textual display) to an end user.

While FIG. 55 is discussed with respect to passing of a request to an on-premises component 4932 distinct from a data intake and query system 108, in some instances that component 4932 may be incorporated into the system 108. For example, a search head 210 may include or implement the on-premises component 4932. In such an embodiment, the cloud-provided component 5302 and on-premises network object 5304 may interact with the search head 210 in a manner similar to that described above. For example, the component 5302 may submit an SPL-language query to the object 5304, which the object 5304 may pass to the search head 210 to be executed. In this embodiment, the results of the query may correspond to event records matching the query, which records may be used to support display of information (e.g., a visualization) within an interface on a client device 102. Moreover, while FIG. 55 depicts a single round-trip communication between the cloud-provided component 5302 and the on-premises component 4932, in some instances multiple round trip communications may occur. For example, where the end user request is execution of a workflow including a series of steps, any or all of such steps may involve transmission of a data request to the system 108. Thus, the interactions of FIG. 55 are intended to be illustrative in nature.

5.4 Example Routines to Provide a Multi-Component Application

Figure 56:
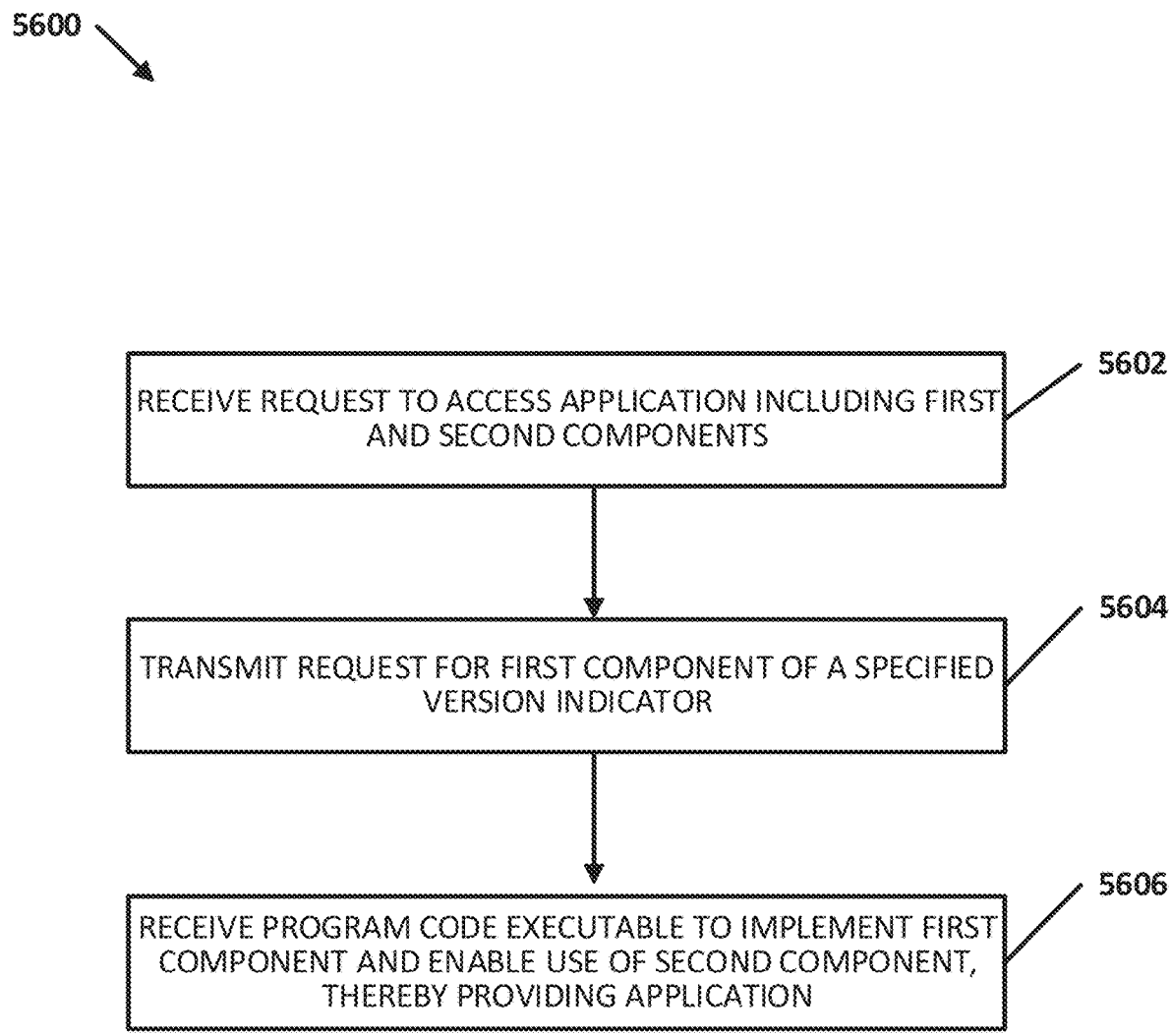
FIGS. 56-58 depict example routines that may be used to provide a multi-component application, as described herein.
Figure 57:
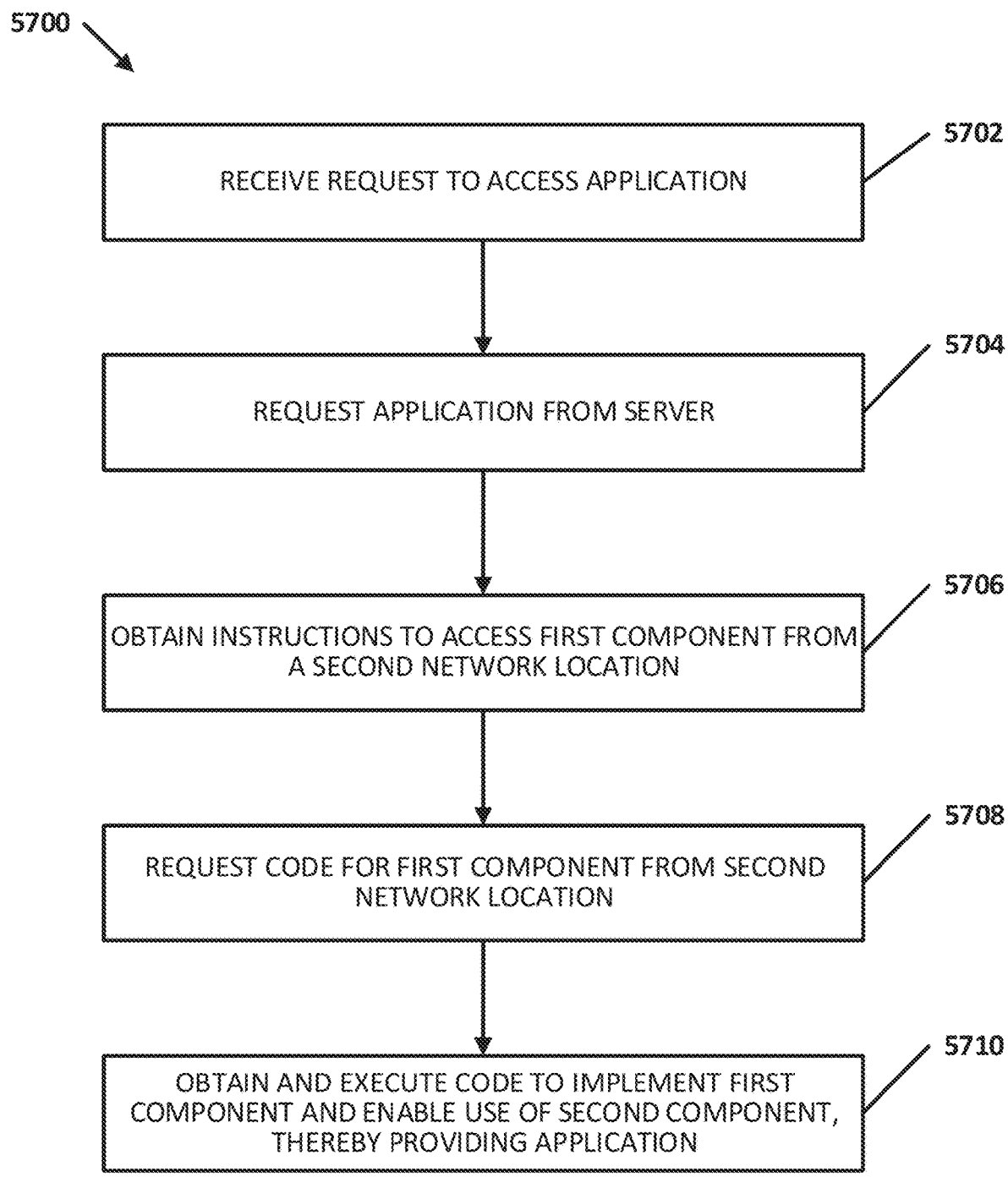
Figure 58:
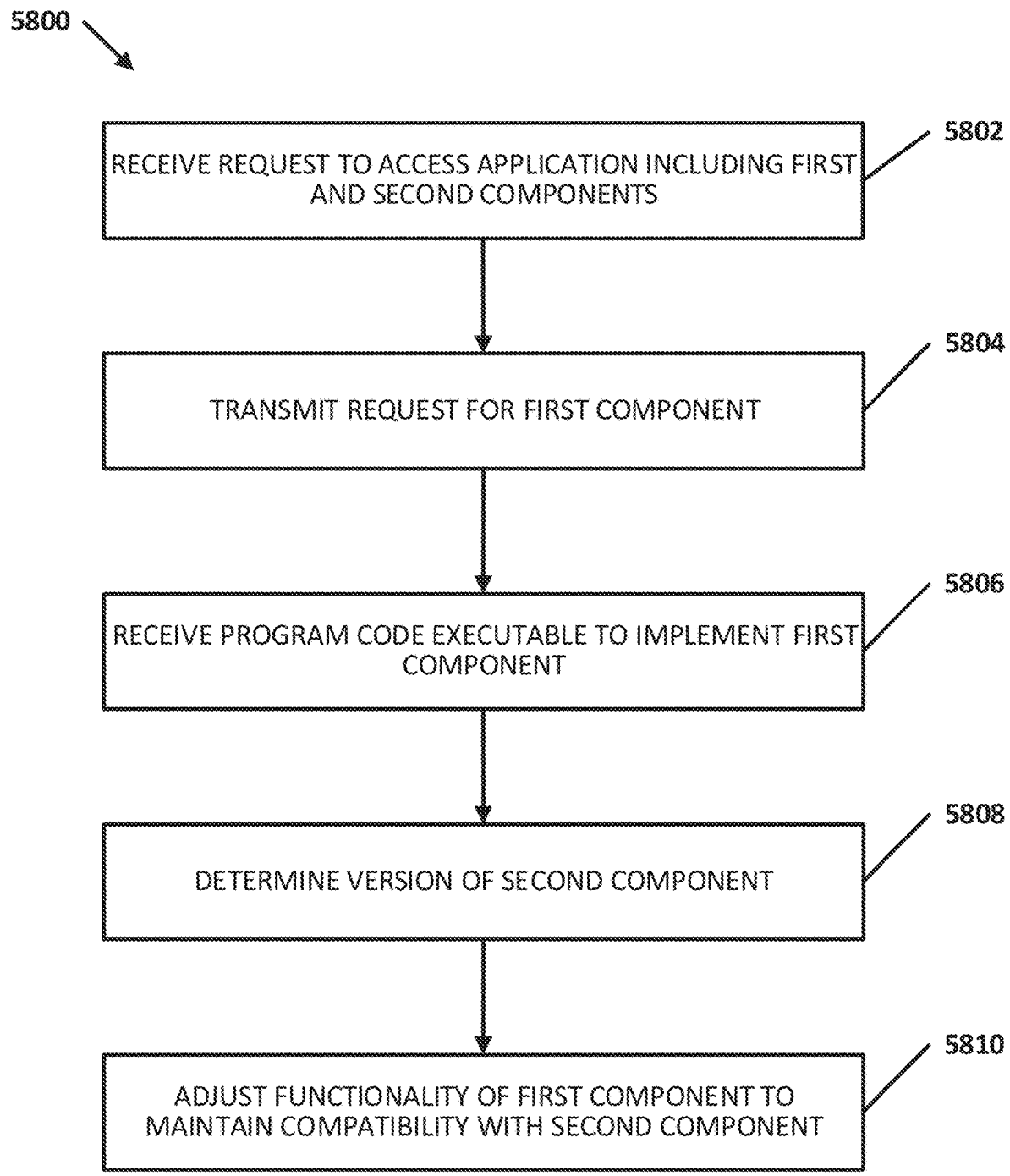

FIGS. 56-58 depict example routines that may be used to provide a multi-component application, as described herein. For example, FIG. 56 depicts an illustrative routine for providing a multi-component application including a first component whose version may be altered to vary the functionality of the application, without requiring modification to a second component of the application; FIG. 57 depicts an illustrative routine for seamlessly providing a multi-component application in a manner that, from the point of view of an end user, is similar to accessing a single-component application; and FIG. 58 depicts an illustrative routine for adjusting functionality of a first component in a multi-component application to maintain compatibility with a second component of the application.

The illustrative routines of FIGS. 56-58 may be implemented, for example, by a client device 102. In one embodiment, the client device 102 implements a first component of the multi-component application, which may be for example a cloud-provided component 5302. Execution of the first component can enable use of a second component, such as an on-premises component 4932 or a cloud-based second component 4932, providing access to data or functionality. Because these components may be decoupled and independently modifiable, overall functionality of the application may be varied by modification to the first component, without requiring that the second component be modified (e.g., because modification of the second component may be more difficult in terms of requiring, for example, administrative access).

With reference to FIG. 56, the illustrative routine 5600 begins at 5602, where a client device 102 obtains a request to access an application including first and second components. The request may correspond, for example, to end user input to the client device 102 (e.g., accessing an access program, such as a web browser or dedicated program, typing a URL or selecting a hyperlink to the application, etc.).

At block 5604, the client device 102 transmits a request for the first component, including a specified version indicator for the first component. Illustratively, the version indicator may indicate a particular version type for the first component, such as a "latest" or "stable" version. In one embodiment, the user may specify a version type within their request to access the application. For example, when executing one version of a first component, a user may select a hyperlink to another version of the first component. In another embodiment, the client device 102 may maintain a record of an end user's preferred version. For example, an access program may maintain a record (e.g., a cookie of a web browser) indicating a preferred content indicator, and append the request of block 5604 with the indicator. In still other embodiments, the version indicator may be added to the request based on instructions from an external device. For example, where a user attempts to access the second component directly (e.g., as if the second component were a single component application), the second component may instruct the client device 102 to obtain the first component, and further specify a version indicator of the first component (e.g., as a default version indicator). In one embodiment, the request of block 5604 is an HTTP-formatted request, such as a GET request. The request is illustratively transmitted over a network to a device maintaining one or more versions of the first component. For example, the request may be transmitted over the network 104 to the cloud-based hosting system 4910. In one embodiment, the request is transmitted over a public portion of the network 104 (e.g., the public Internet), which may itself be considered a network.

At block 5606, the client device 102 receives program code executable to implement the first component. In one embodiment, the program code may include client-side scripting executable within a network access program of the client device 102, such as a web browser. The code may be received in conjunction with markup language, such as HTML, renderable to present an interface of the first component on the client device 102. For example, where the request of block 5604 is an HTTP request, block 5606 may correspond to receiving an HTTP response including an HTML document and client-side scripting. As discussed above, the first component may enable use of the second component (e.g., on a remote system), and the first and second component, in conjunction, provide the application. For example, the first component may provide a frontend through which the second component—a backend—may be accessed. In one embodiment, the first component and second component communicate over a private network (e.g., a private portion of the network 104). Thus, while the first component may be provided by a remote system (e.g., the cloud-based hosting system 4910), that remote system is not required in some embodiments to have the capability of accessing the second component.

With reference to FIG. 57, an illustrative routine 5700 is depicted to seamlessly provide a multi-component application in a manner that, from the point of view of an end user, is similar to accessing a single-component application. The routine 5700 may be implemented, for example, by a client device 102.

The routine 5700 begins at block 5702, where the client device 102 receives a request to access an application. The request may correspond, for example, to end user input to the client device 102 (e.g., accessing an access program, such as a web browser or dedicated program, typing a URL or selecting a hyperlink to the application, etc.).

At block 5704, the client device 102 requests the application from a server, in a manner similar to a request for a single component application. For example, the client device 102 may request a web page from the server that is associated with the application. In one embodiment, the server is associated with data or functionality of the application. For example, the server may provide a second component of the multi-component application. The server may correspond, for example, to a device hosting the on-premises component 4932 of FIG. 49A, or a device hosting the cloud-based second component 4932 of FIG. 49B. To enable agile modification of functionality of the application, the server may be configured to redirect the client device 102 to an alternative network location to obtain a first component that, in conjunction with the second component, provides the application.

Accordingly, at block 5706, the client devices 102 obtains instructions to access a first component from a second network location. In one embodiment, the instructions may included in an HTTP response from the server. For example, the instructions may be included in an HTML document provided by the server. In one instance, the instructions are an HTML element, such as an iframe element, that references the second network location. The second network location may, for example, a device of the cloud-based hosting system 4910 (e.g., the cloud component interface 4912).

At block 5708, the client device 102 requests code for the first component from the second network location, in accordance with the instructions. For example, the client device 102 may process an HTML element and, based on such processing, transmit an HTTP request to a second network location for a network object (e.g., an HTML document) including code for the first component.

At block 5710, the client device 102 obtains the code responsive to the request, and execute the code to implement the first component. The first component illustratively enables use of the second component, thereby providing the multi-component application to an end user of the client device 102. As discussed above, code for the first component may include client-side scripting executable within a network access program of the client device 102, such as a web browser. The code may be provided in conjunction with markup language, such as HTML, renderable to present an interface of the first component on the client device 102. Thus, block 5710 may include, for example, obtaining a web page responsive to the request of block 5708 and rendering the webpage to provide the first component.

In one embodiment, blocks 5704 through 5710 of the routine 5700 occur programmatically, without requiring input from and end user. Thus, from the point of view of an end user, the user may request access to an application at block 5702, and that application may be provided at block 5710. In this way, a multi-component application can be implemented in a manner that, from the point of view of an end user, provides a similar experience to accessing a single component application.

With reference to FIG. 58, an illustrative routine 5800 is depicted to adjust functionality of a first component in a multi-component application to maintain compatibility with a second component of the application. The routine 5800 may be implemented, for example, by a client device 102.

The routine 5800 begins at block 5802, where the client device 102 receives a request to access a multi-component application, the application including first and second components. The request may correspond, for example, to end user input to the client device 102 (e.g., accessing an access program, such as a web browser or dedicated program, typing a URL or selecting a hyperlink to the application, etc.). As discussed above, the first component may be remotely hosted (e.g., at a cloud-based hosting system 4910), and executable locally on the client device. The second component may be remote to the client device 102, such as within a private environment 4930 or a cloud-based data intake and query system 1006.

At block 5804, the client device 102 transmits a request for the first component. In one embodiment, the request of block 5804 is an HTTP-formatted request, such as a GET request. The request is illustratively transmitted over a network to a device maintaining the first component. For example, the request may be transmitted over the network 104 to the cloud-based hosting system 4910. In one embodiment, the request is transmitted over a public portion of the network 104 (e.g., the public Internet), which may itself be considered a network.

At block 5806, the client device 102 receives program code executable to implement the first component. In one embodiment, the program code may include client-side scripting executable within a network access program of the client device 102, such as a web browser. The code may be provided in conjunction with markup language, such as HTML, renderable to present an interface of the first component on the client device 102. For example, where the request of block 5804 is an HTTP request, block 5806 may correspond to receiving an HTTP response including an HTML document and client-side scripting. As discussed above, the first component may enable use of the second component (e.g., on a remote system), and the first and second component, in conjunction, provide the application. For example, the first component may provide a frontend through which the second component—a backend—may be accessed. In one embodiment, the first component and second component communicate over a private network (e.g., a private portion of the network 104). Thus, while the first component may be provided by a remote system (e.g., the cloud-based hosting system 4910), that remote system is not required in some embodiments to have the capability of accessing the second component.

At block 5808, the first component (e.g., during execution on the client device 102) determines a version of a second component. In one embodiment, the first component may query the second component for version information of the second component. For example, the first component may transmit an HTTP request to the second component to return version information of the second component, and receive in response an indication of a version of the second component. The information received from the second component may additionally include versioning information for other elements used by the second component. For example, where the second component is an on-premises component 4932, the versioning information may include a version of the data intake and query system 108.

In some instances, querying of the second component may be facilitated by a pre-existing connection between the client device 102 and the second component. For example, the client device 102 may have attempted to access the second component directly, and have been instructed to obtain and execute the first component (e.g., by loading an embedded element in a web page). Where a connection to the second component is maintained (e.g., as a parent window to an iframe element), the first component may transmit a query to the second component through that connection. For example, the first component may utilize client-side scripting to submit the request to a parent window of an iframe element. Utilization of a pre-existing connection may beneficially enable querying of the second component without requiring modification of network security for the second component (e.g., modification of firewall rules). In addition, utilization of a pre-existing connection may beneficially negate the need for a first component to obtain addressing information for the second component. Specifically, because the first component may address the second component through a pre-existing connection of the client device 102, the first component may not be required to locate a network address of the second component. In this manner, the first component is not required to "discover" the second component on the network.

At block 5810, the first component adjusts its functionality to maintain compatibility with the second component, based on the versioning information obtained regarding a version of the second component (and potentially other elements used by the second component in providing functionality of the application). Illustratively, code of the first component may include one or more functions that are designated as requiring at least a minimum version of the second component (or other elements used by the second component). Thus, the first component may identify these functions and, if the second component (or other element) does not meet the minimum version requirement, disable the corresponding functionality to maintain compatibility with the second component. In some instances, the functionality may be replaced with a notification that the functionality has been disabled, and/or an invitation to update the second component to a newer version. Accordingly, by operation of the routine 5800, functionality of the application may be modified by providing different versions of a first component, while maintaining compatibility with various versions of a second component that may be available to operate in conjunction with the first component.

6.0 Efficient Alert Notifications from Journey Data

As discussed above, embodiments of the present disclosure can enable a system (e.g., the data intake and query system 108) to analyze events within raw machine data to identify instances of a journey representing a series of touchpoints between a user and one or more computing systems. For example, the computing systems may represent a network-accessible service, providing functionality such as a "create account" process. During the create account process, a user may submit information in various stages, conduct various verification tasks (e.g., completing challenge questions to validate identity, providing a unique code sent to an email address), select a password, and finally log in to the service using the created account. Each step of this process may result in a touchpoint, as the user interacts with the service. This series of steps (e.g., each an occurrence of a given type of event) can define a journey. The particular series of touchpoints of a given user may generally be referred to herein as an "instance" of that journey. While most instances of a journey may result in successful account creation, some may result in errors. Moreover, even some instances that are successful may be frustrating to an end user. For example, an end user may repeat a step of the journey multiple times, due to intermittent errors of the service. Thus, it can generally be desirable for an administrator to inspect journey data to detect such undesirable instances. However, particularly for large services, the number of journey instances may be too large to manually review.

To address this, embodiments of the present disclosure can enable a system (e.g., the data intake and query system 108) to support alerts based on journey instances, such that if one or more journey instances satisfy criteria of an alert, a notification is sent to an administrator of the system. Such criteria may be based on a single instance, or a combination of instances. For example, an alert may be set such that a notification is sent if any single journey repeats a step more than a threshold number of times, reaches an error state step, takes a threshold amount of time between two steps, if the value of a field at a given step exceeds a threshold value, etc. Additionally, an alert may be set such that a notification is sent if multiple journeys (e.g., a threshold number) meet any of the above criteria, or if a statistical value derived from the above criteria is met for a given number or duration of journeys. For example, an alert may be set such that a notification is sent if more than n % of past journeys (the last x journeys, journeys in the last x minutes, etc.) meet the criteria, if an average value of a criteria meets a given threshold (e.g., if average number of steps of past journeys exceeds a value), if the statistical distribution of a criteria meets a given distribution threshold, etc. Alerts may additionally combine criteria according to a logical operator, such that a notification is generated if the value of a field at a given step exceeds a threshold value and a given step is repeated a threshold number of times, for example. Each alert may illustratively be associated with a check periodicity, in which the underlying data is compared to the alert criteria to determine if an alert state has occurred. If so, a notification can be sent in accordance with the alert.

One mechanism for implementing alerts is to treat each alert independently. For example, a workflow could be designed such that for each check period of each alert, events within the data intake and query system 108 could be analyzed to determine whether one or more journeys have occurred that satisfy the criteria for the alert. This approach may be feasible, for example, where the underlying data used to generate an alert is structured. Often, querying structured data is relatively efficient, and thus an evaluation of structured data based on multiple alert criteria could occur relatively quickly and efficiently.

However, as discussed above, journey instances can involve multiple steps, representing multiple events obtained from multiple event sources. These events may not be uniformly formatted, or may utilize different field values to identify a single instance. Thus, generating journeys from raw machine data (e.g., a set of events, each event representing unstructured data) is a non-trivial operation that can consume significant time and computing resources. Accordingly, any attempt to directly and individually evaluate events within unstructured, raw machine data based on multiple alert criteria would also consume significant time and computing resources, potentially to the point where such individual evaluation is not possible.

To address this, embodiments of the present disclosure relate to supporting efficient generation of alert notifications regarding journey instances found in unstructured, raw machine data. Specifically, as opposed to attempting to directly and individually evaluate events within unstructured, raw machine data based on multiple alert criteria, embodiments of the present disclosure can support the periodic identification of journey instances within unstructured, raw machine data, and storage of such journey instances as structured data (e.g., such that each journey instance corresponds to data of a defined format, such as a class object with corresponding fields or variables). The structured data representing journey instances can then be evaluated according to alert criteria, to determine whether an alert state exists. Notably, because a single set of structured data is used to support evaluation of multiple alert criteria, the problems of inefficiency in the identification of journey instances from unstructured, raw machine data are minimized.

A potential downside of this approach is that it may not be possible to restrict the inspection of unstructured machine data on a per-alert-criteria basis. For example, if each alert criteria was directly compared with unstructured machine data, it may be possible to query for only events within the raw data that might satisfy the criteria. Illustratively, if an alert were based on an instance meeting a threshold duration between two events of two given types, it may be possible to restrict a query to the unstructured machine data to events of the two given types, speeding the query relative to a query for all events potentially relevant to a defined journey. While such restriction may be beneficial to an individual query, an outcome of attempting to use alert-scoped queries is that the results of such query apply only to the individual alert being evaluated, and additional queries must be submitted for each other potential alert. Because the computing resources used to conduct queries against raw machine data can be orders of magnitude larger than the resources used to conduct evaluations of structured data, generating a non-alert-scope structured data set of all journey instances reflected in unstructured data, and evaluating that structured data set according to multiple alert criteria can result in efficient alert notifications based on the journey instances in the unstructured data.

6.1 Example User Interfaces for Requesting Alert Notification

Figure 59:
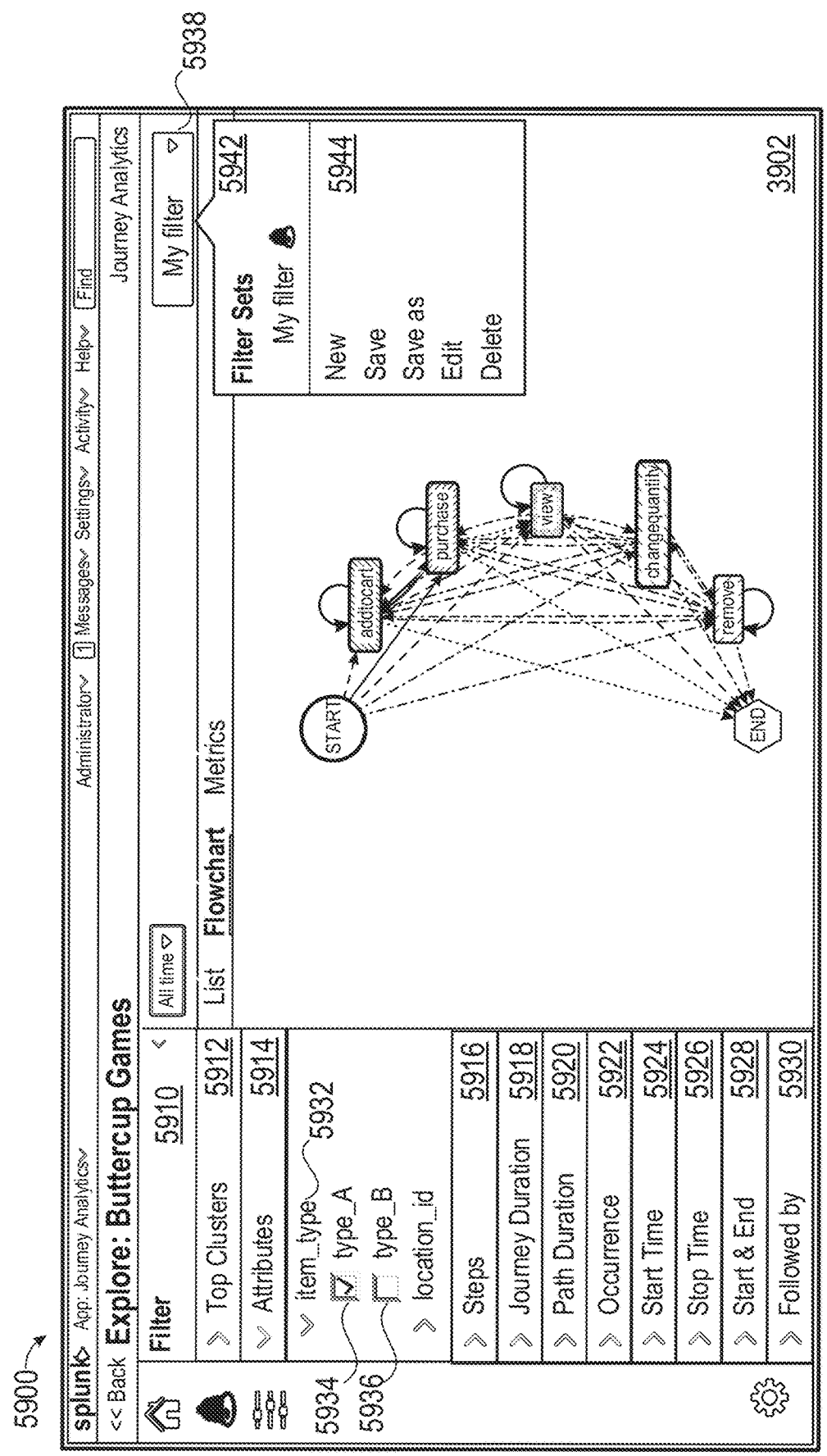
FIGS. 59-61 depict example user interfaces for filtering journey instances and reviewing filtered instances, in accordance with embodiments of the present disclosure.
Figure 60:
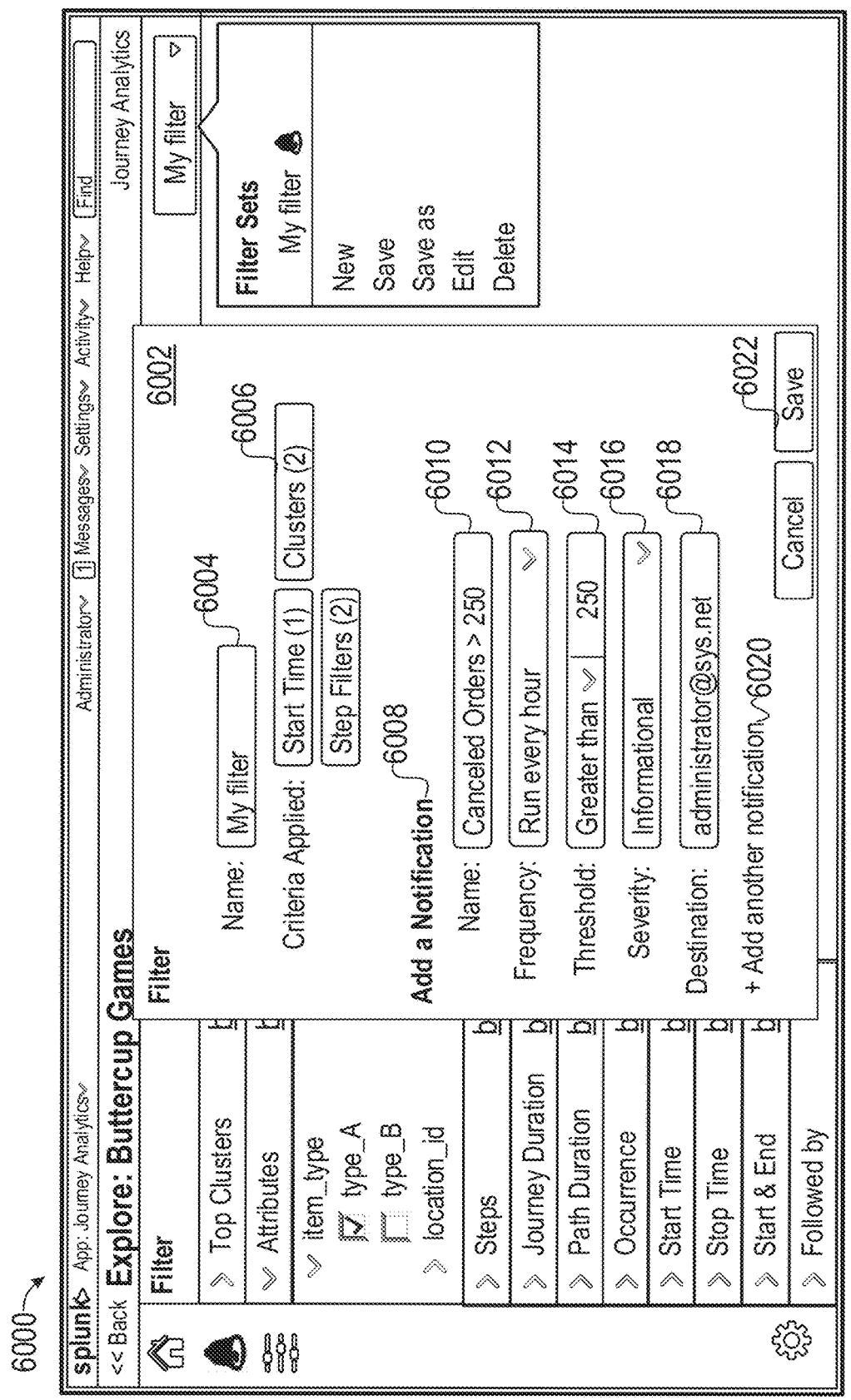
Figure 61:
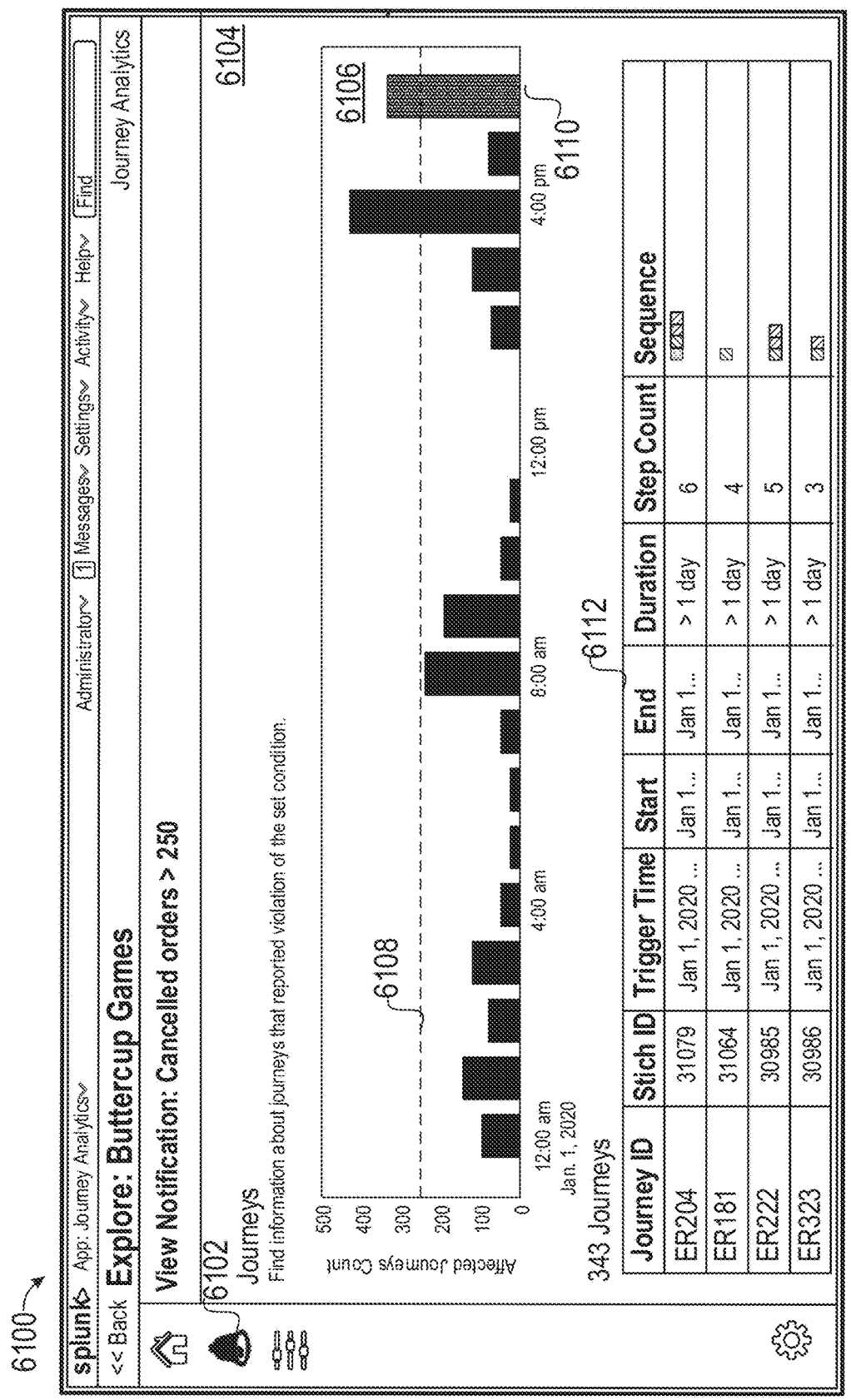

With reference to FIGS. 59-61 illustrative interfaces for requesting notifications based on journey instances in unstructured data will be described. Specifically, the interface 5900 of FIG. 59 depicts an illustrative interface for specifying a "filter" to identify specific journey instances, from a number of potential journey instances, for which an alert should be created. For example, a filter may be used to detect journey instances including specific steps, having specified attributes, taking a given amount of time, etc. The interface 6000 of FIG. 60 depicts an illustrative interface for specifying a magnitude of filtered journey instances necessary to cause an alert state, resulting in a notification. For example, the magnitude may specify that if a given number or percentage of journey instances match the filter, then an alert state has been reached. The interface 6100 of FIG. 61 depicts an illustrative interface for reviewing journey instances matching a filter, such as to review those journey instances that caused an alert state. The interfaces of FIGS. 59-61 may illustratively be generated by the data intake and query system 108 to facilitate inspection of unstructured machine data.

As noted above, the interface 5900 of FIG. 59 depicts an illustrative interface for specifying a "filter" to identify specific journey instances, from a number of potential journey instances, for which an alert should be created. In FIG. 59, it is assumed that a journey has previously been defined by a user, as discussed above. The journey is illustratively depicted in element 3902, and includes a number of steps, each of which represent touchpoints with an illustrative service (e.g., a shopping system or the like). As shown in FIG. 59, a variety of different paths may be taken through the journey, reflecting the unique interactions of each user. Some paths may represent expected or unproblematic user experiences, while other paths may represent problematic or undesirable experiences. The interface 5900 therefore includes a filter panel 5910 enabling specification of criteria of individual journey instances, such that an end user may better identify potentially problematic journey instances.

Specifically, the filter panel 5910 enables specification of journey instance criteria including: clusters of steps within instances, attributes of instances, steps within instances, duration of a journey instance, duration of a sub-path within a journey instance, an occurrence of a specific step (or steps) within an instance, start time of an instance, stop time of the instance, start and end steps of an instance, and a particular ordering of steps within an instance (e.g., a first step "followed by" a second step), each of which is discussed in more detail below. While the interface provides examples of journey instance criteria, others may be included.

More specifically, panel object 5912 can enable a user to specify, as a criterion for a filter, a particular cluster of steps included within journey instances. Clusters of steps are discussed in more detail above with respect to FIGS. 40A-40B. Selection of the panel object 5912 illustratively results in display of an interface depicting common clusters of journey instances within past data, which may be similar to the summarization control area 3912 of FIG. 40A. By selection of one or more clusters, a filter may be modified such that it includes only instances conforming to at least one selected cluster.

Somewhat similarly, panel object 5914 can enable a user to specify, as a criterion for the filter, one or more attributes of matching journey instances. Attributes of journey instances are discussed above, such as with respect to FIG. 37B. As noted above, an attribute can reflect, for example, a field value of an event corresponding to a step of the journey instance. Expansion of the panel object 5914 can therefore result in a listing of potential attributes of journey instances (e.g., "item_type", "location_id," etc.). Each attribute is illustratively selectable to specify values for that attribute that should match the filter. For example, selection of input 5932, corresponding to the "item_type" attribute, can result in display of two values for the attribute found within journey instances otherwise matching the filter, shown in FIG. 59 as "type_A" and "type B." Each attribute value is illustratively selectable to add to the filter a criteria specifying that matching instances must have an attribute value among the selected values. For example, in FIG. 59, selection of input 5934 (corresponding to the "type_A" value) and deselection of input 5936 can result in only instances with a "item_type" value of "type_A" matching the filter.

Panel object 5916 can enable a user to specify, as a criterion for the filter, one or more steps of matching journey instances. Illustratively, selection of the object can result in a listing of the potential steps of journey instances (e.g., all steps of the journey), each of which may be selected to either specify that the step must be included in an instance to match the filter or to specify that the step must not be included in an instance to match the filter. For example, the object 5916 may expand to enable a user to specify that, to match the filter, an instance must include the "addtocart" step, but exclude the "purchase" step.

Panel object 5918 can enable a user to specify, as a criterion for the filter, a duration of matching journey instances. Illustratively, selection of the object can result in an input enabling specification of a duration (e.g., as a time value), as well as an operator (e.g., less than, greater than, equal to, etc.). Accordingly, a user may expand the object 5918 to specify, for example, that to match a filter, an instance must have a duration of at least n seconds.

Panel object 5920 can enable a user to specify, as a criterion for the filter, a duration between particular steps of matching journey instances. Illustratively, selection of the object can result in an input enabling specification of two potential steps of instances, and a duration (e.g., as a time value), as well as an operator (e.g., less than, greater than, equal to, etc.). Accordingly, a user may expand the object 5920 to specify, for example, that to match a filter, an instance must have a duration of at least n seconds between a first step and a second step of the journey.

Panel object 5922 can enable a user to specify, as a criterion for the filter, a threshold occurrence of one or more steps of matching journey instances. Illustratively, selection of the object can result in an input enabling specification of one or more potential steps of instances, and a number of occurrences of that step (or steps) required to match the filter. Accordingly, a user may expand the object 5922 to specify, for example, that to match a filter, an instance must include at least n occurrences of a given step, or must include at least n occurrences of a specific combination of steps (e.g., step one followed by step two).

Panel object 5924 can enable a user to specify, as a criterion for the filter, a start time of matching journey instances. In one embodiment, the start time is date-insensitive, such as a given hour and minute within a 24 hour period. Accordingly, a user may expand the object 5924 to specify, for example, that to match a filter, an instance must begin before, after, exactly at, etc. a given hour and minute.

Panel object 5926 can enable a user to specify, as a criterion for the filter, an end time of matching journey instances. In one embodiment, the end time is date-insensitive, such as a given hour and minute within a 24 hour period. Accordingly, a user may expand the object 5926 to specify, for example, that to match a filter, an instance must end before, after, exactly at, etc. a given hour and minute.

Panel object 5928 can enable a user to specify, as a criterion for the filter, one or more acceptable beginning and end steps of matching journey instances. Illustratively, selection of the object can result in an input listing a potential step of instances, a specification of one or more steps as valid beginning steps of matching instances, and specification of one or more steps as valid ending steps of matching instances. Accordingly, a user may expand the object 5928 to specify, for example, that to match a filter, an instance must begin with the "addtocart" step and end with the "remove" step.

Panel object 5930 can enable a user to specify, as a criterion for the filter, a particular ordering of steps within an instance (e.g., a first step "followed by" a second step). Illustratively, selection of the object can result in an input enabling specification of a first step, a second step, and a relationship between the steps (e.g., as consecutive or non-consecutive). Accordingly, a user may expand the object 5930 to specify, for example, that to match a filter, an instance must include the "addtocart" step immediately prior to the "remove" step. The inputs provided by selection of object 5930 may be similar, for example, to the transition filters input of FIG. 41.

Accordingly, by interaction with panel 5910, a user is enabled to specify one or more criteria for a filter. The various criteria selected via the panel 5910 may be combined according to one or more logical operators predefined according to the interface 5900. For example, the criteria specified within each object 5912-5930 may be combined according to an "AND" operator, such that each criteria must be met for an instance to conform to the filter. As a further example, the acceptable values for an individual criterion (e.g., the acceptable values for the "item-type" attribute) may be combined with an "OR" operator, such that any selected value satisfies the criteria. In other embodiments, the interface 5900 may enable a user to specify logical operators combining each of the criteria. Thus, the interface 5900 can enable a user to filter journey instances to identify only those instances relevant to a particular analysis.

In some embodiments, the visualization of panel 3902 may reflect a totality of journey instances conforming to currently specified filter criteria. For example, the nodes within the panel 3902 may reflect steps of instances conforming to a current filter, and the interconnections between nodes may represent transitions between those steps. In some cases, the interconnections or nodes may be colored, shaded, or otherwise altered to reflect attributes of instances represented by those nodes or interconnections. For example, nodes or interconnections may be shaded such that more common nodes or interconnections are represented with higher opacity than less common nodes or interconnections. Thus, interaction with the panel 5910 can enable a user to interact with a journey to determine, for a past period of time, potentially undesirable instances.

In addition to detecting potentially undesirable past journey instances, the interface 5900 can enable a user to save a filter, such that the filter can later be reapplied to journey instances (e.g., at a later point in time, potentially after new instances exist). Specifically, the interface includes input 5938, which displays a name of a current filter and is selectable to show a menu 5942 of saved filters. Each filter identified in the menu 5942 is illustratively selectable to apply the filter to the interface 5900, thus modifying the selections of panel 5910 and the instances shown in the panel 3902 in accordance with the selected filter's criteria.

In addition, the menu 5942 includes elements 5944 selectable to create a new filter, save a current filter, save the current filter as a specific filter, edit aspects of the current filter, or delete the current filter. An example interface 6000 for editing aspects of a filter, which may be reached for example by selection of the "save as" or "edit" elements of the menu 5932, is shown in FIG. 60.

Specifically, the interface 6000 of FIG. 60 differs from the interface 5900 by inclusion of the filter editing panel 6002. The panel 6002 illustratively includes an input 6004 enabling specification of a name for the filter, as well as a listing 6006 of the criteria forming the filter. Individual criteria may be selected from the listing 6006 to, for example, remove the criteria from the filter.

In addition, the panel 6002 includes a notification portion 6008, enabling a user to request a notification when instances conforming to the filter reach a specified threshold, which is generally referred to herein as an "alert state" (e.g., a state of events within underlying raw machine data that, when processed as journeys and filtered according to the filter criteria, reaches the specified threshold such that an alert should be provided to a specified user). The combination of filter criteria (e.g., criteria defining certain journey instances from among a set of instances) and notification criteria (e.g., criteria defining a threshold for when an aggregate of the instances conforming to the filter criteria require a notification) is generally referred to herein as alert state criteria.

To enable creation of an alert state, the portion 6008 includes a name input 6010 for the alert state, such that a user can distinguish different states. In the illustration of FIG. 60, the alert state is named "Canceled Orders>250," indicating that a notification should be sent if canceled orders (a particular type of journey instance defined by the filter specified, e.g., via the interface 5900) in a given hour exceed 250. The portion 6008 further includes a frequency input 6012, which illustratively defines how often a search of raw machine data should be conducted to construct journey instances, filter instances according to the filter criteria and evaluate those instances according to the notification criteria. The frequency further illustratively defines the period over which instances should be constructed, such that event data over the frequency period (e.g., a past hour) is queried to construct instances. However, the period over which instances should be constructed may also be separately specified.

Still further, the portion 6008 includes a threshold input 6014, enabling specification of a threshold value defining a threshold for when an aggregate of the instances conforming to the filter criteria require a notification. In the example of FIG. 60, the threshold is an absolute value, such that if an absolute number of instances over the past period meet the value, an alert state is entered and a notification is sent. In another embodiment, the threshold may be a relative value, such that if a relative number (e.g., a percentage) of instances over the past period meet the value, an alert state is entered and a notification is sent. The input 6014 further enables a comparison operator for the threshold, such as the number of instances being greater than, less than, equal to the value, etc.

In addition to the above, the portion 6008 includes inputs 6016 and 6018, enabling specification of a severity level for the alert state and a destination for a notification, respectively. While input 6018 is shown in FIG. 60 as including an email address, notifications may be sent via any of a variety of channels known in the art, such as text message, instance message, transmission of a notification to a streaming data system, etc. Illustratively, the destination field may enable specification of a URI associated with a destination system to which the notification should be sent.

While FIG. 60 depicts a single portion 6008 corresponding to a single notification, the panel 6002 further includes an element 6020 selectable to create additional notifications. Selection of the element 6020 may result, for example, in the inclusion of an additional portion 6008 to the panel 6002. After specification of inputs within the panel 6002, a user may select the save button 6022 to save the filter and associated notifications. Thereafter, the system providing the interface (e.g., the system 108) can periodically construct journey instances from underlying machine data and determine if those instances indicate an alert state. If so, a notification can be sent in accordance with the information specified in panel 6002, enabling a user to remain aware of events reflected within underlying machine data.

With reference to FIG. 61, an illustrative interface 6100 for reviewing notifications of alert states will be described. The interface 6100 may be reached, for example, based on a link or URI included within a notification of an alert state, or by other interaction with the interface 6100 (e.g., selection of icon 6102). The interface 6100 is shown as relating to an individual alert state, "Cancelled orders>250." However, similar interfaces may be provided for each alert state.

Within the interface 6100, a panel 6104 is provided that includes information on journey instances matching a filter corresponding to the alert state. Specifically, the panel 6104 includes a graph 6106 that reflects, for each past period at which journey instances were evaluated, a number of journey instances matching the filter of the alert state. The graph 6106 further includes a reference 6108 indicating, within the graph 6106, a threshold value for the alert state. Thus, by reference to the graph 6106, a user may quickly determine whether an alert state has been triggered at each period. While shown in FIG. 61 as a bar graph, other representations, such as a line graph, may be used.

In the interface, each bar of the graph 6106 may be selectable to show, within table 6112, details of the journey instances summarized by the bar. For example, FIG. 61 is shown with bar 6110 selected. Bar 6110 indicates that 343 journey instances between 5 PM and 6 PM on Jan. 1, 2020 matched a filter. Because the notification threshold for that filter was set at 250, a notification was transmitted. Because bar 6110 is selected, the particular 343 instances are shown in the table 6112. Specifically, for each instance, an identifier of the instance is shown, along with any stitching identifiers of the instance (which, as discussed above, represent identifiers of events in raw machine data that represent the journey instance), the trigger, start, and end times of the instance, the duration of the instance, the number of steps in the instance, and the sequence of those steps.

In one embodiment, the data shown within table 6112 is saved at each evaluation of an alert state (e.g., whether the state is entered or not), such that a user may quickly review instances corresponding to a filter during a given period. Further, the data saved regarding each instance for a given filter may represent a set of data required to quickly retrieve, from underlying raw machine data, events correspond to the instance. This set of data may include, for example, stitching identifiers for the events of the instance and a start and end time of the instance. Because the stitching identifiers can uniquely identify events of the instance, a query conduct against raw machine data for events matching a stitching identifier during the relevant time period can be expected to complete relatively quickly, thus enabling rapid reconstruction of an instance based on a relatively small saved set of data. Illustratively, each row within the table 6112 is selectable to conduct such a query and to view events corresponding to the instance of the row. Thus, via interaction with the interface 6110, a user is enabled to quickly review instances conforming to a filter, determine whether an alert state for the trigger was triggered, to review journey instances related to the filter, and to retrieve and review event data in underlying raw machine data that correspond to such instances.

6.2 Example Routine for Efficient Detection of Alert States in Unstructured Data As discussed above, a significant problem in enabling notification based on journey instances is the difficulty of identifying the instances within unstructured event data. For example, a process that begins with alert state criteria and then attempts to evaluate unstructured event data according to that criteria (e.g., by identifying journey instances within the event data that correspond to a filter and evaluating those instances according to notification criteria) would repeatedly incur the significant resource costs associated with evaluation of unstructured event data. Embodiments of the present disclosure address the issue by providing for use of a single, structured data set that serves as a basis for evaluation with respect to multiple alert state criteria. More specifically, embodiments of the present disclosure can enable querying unstructured event data to identify a set of journey instances within a given time period, and generate a structured data set of the journey instances. That structured data set can then be evaluated according to each of multiple sets of alert state criteria, to determine whether any alert state has occurred. Relative to unstructured event data, evaluations of the structured data set may occur rapidly, as no construction of journey instances is required. Thus, use of a single structured data set to detect multiple alert states occurring within unstructured data can provide much more responsive alert state detection than attempting to directly detect such alert states from the unstructured data.

Figure 62:
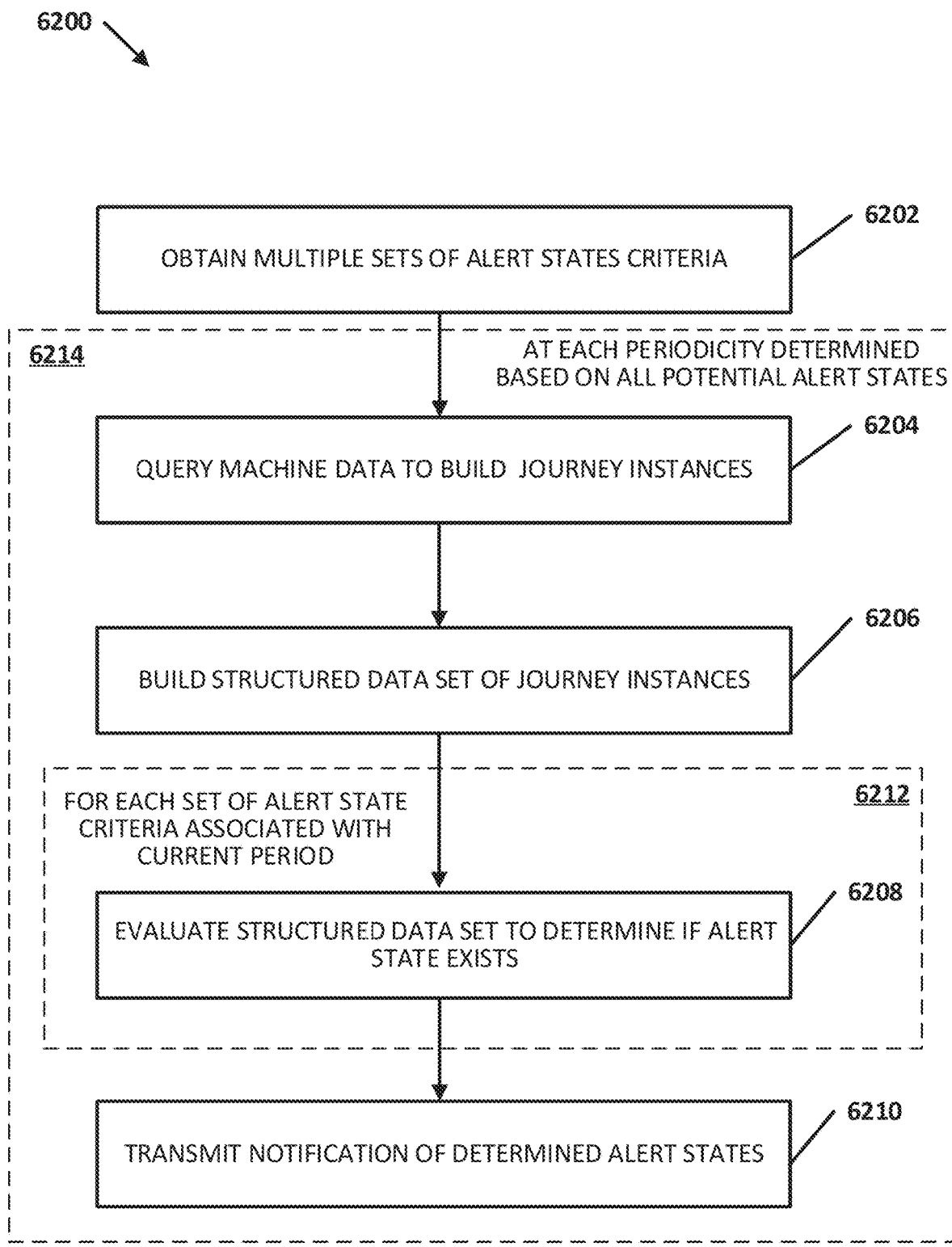
FIG. 62 depicts an illustrative routine for detecting, based on use of a structured data set, alert states occurring with respect to journey instances within unstructured data.

An illustrative routine 6200 for detecting alert states occurring within unstructured data based on use of a structured data set is represented within FIG. 62. The routine 6200 may be implemented, for example, by the data intake and query system 108. The routine 6200 begins at block 6202, where the system 108 obtains multiple sets of alert state criteria (e.g., each including at least one criterion indicating a respective alert state). Each set of alert state criteria may correspond, for example, to filter criteria (e.g., created via the interface 5900) and notification criteria (e.g., created via the interface 6000).

Thereafter, the routine 6214 enters loop 6214, which occurs at a periodicity determined based on the multiple sets of alert state criteria. Specifically, as noted above, each alert state can be associated with a frequency, indicating how frequently event data should be analyzed to determine if an alert state has been entered. To ensure event data is evaluated at the correct frequency for each alert state, the periodicity may be determined as a minimum periodicity among the alert states. For example, if a minimum frequency among the alert states is one hour, the loop 6214 may occur at each hour. The loop 6214 may in some embodiments be implemented as an infinite loop, and thus occur at the determined periodicity until the system 108 is halted, or until a change in the alert state criteria occurs.

At each instance of the loop 6214, the system 108, at block 6204, queries unstructured machine data to build, from events within the machine data, journey instances. Block 6204 may be implemented, for example, as an instance of the process 2900 of FIG. 29 or an instance of the process 3000 of FIG. 30. As a result of block 6204, one or more journey instances within the unstructured machine data are identified.

Thereafter, at block 6206, the system 108 generates a structured data set of the journey instances. Illustratively, the structure data set may include each journey instance as a distinct entry within the data set. Moreover, each entry illustratively includes sufficient information to enable determination of whether a corresponding instance matchings a set of filter criteria. For example, each entry may be associated with attributes identifying the steps in the instance (e.g., including repetitions of steps), a duration between each step, a begin time of the instance, and an end time of the instance. Each entry may further identify stitching identifiers of the instance, such that events corresponding to the instance can later be identified quickly from the unstructured event data. Illustratively, the structured event data may be a data table, with instances represented as rows of the table and attributes of each instances represented as columns. In another example, the structured event data may be a set of data objects, each data object corresponding to a journey instance and having variables or fields identifying attributes of the instance. The structured nature of the data, as opposed to events whose data that do not conform to a given data structure, enables rapid evaluation of the journey instances.

Accordingly, the routine 6200 enters loop 6212, which illustratively occurs for each set of alert state criteria associated with a current period. For example, where loop 6214 occurs hourly, a set of alert state criteria with an hourly frequency would be associated with each period, a set of alert state criteria with an every-four-hours frequency would be associated with one in every four periods, etc. In loop 6212, at block 6208, the structured data set is evaluated according to each set of alert state criteria associated with a current period. For example, for each set of alert state criteria, the structured data set may be filtered according to the filter criteria to result in a set of journey instances complying with the filter criteria. That filtered set of journey instances can then be compared to notification criteria for the alert state, to determine if an alert state has occurred. Notably, because block 6208 can occur repeatedly with respect to each set of alert state criteria, only a single structured data set is needed to support multiple alerts, and the computing cost required to generate the single structured data set (e.g., to query unstructured data and build from events within that data a set of journey instances) is minimized.

Thereafter at block 6210, for each alert state determined at block 6208, a notification is transmitted to a location associated with the alert state (e.g., as specified via the interface 6000). The notification can illustratively include a link or URI to an instance of the interface 6100, such that a user can review the journey instances that contributed to the alert state. Accordingly, a user is enabled to quickly and easily review events contributing to potentially undesirable journey instances.

7.0 Efficient Storage of Journey Data

As discussed above, the data intake and query system 108 provides numerous benefits, such as the use of flexible schemas and high data availability. However, it may not be well suited for storage of some data, such as rapidly modified data, particularly where records of past versions of the data are not desired.

One example of such data may include records of journey instances, such as those visualized in the interface 6100 of FIG. 61, discussed above. As discussed with respect to FIG. 61, a query of event data may occur periodically, such as every hour, in order to detect journey instances reflected in that event data. However, in some cases, a journey instance may not occur solely within a given period. For example, a user may begin an instance within a first hour (e.g., such that an initial touchpoint of the instance occurs in the hour), but complete the instance in a second hour. Furthermore, it may be unclear solely from data within the first hour whether an instance is complete or incomplete. For example, where a journey instance begins with adding an item to a shopping cart, it may be unclear from events within a first hour whether a user will take further action, or has "abandoned" the item. Thus, a significant probability may exist that a journey instances built during a first period, which instance is later known to be only a partial instance, should be replaced with a completed instance built during a second period. In some embodiments, the system 108 may not be configured to enable direct replacement of data, and instead utilize tombstoning when data is replaced. Thus, storage of partial journeys within the system 108 may result in excess tombstones, slowing retrieval of journey instance data and rendering such retrieval inefficient. This issue may be particularly problematic when the periodicity of creation for instances (e.g., the frequency of queries against the system 108) is short compared to the potential duration of journeys. For example, where instances are detected every 24 hours, but occur over durations of one week, roughly 85% (six sevenths) of journeys detected at each query can be expected to be partial journeys, since each journey would be reviewed at six 24 hour periods before being completed during a seventh period.

To address these problems, embodiments of the present disclosure can store information identifying journey instances external to the data intake and query system 108, within the structured data store 4922. As discussed above, the structured data store 4922 can be configured to store structured data objects, such as entries within a columnar timeseries database. Because the structured data store 4922 can enable overwriting of past data without creation of tombstones, the structured data store 4922 can be used to store information regarding partial journey instances, which can be overwritten at a later time with information regarding complete journey instances.

Figure 63:
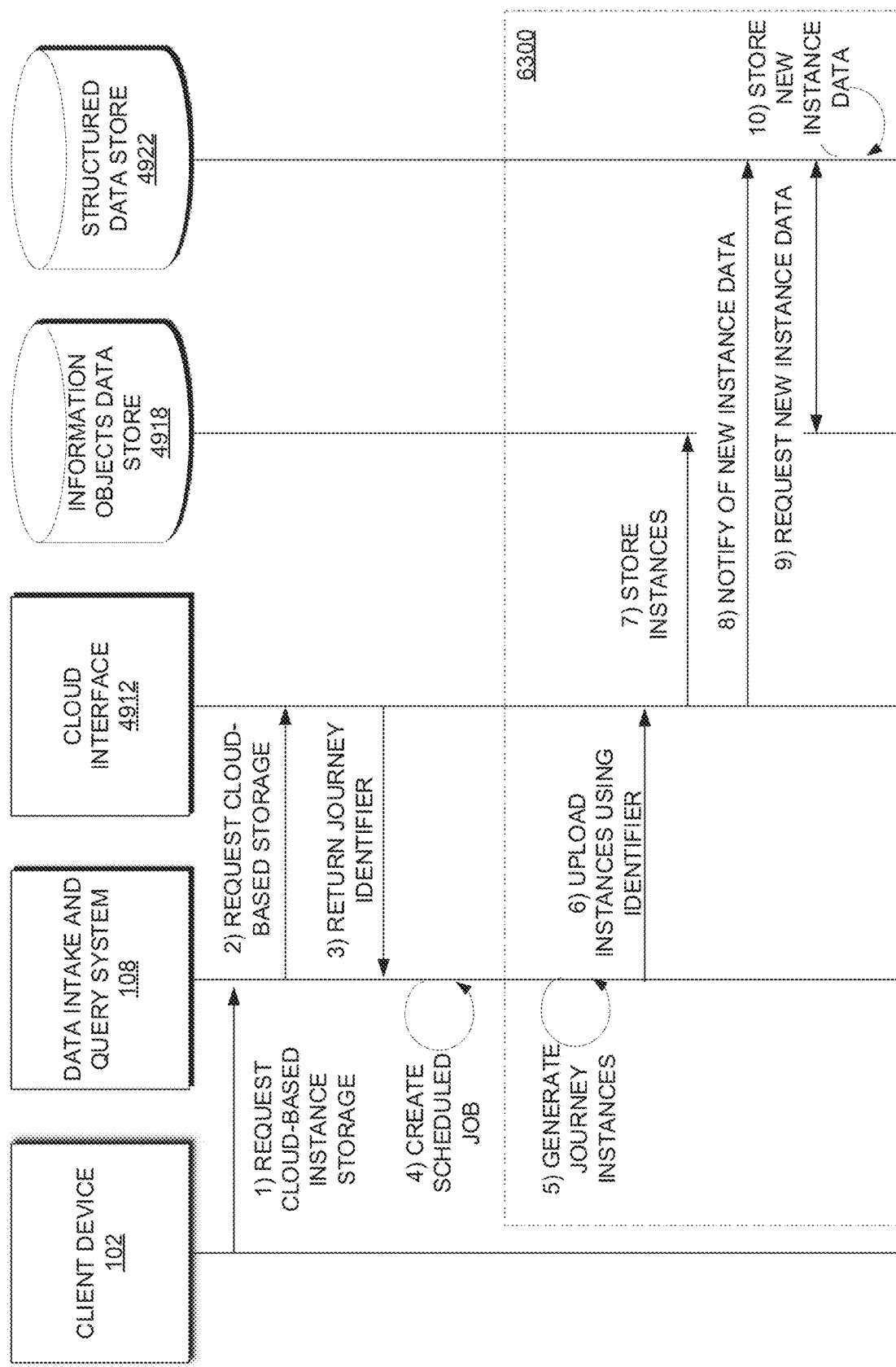
FIG. 63 depicts an illustrative flow for efficiently storing information identifying journey instances, as generated based on querying unstructured event data, within a structured data store.

Illustrative interactions for efficiently storing information identifying journey instances (which may generally be referred to herein as "storing journey instances" for simplicity) are shown in FIG. 63. As shown in FIG. 63, the interactions begin at (1), where a client device 102, which may be operated by an administrator, submits a request to the data intake and query system 108 for cloud-based storage of journey instances. The system 108 therefore, at (2), transmits a request to the cloud interface 4912 to utilize cloud-based storage. In one embodiment, the data intake any query system 108 may represent a single-tenanted system, operated on behalf of one entity, while the cloud interface 4912 may represent a part of a multi-tenanted cloud-based hosting system 4910, operated on behalf of multiple entities.

At (3), the cloud interface 4912 returns a journey identified to the system 108. The journey identifier can illustratively represent a unique identifier for the journey, utilized to distinguish instances of the journey from other instances of other journeys on the cloud-based hosting system 4910 (e.g., of the same tenant or other tenants). At (4), the system 108 creates a scheduled job, instructing the system 108 to periodically inspect the unstructured event data of the system 108 to identify journey instances, and to submit those instances to the cloud interface 4912 for storage. The scheduled job can illustratively occur at a client-specified periodicity, as specified, for example, in the request to utilize cloud-based instance storage for a journey.

An instance of the scheduled job is shown in FIG. 63 as loop 6300, which may repeat at each of the periods of the job. Specifically, at each instance of the loop 6300, the system 108, at (5), queries unstructured event data to detect events corresponding to instances of journeys within the data, and to generate those instances. Interaction (5) may represent, for example, as an instance of the process 2900 of FIG. 29 or an instance of the process 3000 of FIG. 30. As discussed above, the instances may represent complete journeys, such that no additional events corresponding to the journey will occur, or may represent partial journeys, such that one or more additional events (e.g., not yet present in the system 108) will eventually become part of the journey instance. Each instance may be represented at the system 108 by a set of information useable to uniquely identify events of the instance in the system 108 at a later time. Illustratively, each instance may be represented by an instance identifier, one or more stitching identifiers, and timing information of the instance. Illustrative information representing an instance is shown, for example, in table 6112 of FIG. 61.

At (6), the system 108 uploads the identified instances (e.g., the information representing the instances) to the interface 4912 using the identifier. In one embodiment, the instances are uploaded using a secure, encrypted connection between the system 108 and the cloud interface 4912, such as a Transport Security Layer (TLS)-compliant HTTP connection. While shown in FIG. 63 as a single interaction, in some instances the system 108 may utilize multiple connections to transmit the instances. For example, the system 108 may utilize a multi-part upload functionality of the interface 4912 to transfer the instances over multiple connections. Multiple connections may be beneficial, for example, where the information representing the instances is large (e.g., gigabytes or more).

At (7), the cloud interface 4912 stores the instances within the information objects data store 4918, and at (8), notifies the structured data store 4922 of the new instance data stored within the information objects data store 4918. While FIG. 63 depicts storage of instance data in the information objects data store 4918 prior to notifying the structured data store 4922 of the data (e.g., because the store 4918 may be configured for high resiliency storage), in some embodiments the interface 4912 may submit instance data directly to the structured data store 4922.

Thereafter, at (9), the structured data store 4922 retrieves the instance data from the objects data store 4918 and, at (1), stores the new instance data within the structured data store 4922. Storing may include, for example, creating entries within a columnar timeseries database representing each instances representing in the new instance data. More specifically, storing may include storing any new partial journey instances within the store 4922, and replacing any prior partial journey instances within the store 4922 with updated versions of those journey instances, which may represent complete journey instances. For example, where the new instance data represents instances detected within the system 108 over a particular time range (e.g., a seven day period), the structured data store 4922 may overwrite prior data within the store 4922 for that time range with the new data. Each entry within the store 4922 illustratively corresponds to an instance, with columns in the store representing attributes of the instance (e.g., as shown in the table 6112 of FIG. 61. Because overwriting can result in a "clean" replacement of prior partial instance data with newer, more complete instance data, use of the structured data store 4922 can enable more efficient storage of instance data than storage directly within the system 108. The interactions of loop 6300 may then be repeated at each period.

Thereafter, the data within the structured data store 4922 may be used to provide information on instances—reflecting events within underlying structured event data of the system 108—to a client device 102. For example, the data within the structured data store 4922 may be queried to generate the interface 6100 of FIG. 61. In some embodiments, the client device 102 may be configured to retrieve the information from the structured data store 4922 transparently to an end user of the device 102. For example, the device 102 may access the information via an on-premises network object 5304 (e.g., a web page provided by the system 108) or may utilize a cloud-provided component 5302, either of which may instruct the device 102 to retrieve instance data from the store 4922, rather than the system 108. For example, a web page provided by the system 108 may include a URI of the cloud interface 4912, such that queries regarding journey instances are directed to the interface 4912 rather than the system 108.

Figure 64:
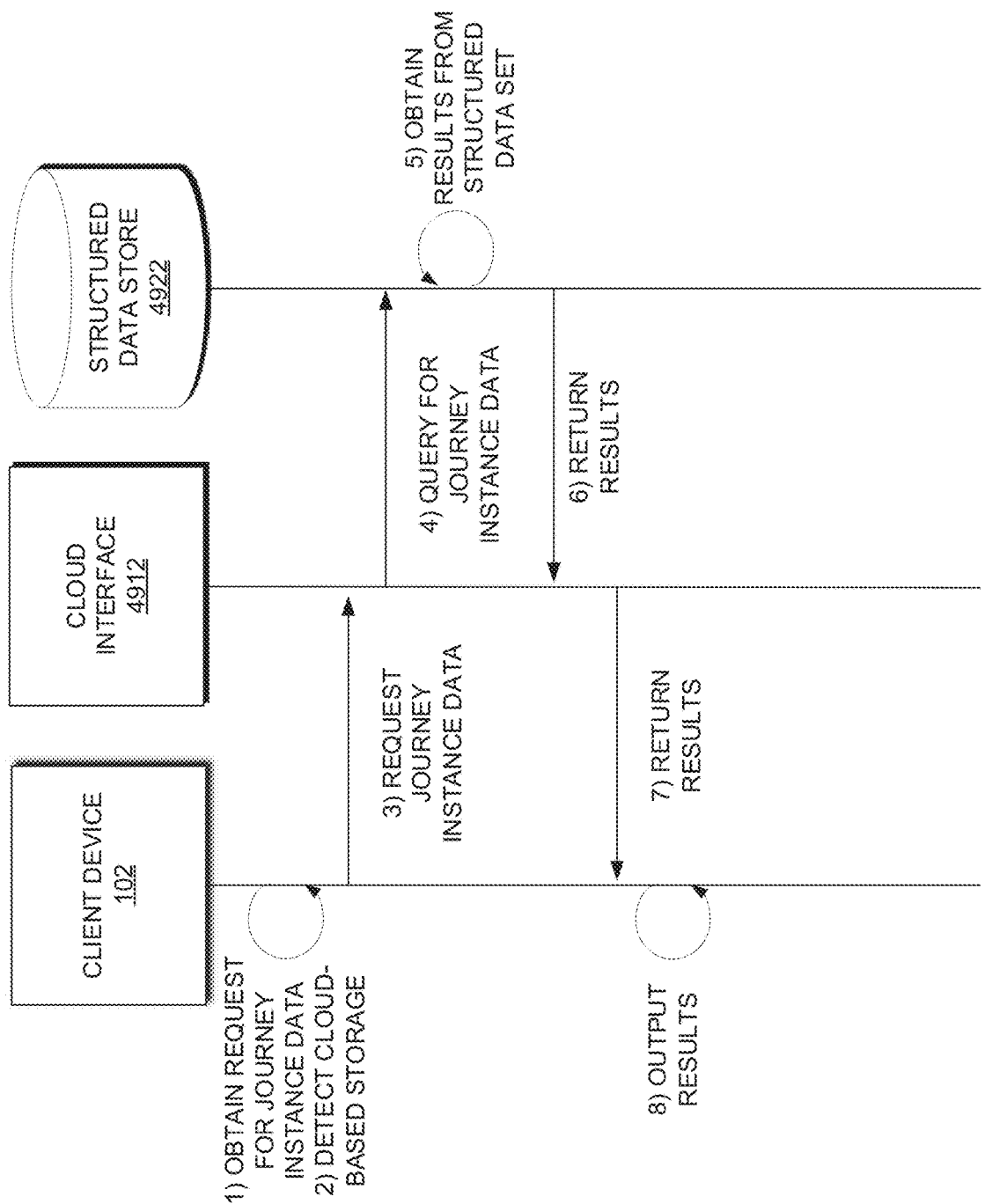
FIG. 64 depicts an illustrative flow for retrieving information of journey instances, reflective of events within unstructured event data, from a structured data store.

Illustrative interactions for retrieving instance information from the structured data store 4922 via the cloud interface 4912 are shown in FIG. 64. Specifically, as shown in FIG. 64, a client device 102, at (1), obtains a request for journey instance data. Illustratively, the device 102 may receive user input to obtain a particular set of instance data, such as input to load the interface 6100 of FIG. 61. At (2), the device 102 detects cloud-based storage of the requested instance data. Illustratively, an on-premises network object 5304 or cloud-provided component 5302 on the device 102 may indicate particular journeys for which data is stored at the cloud-based hosting system 4910, rather than the system 108. Accordingly, at (3), the client device 102 requests from the cloud interface 4912 the journey instance data. In one embodiment, the client device 102 may authenticate to the cloud interface 4912 using a token provided by the system 108, as discussed above. Accordingly, the interface 4912 may authenticate the device 102 as having permission to access the instance data.

Thereafter, at (4), the cloud interface 4912 queries the structured data store 4922 for the journey instance data. In one embodiment, the interface 4912 may utilize multiple queries to the store 4922, in order to translate between a format of requests by the client device 102 and a format of requests to the store 4922. For example, the interface 4912 may provide an API to the client device 102 over which a particular API call is received, and the interface 4912 may be configured to make one or more database queries to the store 4922 corresponding to the API call.

On receiving the one or more queries, the store 4922 obtains results from the structured data set corresponding to the queries. Illustratively, where a query is for instances within a given time range, the store 4922 may inspect the structured data set for entries within the time range, and return data identifying those entries to the interface 4912. Notably, queries to the structured data set may be expected to complete more quickly than queries to an unstructured data set, thus providing increased efficiency relative to querying the system 108 for journey instances. On obtaining results from the structured data set, the interface 4912 then, at (7), returns the results to the device 102, which outputs the results at (8). Thus, the device 102 may obtain from the structured data store 4922 instance information, in a manner potentially transparent to an end user.

Figure 65:
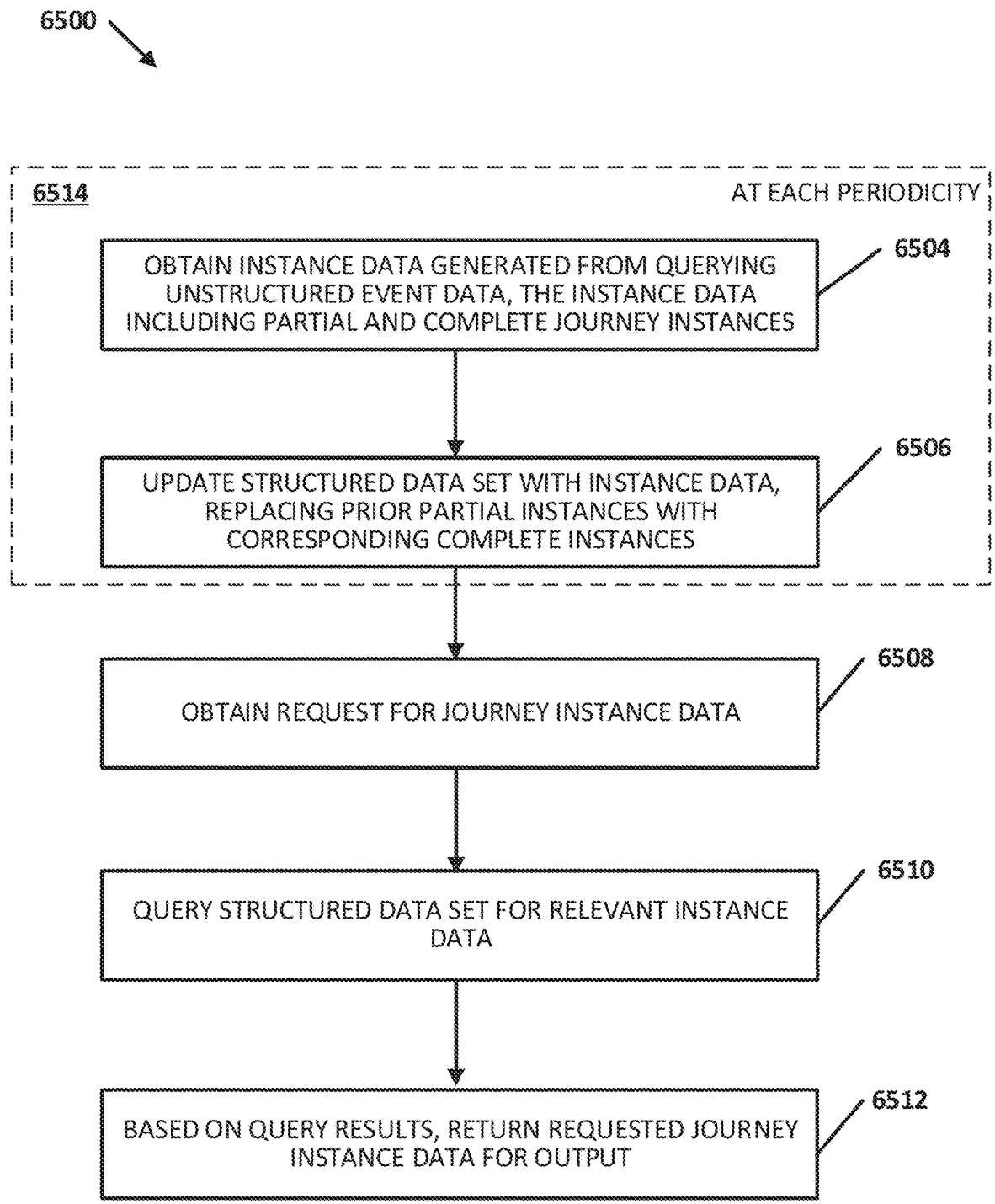
FIG. 65 depicts an illustrative routine for efficiently storing and retrieving information of journey instances, reflective of events within unstructured event data, from a structured data store.

With reference to FIG. 65, an illustrative routine 6500 for efficient storage and retrieval of journey instance data reflecting journey instances in unstructured event data will be described. The routine may be implemented, for example, by the cloud-based hosting system 4910 (e.g., the cloud interface 4912) in conjunction with a data intake and query system 108.

As show in FIG. 65, the routine 6500 begins at block 6504, where the system 4910 obtains instance data generated from querying unstructured event data, the instance data including data reflecting partial and complete journey instances. The instance data is illustratively generated by the data intake and query system 108, such as by implementation of the process 2900 of FIG. 29 or the process 3000 of FIG. 30. As discussed above, generation of instance data may include detecting events within unstructured event data, reflecting touchpoints of a user journey, and correlating such events based on identifiers within the events. Generation of instance data may be expected to be a relatively resource intensive process, and thus may occur only periodically (e.g., every 24 hours). Moreover, it may be difficult or impossible from event data to determine whether an instance has completed, or whether additional events in the instance may occur at a later time. Thus, within each set of instance data, one or more complete instances can be reflected as well as one or more partial journey instances. When the periodicity of instance data generation is short relative to the average duration of a journey instance, it is expected that a majority of the instances reflected in each set of generated instance data are partial instances.

On receiving instance data, the system 4910 at block 6506 updates a structured data set (e.g., within the store 4922) with the instance data, including replacing prior partial data regarding an instance with updated data regarding that instance (e.g., complete data). In one embodiment, the structured data set is a columnar timeseries data set, with individual entries being associated with a timestamp, such as the time that the journey began (in addition to other data, such as a journey identifier). In one embodiment, because new instance data is expected to include and expand on prior instance data for the timeframe reflected in the instance data, updating the structured data set may include overwriting all prior data for the timeframe with new instance data. For example, where a journey duration is seven days, each generation of instance data may query for events within the past seven days. Where detection of instances occurs every 24 hours, the data generated at each period may overlap with prior data by 6 days. Thus, updating the structured data set may include overwriting a past 6 days of data, and adding a new day of data to the set. Beneficially, overwriting data in this manner may occur quickly, as a timeseries data store may be optimized to conduct time-based modifications, and no inspection of non-time-based data of an entry (e.g., an instance identifier) is required. In other embodiments, updating the data set may include inspection and replacement of individual entries, such as by replacing entries of a given instance identifier with corresponding data from the obtained instance data. In some instances, updating the data set may completely replace prior data, without generation of tombstones or other reflections of deletion. While complete overwriting of data may reduce changes of data loss, this downside is mitigated by the resiliency of the system 108 against data loss. In other words, because the structured data set may be used only to reflect data derived from the system 108, data loss in the structured data set can be expected to be minimally disruptive, as such data can be replaced based on querying of the system 108.

Blocks 6504 and 6506 of the routine 6500 may illustratively be repeated, as reflected by loop 6514, as new instance data is generated by the system 108. For example, the loop 6514 may occur at each periodicity of a scheduled job created on the system 108 based on user request for cloud-based instance storage.

Thereafter, at block 6508, the system 4910 obtains a request for journey instance data. The request may be received, for example, from a client device 102, based on interaction with an access program 4902. For example, the request may be generated by loading the interface 6100 of FIG. 61, or selecting a bar within the graph 6106, thus generating a request for data of journey instances reflected in the bar.

In response, at block 6510, the system 4910 queries the structured data set for the instance data relevant to the request. Illustratively, the request may specify criteria for the relevant journey instances, such as a time range and journey identifier. The system 4910 may thus translate the request into one or more queries to the structured data set (e.g., based on predefined queries corresponding to a particular API call through with the request was received). For example, the system 4910 may query the data set for instances associated with the journey identifier and the time range. Journey instance data based on the query results is then returned in response to the request for output to a client, at block 6512.

In contrast to queries to an unstructured data set, queries to the structured data set can be expected to be relatively resource efficient. Thus, retrieval of instance data from the structure set can be expected to complete more quickly and efficiently than retrieval of instance data from the system 108. While the structured nature of the data set may impose some limits in the data that can be obtained (or the representation of that data), these limits are mitigated by maintaining underlying events of instances within the system 108. Thus, a combination of an unstructured data set and a structured data set can be used to provide the advantages of each, while also overcoming the relevant deficiencies of both storage formats.

8.0. Example Embodiments

Embodiments of the present disclosure can be described in view of the following clauses:

Clause 1. A computer-implemented method comprising:
obtaining alert criteria defining a plurality of alert states, each alert state defining a criterion by which to evaluate instances of a journey and, if the journey instances meet the criterion, to generate an alert;

executing, at a data store of unstructured event data, a query for the journey instances, each journey instances comprising a series of events, from events within the unstructured event data;

generating, from query results responsive to the query, a structured data set of the journey instances, the structured data set comprising each of the journey instances as a distinct entry within the structured data set;

evaluating the entries of the structured data set according to the criterion of each of the plurality of alert states to determine at least one alert state whose criterion is met by the journey instances identified within the unstructured event data; and transmitting a notification of the at least one alert state to a client computing device.

Clause 2. The computer-implemented method of Clause 1, wherein the events within the unstructured event data are handled as information not delineated by a pre-defined data structure.

Clause 3. The computer-implemented method of Clause 1, wherein entries within the structured data set are handled as information delineated by a pre-defined data structure.

Clause 4. The computer-implemented method of Clause 1, wherein entries within the structured data set are handled as information delineated as columns within a pre-defined data structure.

Clause 5. The computer-implemented method of Clause 1, wherein entries within the structured data set are handled as information delineated as columns within a pre-defined data structure, the columns comprising one or more of beginning timestamps of journey instances, ending timestamps of journey instances, identifiers of a journey instances, or stitching identifiers of journey instances.

Clause 6. The computer-implemented method of Clause 1, wherein the notification includes a link to a display page, and wherein the method further comprises:
obtaining a request for the display page from the client computing device; and
transmitting, to the client computing device, a subset of the journey instances identified within the unstructured event data, instances within the subset conforming to the criterion of the at least one alert state.

Clause 7. The computer-implemented method of Clause 1, wherein the notification includes a link to a display page, and wherein the method further comprises:
obtaining a request for the display page from the client computing device;
transmitting, to the client computing device, a subset of the journey instances identified within the unstructured event data, instances within the subset conforming to the criterion of the at least one alert state;
receiving selection of a journey instance within the subset, the selected journey instance associated with a time range and one or more stitching identifiers;
querying the data store of unstructured event data, based at least partly on the time range and the one or more stitching identifiers, for the series of events representing the selected journey instance; and
returning the series of events represented the selected journey instance to the client computing device.

Clause 8. The computer-implemented method of Clause 1, wherein the journey represents a series of steps, each journey instance comprising a series of events conforming to the series of steps.

Clause 9. The computer-implemented method of Clause 1, wherein the criterion of each alert state represents a combination of instance criterion defining matching instances and notification criterion defining a number of matching instances required to indicate the alert state.

Clause 10. The computer-implemented method of Clause 1, wherein the criterion of each alert state represents a combination of instance criterion defining matching instances and notification criterion defining a number of matching instances required to indicate the alert state, and wherein the instance criterion specifies at least one of: a required step, a required series of steps, a required attribute value, a required duration of instances meeting the criterion, a required duration between at least two steps, a required repetition of at least one step, a required start time, a required stop time, a required starting step, a required ending step, or a required ordering of at least two steps.

Clause 11. The computer-implemented method of Clause 1, wherein the criterion of each alert state represents a combination of instance criterion defining matching instances and notification criterion defining a number of matching instances required to indicate the alert state, and the notification criterion specifies at least one of a minimum absolute number of matching instances, a maximum absolute number of matching instances, a minimum proportion of matching instances, and a maximum proportion of matching instances.

Clause 12. The computer-implemented method of Clause 1, wherein the method is repeated at each of a set of periods.

Clause 13. The computer-implemented method of Clause 1, wherein the method is repeated at each of a set of periods, and wherein the method further comprises storing the structured data set as a record of instances associated with a current period of the set of periods.

Clause 14. The computer-implemented method of Clause 1, wherein the method is repeated at each of a set of periods, wherein each of the plurality of alert states is associated with a periodicity, and wherein the periods are determined based on a minimum periodicity among the plurality of alert states.

Clause 15. The computer-implemented method of Clause 1, wherein the query is limited to events within the unstructured event data occurring within a specified time range.

Clause 16. The computer-implemented method of Clause 1, wherein the query is limited to events within the unstructured event data occurring within a specified time range, and wherein the specified time range is determined based on a maximum duration of the journey.

Clause 17. The computer-implemented method of Clause 1, wherein the unstructured event data comprises raw machine data.

Clause 18. The computer-implemented method of Clause 1, wherein the unstructured event data comprises raw machine data obtained from heterogeneous data sources and formatted according to heterogeneous data formats.

Clause 19. The computer-implemented method of Clause 1, wherein the structured data set is a columnar time series data set.

Clause 20. The computer-implemented method of Clause 1, wherein evaluating the entries of the structured data set according to the criterion of each of the plurality of alert states further determines at least one alert state whose criterion is not met by the journey instances identified within the unstructured event data.

Clause 21. The computer-implemented method of Clause 1, wherein executing the query for the journey instances comprises, for each journey instance, stitching together the series of events of the instance based on a field value shared among the series of events.

Clause 22. A system comprising:
- a data store including computer-executable instructions; and
- a processor in communication with the data store and configured to execute the computer-executable instructions to:
  - obtain alert criteria defining a plurality of alert states, each alert state defining a criterion by which to evaluate instances of a journey and, if the journey instances meet the criterion, to generate an alert;
  - execute, at a data store of unstructured event data, a query for the journey instances, each journey instances comprising a series of events, from events within the unstructured event data;
  - generate, from query results responsive to the query, a structured data set of the journey instances, the structured data set comprising each of the journey instances as a distinct entry within the structured data set;
  - evaluate the entries of the structured data set according to the criterion of each of the plurality of alert states to determine at least one alert state whose criterion is met by the journey instances identified within the unstructured event data; and
  - transmit a notification of the at least one alert state to a client computing device.

Clause 23. The system of Clause 22, wherein the notification includes a link to a display page, and wherein the processor is further configured to execute the computer-executable instructions to:
- obtain a request for the display page from the client computing device; and
- transmit, to the client computing device, a subset of the journey instances identified within the unstructured event data, instances within the subset conforming to the criterion of the at least one alert state.

Clause 24. The system of Clause 22, wherein the notification includes a link to a display page, and wherein the processor is further configured to execute the computer-executable instructions to:
- obtain a request for the display page from the client computing device;
- transmit, to the client computing device, a subset of the journey instances identified within the unstructured event data, instances within the subset conforming to the criterion of the at least one alert state;
- receive selection of a journey instance within the subset, the selected journey instance associated with a time range and one or more stitching identifiers;
- query the data store of unstructured event data, based at least partly on the time range and the one or more stitching identifiers, for the series of events representing the selected journey instance; and
- return the series of events represented the selected journey instance to the client computing device.

Clause 25. The system of Clause 22, wherein the processor is further configured to execute the computer-executable instructions at each of a set of periods, and wherein the computer-executable instructions further cause the processor to store the structured data set as a record of instances associated with a current period of the set of periods.

Clause 26. Non-transitory computer-readable media comprising computer-executable instructions that, when executed by a computing system, cause the computing system to:
- obtain alert criteria defining a plurality of alert states, each alert state defining a criterion by which to evaluate instances of a journey and, if the journey instances meet the criterion, to generate an alert;
- execute, at a data store of unstructured event data, a query for the journey instances, each journey instances comprising a series of events, from events within the unstructured event data;
- generate, from query results responsive to the query, a structured data set of the journey instances, the structured data set comprising each of the journey instances as a distinct entry within the structured data set;
- evaluate the entries of the structured data set according to the criterion of each of the plurality of alert states to determine at least one alert state whose criterion is met by the journey instances identified within the unstructured event data; and
- transmit a notification of the at least one alert state to a client computing device.

Clause 27. The non-transitory computer-readable media of Clause 26, wherein the notification includes a link to a display page, and wherein the computer-executable instructions further cause the computing system to:
- obtain a request for the display page from the client computing device; and
- transmit, to the client computing device, a subset of the journey instances identified within the unstructured event data, instances within the subset conforming to the criterion of the at least one alert state.

Clause 28. The non-transitory computer-readable media of Clause 26, wherein the notification includes a link to a display page, and wherein the computer-executable instructions further cause the computing system to:
- obtain a request for the display page from the client computing device;
- transmit, to the client computing device, a subset of the journey instances identified within the unstructured event data, instances within the subset conforming to the criterion of the at least one alert state;
- receive selection of a journey instance within the subset, the selected journey instance associated with a time range and one or more stitching identifiers;
- query the data store of unstructured event data, based at least partly on the time range and the one or more stitching identifiers, for the series of events representing the selected journey instance; and
- return the series of events represented the selected journey instance to the client computing device.

Clause 29. The non-transitory computer-readable media of Clause 26, wherein the computer-executable instructions are first computer-executable instructions, and wherein the media further comprises second computer-executable instructions that cause the computing system to repeat execution of the first computer-executable instructions at each of a set of periods and, at each period, to store the structured data set as a record of instances associated with the period.

Clause 30. The non-transitory computer-readable media of Clause 26, wherein the query is limited to events within the unstructured event data occurring within a specified time range, and wherein the specified time range is determined based on a maximum duration of the journey Additional embodiments of the present disclosure can be described in view of the following clauses:

Clause 1. A computer-implemented method comprising:
executing, on a data store of unstructured event data, a query for instances of a journey representing a series of steps;
obtaining, in response to the query, query results representing one or more complete journey instances and one or more partial journey instances, each of the one or more complete journey instances representing a series of events conforming to an entirety of the series of steps and each of the one or more partial journey instances representing at least one event conforming to a beginning of the series of steps;
updating a structured data store with the query results obtained from the unstructured event data, wherein the structured data store is configured to store each journey instance as a distinct data entry within the structured data store, and wherein updating the structured data store comprises replacing an existing data entry within the structured data store representing a partial journey instance with a new data entry representing a complete journey instance corresponding to the partial journey instance; and
generating, from the data entries of the structured data store, a summary of the journey instances within the unstructured event data formatted for display on a client computing device.

Clause 2. The computer-implemented method of Clause 1, wherein the events within the unstructured event data are handled as information not delineated by a pre-defined data structure.

Clause 3. The computer-implemented method of Clause 1, wherein entries within the structured data store are handled as information delineated by a pre-defined data structure.

Clause 4. The computer-implemented method of Clause 1, wherein entries within the structured data store are handled as information delineated as columns within a pre-defined data structure.

Clause 5. The computer-implemented method of Clause 1, wherein the structured data store is a columnar time series data store.

Clause 6. The computer-implemented method of Clause 1, wherein entries within the structured data store are handled as information delineated as columns within a pre-defined data structure, the columns comprising one or more of beginning timestamps of journey instances, ending timestamps of journey instances, identifiers of a journey instances, or stitching identifiers of journey instances.

Clause 7. The computer-implemented method of Clause 1, wherein the query results represent journey instances associated with a time range, and wherein updating the structured data store with the query results comprises deleting past entries within the structured data store that are associated with the time range and entering the query results into the structured data store.

Clause 8. The computer-implemented method of Clause 1, wherein the method is repeated at each period of a set of periods, wherein each set of query results represent journey instances associated with a time range that is greater than a duration of each period, and wherein each set of query results partially overlaps in time with a prior set of query results.

Clause 9. The computer-implemented method of Clause 1, wherein the method is repeated at each period of a set of periods, and wherein the one or more partial journey instances are indistinguishable from the one or more complete journey instances at a current period.

Clause 10. The computer-implemented method of Clause 1, wherein the query is limited to events within the unstructured event data occurring within a specified time range.

Clause 11. The computer-implemented method of Clause 1, wherein the query is limited to events within the unstructured event data occurring within a specified time range, and wherein the specified time range is determined based on a maximum duration of the journey.

Clause 12. The computer-implemented method of Clause 1, wherein the unstructured event data comprises raw machine data.

Clause 13. The computer-implemented method of Clause 1, wherein the unstructured event data comprises raw machine data obtained from heterogeneous data sources and formatted according to heterogeneous data formats.

Clause 14. The computer-implemented method of Clause 1, wherein executing the query for the journey instances comprises, for each journey instance, stitching together the series of events of the instance based on a field value shared among the series of events.

Clause 15. The computer-implemented method of Clause 1, wherein the unstructured event data is held within a single-tenanted data store of a first environment, and wherein the structured data store is maintained within a multi-tenanted hosted computing environment distinct from the first environment.

Clause 16. The computer-implemented method of Clause 1, wherein the unstructured event data is held within a single-tenanted data store of a first environment, and wherein the structured data store is maintained within a multi-tenanted hosted computing environment distinct from the first environment, and wherein each data entry within the structured data store is associated with a journey identifier distinguishing instances of the journey from instances of other journeys of other tenants of the multi-tenanted hosted computing environment.

Clause 17. The computer-implemented method of Clause 1, wherein the unstructured event data is held within a single-tenanted data store of a first environment, and wherein the structured data store is maintained within a multi-tenanted hosted computing environment distinct from the first environment, and wherein each data entry within the structured data store is associated with a journey identifier distinguishing instances of the journey from instances of other journeys of a same tenant of the multi-tenanted hosted computing environment.

Clause 18. The computer-implemented method of Clause 1, wherein each data entry within the structured data store is associated with a time stamp and a stitching identifier of the journey instance represented by the data entry, the stitching identifier representing a field value identified within the unstructured event data as shared among at least two events of the series of events of the data entry.

Clause 19. The computer-implemented method of Clause 1, wherein the unstructured event data is held within a data store that maintains tombstone information identifying data removed from the data store.

Clause 20. The computer-implemented method of Clause 1, wherein the unstructured event data is held within a data store that maintains tombstone information identifying data removed from the data store, and wherein the structured data store does not maintain information identifying data removed from the data store.

Clause 21. The computer-implemented method of Clause 1, wherein generating the summary of the journey instances comprises:
 receiving a request for the summary from a client computing device;
 transmitting one or more queries to the structured data store based on the request;
 obtaining results of the one or more queries; and
 formatting the results as the summary of journey instances.

Clause 22. The computer-implemented method of Clause 1, wherein generating the summary of the journey instances comprises:
 receiving a request for the summary from a client computing device as a call to an application programming interface (API);
 transmitting one or more queries to the structured data store, the one or more queries determined based on a predefined correspondence between the one or more queries and the call to the API;
 obtaining results of the one or more queries; and
 formatting the results as the summary of journey instances.

Clause 23. A system comprising:
 a data store including computer-executable instructions; and
 a processor in communication with the data store and configured to execute the computer-executable instructions to:
  execute, on a data store of unstructured event data, a query for instances of a journey representing a series of steps;
  obtain, in response to the query, query results representing one or more complete journey instances and one or more partial journey instances, each of the one or more complete journey instances representing a series of events conforming to an entirety of the series of steps and each of the one or more partial journey instances representing at least one event conforming to a beginning of the series of steps;
  update a structured data store with the query results obtained from the unstructured event data, wherein the structured data store is configured to store each journey instance as a distinct data entry within the structured data store, and wherein updating the structured data store comprises replacing an existing data entry within the structured data store representing a partial journey instance with a new data entry representing a complete journey instance corresponding to the partial journey instance; and
  generate, from the data entries of the structured data store, a summary of the journey instances within the unstructured event data formatted for display on a client computing device.

Clause 24. The system of Clause 23, wherein the query results represent journey instances associated with a time range, and wherein updating the structured data store with the query results comprises deleting past entries within the structured data store that are associated with the time range and entering the query results into the structured data store.

Clause 25. The system of Clause 23, wherein the processor is configured to execute the computer-executable instructions at each period of a set of periods, wherein each set of query results represent journey instances associated with a time range that is greater than a duration of each period, and wherein each set of query results partially overlaps in time with a prior set of query results.

Clause 26. The system of Clause 23, wherein the unstructured event data is held within a single-tenanted data store of a first environment, and wherein the structured data store is maintained within a multi-tenanted hosted computing environment distinct from the first environment.

Clause 27. Non-transitory computer-readable media comprising computer-executable instructions that, when executed by a computing system, cause the computing system to:
 execute, on a data store of unstructured event data, a query for instances of a journey representing a series of steps;
 obtain, in response to the query, query results representing one or more complete journey instances and one or more partial journey instances, each of the one or more complete journey instances representing a series of events conforming to an entirety of the series of steps and each of the one or more partial journey instances representing at least one event conforming to a beginning of the series of steps;
 update a structured data store with the query results obtained from the unstructured event data, wherein the structured data store is configured to store each journey instance as a distinct data entry within the structured data store, and wherein updating the structured data store comprises replacing an existing data entry within the structured data store representing a partial journey instance with a new data entry representing a complete journey instance corresponding to the partial journey instance; and
 generate, from the data entries of the structured data store, a summary of the journey instances within the unstructured event data formatted for display on a client computing device.

Clause 28. The non-transitory computer-readable media of Clause 27, wherein the query results represent journey instances associated with a time range, and wherein updating the structured data store with the query results comprises deleting past entries within the structured data store that are associated with the time range and entering the query results into the structured data store.

Clause 29. The non-transitory computer-readable media of Clause 27, wherein the computer-executable instructions are first computer-executable instructions, and wherein the media comprises second computer-executable instructions that cause the computing system to repeatedly execute the first computer-executable instructions at each period of a set of periods, wherein each set of query results represent journey instances associated with a time range that is greater than a duration of each period, and wherein each set of query results partially overlaps in time with a prior set of query results.

Clause 30. The non-transitory computer-readable media of Clause 27, wherein the unstructured event data is held within a single-tenanted data store of a first environment, and wherein the structured data store is maintained within a multi-tenanted hosted computing environment distinct from the first environment.

9.0. Example Hardware Architecture

Figure 66:
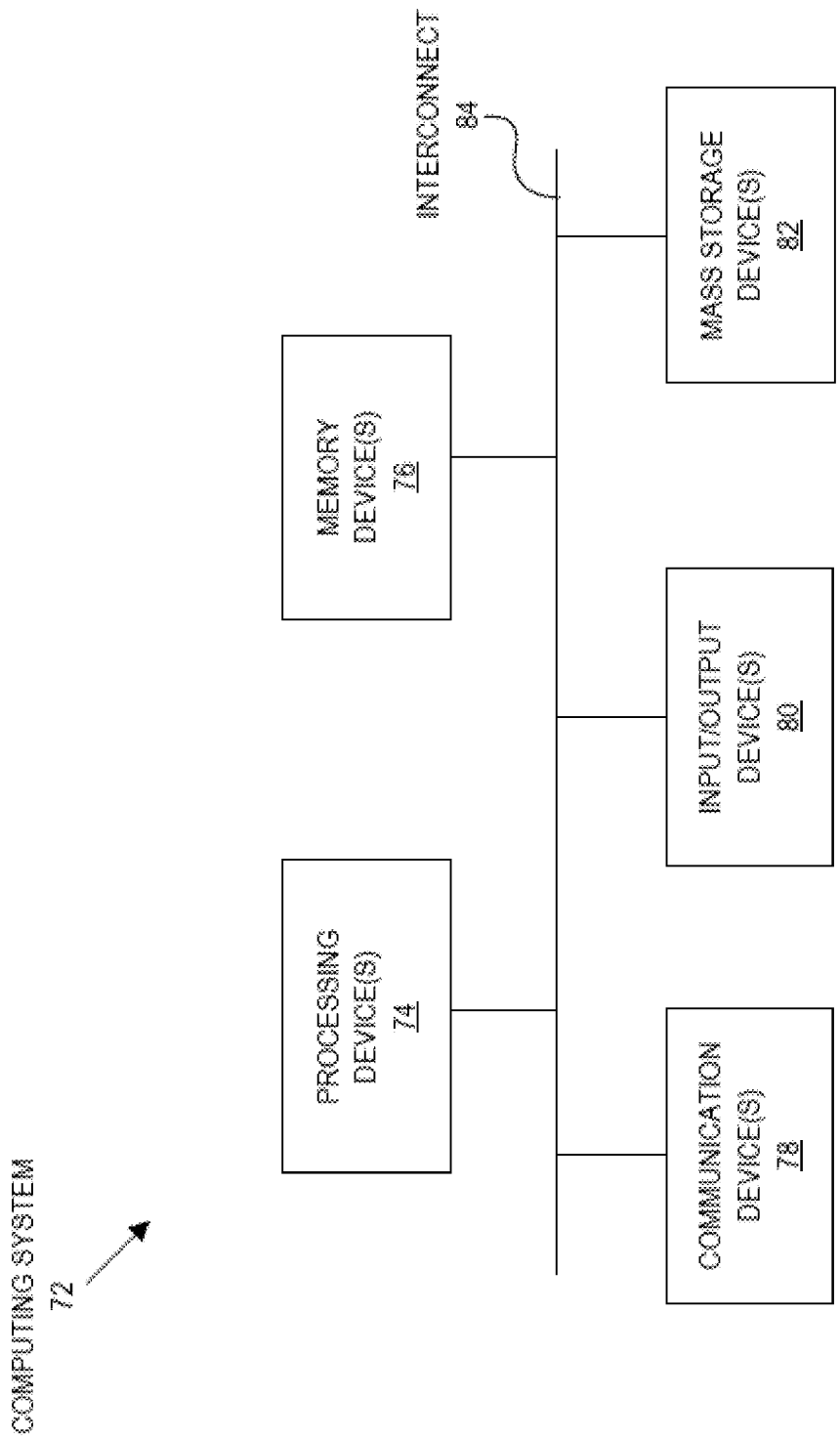
FIG. 66 is a block diagram illustrating a high-level example of a hardware architecture of a computing system in which an embodiment may be implemented.

FIG. 66 is a block diagram illustrating a high-level example of a hardware architecture of a computing system in which an embodiment may be implemented. For example, the hardware architecture of a computing system 72 can be used to implement any one or more of the functional components described herein (e.g., indexer, data intake and query system, search head, data store, server computer system, edge device, cloud-based hosting system, etc.). In some embodiments, one or multiple instances of the computing system 72 can be used to implement the techniques described herein, where multiple such instances can be coupled to each other via one or more networks.

The illustrated computing system 72 includes one or more processing devices 74, one or more memory devices 76, one or more communication devices 78, one or more input/output (I/O) devices 80, and one or more mass storage devices 82, all coupled to each other through an interconnect 84. The interconnect 84 may be or include one or more conductive traces, buses, point-to-point connections, controllers, adapters, and/or other conventional connection devices. Each of the processing devices 74 controls, at least in part, the overall operation of the processing of the computing system 72 and can be or include, for example, one or more general-purpose programmable microprocessors, digital signal processors (DSPs), mobile application processors, microcontrollers, application-specific integrated circuits (ASICs), programmable gate arrays (PGAs), or the like, or a combination of such devices.

Each of the memory devices 76 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 82 can be or include one or more hard drives, digital versatile disks (DVDs), flash memories, or the like. Each memory device 76 and/or mass storage device 82 can store (individually or collectively) data and instructions that configure the processing device(s) 74 to execute operations to implement the techniques described above.

Each communication device 78 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing devices 74, each I/O device 80 can be or include a device such as a display (which may be a touch screen display), audio speaker, keyboard, mouse or other pointing device, microphone, camera, etc. Note, however, that such I/O devices 80 may be unnecessary if the processing device 74 is embodied solely as a server computer.

In the case of a client device (e.g., edge device), the communication devices(s) 78 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 78 can be or include, for example, any of the aforementioned types of communication devices, a wired Ethernet adapter, cable modem, DSL modem, or the like, or a combination of such devices.

A software program or algorithm, when referred to as "implemented in a computer-readable storage medium," includes computer-readable instructions stored in a memory device (e.g., memory device(s) 76). A processor (e.g., processing device(s) 74) is "configured to execute a software program" when at least one value associated with the software program is stored in a register that is readable by the processor. In some embodiments, routines executed to implement the disclosed techniques may be implemented as part of OS software (e.g., MICROSOFT WINDOWS® and LINUX®) or a specific software application, algorithm component, program, object, module, or sequence of instructions referred to as "computer programs."

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method comprising:
executing, on a data store of unstructured event data, a query for instances of a journey representing a series of steps;
obtaining, in response to the query, query results representing one or more complete journey instances, each of the one or more complete journey instances representing a series of events conforming to an entirety of the series of steps; and
updating a structured data store with the query results obtained from the unstructured event data, wherein the structured data store is configured to store each journey instance as a distinct data entry within the structured data store, and wherein updating the structured data store comprises replacing an existing data entry within the structured data store representing a partial journey instance, representing at least one event conforming to a beginning of the series of steps and less than the entirety of the series of steps, with a new data entry representing a complete journey instance corresponding to the partial journey instance.

2. The computer-implemented method of claim 1, wherein the events within the unstructured event data are handled as information not delineated by a pre-defined data structure.

3. The computer-implemented method of claim 1, wherein entries within the structured data store are handled as information delineated by a pre-defined data structure.

4. The computer-implemented method of claim 1, wherein entries within the structured data store are handled as information delineated as columns within a pre-defined data structure, the columns comprising one or more of beginning timestamps of journey instances, ending timestamps of journey instances, identifiers of a journey instances, or stitching identifiers of journey instances.

5. The computer-implemented method of claim 1, wherein the query results represent journey instances associated with a time range, and wherein updating the structured data store with the query results comprises deleting past entries within the structured data store that are associated with the time range and entering the query results into the structured data store.

6. The computer-implemented method of claim 1, wherein the method is repeated at each period of a set of periods, wherein each set of query results represent journey instances associated with a time range that is greater than a duration of each period, and wherein each set of query results partially overlaps in time with a prior set of query results.

7. The computer-implemented method of claim 1, wherein the method is repeated at each period of a set of periods, and wherein the one or more partial journey instances are indistinguishable from the one or more complete journey instances at a current period.

8. The computer-implemented method of claim 1, wherein the query is limited to events within the unstructured event data occurring within a specified time range.

9. The computer-implemented method of claim 1, wherein the query is limited to events within the unstructured event data occurring within a specified time range, and wherein the specified time range is determined based on a maximum duration of the journey.

10. The computer-implemented method of claim 1, wherein executing the query for the journey instances comprises, for each journey instance, stitching together the series of events of the instance based on a field value shared among the series of events.

11. The computer-implemented method of claim 1, wherein the unstructured event data is held within a single-tenanted data store of a first environment, and wherein the structured data store is maintained within a multi-tenanted hosted computing environment distinct from the first environment.

12. The computer-implemented method of claim 1, wherein the unstructured event data is held within a single-tenanted data store of a first environment, and wherein the structured data store is maintained within a multi-tenanted hosted computing environment distinct from the first environment, and wherein each data entry within the structured data store is associated with a journey identifier distinguishing instances of the journey from instances of other journeys of other tenants of the multi-tenanted hosted computing environment.

13. The computer-implemented method of claim 1, wherein each data entry within the structured data store is associated with a time stamp and a stitching identifier of the journey instance represented by the data entry, the stitching identifier representing a field value identified within the unstructured event data as shared among at least two events of the series of events of the data entry.

14. The computer-implemented method of claim 1, wherein the unstructured event data is held within a data store that maintains tombstone information identifying data removed from the data store, and wherein the structured data store does not maintain information identifying data removed from the data store.

15. A system comprising:
a data store including computer-executable instructions; and
a processor in communication with the data store and configured to execute the computer-executable instructions to:
execute, on a data store of unstructured event data, a query for instances of a journey representing a series of steps;
obtain, in response to the query, query results representing one or more complete journey instances, each of the one or more complete journey instances representing a series of events conforming to an entirety of the series of steps; and
update a structured data store with the query results obtained from the unstructured event data, wherein the structured data store is configured to store each journey instance as a distinct data entry within the structured data store, and wherein updating the structured data store comprises replacing an existing data entry within the structured data store representing a partial journey instance, representing at least one event conforming to a beginning of the series of steps and less than the entirety of the series of steps, with a new data entry representing a complete journey instance corresponding to the partial journey instance.

16. The system of claim 15, wherein the query results represent journey instances associated with a time range, and wherein updating the structured data store with the query results comprises deleting past entries within the structured data store that are associated with the time range and entering the query results into the structured data store.

17. The system of claim 15, wherein the processor is configured to execute the computer-executable instructions at each period of a set of periods, wherein each set of query results represent journey instances associated with a time range that is greater than a duration of each period, and wherein each set of query results partially overlaps in time with a prior set of query results.

18. One or more non-transitory computer-readable media comprising computer-executable instructions that, when executed by a computing system, cause the computing system to:
- execute, on a data store of unstructured event data, a query for instances of a journey representing a series of steps;
- obtain, in response to the query, query results representing one or more complete journey instances, each of the one or more complete journey instances representing a series of events conforming to an entirety of the series of steps; and
- update a structured data store with the query results obtained from the unstructured event data, wherein the structured data store is configured to store each journey instance as a distinct data entry within the structured data store, and wherein updating the structured data store comprises replacing an existing data entry within the structured data store representing a partial journey instance, representing at least one event conforming to a beginning of the series of steps and less than the entirety of the series of steps, with a new data entry representing a complete journey instance corresponding to the partial journey instance.

19. The one or more non-transitory computer-readable media of claim 18, wherein the query results represent journey instances associated with a time range, and wherein updating the structured data store with the query results comprises deleting past entries within the structured data store that are associated with the time range and entering the query results into the structured data store.

20. The one or more non-transitory computer-readable media of claim 18, wherein the computer-executable instructions are first computer-executable instructions, and wherein the media comprises second computer-executable instructions that cause the computing system to repeatedly execute the first computer-executable instructions at each period of a set of periods, wherein each set of query results represent journey instances associated with a time range that is greater than a duration of each period, and wherein each set of query results partially overlaps in time with a prior set of query results.

* * * * *